US006327994B1

(12) United States Patent
Labrador

(10) Patent No.: US 6,327,994 B1
(45) Date of Patent: Dec. 11, 2001

(54) SCAVENGER ENERGY CONVERTER SYSTEM ITS NEW APPLICATIONS AND ITS CONTROL SYSTEMS

(76) Inventor: Gaudencio A. Labrador, 1312 Leaf Ter., San Diego, CA (US) 92114

( * ) Notice: Subject to any disclaimer, the term of this patent is extended or adjusted under 35 U.S.C. 154(b) by 0 days.

(21) Appl. No.: 08/999,729

(22) Filed: Dec. 23, 1997

Related U.S. Application Data

(63) Continuation-in-part of application No. 08/506,335, filed on Jul. 25, 1995, now abandoned, and a continuation-in-part of application No. 08/097,655, filed on Jul. 27, 1993, now Pat. No. 5,435,259, and a continuation-in-part of application No. 07/811,470, filed on Dec. 18, 1991, now Pat. No. 5,507,943, and a continuation-in-part of application No. 07/773,680, filed on Oct. 8, 1991, now abandoned, and a continuation-in-part of application No. 07/255,657, filed on Oct. 13, 1988, now Pat. No. 5,056,447, and a continuation-in-part of application No. 07/177,599, filed on Apr. 5, 1988, now Pat. No. 4,859,146, and a continuation-in-part of application No. 07/613,321, filed on Jul. 19, 1984, now Pat. No. 4,756,666.

(51) Int. Cl.⁷ .................................................. B63B 17/00
(52) U.S. Cl. ............................................................ 114/382
(58) Field of Search ............................... 114/39.11, 382; 440/8; 417/330; 60/506; 210/136

(56) References Cited

U.S. PATENT DOCUMENTS 4,112,864 * 9/1978 Bergman ........................... 114/265
4,829,928 * 5/1989 Bergman ........................... 114/125
4,993,348 * 2/1991 Wald ................................. 114/265

* cited by examiner

Primary Examiner—Stephen Avila

(57) ABSTRACT

What has been invented is a series of scientific applications of the wideface energy converter device, be it in the form of a wideface solar heat receiver or a wideface fluid impeder device. The wider is the solar heat receiver, the more solar power is available for conversion. The wider is the sail of the boat, the more wind is available to push the boat. Wherefore, the wideface solar trap made up of multi-layer transparent roofs covering a heat insulated box is used to heat up a radiator tubings that contain water. The multilayer transparent roof, having spaces in between sheets, prevents solar heat from backing out hence the trap becomes hoter and hoter because the inner sheet is not in contact with the cold wind. This solar trap is now used to heat up radiator pipes of compressed air coming from a gas turbine engine and then returned back to the exhaust turbine of same engine. Applying the principle of the wind sail, the turbine blades of the compressor and the turbine blades of the exhaust turbine are made wideface as much as possible to produce maximum impedance against the expanding exhaust hot air and to produce maximum push upon the fresh air being compressed. This wideface fluid impeder is now expanded into an underwater platform from One Acre or much more and attached to floating hotels, large/small boats, and floating sea walls, to prevent oscillation by the surfs.

127 Claims, 56 Drawing Sheets

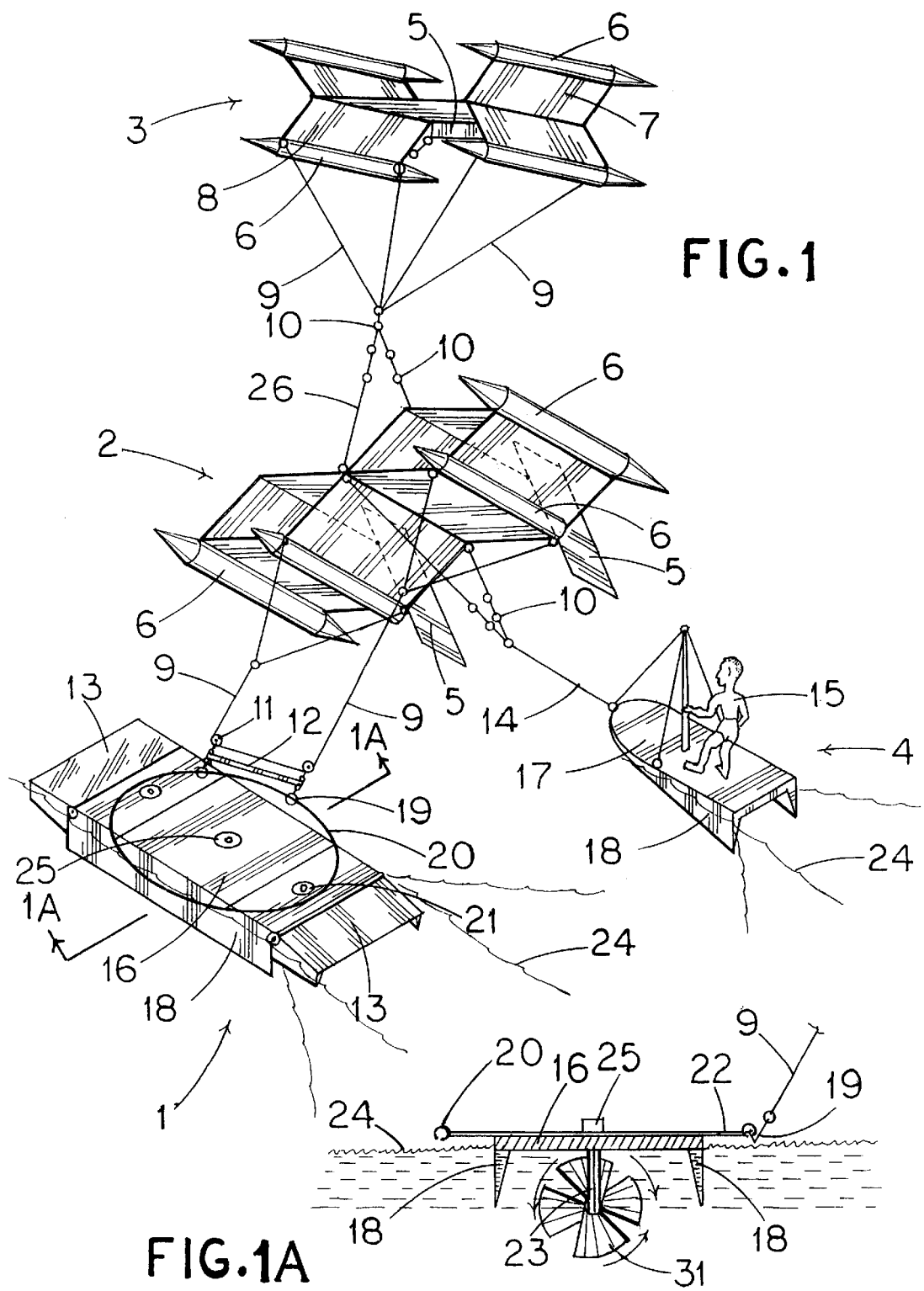

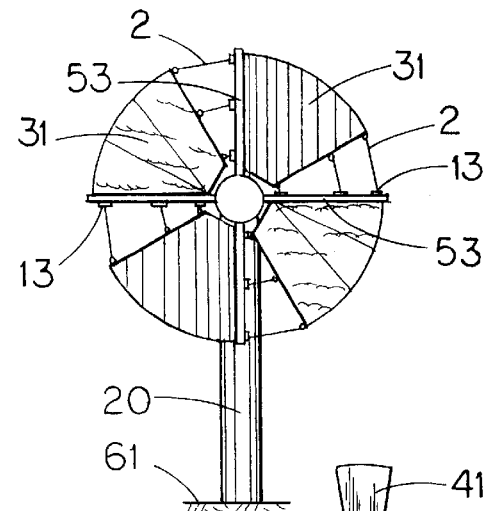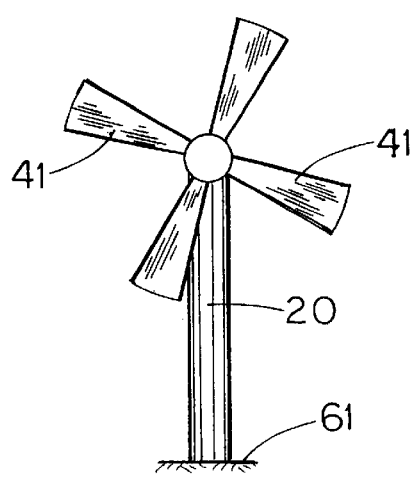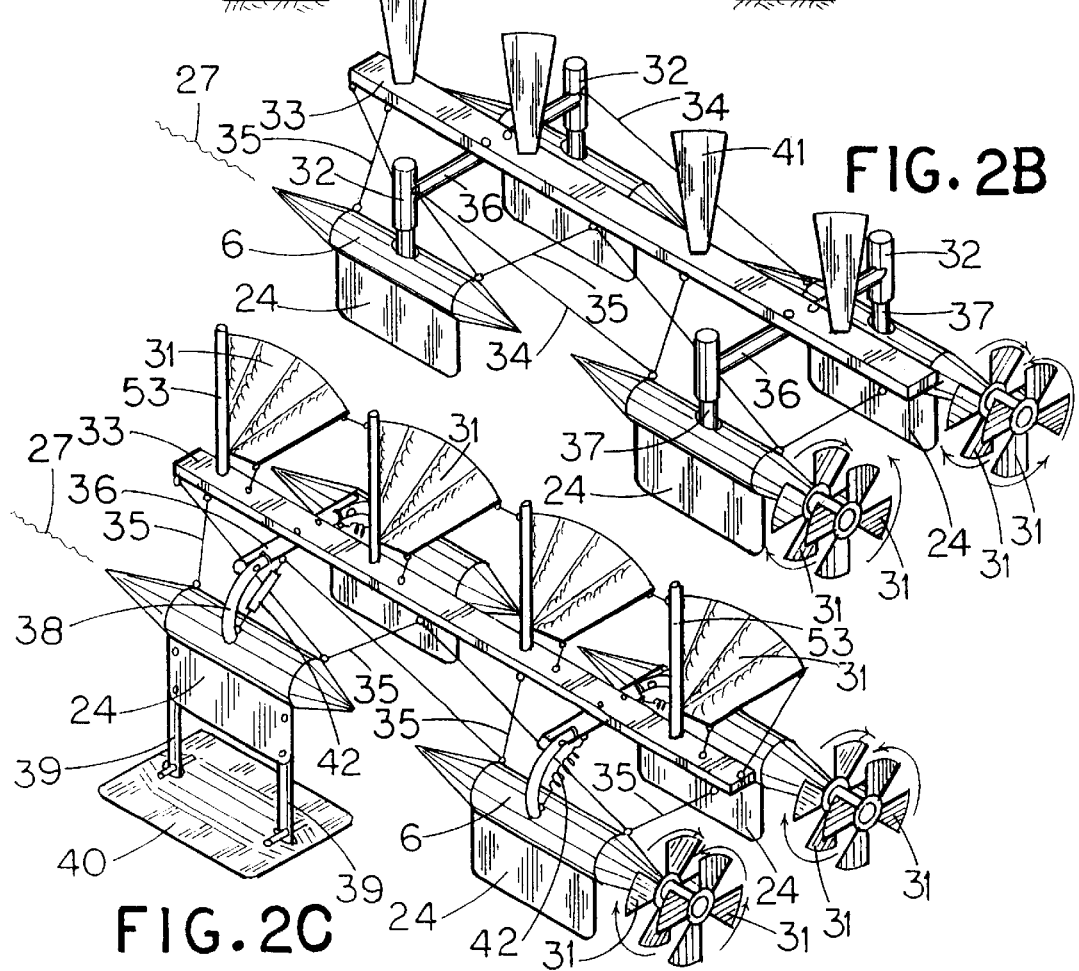

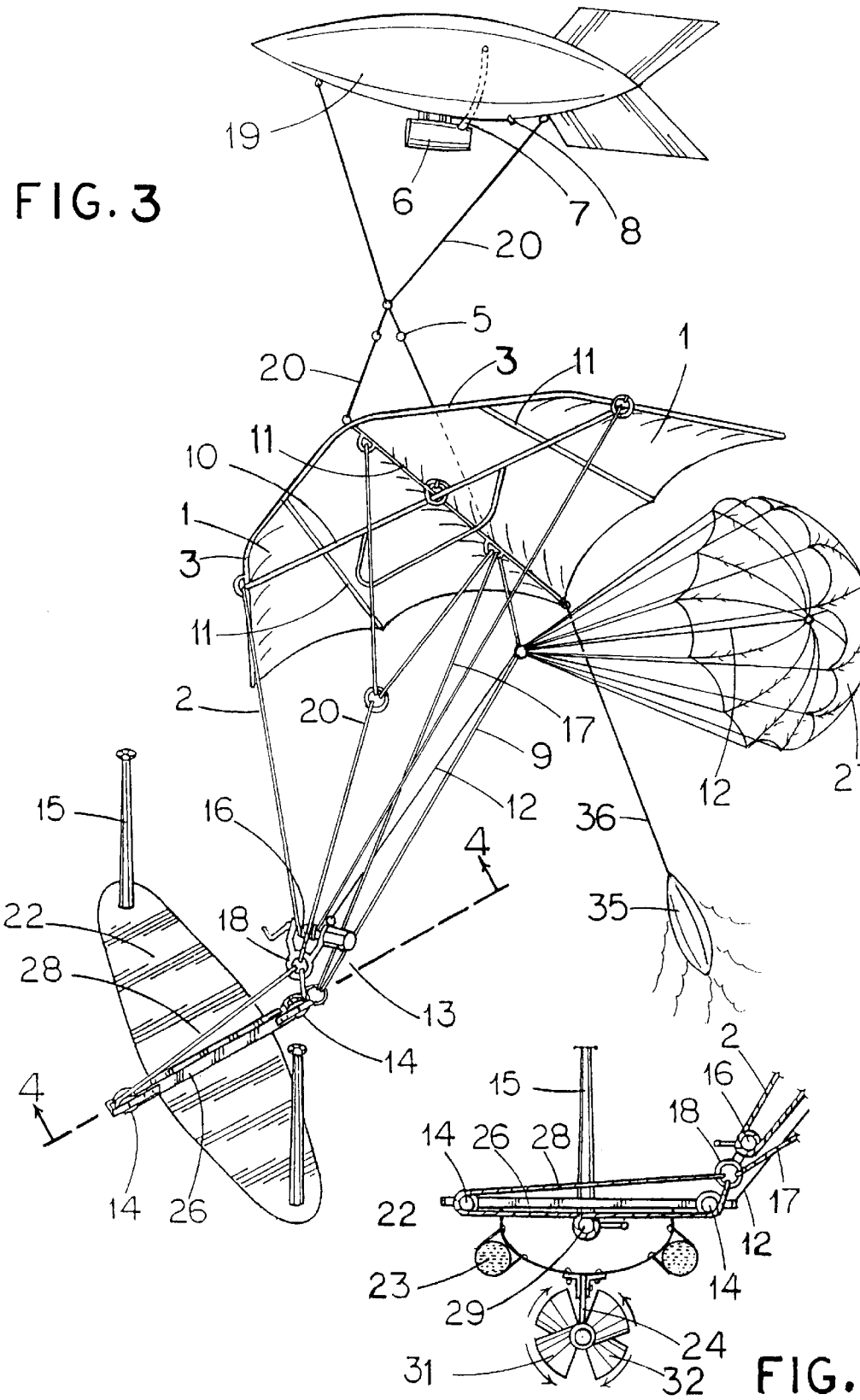

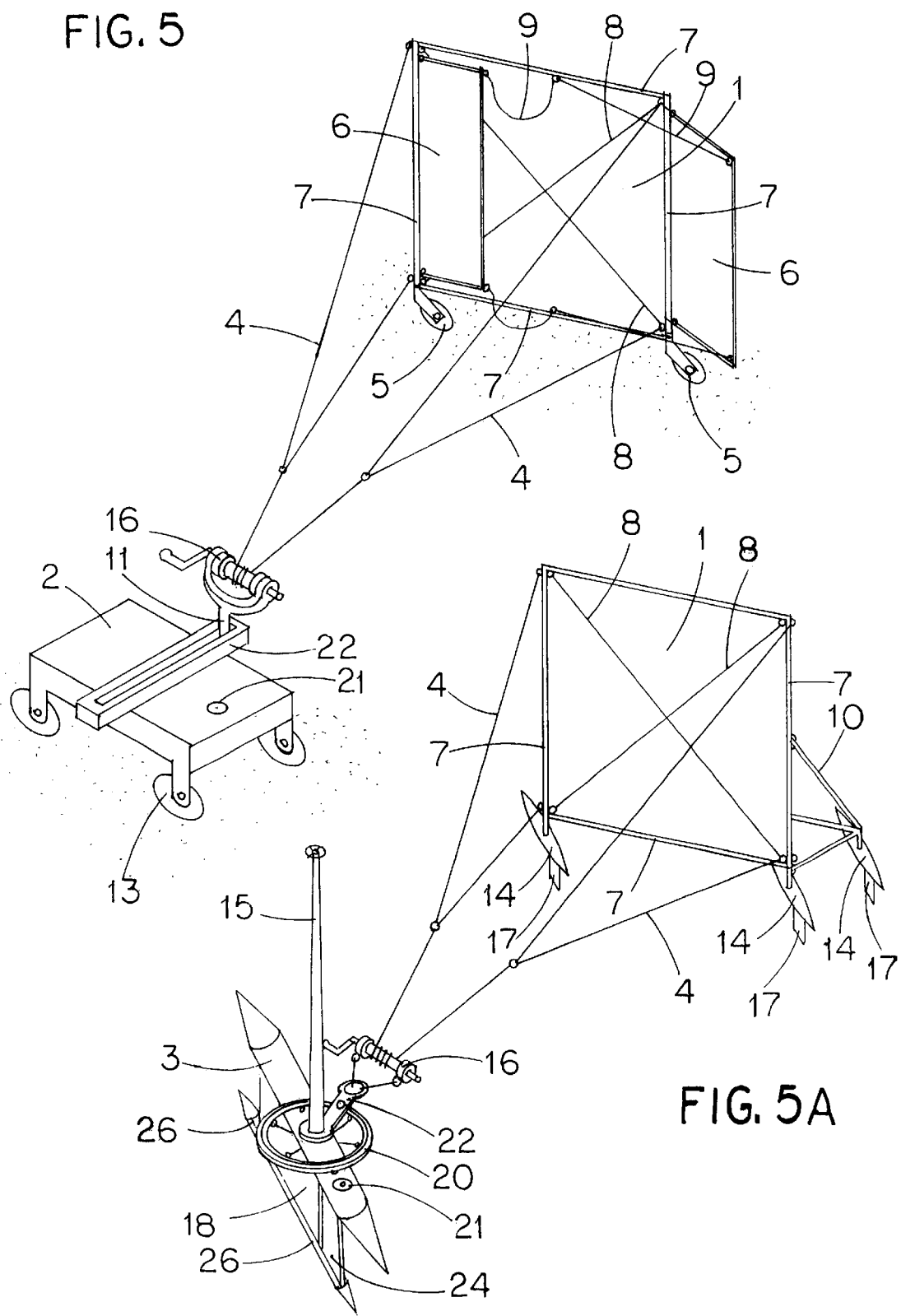

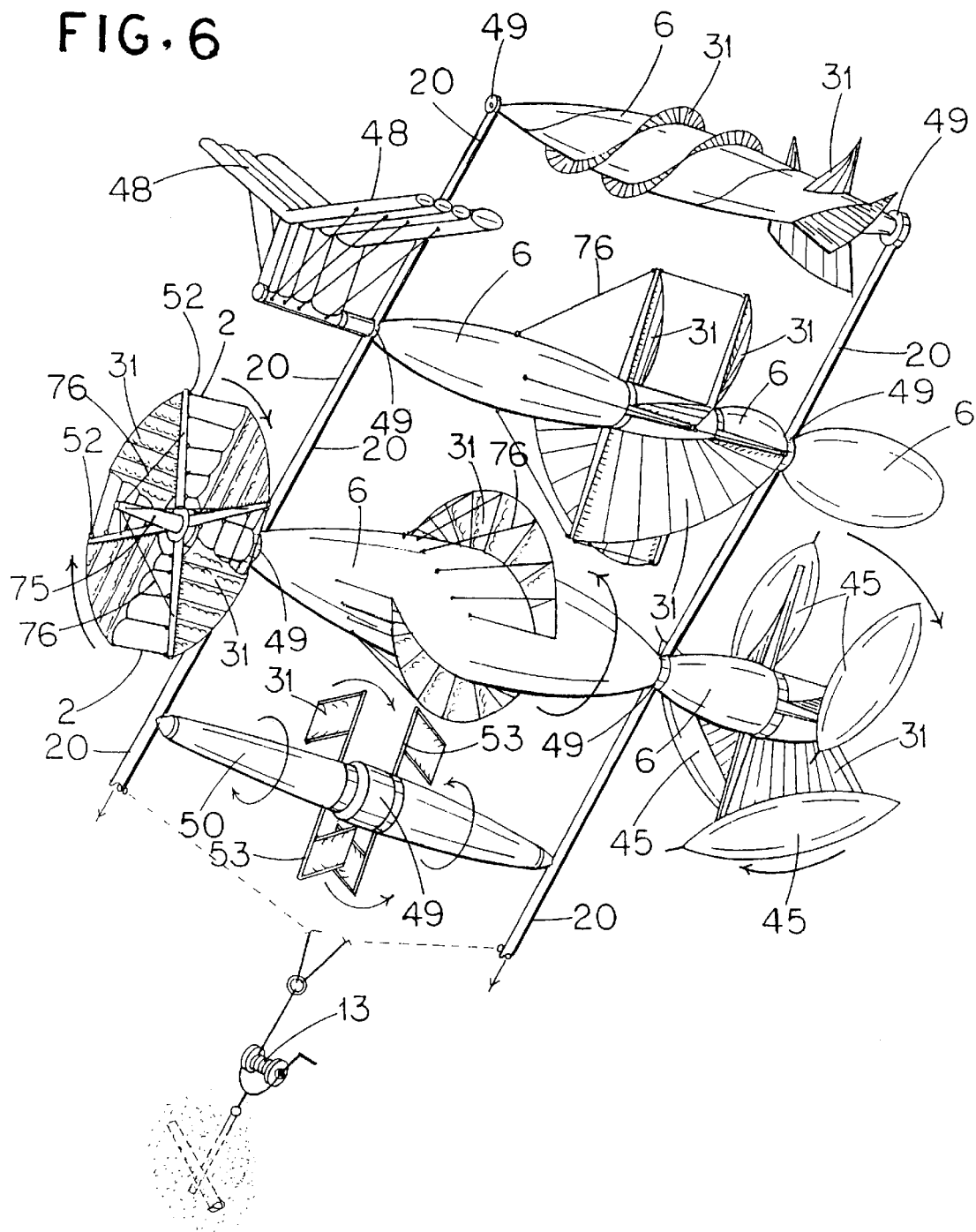

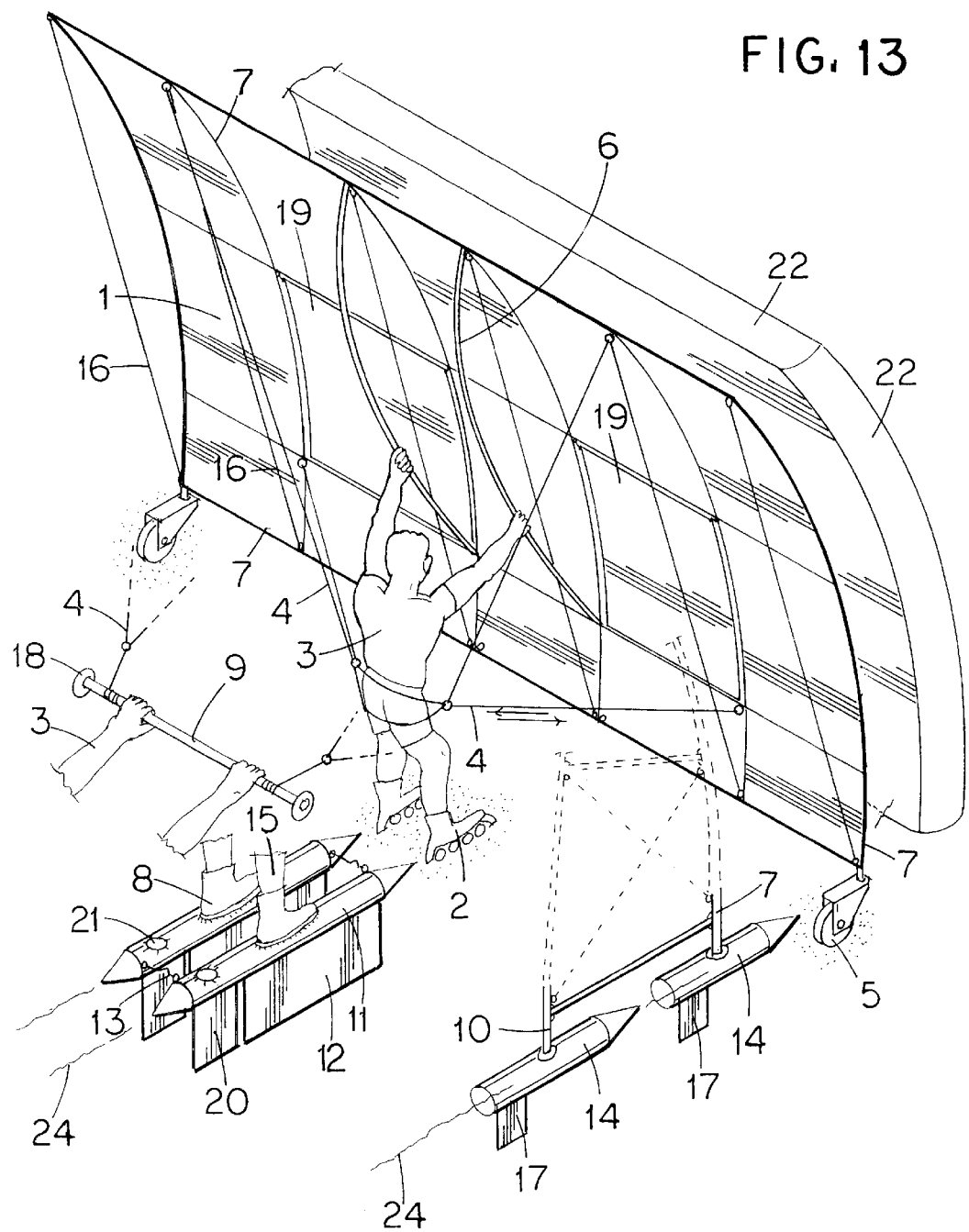

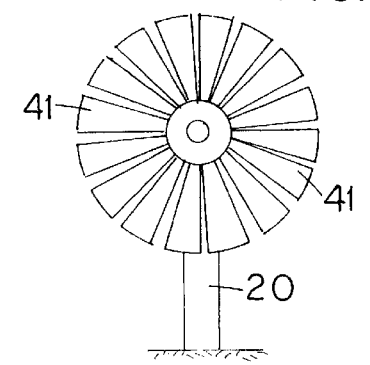
FIG.14A
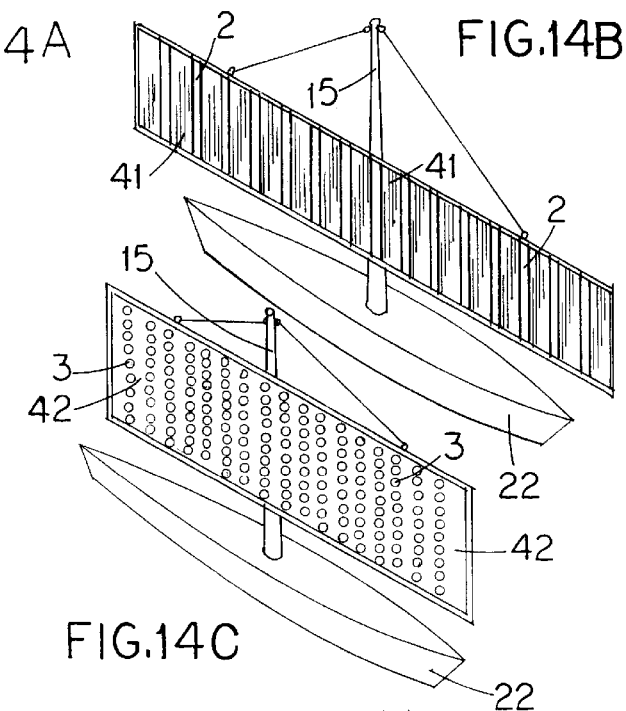
FIG.14B
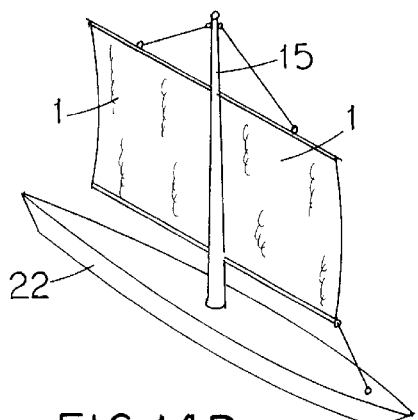
FIG.14C
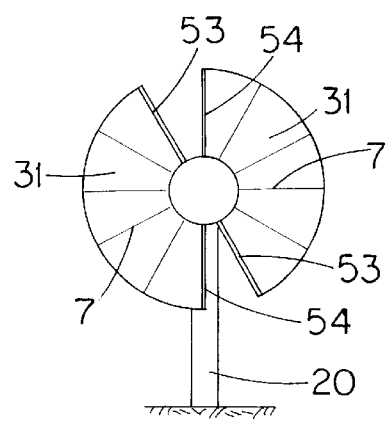
FIG.14D
FIG.14E
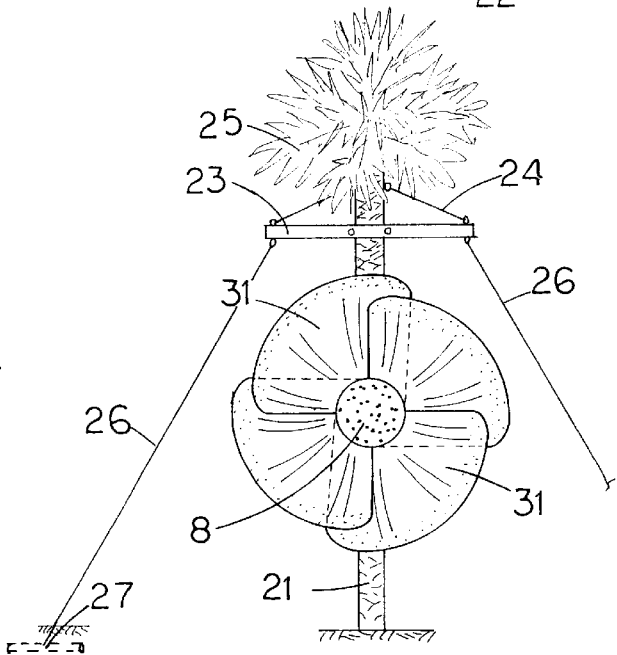
FIG.14F

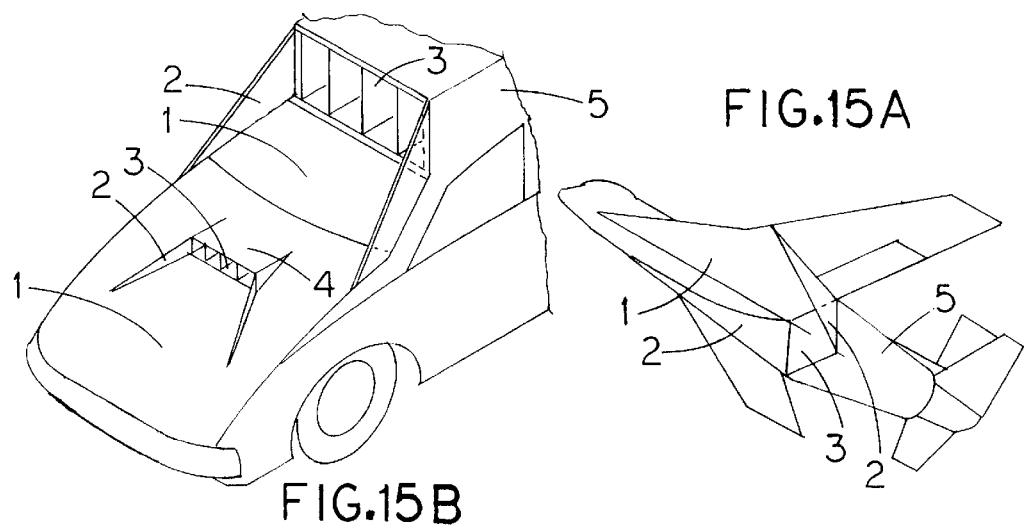
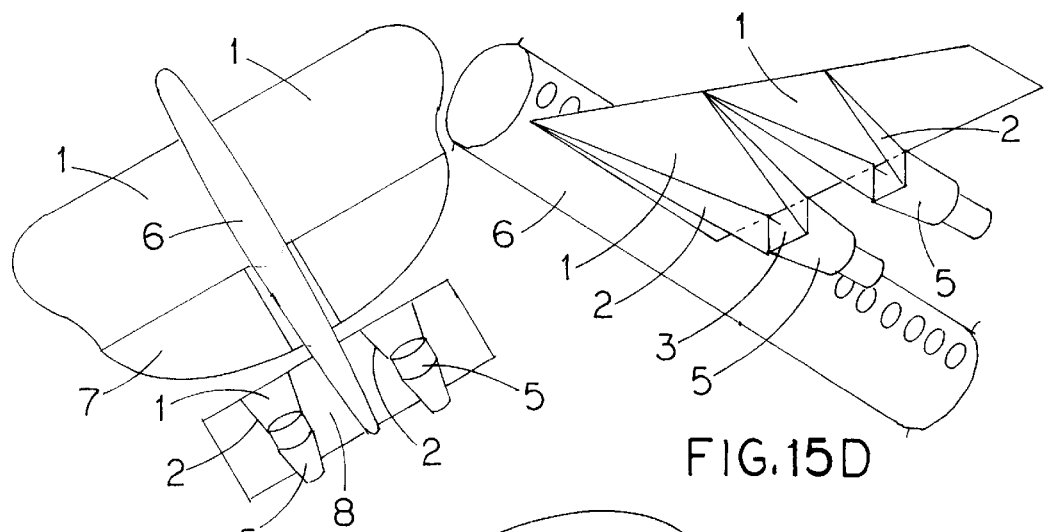
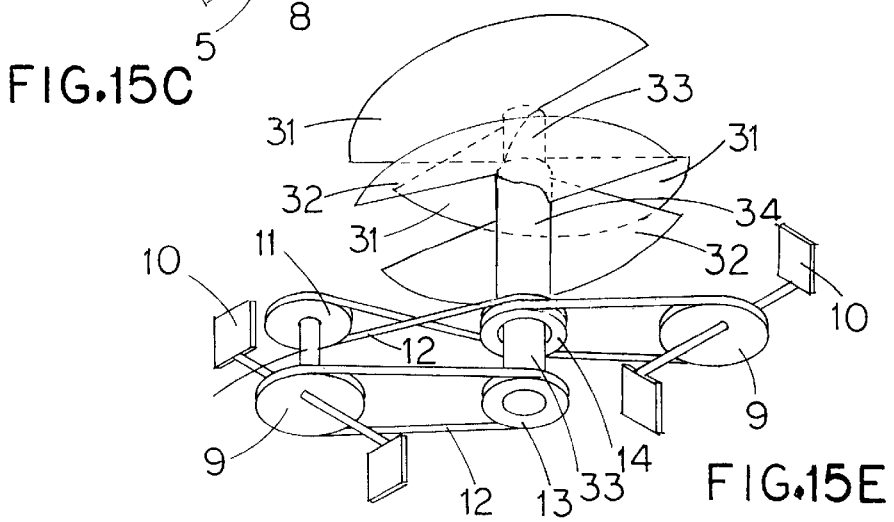

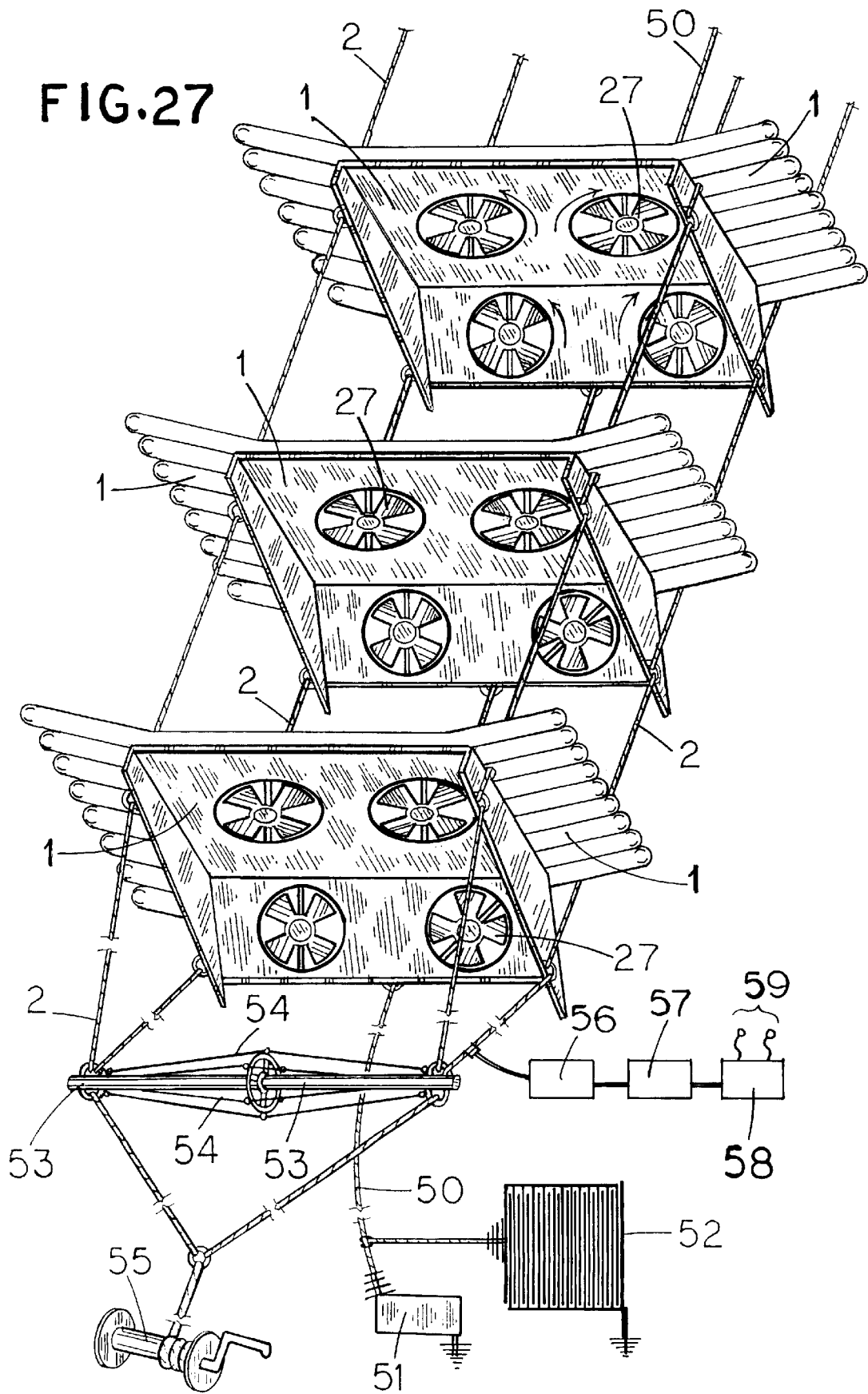

FIG. 42
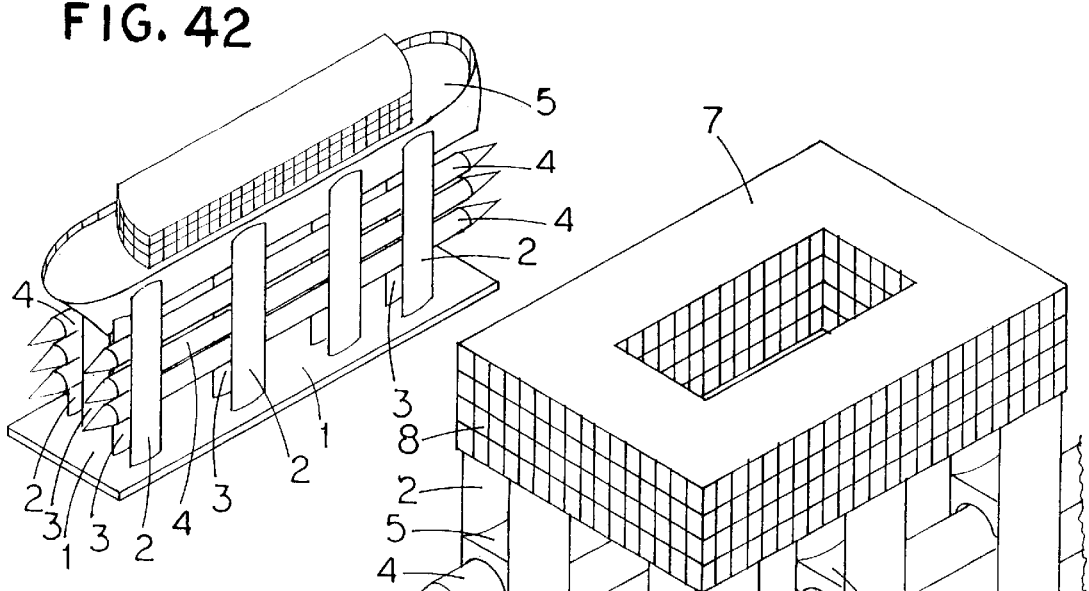
FIG. 43
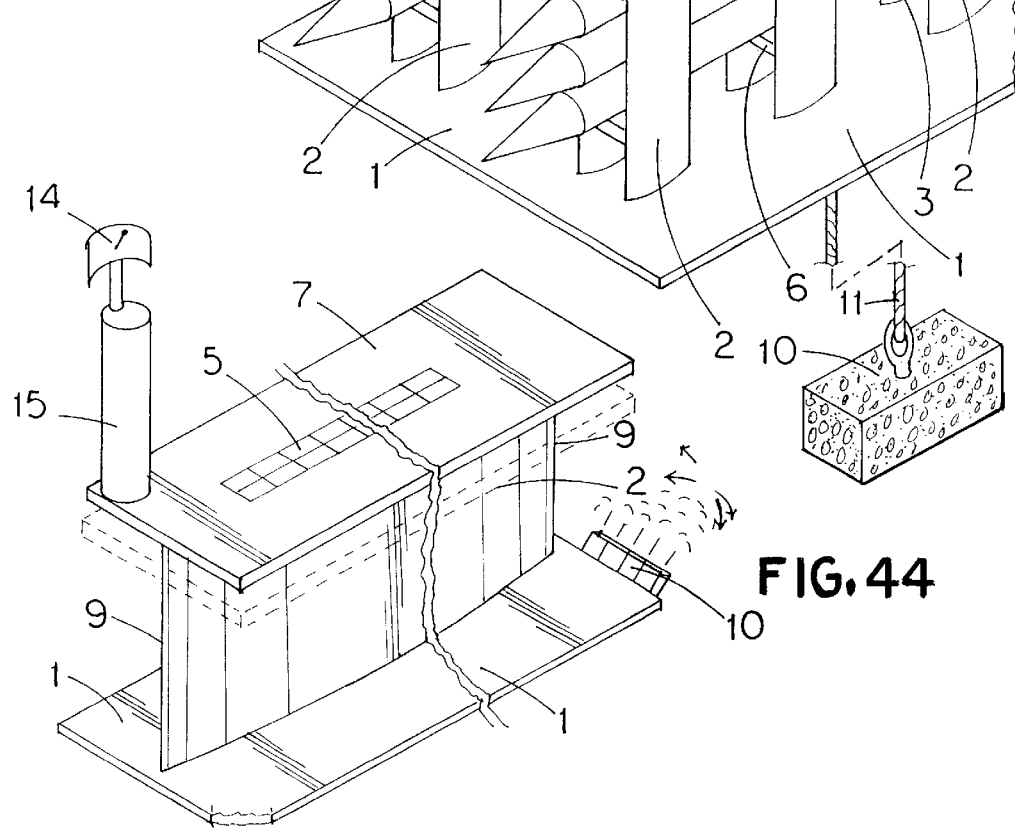
FIG. 44

SCAVENGER ENERGY CONVERTER SYSTEM ITS NEW APPLICATIONS AND ITS CONTROL SYSTEMS

CROSS-REFERENCES TO RELATED APPLICATIONS

This is a continuation-in-part of previous applications: Ser. No. 07/613,321—Jul. 19, 1984—U.S. Pat. No. 4,756,666; Ser. No. 07/177,599—Apr. 5, 1988—U.S. Pat. No. 4,859,146; Ser. No. 07/255,657—Oct. 13, 1988—U.S. Pat. No. 5,056,447; and a CIP of Ser. No. 07/773,680—Oct. 8, 1991—Abandoned; and a CIP of Ser. No. 08/097,655—Jul. 27, 1993—U.S. Pat. No. 5,435,259; and a CIP of Ser. No. 07/811,470—Dec. 18, 1991—U.S. Pat. No. 5,507,943; and a CIP of Ser. No. 08/506,335—Jul. 25, 1995—abandoned.

There is no government assistance in this invention, hence, the inventor's right is 100%.

BACKGROUND OF THE INVENTION

1. Field of Invention

This invention deals with the maximization of efficiency in fluid deflection for the purpose of maximizing conversion of the energy of fluids in motion by means of wide-face sail or by means of turbines with the blades made wide-face. It also deals with maximization of efficiency in turbine-type pumping of fluids by means of oppositely rotating multi-stage turbines with the blades made wide-face. It should be noted that fluid includes matters in liquid state as well as matters in gaseous state, hence, this invention also deals with wind turbines having blades made wide-face and a pair of said wind turbine being coupled together and made to rotate opposite against each other to maximize the conversion of the wind energy and to double the speed of the electric generator that it drives, it being that the pipe magnet rotates opposite against the rotation of the pipe induction wire coil. In trying to maximize energy harvest from nature, special new designs of wide-face deflectors, control systems, data collectors, butterfly-wing wide-face turbine blades, oppositely rotating driven devices in the water and up in the sky, wideface solar trap, and lighter than air structures, and wideface resistors poped up.

This new idea deals with various new applications of the wide face fluid impeder device that has been already conceived in my previous patents as indicated in the above identified cross-references. By nurturing the concept of the wide face fluid impeder device, several and various applications, hybrids of ideas, and new concept of structures/configurations, upon which the functions of the wide face fluid impeder device, had poped up into view. It should be noted at this point the word fluid applies to or includes water, air, or oil. It should also be noted at this point that the word impede refers to relative movement between the fluid and the wide face impeder device, wherein, either the fluid is preventing the free movement of the wide face impeder device, or tile wide face impeder device is preventing the free movement of the fluid, or that the wide face impeder device is driving the fluid from one place to another place, and/or that the fluid is driving the wide face impeder device from one place to another place. The situation depends upon the purpose of the resulting mechanical reaction, wherein, both the impeder and the fluid are approaching stationary condition, or both the impeder and the fluid are in motion driving each other. In this particular invention, in some of the apparatus, the wide face impeder device is being prevented to move up or down by the still water under the ocean surface in which case, the wide face device is serving as an anti-oscillation device, and in other apparatus, the wide face impeder device, in the form of a paddle wheel, is preventing the free flow of the river water in order to store the water and to develop water head that drives the paddle wheel. In another apparatus, the wide face impeder device, in the form of a wind sail, is being manipulated to drive a recreation swing to move left and right thru the action of the wind. In other parts of this invention, it demonstrates the additional new uses of the floater pipes that are bundle together to form a vertical stack piles of pipes to serve as a footing that floats on water to carry structures above the water surface to insure a minimum in oscillation caused by the water waves, as illustrated by part 170 shown in FIG. 5 of my U.S Pat. No. 5,094,595, and by part Nos. 3, 4, 5 shown in FIG. 1 of my U.S. Pat. No. 5,027,735, in complementary action with the function of the antioscillation wide face impeder device. In another part of this invention, the wide face fluid impeder device, in the form of a rectangular folding Butterfly-wing-type turbine blade, is used as wind sail to drive a sail windmill in the form of an elevated closed-loop rope that serve as drive chain to turn a gear wheel, a hybrid of the wind-mill illustrated by FIG. 1 of the U.S. Pat. No. 4,859,146, as illustrated in my prior inventions identified in the above references.

2. Description of the Prior Arts

The prior application Ser. No. 08/097,655 now U.S. Pat. No. 5,435,259 has presented a wideface wind deflector, oppositely rotating turbines, and oppositely rotating electrict generators, but they were not abondantly viewed in details and the claims applied for including 38 other claims were not granted, hence, this continuation-in-part application is submitted in pursuit of the ungranted claims. Additionally, various new concepts, new inventions, new creations, and new technologies using the same principle of the wideface fluid impeder device are hereby presented and applied for patent, since the prior patents do not present and do not claim similar ideas/concepts as it is hereby now presented and claimed for.

The evolution of the idea started from my previous invention U.S. Pat. Nos. 5,052,902 and 5,094,595, wherein, as shown in FIG. 3, FIG. 4, and FIG. 5, the wide face impeder device, part #130 is called an impact wall, it being bumped by the horizontally moving water waves in order to drive a horizontally activated piston type pump. In the same U.S. Pat. Nos. 5,052,902 and 5,094,595, as shown in FIG. 5, FIG. 9, and FIG. 10, the wide face impeder device pail #207 is disposed horizontally in still waters to serve as an anti-oscillation device in order to prevent the floating pipe foundation part #170 from being oscillated by the water waves, and to prevent the floating air compressor, the apparatus of FIG. 9 and FIG. 10, from being oscillated too much by the water waves. Again in my previous invention U.S. Pat. No. 5,507,943, the same wideface fluid impeder device has been used to serve and to function as an anti-oscillation device to stabilized a floating sea wall that converts the energy of the water waves in another kind of configuration, as illustrated by part #48 in FIG. 1, FIG. 2, FIG. 4, and FIG. 5.

From the above history, the wide face fluid impeder device has been already used in many functions, but after further explorations, it can be made in many forms and it can be used in many functions. The claims in my previous patents are very general which lack details and adequate understanding of the various possibilities of new configurations and the various details of scientific applications of this wideface fluid impeder device.

In the prior arts:

a. There is no intention to use the wideface fluid impeder device as a component pail of a platform or a missile silo that is floating on the ocean or submerged under the ocean;

b. There is no detailed illustration of a joint assembly of the wideface anti-oscillation resister device with the single stack of floater pipes to to serve as footing of structures or boats floating out on the ocean;

c. There is no detailed illustration wherein the wideface anti-oscillation device is used as propeller to push the boat forward by the energy of the water waves;

d. There is no concept wherein a plurality of pipes are arranged side-by-side to form a wideface device to serve as a thin hull of a boat or as a thin hull of an aircraft carrier or a thin hull of a missile ship, or a thin hull in a radiant formation to form a 4-quadrant thin missile submarine;

e. There is no concept wherein the wideface device is used to form a paddle wheel turbine that serves as water dam;

f. The prior art do not present similar concepts as it is now being presented;

hence, the herein new inventions being applied for patent to illustrate further explorations and new discoveries, and to further illustrate in new details in which the prior arts failed to present similar concepts, for clearer understanding of the various functions and uses of the wideface fluid impeder device which serves as a tool of the herein inventor to lead mankind into further realization and recognition of what GOD has prepared for mankind.

SUMMARY OF THE INVENTION

I. Problems Encountered and Needs not Provided by the Prior Arts a. The standard wind turbine are constructed to have narrow blades to prevent structural breakdown during high winds, hence, the turbine blades fail to deflect more wind;

b. The blades of the prior art turbine are being turned neutral to the wind during high speed winds for fear of burning the electric generator, and fear of producing high voltage output, hence, the turbine is stopped during high winds;

c. There are no technology of variable loading systems being driven by the prior art turbine, hence, the power put in by the high speed wind is wasted;

d. There is a misconception of using a narrow blade for a wind turbine by imitating the blade of an airplane propeller, thinking that the same principle is involved, but the truth is: that the air pressure is acting at the back of the blade of the airplane propeller, while in the case of the wind turbine, the air pressure is acting on front face of the blades; and that the air pushes the turbine blade at a very slow pace whereby there is no chance for the narrow turbine blade to impede all the wind within the circle of the turbine, while the airplane propeller blade moves beyond the speed of sound thereby driving all the air within the circle of the propeller;

e. There is no electronic fuzzy control logic device and an algorithmic command device being used to control windmills as now being used to control automobile engines;

f. There have been no reliable wind speed detector to assist in the operation of the windmills;

g. There are no automatic electrical and mechanical control devices to adjust the wide-face turbine blade;

h. There are no artistic turbine blade designs, hence, the neighborhood obstruct the erection of wind turbines;

i. There is a very limited design/form and application of the wide-face fluid deflector, which is, at present, limited to kites, sail for the sail boat, parachute, and electric fan blades. There is a limited design and form for sails. There is a limited design, form, and usage for kites. There is a limited design, form, and usage for parachute. There is very limited usage of the wide-face fluid deflector in fast moving devices—such as, speed boats, surf boards, gliders, airplanes, sails, windmils, and turbines;

j. There is airborne wind turbine to harvest energy from the high altitude winds as presented by U.S. Pat. No. 5,056,447 invented by the herein inventor, but the design is limited to a kite. There has to be other designs to provide a freedom of choice to the end users;

k. There are no oppositely rotating—wind turbines, turbine pumps, gas turbines, and electric generators—that would maximize convertion of wind energy, maximize the efficiency of turbine pumps (for gas or liquid), maximize the conversion of exhaust gas energy, and double the speed of the electric generator— respectively;

l. There is no wide-face wing being used for an airplane, similar to the Butterfly wing, that would serve as a parachute for the airplane when the engines stop while on flight;

m. There are no designs for light bulletproof structures that can be use to support airborne sails, airborne turbines, floating sails, and airborne structures;

n. There are no designs to help man fly by his own manpower.

II. Objectives of the Invention

1. To provide relief to the problems of the prior arts including those stated in item I;

2. To advance and provide technology in the new design and construction of high efficiency machineries, including: kites, transportation vehicles, oppositely rotataing windmills, water turbines, and turbine engines; recreation and sports devices; convertion of the solar heat, clean burning of trash, sulfur control, ocean transportation, desalination of water, military war machines, floating seawall, water wave supressors, floating houses/hotels/airports, and underwater farm beds.

3. To lead mankind into new exciting adventures in scientific applications of new discoveries of existing GOD's creations but never before known to man.

III. New Creations

To attain the above objectives, and to provide solutions to the problems of the prior arts, the following new creatioins are hereby presented and applied for patent right protection, to wit:

1. a new design for a blade of a rotary wind turbine, wherein, in order to enable said blade to deflect more fluid, its face is made as wide as possible approaching the form of a square. It should be noted at this point, that the wind pressure upon the front face of the turbine blade approaches zero as the width of said blade approaches zero, hence, the face of the turbine blade should be a square. Since the blades are in radial formation, the only way to do is approaching a square, which means, the furthest that can be done is making the blades in the form of a trapezoid;

2. a new design for a turbine blade, wherein, for the purpose of making the turbine artistic while keeping it wide-face, a plurality of Butterfly Wings are attached to said turbine blade, and said wings serve as the wind deflector, said wings being painted with various art designs in various colors; to add esthetical view in the wind farm;

3. a new design for a wide-faced blade turbine, that is used either as wind turbine or as a turbine in running water, wherein, two sets of turbines are made co-axial and are made to rotate opposite against each other in order to double the speed of the electric generator or turbine-type compressor that is being driven by said twin turbine, said generator having a drum/pipe magnet that rotate opposite the rotation of its induction wire coil armature;

4. a new design for a control system to automatically relax said Butterfly Wings against the overspeeding winds, wherein a coil spring is used as a torsion resistor to keep said wings open during ordinary working winds but allows said wings to close during destructive storms;

5. a new design for a wide-faced turbine blade, wherein, a plurality of rigid light bars are arranged in a radial formation to serve as radial mast and a wide sail is attached to each mast upon which said sail pivots on one side;

6. a new design for a mechanical control system to automatically relax a turbine blade against the destructive winds, wherein, the free side of said Butterfly Wing or the free side of a sail is attached by strings/ropes to a deep-grooved pulley-winch and said winch being functionally attached to a coil spring resistor that turns said winch to always rewind up the string, in order to make said wings or said sail self adjusting to the wind force, said coil spring being attached to the succeeding mast, while the coil spring for the Butterfly Wing being attached to a bar that is also attached to the same mast that holds said wing, said wing and said bar being perpendicularly attached to the same mast; to make the turbine work during storms;

7. a new design for an electro-mechanical control system to stop the turbine for process of maintenance, wherein, a remote or radio controlled electric motor is geared to said pulley winch to rewind said control string/rope and to lock said coil spring, and wherein, an electromagnet is set to unlock said control coil spring;

8. a new design for a control system for a turbine blade, wherein, said mast is inserted into a larger pipe to freely play on pivote but said mast is held to said pivote pipe by means of a coil spring that act as torsion resistor to limit the twisting of said mast so that the turbine blade is allowed to adjust and relax to make the turbine keep on working during storms;

9. a new design for a control system of a turbine, wherein, a rigid wide sail is eccentrically and rigidly attached to a twistable mast that performs as a torsion bar so that said sail relaxes in the storm winds, said mast being slender and pierces the hub of the turbine to hold another sail at its other end, and wherein, a forward strut extension of the hub is provided to serve as forward strut anchor for the guy strings/ropes attached to the outer tip of said torsion bar radial masts, in order to hold said turbine blades against the wind, a rotating connector being provided at the tip of said forward strut to hold said guy strings;

10. a new design for a control system of a turbine blade, wherein, a plurality and variety of compressible devices and materials, such as, coil springs, compressed air, hydraulic jack, foam rubber, flexible bow and other flexible materials, are placed in-between and to serve as strut to keep open said Butterfly Wing and to allow said Wing to partially close during storms;

11. a new design for a control system of a wide-faced turbine blade, wherein, the rope holding the free side of a wide face deflector is in the form of stretchable and flexible material to allow adjustments of said sail and said wing during storms;

12. a new design for a control system used to turn a turbine blade neutral to the wind, wherein, a turnpike dowel is used to turn the mast at its hub base connector, said turnpike being perpendicular to said mast, the outer end of said turnpike being moved perpendicular to the axis of the hub and of said mast by means of a ring around said hub, said ring being attached to each of the outer end of said turnpike according to the spacing of said mast around said hub, said drive ring being attached by a left and by a right wire rope/chain to a winch where said left and right wires are oppositely wound so that said right wire will be elongating when said left wire is shortening, said winch being driven by a remotely/radio controlled electric motor;

13. a new design for a multiple variable loading system for a wide-faced blade wind turbine, wherein, the load is a variable field direct current electric generator and a governor is provided thereof to increase or decrease the magnetic field of said generator in accordance with the varying speed of said turbine as driven by the varying speed of the wind, said generator being built to withstand the maximum capacity of said turbine, a magnetic levitation bearing being provided to eliminate friction due to the extra weight of the induction coil armature of said generator, and wherein, due to varying voltage output of said generator and for purposes of producing a steady Alternating Current output that is synchronized with the utility grid, a voltage regulator in the form of an assembly of an inverter and an automatic self adjusting transformer is being provided to produce a variable amperage but steady votage, in order to take advantage of the varying energy being offered by the wind;

14. a new design for a multiple variable loading system for a wide-faced blade turbine, be it water driven or wind driven, wherein, for the purpose of taking advantage of the abondance of energy being offered by the driving medium, a plurality of loads, such as generators, compressors, and pumps, are aligned to be driven by said turbine thru a plurality of driver pulleys that are arrange in parallel thru a single drive shaft and each of said loads is being geared progressively electronically to add more and more loads being driven by said turbine in response to the increasing wind speed, each generator being rated much less than the maximum capacity of said turbine, and wherein, an electronic voltage regulator is provided on each generator in order that the output will be acceptable to the utility grid;

15. a new design for a wind speed detector that feeds information into a fuzzy control logic command module, wherein, a hanging wide-face sail is attached to a pendulum bar which serves as switch by touching an array of contact points as it swings up and down when said sail is pushed by the wind, said command module being used to regulate the blades of a turbine and the loading system; an electronic Rule-Base Algorithm being provided as additional component of the control system in order to automatically adjust the pitch of the turbine blade or to add on more loads so that the speed of the turbine will be in the ideal ratio with the speed of the wind in every minute of operation, in order to maximize convertion of the wind energy available in contac with the turbine;

16. a new design for a wide-faced Sail-Type turbine, wherein, a Butterfly Wing is use as a wind deflector that is functionally attached to a rectangular frame that pivots on one of its vertical side frames, said wing being provided with a central axis bar which is horizontally attached to the left and the right vertical frames of said rectangular frame, said central axis bar serving as pivot connector for a pair of wings that closes and opens like the Butterfly do, and wherein, said vertical pivote side frame of said rectangular frame being extended upward and downward to serve as sail mast, the upper end of which being attached to an aerial cable chain while its lower end being attached to a lower aerial cable chain in order to form a large sail-type turbine in similar construction as in FIG. 1 of the U.S. Pat. No. 4,859,146, entitled United Sail Windmill, in which a plurality of said Butterfly Wing-Sail are carried in mid-air by a two level closed-loop cable chain that drive a stationary gear at each end loop;

17. a new design for an oppositely rotating co-axial twin turbine, wherein, the clockwise turbine has a diameter larger than the diameter of the counter-clockwise turbine and the blades of said larger turbine being outside the circle of said smaller turbine, said twin turbines being intergeared with each other by means of stationary planetary gears in-between the corresponding smaller and larger cylindrical hubs, said hubs being extended forward to serve as strut posts to hold the turbine blades against the wind by means of guy strings or ropes;

18. a new design for wide-faced blade vertical axis turbine, wherein, the radial formation of masts is horizontal and each said horizontal mast serves as central axis upon which said Butterfly Wing pivots to open and to close when the wind blows upon said wings, said wings being controlled by flexible springs and elastic guy ropes such that said wings are closed when moving against the wind and blown up open when moving along the wind current, and a plurality of this type of turbine being erected side-by-side such that the turbine circles are overlapped on each other's side where the blades move against the wind by synchronizing said turbines together by means of drive chains and corresponding gears;

19. and a new design for a kite to pull loads on water, on land, on ski, on rollers, on aerial cable, or, to serve as a glider, wherein, said kite is in the form of a Butterly which is made of any shape, any design, and any color, with a rudder tail that serve as aerodynamic stabilizer, a couple of said kite being paired side-by-side by attaching to each other by the wing tips, in order to form a more powerful wind deflector, and a plurality of said twin kite being assembled in a vertical array formation to form an even more powerful airborne tractor, and said kites may carry wind turbines that energize said rudder tail;

20. a new design for an airborne turbine that is carried up in the sky by cylindrical balloon, wherein, Butterfly Wing type turbine blades are functionally attached around said cylindrical balloon, said Butterfly Wing being provided with various control systems such that said wings automatically adjust to close partially during storms, in order to produce electricity out of the higher altitude winds even during storms.;

21. a new design for a wide face kite that fly on a tilted position wherein, three wide Wings of any wide-faced shape are assembled together on a common central axis to form a radial figure kite, and wherein, two of said radial wing kite are coupled together side-by-side by attaching each other's wing tip to form a star looking kite, which is hereby named the Star Kite, said kite being provided with rudder tail that functions to maneuver said kite to fly in a tilted position; said rudder tail being functionally manipulated alternatively by various energized control devices, such as, compressed air, battery, wind turbine, and remote control strings, and an inflated pointed cylinder being attached at each wing tip and at each central axis of said radial wings, in order to make said Star Kite look like a passenger aircraft and to provide additional lift, see part 3 of FIG. 1;

22. a new design for erecting a vertical axis butterfly turbine, wherein, said turbine functionally attached to the trunk of a palm tree or to a tall tree so that said turbine rotates around said tree, in order to save expenses from the erection of a tower or a pole, 23. and a new design for a wide-faced wind deflector, wherein, a framed sheet sail, or inflated sail, or a rigid light board sail stands on one of its sides on rollers/wheels that are functionally attached to the bottom of said standing sail by means of pivot pin connectors so that said wheels are to rotate and roll along the direction of the sail's movement, or wherein, elongated floaters are eccentrically and pivotally attached to the bottom side of said standing sail so that said elongated floaters carry said sail on the water and said floaters automatically align along the movement of said sail, support posts resting on elongated floaters being attached at the back of said sail in order to make said sail able to stand by itself on water when not being used, said sail being used to pull loads floating on water or loads rolling on land, or sliding on ice, by tieing a kite-sling rope at the left and at the right vertical sides so that said sail will act as a kite and then attach said rope to a load being pulled by said sail-kite; see FIG. 5 and FIG. 5A;

24. A new design for a kite stabilizer to prevent the sail-kite from diving downward when it is made to tilt left or right for purposes of tacking the sailboat, wherein, a lifter cylindrical balloon or a lifter second kite is disposed above the sail-kite and being attached to the top of the sail-kite by means of a kite-sling-rope that has a plurality of eye-hole connectors to provide adjustment so that the sail-kite is forced to tilt upward all the time, see part 3, 10, and 26 of FIG. 1, and see part 3, 5, and 20 of FIG. 3;

25. A new design for converting the energy energy of the high altitude wind in the form of an oppositely rotating water turbine attached to the sailboat that is being pulled by kites, said boat sails back and forth without turning around, see FIG. 1. FIG. 1A, FIG. 3 and FIG. 4;

26. A new design for preventing the kite from rising up to a high angle of flight elevation in the form of a moving weight, of any form that floats and being slippery on water, upon which the kite is tied to but being towed by said kite, in order to have more face area of the kite against the wind, see part 17 of FIG. 1, and part 35 of FIG. 3;

27. A new design for a lifter balloon that is used to control kites and to serve as a travel vehicle, wherein, a propulsion engine, that produce hot air, is attached to and hangs below the balloon, such that the exhaust hot air from the engine is directed by pipe to forcibly enter the balloon to inflate the balloon with hot air in order the make the balloon float in air by way of the light hot air at the same time moving the balloon forward by the propulsion engine, see part 3, 6, and 7 of FIG. 3;

28. A new design for a high altitude multilevel windmill, as shown in FIG. 6, wherein, a cylindrical balloon is privided with wideface wind deflectors or widface windmill blades disposed oblique to the longitudinal axis of the cylindrical balloon, said wide blades being in the form of flat balloons or ordinary flamed helix sheets or plain sheets framed by small cylindrical balloons, the main cylindrical balloon being made to rotate on a pivot bearing at the end points of the main balloon;

29. A new flat balloon wing, see part No. 48 of FIG. 6, to tilt up the front end of a rotating cylindrical balloon-windill,—said wing being in the form of cylindrical balloons attached to each other side-by-side to form a horizontally flat balloon, tilted left and right;

30. A new lighter than air windmill impeller blade that is in the form of framed sheets but the outer ends are in the form of pointed cylindrical balloons disposed oblique to the wind, in order to lift the impellers afloat up in the air or to eliminate its weight at the same time to act as additional impellers for the windmill, see part No. 45 in FIG. 6;

31. A new sail-type windmill blade which is in the form of wide sheet sails that are supported by at least four masts that are disposed radially perpendicular to the axis of said cylindrical lifter balloons;

32. A lighter than air structural frame that is used to support airborne bodies or objects, which is made bulletproof by using Kevlar fibers or spectra fibers or other strong fibers as outer skin and to make it able to withstand highly pressurized light gas content, which is in the form of a cylindrical balloon that is strong against bending and compression, a plurality of which may be arranged to form a strong framework that is floating up in the sky, as illustrated by part No. 50 in FIG. 6;

33. A new design for a balloon-type Sky Bike which is in the form of a rotating pointed cylindrical balloon that is provided with circumferencial helical impellers at its middle section or at its rear section, and further provided with a lifter type rudder at the tail, and a passenger capsule together with its bike mechanism are being suspended form the main body of the said balloon bike by means of a driving belts that fits oil the deep groove ring around the central body of the balloon, see FIG. 7;

34. A newly invented safe balloon wherein said balloon is made bulletproof by wrapping it with a strong skin that is made up of kevlar fibers and spectra fibers in a composite construction, said balloon being made to have larger volume so that the ratio of the "weight of skin/weight of air displaced less the weight of helium content" remains less than One;

35. A new invention for a wind turbine blade wherein a lifter pointed elongated balloon is attached to the outer periphery of a turbine blade, in order to make said turbine blade be lighter than air, said lifter balloon being allowed to revolve with the turbine;

36. A new design for an oppositely rotating wind turbine that is carried by a kite or by a balloon up in the sky, wherein, a set of a clockwise rotating turbine is assembled together co-axially with a set of counter-clockwise rotating turbine to prevent the carrier kite or the carrier balloon from being rotated, and to double the relative speed of an oppositely rotating induction wire coil against a rotating cylindrical magnet, in order to double the power output of an electric generator being driven by said turbine. This kind of turbine is referred to as an oppositely rotating turbine, and said generator is referred to as as oppositely rotating electric generator, see part 31 of FIG. 1;

37. A new design for an oppositely rotating turbine-type pump, wherein, a series of oppositely rotating turbines are alternately interphase together in a multilayer fashion to relatively double the speed of said turbine;

38. A new design for an oppositely rotating gas turbine or jet turbine engine, wherein, a series of oppositely rotating sets of turbines are alternately interphased with each other in a multilayer fashion at die intake and at the exit with the two drive shafts made co-axial, in order to maximize convertion of the expanding gas into mechanial energy, by increase of pressure in the combustion chamber;

39. A new design for an oppositely rotating electric generator, wherein, a plurality of concentric cylindrical magnets are alternately interphased co-axially with a plurality of concentric cylindrical induction wire coil that rotate oppositely against the rotation of the cylindrical magnets, see parts 51 and 54 of FIG. 9;

40. A new design for an oppositely rotating water turbine, wherein, a plurality of floater cylinders or pipes are submerged under running water and provided with a series of sets of turbine blades around the pipes and along the pipes, said pipes being laid parallel to each other current-wise in a multilevel horizontal formation, said turbines are made to oppositely rotate alternately against each other and mechanically connected by drive belts, in order to drive an oppositely rotating electric generators, compressors and water pumps that rotates oppositely, see FIG. 8;

41. A new design for an oppositely rotating water turbine, wherein, a plurality of turbines are attached in a series along the length of a long drive shaft which is suspended from and carried by an elongated floater that floats on the water in order to submerged said turbines under running water, said carried floater being anchored against the water current. A plurality of this appartatus are laid parallel to each other, current-wise, and said drive shafts are made to oppositely rotate alternately against each other, each pair of opposite turbines are made to drive a series of oppositely rotating electric generators and compressors that are mounted above the water;

42. A new invention for an oppositely rotating electric generator, wherein, a plurality of a disc-type wire coil aramatures are attached spacedly in a series to a central drive shaft and being spun/rotated co-axially by said drive shaft, and wherein, a plurality disc-type magnets are attached in a series inside a cylindrical drive shaft at a spacing that matches the spacing of said wire coil disco with appropriate clearance between the wire discs and the magnet discs, and said magnet discs are alternately placed in-between said wire coil discs and being oppositely spun/rotated against the said wire coil discs co-axially. Said cylindrical drive shaft having a diameter large enough to accommodate the diameter of said wire coil discs and said magnet discs with appropriate clearance, in order to function as an electric generator.

43. A new invention for a safe wind sail that is used for an oppositely rotating turbine, wherein, the upper side of a wide face sail is fixly attached to an upper bar frame while the bottom side of said sail being adjustabley attached to a lower bar frame by means of a plurality of control ropes that elongate during high speed winds but retract during low speed winds, in order to deflect more of the low speed winds and deflect less of the high speed winds automatically self adjusting in order to be able to work safely in all weather conditions to take advantage of the time of abundance. Said control ropes are being wound around a winch that is controlled by a calibrated coil spring or any appropriate device that rotates said winch and resistively unwind said control rope, the left and right sides of said sail being set free. Said sail is also being alternatively attached to a radial mast of a turbine wherein the front side is fixed at one mast while the rear side of said sail being also adjustably attached to the succeeding radial mast by means of said coil spring controlled winch thru which said control ropes are wound, see FIG. 10 and FIG. 6, part #52, 2, & 31

44. A new invention for a safe wind sail that is used for an oppositely rotating wind turbine, wherein, a wide face sail is eccentrically attached to a radial mast that is elastic enough to act as torsion bar, and wherein, the upper and lower sides of said sail are attached to bar frames that are locked perpendicularly to said radial mast in such firmness to be able to twist said mast during strong winds so that the sail will become almost neutral to the violent wind, hence, the turbine will have the opportunity to harvest energy from the violent winds working at ease, see FIG. 11 part 31 and 53.

49. A new invention for an oppositely rotating co-axial turbines, wherein, a plurality of planetary gears are spacedly inserted in-between the oppositely rotating cylindrical drive shafts. The smaller cylinder is provided with outside drive gear and the larger cylinder is provided with inside drive gear upon which said planetary gear fits in and being driven. Said planetary gear drives the armature of an electric generator, see FIG. 11, part 70, 71, 75 & 51.

46. A new invention for a kite-sail that floats on water wherein, three wide face sails are attached to a central bar connector to form a radial sail with cylindrical or elongated floaters attached to each outer side of said sail so that the two sails serve as legs that stand stridingly on the water while the third sail stands upright for the wind. This sail is alternatively in the form of inflatable plastic construction or a simple framed sheet with radial frames and plastic pipe floaters. This sail is allowed to roll over the water like a paddy wheel when moving along the the wind current. The central bar connector is tied to a sling control rope in order to make this floating sail to act as a kite that do not fly but moves obliguely against the wind when pulling a boat that sail obliquely against the wind. A thin wall is also being provided under said floaters to serve as rudder under water and to prevent said floating sail from drifting sideward when acting as an independently flaoting sail boat without being controlled by another boat, See FIG. 12.

47. A new type of wide-face kite in the form of a butterfly, or in the form of a pair of open-end boxes that are attached to each other side-by-side, wherein, the vertical diameter of said boxes are made shorter to form a parallelogram cross-section. Having wide faces, these types of kite can serve as effective sail.

48. An oppositely rotating electric generator, wherein, the induction wire coil armature is driven by an inside gear of a smaller diameter cylindrical drive shaft of a wind turbine, while the magnet cylinder is driven by an inside gear of a larger diameter cylindrical drive shaft of a second wind turbine that rotate opposite the rotation of the first turbine.

49. A new design for a wide face blade wind turbine, wherein, the blades of the turbine is made into a large wide face petal of a flower and painted with various muliticolor arts design, and the flower turbine is attached to tall trees, one of which is a palm tree, and provided with guy wires, see FIG. 14F;

50. A new design for a wide face blade for a turbine, wherein, one blade covers up to 160 degrees of the turbine circle, be it an air turbine, or water turbine, or gas turbine engine, or air compressor, or water pump, or propelle for the helicopter, as shown in FIG. 14E, and FIG. 15E.

51. A kite made concave to the wind having a grab bar that is held to the wind by a person on roller shoes or a person on floating shoes, as shown in FIG. 13.

52. A wind deflector made wideface to concentrate moving air or the wind, one sample of which is the hood and wind shield of the car serving as wind deflector and a side guard wall is provided so that the concentrated wind is forced to enter an air port of the engine, as shown in FIG. 15B;

53. A wind concentrator made wide face together with a side guard wall that is installed at the bottom face of an airplane wing such that the concentrated wind is forced to enter the air port of the plane's engine that is installed at the rear of the wing, as shown in FIG. 15A, FIG. 15D, and in FIG. 15C;

54. A wideface wing for an airplane made aesthetic similar to the wings of the Butterfly, made large enough so that its butterfly wings serves as a parachute for the airplane when there is engine trouble, as shwon in FIG. 15C;

55. A Butterfly wing that resistively folds to give way to the violent wind, being used for a wind turbine blade coupled with electronic safety control system, in order to build a safe windmill, with various multicolor art designs of the butterfly, see FIG. 16;

56. A wideface fluid deflector in the form of a paddle wheel used as a water turbine to drive an oppositely rotating air compressors an oppositely rotating electric generator, or to drive a water pump, see FIG. 17, 57. A wideface water wave deflector in the form of a floating sea wall used to concentrate/amplify the water waves, wherein, the amplified water wave is used to drive an oscillator which in turn drives an oppositely rotating flywheel that in turn drives an oppositely rotating compressor/generator/water pump, see FIG. 18.

58. A new design for an oppositely rotating compact turbine, wherein, the inner section of one blade is driven by the expanding air while its outer section drives to compress air rearward in one rotational direction, while the succeding blade revolves to the opposite direction, and its inner section is driven by the expanding air while its outer section drives to compress air rearward all at the same time, see FIG. 19;

59. A clean burning trash incinerator that supplies heat energy to a gas turbine engine, wherein, the trash fuel is feed at the bottom of the burner to burn the trash starting from the top by means of an auger conveyor, and the oxygen bearing air is feed thru a supper heating duct, so that the oxygen is pre-superheated before it gets to the trash, and a plurality of heat absorbing pipes are installed inside the upper section of the combustion chamber in order to supperheat the air content of said pipes, see FIG. 20;

60. A solar trap in the form of a roof to supply solar energy to a heat absorbing pipe that drives a gas turbine, and wherein, said heat absorbing pipe is extended to the chambers of a fireplace to absorb the heat energy supplied by the burning trash, see FIG. 21.

61. A heat absorbing pipe that is installed to form a deep geothermal well to drive a gas turbine, wherein, the bottom of said deep well is closed to prevent sulfure from getting out of the geothermal well. Compressed air is driven into the hot well and the resulting heated air gets out of the well thru an inner return pipe that is extended to the bottom of the well, see FIG. 22.

62. A new design/creation of an scavenger power plant, that is driven by an oppositely rotating wideface bladed centrfical type compressor, in combination with an oppositely rotating turbine compressor, a large diameter centrifugal pump, and a compressed air supply pipe line comming from various kinds of compressed air pumping stations including windmills, solar pumps, water wave driven pumps, geothermal driven pumps, said air supply being injected and mixed into the heating chambers of this scavenger power plant and made to pass thru a solar heat trap, then thru a trash incinerator, then thru a geothermal heating system, then thru the cooling system of a nuclear fireplace, then thru the oppositely rotating wideface bladed exhaust turbine that drives an oppositely rotating electric generator. A slipper high voltage capacitor building block is provided to store eccess high voltage electricity thru a step up transformer from the the generator, see FIG. 23;

63. A scavenger power plant that directly burn and distil trash and coal to retrieve resin and sulfure, and to effect gasification in the combustion chamber, in combination with smoke and ash filter thru water, see FIG. 24;

64. A new design for self cleaning filter to clean air thru cyclone separator and thru air bubbles in water, see FIG. 25;

65. A new design for an oppositely rotating wind turbine having guy wires to hold the wideface sails against the wind thru a foreward post as an extension of the hubs, said sails being held by a slender radial mast that acts as a tortion bar, see FIG. 26;

66. A new design for a high altitude windmill, wherein, wideface balloon kites are arranged in a multilevel vertical array, and each kite carries a plurality of wind turbines that each drive an electric generator, in order to take advantage of the high altitude winds, see FIG. 27;

66A.—A large cylindrical missile silo that contains a plurality of smaller missile silos, said large cylinder silo sits vertically floating on water, having additional peripheral floaters around its base, and having a wide face fluid impeder anti-oscillation resistor device that is disposed in deep waters, as per FIG. 32 and FIG. 33.

67. An Elongated Hot Air balloon that carry a detection/communication radar disposed high in the sky by a sling control rope that is tied down to the said floating missile silo, as per FIG. 32.

68. A large trough like missile silo that contains a plurality of smaller missile silos, that is disposed high above the water surface by supporting it with a plurality of floater pipe posts that contains another smaller floater pipe buoyancy controller device, the bottom of said floater post being attached to a wide face anti-oscillation resistor, as per FIG. 34.

69.—a push-and-pull electric generator by way of the oscillation action by the water waves upon a floater pipe oscillator that is held in place by a floating transmission tower the bottom of which being attached to a wide face anti-oscillation device that is disposed in deep water, as per FIG. 35;

70.—an ocean platform that is least oscillated by the water waves, supported well above the water surface by vertical floater pipes that are attached down to a wide face anti-oscillation resistor device, and a water wave splitter device being provided to each pipe post, as per FIG. 36;

71.—an ocean platform that is least oscillated by the water waves, supported high above the water surface by vertical floater pipe posts that also serve as missile silo for long range rocket, said platform serves as multilevel housing and office space for military operations, the bottom of said posts being attached to a wide face anti-oscillation resistor device that has a propeller to move the facility from place to place, as per FIG. 37;

72.—a luxury ship/boat that is being propelled to move forward by the power of the water waves thru a plurality of wide face fluid impeder device that are disposed in still waters well below the bottom of the boat by means of double bladed sword-like posts/struts in redundant function, as per FIG. 38;

73.—a ocean going multi-story building/house/hotel that is least oscillated by the water waves, being supported high above the water by double bladed sword-like posts that are erected on an assembly of plurality of floater pipes that are stacked serving as footing for the building, the bottom of the posts being attached to a wide face anti-oscillation resistor stabilizer device that is disposed in deep waters to prevent oscillation by the water waves, a plurality of jet engines being attached to the posts below the building in order to move the floating building from place to place, and a plurality of heavy anchor blocks or natural rocks are tied tautly by ropes to the bottom of the posts in order to submerge all the floater pipe footings so that there is nothing being oscillated by the water waves, as per FIG. 39 and FIG. 43;

74.—a missile submarine vehicle that is made up of wide face fluid impde in four quadrants, such that, when one quadrant is up to the water surface, the second and the fourth quadrant faces are serving as wide face anti-oscillation resistor stabilizers to prevent the floating submarine from being oscillated by the water waves, as per FIG. 40;

75.—a luxury boat that is least oscillated by the waster waves by being disposed above the water by supporting it with a stack of floater pipes that are vertically clipped together by means of a plurality of sword-like posts that are attached to a wide face fluid impeder anti-oscillation resistor device down in deep water as per FIG. 42;

76.—an aircraft carrier ship that is least oscillated by the water waves by making the hull into a thin wall-like floating device so that it can go thru the water with least resistance, said hull being made up of a single array of vertical floater pipes of gradually varying sizes that serve as missile silo, the top of said hull being attached to and carry a long and wide platform that serves as an airport, while the bottom of said hull being attached to a wide face fluid impeder anti-scillatin device to prevent oscillation by the water waves, and a water jet propeller is being provided at the rear to push the ship, as per FIG. 44;

77.—a floating sea wall in the form of a large long floating pipe that is least oscillated by the water waves by attaching it to a wide face fluid impeder anti-oscillation resistor device that is disposed in deep water by means of a plurality of rigid vertical floater pipe posts attached to the sides of said floating sea wall large pipe, said large pipe being made multichambered with inward one-way valves to make it into a multistage air compressor which is operated by the energy of of the water waves, and the compressed air is made to drive an air driven electric generator, as per FIG. 41;

78.—a missile submarine multi-hull boat comprising a plurality of spacedly parallel thin sharp edge walls that are hollow to serve as hull into which a plurality of single file array of vertical floater pipes serving as missile silo are inserted and assembled inside said each hull, a one piece sharp front/rear edge wide face fluid impeder anti-oscillation resister device being provided upon which each hull is spacedly attached at the bottom, and a water jet propeller being provided at the rear of the said wide face anti-oscillation resistor, as per FIG. 45;

79.—a multi-hull aircraft carrier missile boat comprising an under water one piece wide face fluid impeder anti-oscillation resistor device upon which a plurality of sharp front/rear edge hollow thin armor walls serving as hulls are spacedly attached, said hulls being loaded with vertical single file array of floater pipes that serve as missile silo, a one piece platform in the form of a rigid framed multi-story house or building is superimpose to the top of the hulls to serve as an airport out on the ocean, and a propeller being provided at the rear of the wide face anti-oscillation resistor footing, as per FIG. 46;

80.—a wide face paddle wheel turbine used as Water Dam to store water in a flowing river in order to increase the waterhead that is acting upon the turbine, by constructing an anti-erosion pavement on the river floor beneath the turbine, as per FIG. 47;

81.—a high or tall play swing wherein the suspension rope of the swing seat is made very long so that the swing period is at least 30 seconds, a wide face fluid impeder device in the form of a wind sail is being attached to and manipulated at the rear swing rope in order to maximize to full swing, an inflatable tall inverted U frame serving as swing tower being erected on the ground to carry the swing, as illustrated by FIG. 48;

82.—a sail windmill using two levels of wide face fluid impeder rectangular wind sails assembled together to drive a single closed loop aerial cable drive chain, the sails being in the form of a Butterfly Type self adjusting that fold along a horizontal axis to give way to the over speeding winds, as illustrated by FIG. 49;

83.—a water wave suppressor or wave breaker in the form of a floating but mostly submerged rigid flat deck wide face fluid impeder device that is built out stiff crescrossing pipes in multi-layer laminates, said wide face deck being attached by a plurality of ropes or tendons down to another wide face fluid impeder anti-oscillation device that is disposed in deep water, said anti-oscillation device having a plurality of circular plate upward lifting one-way valves, and said floating flat deck being anchored to the ocean floor by tendons attached to natural rocks, rock sausages, concrete blocks, or sausages of sand bags in a large net bag, as illustrated by FIG. 50.

84.—a new concept of making wideface platform into a stiff structure, having a width and a length of at least or greater than Four Times the lenght of the longest ocean wave to make it long enough so that it cannot be oscillated by the ocean waves even without using the anti-ocillation device, and wherein, said platform is made up of multi-layer laminates of cres-crossing pipes that are filled up with compress air, or said platform being made up by an assembly of a plurality of styrofoam/plastic foam building blocks with fiber reinforcement, said platform being used as an aircraft carrier or an airport wherein the front edge is tilted up for easy cruising, or said platform being used as an agricultual island floating on the ocean, as illustrated by part 3 of FIG. 50.

85.—There are many lot more new creations and applications of the wide face fluid impeder device, including a large multi-body airplane on wideface water skii, a wide underwater agri-plantation bed serving as wideface anti-oscillation device, a vertical axis oppositely rotating trash burning gas turbine engine, a wideface solar trap water distillation device that is further heated by hot air exhausts from fuel burning engines, a flat-body multi-hull submarine boat a plurality of which are being interlinked to transform into a large airport, a submarine boat being pulled by a kite, a self floating paddle wheel to convert a running water's energy; a self floating auger turbine; a condenser that feeds humid air into a gas turbine engine, a gas turbine that runs on chimney exhaust, a wide area agri-floating platform that is overlain by fertil soil which touches the water so that the soil need not be irrigated for horticulture, and a trash burning gas turbine electric generator that uses its tail hot air for the heating system of a house as illustrated by FIG. 21.

86.—A new recycle used of used rubber tires, wherein, the used rubber tires are filled up with foam rubber/plastics and used bottles and said fillers are lock-in inside the tire so that the tire becomes a lightweight composite structural material that is used as a sandwitched aggregate for moulding floating structures and for constructing a vertical array of rubber tires underwater to serves as a wideface anti-oscillation resistor.

BEST MODE FOR CARRYING OUT THE INVENTION

As this wide face fluid impeder device is applicable to all liquids as well as gases, whether in motion or stationary, the uses of this wide face device is not only applicable to what has been invented and/or what had been already illustrated in the various previous patent applications and in this present application for patent, but all mankind should realize that the scientific and industrial applications of this device is endless and unlimited, as it has been demonstrated in my various patent applications, wherefore, the herein inventor hereby reserves all proprietary rights on what ever improvements on the apparatus and related ideas of new scientific applications for the wide face fluid impeder device. This wide face device may take many forms, many shapes, many sizes, many structural forms of component parts, and many kinds of construction materials in order to adapt, to make it suitable, and to become fit to various kinds of functions and purposes. One form that this wide face device may take is the caudal tail of the large whale, wherein, this wide face device is made resilient and then attached fixed squarely to the bottom end of a vertical post that perpendicularly pierced thru the bottom of the boat, so that when the boat is oscillated by the water waves, the wide face caudal tail that moves up and down will then propel the boat forward. One method of construction for this wide face impeder device is the use of floater pipes that are filled up with high pressure air to make the pipes stiff/rigid against bending, and these pipes are laminated or clipped together to form an array of pipes for the first layer and the next layer is another array of pipes layed perpendicualar to the first layer, and so on, in order to build a light weight wide stiff platform in a composite construction floating on the ocean to serve as an airport which cannot be oscillated by the water waves because the width and the length of this stiff platform is at least ten times the wave length of the longest ocean wave. In the case where this stiff wide face device is used to provide weight and at the same time to serve as an anti-oscillation resistor, then the laminated array of pipes are filled up with compacted sand or filled up with concrete that reinforced by high tension fiber glass to make the structure resistant against the action of salt water. In other cases, the wide face device may be in the form of truss structural works to make it stiff enough least materials but enough weight.

BRIEF DESCRIPTION OF THE DRAWINGS

FIGS. 1 and 1A—illustrate a new design/creation for a wide face scavenger energy converter system, using a wide face kite, wide face hull for a boat, a wide face side wall fender, and a wide face blade for an oppositely rotating water turbine.

FIG. 2—illustrates a new design/creation for a wide face scavenger energy converter system, using a wide face sail for the blades of the wind turbine, for the sail boat, and for a water turbine.

FIG. 3—illustrates how a framed fabric kite is made wideface, being provided with a parachute-type wind resistor, and an elongated lifter balloon above the kite to force the kite to tilt upward.

FIG. 4—is a cross-section of FIG. 3 and illustrates a control connector transverse bar for a sail vehicle, ail oppositely rotating water turbine, and a stabilizer, ballast weight.

FIG. 5—illustrates an oversized sail made to serve as kite-saild that rest on wheels or rest on boats pivotally, in order to pull a moving anchor for the kite.

FIG. 6—illustrates how wideface windmills are afloated in the sky to convert the high altitude winds, by using lighter than air superstructures, oppositely rotating generators, self adjusting sails, torsion bar-masts, and lighter than air wing.

FIG. 13—illustrates how a kite on wheels/floaters pulls a person on roller shoes, on floating shoes, or on snow ski, or said kite is carried by the user;

FIG. 14A—illustrates a wind turbine with a plurality of narrow blades;

FIG. 14B—illustrates a resulting sail for a boat if the narrow blades of the wind turbine in FIG. 14A were assembled into a sail having spaces in-between;

FIG. 14C—illustrates an equivalent sail of FIG. 14B now showing perforations on the sail resulting to a less wind pressure upon the sail due to the perforations;

FIG. 14D—illustrates the most appropriate wideface sail to most effectively move the boat wherein there are no air-scape perforations;

FIG. 14E—illustrates the most ideal wideface blade for a wind turbine which is similar to the wideface sail for the boat in FIG. 14D;

FIG. 14F—illustrates a new design for a wideface turbine blade in the form of a large petal flower attached to a palm tree, to make the wind farm nice;

FIGS. 15(A, B, C, D, & E)—illustrates new designs and various new applications for a wideface fluid deflector to build up wind pressure;

FIG. 27—illustrates a wideface multilevel balloon-kite that has downward sidewalls, carrying wind turbines to convert the high altitude winds;

FIG. 42 illustrates a least oscillated luxury boat that is lifted above the water by stack of floater pipes attached to a wideface fluid resistor device;

FIG. 43—illustrates a perspective view of FIG. 39 wherein a plurality of large heavy anchor blocks are use to pre-submerge the floater pipes;

FIG. 44—illustrates a least oscillated aircraft carrier ship having a thin hull that is made of vertical pipe missile silos and a base of wideface fluid resistor;

DESCRIPTION OF THE PREFERRED EMBODIMENT

Figure 7:
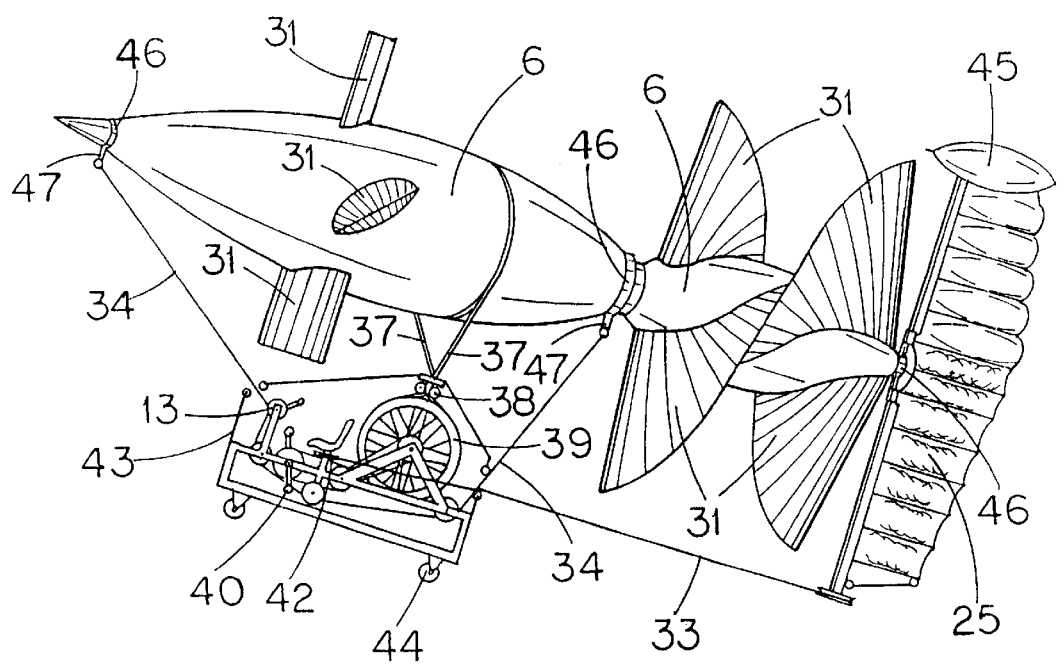
FIG. 7—illustrates [how to construct] a new design for for a sky-bike by means of a lifter cylindrical balloon having spiral/helical impeller fins and being rotated by the passenger thru bike pedal, and a balloon-type rudder to steer said sky bike.

Accordingly and pursuant to the objectives of this invention as enumerated in the summary, the following new concepts, designs, and embodiments are created to provide the most appropriate technology which can be more understood by further reading the descriptions of the figures, to wit:

FIG. 1—illustrates a wide face scavenger energy converter system wherein, boat 1 having a wide face hull 16 is being pulled by a wideface kite 2 that also pulls a wide face surf board 4 that has downward wide face fender walls 18 on each side. The kite 2, serving as wide face sail, is being stabilized by the Star Kite 3 which is also a wide face fluid deflector. The boat 1 has wide face side wall fenders 18 to prevent the water and air from splashing out to the sides thereby developing more fluid pressure to the bottom face of the hull 16 so that the boat 1 will be flying at few inches above the water in order to avoid the resistance of the water. Flap wing 13 is adjustable to create more wind pressure under the boat. Part 21 is the motorized steering device for the boat 1. A circular/eliptical railtract 20 is centrally attached to the top of the hull 16 to serve as an anti-overturning control device for the boat 1. Part 19 is a hook roller assembly that runs around the the railtract 20 while attaching the sail kite 2 to boat 1. Bar 12 separates the left and the right kite sling that are correspondingly adjustable thru a pair of pulley winch 11 that are attached to the hook roller 19. Sail kite 2 is an assembly of two peices of boxes without end cover so that the wind can pass thru. The two boxes have common X-frames so that the two boxes appear to be attached to each other along one corner. As a result, kite 2 has, in effect, top and bottom fluid deflectors or wide face wings. Kite 2 is provided with floater pipes at each of its side and bottom corners to be able to float on water. The rudder tail 5 is attached to the rear 4th corners of kite 2 to steer the kite 2 left/right thru an electronic motor device. The Star Kite 3 serves as a star lifter for kite 2 when kite 2 starts to dive left/right. Kite 3 is not being steered left/right but it is just being pulled by kite 2 and kite 3 always stays level, notbeing tilted, so kite 3 always give a vertical lift to kite 2 thru kite-sling rope 26 that is provided with adjustment Eye-hole 10. Star kite 3 comprsises of a wide face flat main body and on each side there is a downward/outward slant wing 8 and an upward/outward slant wing 7, a pointed cylindrical floater/lifter 6 being attached to each end of the wings 7/8 and an adjustable tail flap wing 5 being provided to add more lift to the kite 3. The boat 1 serves as the moving anchor for kite 2 and the passenger/operator 15 rides on the surfboard 4 which is being pulled by kite 2 thru rope 14 and thru the adjustable sling/eye-hole connector 10. The surfboard 4 comprises of a main wide face body 17 and the downward fender side wall 18 to confine/prevent the water from splashing out to the sides in order to creat higher pressure at the bottom face of the surfboard 4, thereby, the surfboard 4 is flying above the water to avoid resistance from the water. The fender wall 18 of the boat/surfboard are partially filled up with water to prevent turning over or to prevent flying too high above the water.

FIG. 1A—is a cross-section of boat 1, wherein, a wide face blade water turbine 31 is seen attached below the center of the hull 16 thru the structure 23 that is mechanically connected to the oppositely rotating electric generator 25, it being that the turbine 31 is an oppositely rotating wide face blade water turbine. Part 22 is the structural bar that holds the railtract 20 out to the sides of boat 1. The main hull body 16 is made of light materials, such as foamed plastics or Ester/aerogel.

FIG. 2—illustrates another type of a wide face scavenger energy converter system, wherein, the turbine blades 31 are made wide face to have more contact with the wind and to develope more wind pressure upon the front face of the turbine blades 31. The wide face blades 31, serving as wide sail, are controlled by the radial masts 53 upon which a plurality of electronic controlled winch 13 are attached and the control rope 2 are autmtically adjustable for safe operation of the windmill during violent weather. The support tower 20 stands on the ground 61 to hold the windmill 31 up in the air.

FIG. 2A—illustrates the design of the favorit commercial windmill, wherein, the narrow blade 41 is preferably used to get contac with the wind and it is set on the post 20 that is erected on the ground 61 to hold the turbine high in the air. By inspection and taking into consideration that the windturbine should be running at 60% slower than the the wind for maximum efficiency in energy convertion, hence, the blades 41 are moving slowly like the sail of a boat, it can be observed that there is a lot of wind passing thru the gaps between the narrow blades 41, thereby, a lot of wind energy being missed by the turbine.

FIG. 2B—illustrates a sail boat, wherein, the narrow blades 41 of the wind turbine shown in FIG. 2A are now applied/adapted as wind sail for the boat that is harneshed to pull two sets of oppositely rotating water turbines 31. By inspection, it is very logically conclusive that the sail boat cannot move much because there is not much wind contact by the narrow sail 41. It is therefore vey clear that it is very disadvantageous to use a narrow sail for a wind turbine. At any rate, the boat shown in FIG. 2B is a new design/creation of a boat having a plurality of independently and separately functioning hull 6 that is provided with an independent suspension 32 and attached to the main body 33 of the boat by the cross-arm 36. Part 37 is the piston that compresses the spring or air inside the connector chamber 32. Alignment of the independent hulls is done by the guy ropes 34 and 35. The vetical wall blade 24 prevents sideward drifting.

FIG. 2C—illustrate a sail boat 33 that takes advantage of using/adapting the wide face blades 31 of the wind turbine shown in FIG. 2 for the purpose of driving the boat 33 that pulls the turbines 31, which is the same purpose for doing it in FIG. 2B. By inspection, it is logically conclusive that there is more wind contact done by the wide face sail blades of wind turbine of FIG.2, hence, sail 31 gives a strong pull upon the water turbines 31. By the way, the water turbine 31 illustrates the construction of an oppositely rotating water turbine. This boat also illustrates the design and construction of a boat with independent and separately functioning hulls 6 with independent suspension 42. Part 40 is a wide face anti-oscillation rigid board that helps move the boat forward by playing like the large caudal tail of a large whale. This anti-oscillation board is set way down underwater where there is no movement of the water waves, and set to pivote at the front post 39 and allowed to move restrictedly up and down at the rear post 39.

FIG. 3—illustrates an elongated pointed cylindrical hot air balloon 3 with a propulsion engine 6 attached to the bottom of the balloon 3. The engine 6 bums fuel and produces a lot of hot air and the hot air exhaust of the engine 6 is recycled and injected into the balloon 3 thru an air pipe 7 which starts from the rear end of the engine's turbine and is extended to deliver the hot air to the upper section of the balloon 3 in order to keep the balloon 3 inflated with hot air and to replace the old hot air which becomes cooler every second. The old hot air then moves down to the lower section of the balloon 3 and due to the excess pressure of the new hot air, the safety valve 8 is forced to open thereby allowing the old cooler air to exit thru valve 8. This pinted elongated balloon 3 is a new invention/innovation for a hot air balloon, and with the incorporation of the engine 6 to supply hot air into the balloon 3,it is now time to rejoice that the hot air balloon 3 travels against the wind.

FIG. 3 illustrates an embodiment showing how to build a low cost but large, wide, and broad ordinary framed fabric kite 1, wherein, the fabric is extended further to the rear by making the frames 11 longer towards the rear, There is shown also a new design for a peripheral front and side frame that is formed into a half octagon where the ends extends way back to the rear of the kite 1 to make the kite 1 a wide face and able to deflect more wind. It is imperative that the wide-face kite should approach that of a square to deflect more wind and able to serve as parachute when it is not gliding, hence, the shape of a butterfly and a pair of open-end boxes tied together side-by-side are good sails. The wind force is directly proportional to the width of the kite's face. There is also control rope 9, that is looped to a pulley at the tail of the kite 1 and continued to drop down to the anchor ring connector 18, which maybe used to pull down the tail of the kite 1 at the same time to bring up the wind-resistor 27 to the tail of the kite, in order to make more face of the kite 1 be exposed to the wind. The wind resistor 27 is a parachute that can be made closed and opened as needed by the control string 12.

FIG. 3 also illustrates an embodiment of an opportunity to make the kite 1 become lighter than air by making the frames 3, 10, and 11 in the form of, cylindrical pipe balloons and by making the spread sheets in the form of an envelope that is filled up with light gas, several pieces of the half-octagonal frame 3 in the form of cylindrical balloons may be put together side-by-side concentrically along the plane of the kite 1 to form a wide face flat frame. Winch 16 is electrically powered by Electric motor 13 being provided so that the kite 1 may be maneuvered remotely. The anchor rope 20 and the wing rope 2 are being extended upward to take hold of the next higher elevation kites 1.

FIG. 3 also illustrates an embodiment of a newly created control system, comprising of a straight control bar 26 that is attached horizontally and transversely on middle top of the traveling anchor vehicle 22. Said control bar 26 being long enough to extend its end far beyond the sides of the vehicle 22. A deep-grooved roller 14 to hold the rope 28 is disposed at both ends of said control bar 26. The control bar 26 should be made long enough such that the anchor rope 20 from the kite 1 pulls the boat 22 always far out beyond the lee side of the boat 22 to safeguard against overturning of the boat 22. It should be noted at this point that the vehicle 22 cannot turn around against the wind, but instead, it must always be turned around along the wind current as the kite is always pulling the boat 22 to the lee side very vigorously. As the boat 22 turns around clockwise towards,under, and to the left of the kite, the anchor ring connector 18 will be traveling along and over the control bar 26 from the right towards the left end of the bar 26, as the left side of the boat 22 will become the lee side.

FIG. 4 is a detailed cross-section 4—4 of FIG. 3 illustrating the side view embodiment of the said newly created control bar system. There is shown a winch 29, either manual or electrically powered, is disposed to drive the control rope 28 beneath said control bar 26. The control rope 28 is looped around the deep-grooved rollers 14 at both ends of the control bar 26 and also operatably wound around the winch 29. The two ends of the control rope 28 are securely attached to the anchor rope 20 together with the steering rope 2 from the kite 1 thru the anchor ring connector 18. The purpose of this control bar system is to be able to push out the anchor ring 18 far beyond the lee side of the boat such that the resulting line of action of the kite's anchor rope 20 will be passing below the center of gravity of the vehicle 22 in relation with the side ward resistance of the water acting horizontally upon the lee side of the boat 22 and the side ward resistance force of the water acting upon the sides of the thin wall blade 24 below the boat. The ballast weight 23 is a calibrated weight in the form of a large pipe of length at least 50% of the boat's length, and is attached along each side of the boat 22 just below the water line to prevent the boat 22 from tilting to the left or to the right. The ballast weight 23 is calibrated by filling it up with a mixture of water and water tight air containers so that it will float but it will be mostly submerged when set loose on the water so that it will not get lost into the deep ocean. When the boat 22 tilts down to the right, the weight 23 on the left will come out of the water and the buoyancy of water acting upward upon it is removed and therefore, its full weight immediately acts downward forcing the boat 22 to level back on the water. With this powerful stability of the boat 22, the winch 29 maybe dispensed with, and the anchor ring connector 18 will just be moving easily back and forth across the boat 22 along the control bar 26 as the control rope 28 will just be running easily and turning around the deep-grooved rollers 14 as the kite 1 pulls the anchor ring connector 18 across the boat 22 towards the lee side without the assistance of the winch 29. The water turbine 31 and 32 are made of wide face blades to deflect more water and made to rotate opposite against each other in order to make it more efficient in converting the energy of the running water under the boat as being pulled by the kite.

The ballast weight 23 also prevents the baot from being lifted out of the water by the kite-sail.

Figure 8:
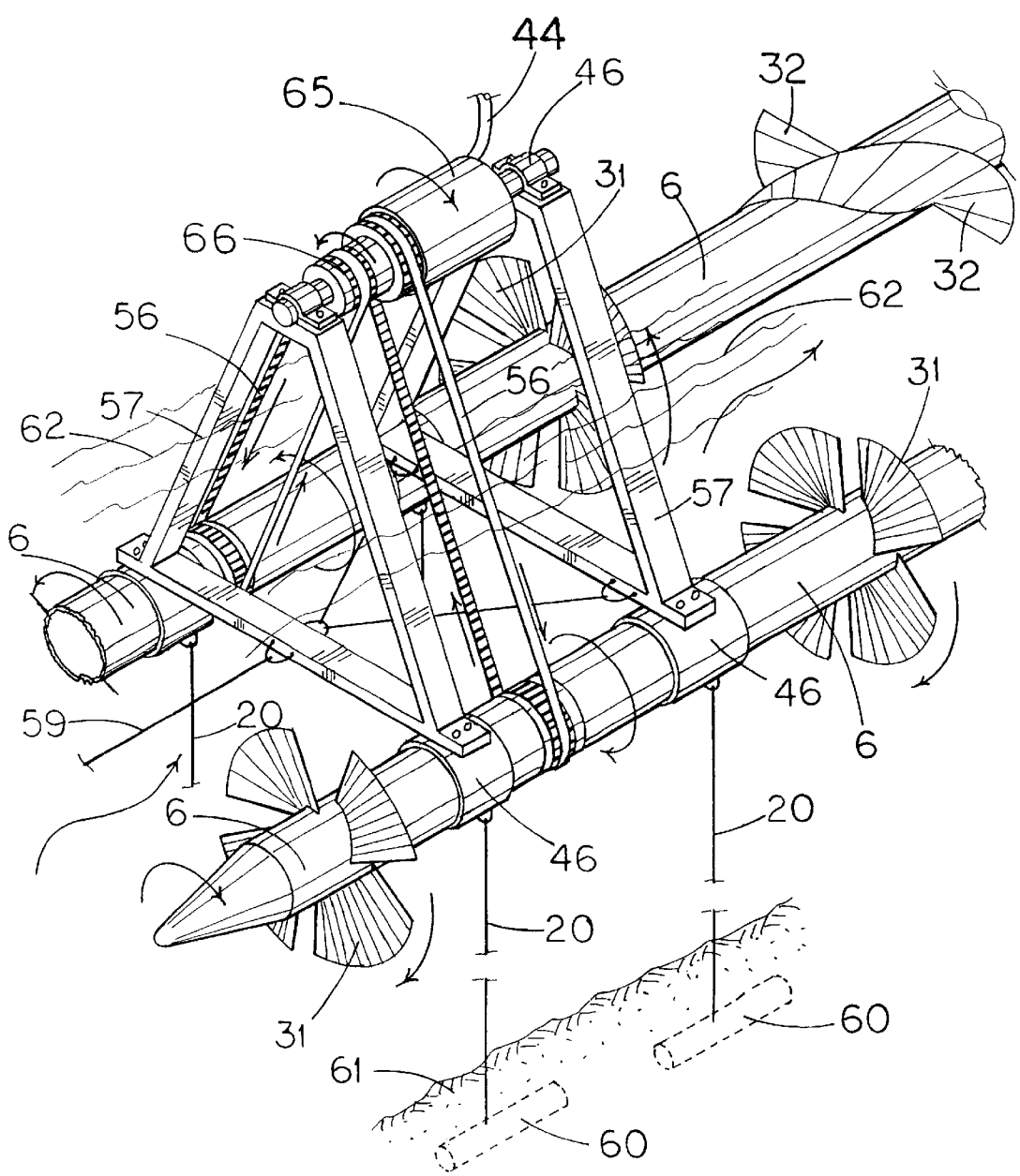
FIG. 8—illustrates how a lifter elongated floater, that is provided with a series of several wide-bladed turbines along its length, is anchored underwater current, and do the same with several other floaters laid parallel with the first floater and rotating opposite to each other to produce electricity thru an oppositely rotating magnet against wire coil armature.

FIG. 3 and FIG. 4 also illustrate an embodiment of an opportunity for constructing an anti-overturn control device/ system, wherein, the transverse control Bar 26 is just in the form of a rail tract, similar to the part No. 28 together with part No. 30 of FIG. 7 as well as that of FIG. 8 of the previous application Ser. No. 07/255,657, under U.S. Pat. No. 5,056, 447, but in this presentation, said rail tract is now a straight rail tract control bar No. 26 which is provided with a rigid flange on its top upon which a hook-roller assembly is attached but set free to roll all along the length of said rail tract. The anchor ring connector 18 is securely attached to the top of said hook-roller assembly and the pull force of the kite 1 is then guided to move along control bar 26, thereby preventing the boat from overturning. Said rail tract control Bar 26 may also be in the form of a hallow box bar having an opening lengthwise on top thru which a bar connector passes and the Hook-roller runs inside the box bar 26.

FIG. 1. FIG. 3—also illustrates a newly created powerful control system for the Kite-Sail 1, wherein, a pointed cylindrical ballast weight 35 that floats on water by at least 5%, which may be of any form but preferably in the form of a plastic pipe partially filled with water, or in the form of a weight having wheels rolling on land, or a Hook roller that is attached to any kind of railway, such as a bar or cable railway, or said ballast weight being in the form of things sliding on ice, or in the form of persons skiing on ice or on water or on roller skates, or in the form of floating things to which a hook line is attached for purposes of catching fish, or said ballast weight being in the form of boats that are loaded with passangers in which case the kite-sail is being shared among several boats sailing together using a common sail in a share-a-sail-teamwork game wherein at least two boats having on-off water resistors are being pulled by the kite while the other boats likewise having on-off water resistors serve as ballast weight tied to the tail of the kite 1, said ballast weight 35, in all the aforesaid configurations functions to hold down the kite-sail to a fined distance above the water preventing said kite from rising up to a higher angle of flight elevation in order to tilt up the kite thereby exposing more face of the kite to obstruct a wider cross-sectional area of the wind in order to deflect a greater air mass per second thereby making the kite exert a stronger force upon the boat being pulled. The hight of the kite above the water may be made variable by adjusting the length of the tie rope 36. Note that the water turbine 31 and 32 of FIG. 4 drive an oppo. rotating Elec.Generator as illustrated by parts 51 and 54 of FIG. 9.

FIG. 3 also illustrate newly created design for a very powerful kite control system, wherein, a pointed cylindrical balloon part 3, with a guide tail, is attached to the top of the kite 1, by means of a kite sling 20 that has adjustment eye-holes 5, in order to hold the kite 1 steadily to a flight posture, thereby preventing the kite 1 to dive when it is tilted to the left or to the right, it being that the lifter balloon 3 will never assume a diving posture even if the kite 1 will try to dive.

FIG. 3—also illustrate a newly created design for a wide face scavenger energy converter system, wherein, a parachute 27 is used to deflect or impede the wind so that the parachute 27 be used to pull any kind of load/person on rollers/snow ski going up hill or higher grounds for transportation or for sports purposes. This is done by way of using the control rope part 12 of FIG. 3, said rope, when pulled shorter will invert the parachute 27 to remove its sail power in order to allow the ski person to roll downhill, while, when said control rope 12 is relaxed, the parachute will open up agianst the wind and will pull the ski person uphill again. The parachute can be made in variable shapes so that it can be manipulated to act like a kite that can move oblique to the wind.

FIG. 5—illustrates how a scavanger wide face energy converter kite 1 is constructed in order to pull a load 2 which is a vehicle that rolls on land. Said kite 1 can be made to fly by adjusting the sling rope 4 such that the upper string 4 is shorter, but if there is an opportunity to be just rolling on land, the kite 1 is provided with self directing roller 5. The kite 1 consist of a main sail body 1, a flap wind deflector 6 which opens at the lee side and closes at the front side. The kite 1 is made wide face by means of frame 7 in the form of pipes or inflated materials. The cross-brace string 8 is provided to make the kite stay squarely at all times. The guy string 9 is provided to make the flap wing 6 make a rigid bite against the wind. Winch 16, when cranked clockwise, shortens the left sling control rope 4 and at the same time elongates the right sling rope 4. Bar 22 is the anti-over turning connector device thru which the kite 1 pulls the cart 2 along a line of force that passes under the center of gravity of the cart. Connector bar 11 is provided with roller bearings that roll inside the slot of the anti-overturning bar 22. Wheels 13, having a blade circumference to be able to bite on the ground, are provided to carry the cart 2. The battery operated steering motor 21 is provided to make the cart 2 steerable to any direction.

FIG. 5A—illustrate the opportunity for having a wide face scavenger kite 1 to be standing/sliding/floating on water. The kite 1 stands on floater devices, such as boats or pointed pipes 14 that are filled up with presurized light materials. The floater device 14 serves as floating shoes for the kite 1. Said floater shoes being provided with rudder 17 at each rear end to make the floater shoes always pointed to the direction of the water current. The back post 10, which is also carried by a floating shoes 14, is provided to make the kite 1 stand upright while it is being assembled and in the process of being harneshed to pull the boat 3.In the same construction as in FIG. 5, the frame 7 is an inflated material or filled up with foamed materials to make the kite 1 float on water when the kite 1 is laid down flat on the water. The winch 16 is used to steer the kite 1. The kite 1 is conncted to the boat 3 by means of the anti-overturining bar connector 22 that is being controlled by a circular railway 20 on top of the boat so that the line of force from the kite 1 will pass thru under the boat. The ballas weight 26 is provided to make the boat 3 stay upright by way of the connector wall 18 which prevents the boat from drifting sideward as it is being pull by the kite 1. The motorized steering device 21 is used to steer the boat 3 thru rudder 24.

FIG. 6—illustrates an embodiment of a new opportunity to harvest energy from the high altitude winds by means of a high flying multilevel oppositely rotating windmills in the form of a vertical array of pointed elongated cylindrical balloons 6 that are provided with windmill wide face blades 31 in various forms, such as, a helix of framed sheets wound around to form an auger/screw around the body of said cylindrial balloon, a plurality of inflated thin balloon long windmill blades set up around the body of said cylindrical lifter balloons, a plurality of framed wide sheets 31 disposed oblique around said cylindrical balloons held outward by means of front and rear radially disposed i masts that are held firmly by guy ropes, a plurality of smaller pointed cylindrical balloons 45 disposed obliquely at the outer ends of said framed wide sheets 31 the purpose of which is to build a self lifting impeller, and a plurality of windmill blades in the form of wide sails 31 disposed obliquely and held outward by at least four radially disposed in one plane masts to which the front side of the sail 31 is attached while the rear side of the sail is held away from the succeeding mast by means of strings or ropes. The pivote bearing-arm air pipe 20 holds the stator of compressor 49 at the front and rear of the of the cylindrical balloon windmill that turns the impeller of the compressor 49. The anchor air pipe 20 hold the vertical array of the flying multilevel windmill to the ground and made adjustable by the winch 13. The balloon wing 48, that is made up cylindrical balloons that are held together side-by-side to form a flat wide face kite that has a vertical wall as stabilizer,—is provided to react with the wind in order to lift the front end of the cylindrical balloon windmill at the next lower level. The wing 48 does not go with the rotation of the windmill but stay upright by means of a bearing connected to the tip of the cylindrical windmill 6. The strut 50, which is in the form a high pressure cylindrical balloon, is provided to push out and keep alignment of the air pipe 20. The said balloon strut 50, which is provided with a high strength skin such as kevlar fibers to enable it to contain high pressure light gas,—is a new invention as i a new kind of structural member that is used to construct rigid structures of various sizes and shapes that may float up in the sky for industrial purposes, as it is lighter than air. Note that air pipe 20 supplies compressed to the gas turbine power plant shown in FIG. 23 thru air gate 44, and also in FIG. 24, FIG. 20, FIG. 21, FIG. 22, and in FIG. 9.

FIG. 6—also illustrates a new design for a lighter than air wind turbine blades wherein a pointed elongated lifter balloon 45 is attached to the outer periphery of said turbine blade 31 pointed towards the direction of revolution.

FIG. 6—also illustrate an embodiment to make said sail-type turbine blade 31 be safe against violent weather by making said sail able to relax against the strong wind thru the used of automatically elongating control rope wound around a winch that is controlled by a calibrated coil spring, see part 52. Part 75, a forward extension of the axle at the front of the windmill, serving as post, provides rigidity to the wide face blades thru guy rope 76.

Figure 9:
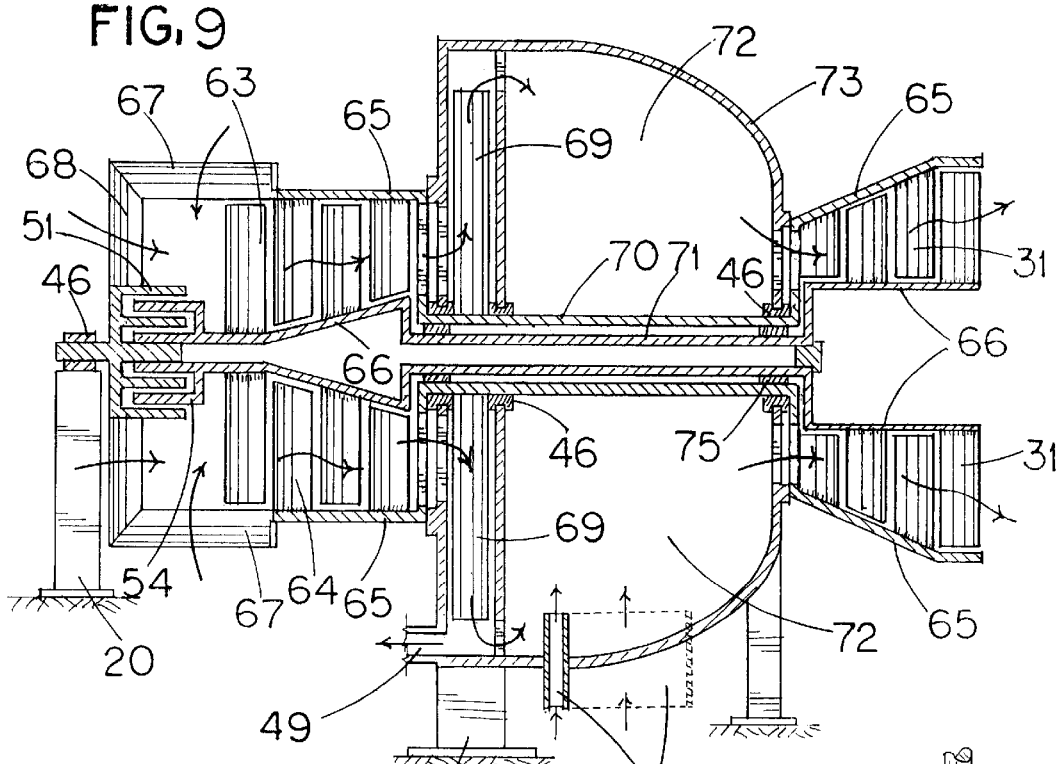
FIG. 9—illustrates how to construct a new design for an oppositely rotating gas/jet turbine, oppositely rotating pipe drive shaft, oppositely rotating turbine-type air compressor, an-oppositely rotating interphased multilayer concentric cylindrical maganets against a multilayer concentric cylindrical wire coils, and a pre-compressor air scooping vanes.

FIG. 6—also illustrates the embodiment of an oppositely rotating wind turbine 6, therein, the front section turbine rotates clockwise, the middle section turbine rotates counterclockwise, and the rear section turbine rotates clockwise, and next succeeding turbine rotates counter-clockwise, and so on in a long series of turbines in the same elongated lifter balloon 6, and wherein, a newly designed oppositely rotating air compressor is installed in-between and driven by said oppositely rotating turbines, said new designed compressor being illustrated by parts 63 and parts 64 in FIG. 9 of this application.

FIG. 6—also illustrates an embodiment of an oppositely rotating turbine that drives an oppositely rotating air compressor, said turbine being in the form of a sail 31 that is eccentrically mounted/attached to the outer section of a highly elastic torsion bar 53 to make said sail able to be relax against the violent wind and make said turbine still able to work safely during violent weather to take advantage during the time of abundance of energy, said turbine and said compressor being carried by a high pressure balloon strut structure 50.

FIG. 6 also illustrates an embodiment of a new type of windmill up in the sky,wherein, an ordinary plain large kite, not inflated, may suspend up a rotary sail windmill 31, as shown below the wing 48, in which case, the front anchor rope 20 of the large kite is attached to the front end of the axle of the suspended rotary sail windmill while the rear anchor rope 20 of the large kite is attached to the rear end of the axle of said sail windmill. This type of non-inflated flying windmill may be better off than the inflated windmill because gun shots can easily destroy the balloons.

FIG. 6 also illustrates a new invention of a bullet proof inflated balloon, wherein, as aforemention in the construction of the high pressure cylindrical balloon strut 50, the outer skin of the lifter balloons is made up of thick laminated layers of KEVLAR Fibers, or SPECTRA Fibers that prevents the bullet from getting thru the balloon. The balloon is made larger to make it able to carry the weight of its outer skin KEVLAR Fibers. It should be noted at this point that the "skin weight/helium gas weight" Ratio may be maintain or reduced by enlarging the balloon to fly.

FIG. 6 also illustrate a new embodiment of a flying windmill, wherein, said rotary sail windmill is carried up in the sky in between two large plain kites all together in one line of axis along the wind current, or said rotary sail windmill is carried in between two cylindrical balloon kites that are provided with wide and broad wings, said wings being necessary to be broad and wide to lift the windmill to a higher angle of flight elevation because said rotary sail windmill offers a high resistance against the wind that tends to move the kites down to the ground. There are so many variations of ideas derivable from this flying windmill of which the herein inventor reserves all rights.

FIG. 7 illustrates a new embodiment of a new Sky-Bike which enables a person to fly around the sky by purely man-power, wherein, a Bike mechanism 39, 40 is suspended below the cylindrical lifter balloon 6 by means of a drive belt 37 that is wound around the bike's drive wheel 39 and around and over the cylindrical lifter balloon 6 thru a deep friction groove around said balloon. A pivote bearing arm connector 46 is disposed at the front and rear end of said balloon 6 to serve as a steady connector that holds the connector arm 47 for the elevator rope 34 that is used to maneuver the balloon 6 to point up or to point downward by cranking the winch 13 therey moving the weight of the bike mechanism 38—44 foreward or rearward—in order to tilt the balloon 6 upward or downward. A plurality of inflated narrow radially disposed impellers 31 are provided at the mid-section of the lifter cylindrical balloon 6—as a first option for an impeller type. The second alternative way is a semi-helix inflated framed wide sail-type impeller 31 disposed at the tail of the lifter cylindrical balloon 6 and attached to an additional lifter cylindrical balloon 6. The frame of said wide helix impeller may be in the form of a plurality of straight sticks that radially push out the outer edge of said wide helix impeller 31. The rudder 25 is disposed at the rear of said helix impeller 31 and attached thereto by another pivote bearing 46, and being manipulated thru string 33 by the operator sitting on top of the winch 42. The upper part of said rudder 25 is made up of a plurality of superposed cylindrical small balloons plus an additional pointed lifter cylindrical balloon 45 at the top to make said rudder 25 stay upright. Said rudder 25 is needed to steer the Sky Bike left or right. The two-directional roller bearing 38 forces the drive belt 37 get together at one point to enable the drive wheel 39 stay at right angle with the rotation of the lifter balloon 6, so that the drive pedal 40 will be in line with the drive wheel 39. The casing 43 may be a transparent plastic film to serve as a capsule for the passenger. The whole passenger capsule is provided with frame with bottom wheels 44 for a landing gear. Said drive wheel 39 may also be disposed to rotate parallel to the rotation of the cylindrical lifter balloon 6, in which case, said drive wheel 39 is disposed at right angle with the drive pedal 40. It should be noted that for a slow moving impeller it should have a wide and broad face approaching that of a square, because the wind pressure upon a sail approaches zero as the width of the sail approaches zero, hence, the wide sail impeller.

The aforementioned Sky Bike may be in the form of another embodiment, such that the sail-type impeller may be directly attached to the rear end of the passenger capsule and driven by a drive shaft that is mechanically connected to the pedal, while the the passenger capsule being suspended from the lifter cylindrical balloon thru a pivote bearing arm connector at a constriction at the midpoint of said lifter balloon.

It should be noted also that the high pressure cylindrical balloon structural strut part #50 as shown in FIG. 6, having Kevlar and/or Spectra woven fibers for its high strength skin, is a new invention of a bulletproof balloon or Super Light Structure for use to make new inventions of a bulletproof airborne/high-altitude viewing and observation station or a house or as a restaurant or a jumping out station for gliders/parachuters,—said airborne station may have adjustable control wings to maneuver it thru the wind up and down or left and right.

FIG. 8—illustrates an embodiment of an oppositely rotating wide-face turbine 31 that turns an elongated lifter cylinder 6 that is anchored floating underwater in a running water 62. A pair of said elongated floaters 6 are made to turn opposite to each other in order to turn an oppositely rotating compressor blades 66 that turns counter-clockwise against a compressor blades 65 that turns clockwise to double the speed of the air compressor which may also be an Elect-.Generator or a water pump. Said driven machines/devices 65 being desposed above the water and mechanically connected to said turbines 6 by means of drive belts 56. A plurality of sets of said wide-face turbine blades 31 are being attached at even spacing along the length of said floater cylinder 6 in order to make a long series of turbines along the water current to make up a big power output. A plurality of said floater cylinder 6 turbines are being disposed parallel to each other across the water current to cover up the whole channel of running water 62. The same procedure is being done with the elongated lifter cylindrical balloon 6 wherein a series of several turbines 31 are attached at even spacing along the length of said long cylindrical balloon 6 in order to make a powerfull series of turbines floating up in the air. It should be noted that the air pipe 44, the air outlet of the compressor 65/66, is made and being connected to the part 44 of FIG. 23 in order to supply compressed air to the gas turbine engine as illustrated in FIG. 23, or to supply compressed air to other gas turbine engines as shown in FIG. 24, FIG. 20, FIG. 21, FIG. 22, and in FIG. 9.

FIG. 8—also illustrate a new design/creation of a water turbine blade part 32 that gradually tapers off to zero at its front edge in order to act as a wedge in order to prevent the entanglement of floating waste materials drifting on the water.

FIG. 9—illustrates a new invention of an oppositely rotating gas turbine engine or jet engine that drives an oppositely rotating turbine type compressor and also drives an oppositely rotating multi-layer concentric-cylinder electric generator 51/54 by means of an oppositely rotating concentric pipe drive shafts 70/71 wherein, the turbine blade 31 that revolves clockwise are held together by an outer cylinder 65 that rotates clockwise, while the turbine blades 31 that revolves counter-clockwise ate being held by an inner cylinder 66 that rotates counter-clockwise. The power of said outer cylinder 65 is transmitted to the outer pipe drive shaft 70 that drives the outer cylinder 65 of the front air compressor. The power output of said inner cylinder 66 of the gas turbine is transmitted thru the inner pipe drive shaft 71 that drives the inner cylinder 66 of the front air compressor. Said outer cylinder 65 at the front air compressor holds and revolves clockwise the compressor blades 64, the pre-compressor scoop vanes/blades 67 & 68 and also rotate clockwise the multi-layer concentric cylindrical magnets 51 of the front electric generator. Said inner cylinder 66 holds and revolves counter-clockwise the compressor blades 63 and also rotates counter-clockwise the multi-layer concentric cylindrical wire coil armature 54 of said electric generator. Part 69 is the impeller blade of a centrifugal type compressor that serves as the final high pressure stage of the compression process which is being driven by the outer pipe drive shaft 70. Part 46 is a roller bearing to hold the drive shafts and the drive cylinders in place. Part 20 is a vertical and lateral support of the engine. Part 73 is a high temperature enclosure shell for the combustion chamber 72 and which also encloses the final centrifugal compression stage 69. Part 74 is an inlet for fuel, steam, geothermal steam, compressed air, and hot compressed air exhaust from piston-type engines to energize this turbine. Part 75 is a planetary synchronizer bearing. Part 49 is an outlet for compressed air to suppercharge the carburetor of the car/any engine.

Figure 10:
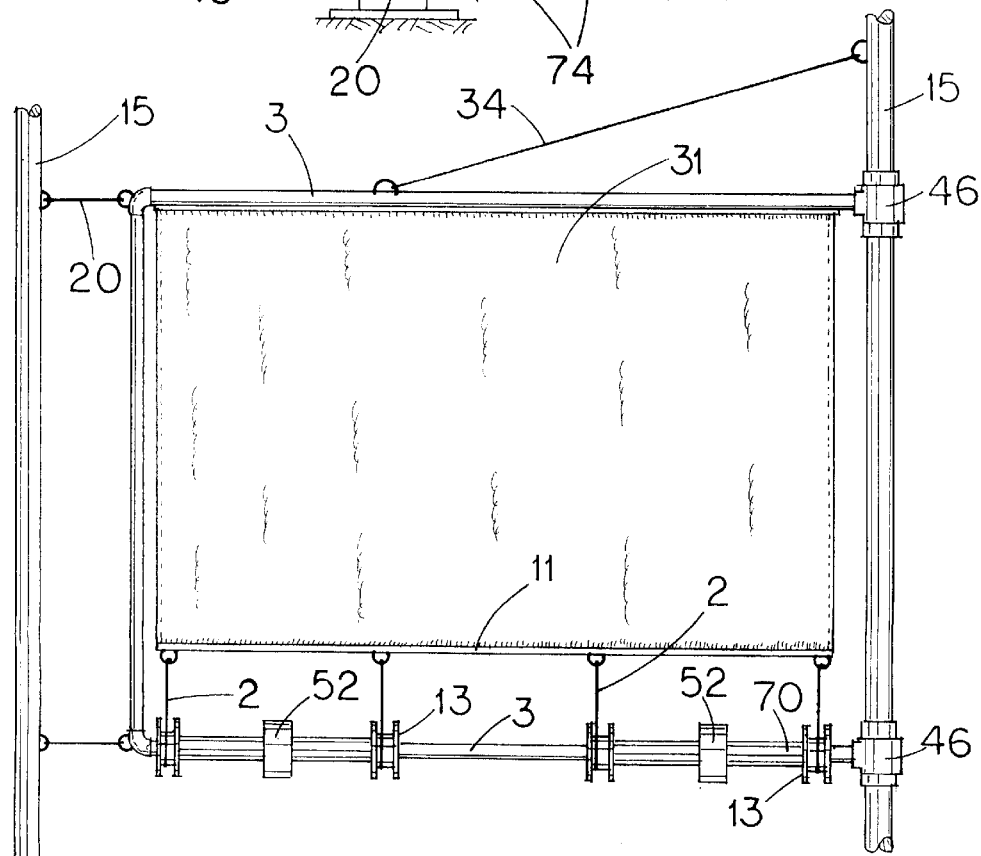
FIG. 10—illustrates how to construct a new design for a self/automatic adjusting wind sail that is safe against high speed winds by means of a winch that is controlled by a calibrated coil spring or other elastic devices, said safe sail being used for wind turbines.

FIG. 10—illustrates a embodiment of a new invention for a control system that enables a wide-face wind sail to work safely during violent weather, wherein, a highly elastic material or a coil spring 52 is set to control a winch 13 thru pipe drive shaft 70. Said coil spring is locked on the sail frame part #3 and resistively unwinds when the control rope 2 forcibly turns winch 13 to elongate rope 2 as the sail 31 is blown out harder by the speeding wind. The mast 15 stays perpendicular to the wind and the frame 3 stays oblique to the wind as fixed by control rope 20. Bearing 46 allows frame 3 and sail 31 to flip left and right. The guy rope 34 fixes frame 3 to stay perpendicular to the mast 15. Bar 11 distributes the force of rope 2 evenly to the lower edge of sail sheet 31. As the wind blows harder, the sail sheet 3 is allowed to fly further away from winch 13 by elongating control rope 2 and fly higher towards the upper frame 3 giving way for the rushing wind thereby the wind force upon the sail remains constant which does not overload the wind turbine as a whole, hence, allowing the wind turbine to be working safely at ease even during violent weather to take advantage of the time of abundance. This sail 3, 31 and mast 15 is being attached and serves as a radial blade for an oppositely rotating wind turbine, and also being attached to a car on a railway track in a long series in a closed loope to build a supper large windmill, and also being attached to multi-level aerial cable railway on a closed loope that drives an end-loope gear to build a supper large aerial windmill, see U.S. Pat. No. 4,859,146 dated Aug. 22, 1989. These supper large windmills also supply comp. air to turbine engines illustrated by FIGS. 23, 24, 20, 21, 22, and 9.

Figure 11:
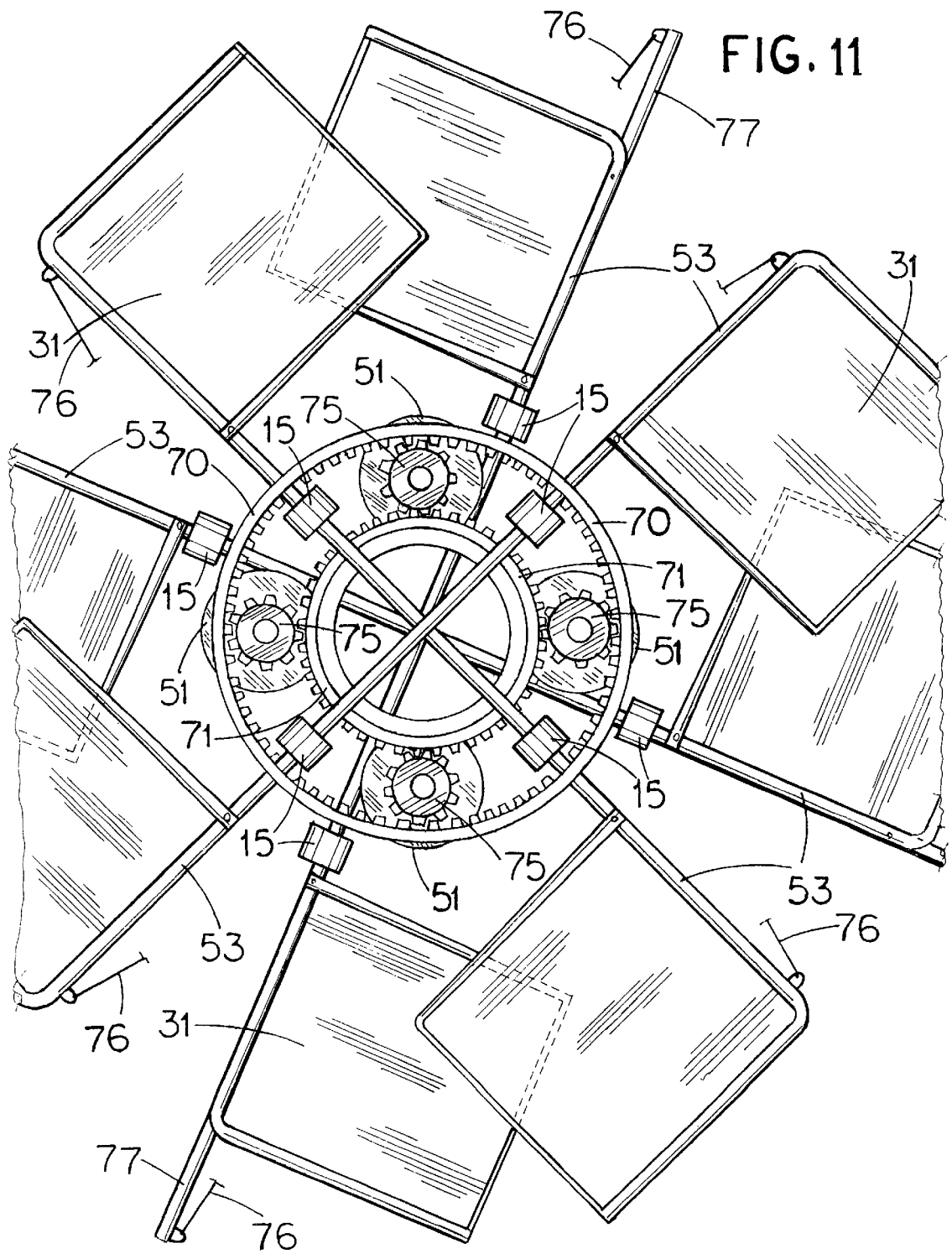
FIG. 11—illustrates how to construct a new design for a plurality of electric generators being driven by oppositely rotating wind turbines thru self adjusting torsion bar masts and thru planetary gears in-between oppositely rotating concentric cylindrical gears.

FIG. 11—illustrates an embodiment of a newly invented oppositely rotating wind turbine wherein the wide-face sail 31 is eccentrically attached to the mast 53 so that when the wind pushes said sail 31 backward, said sail 31 is forced to become oblique to the wind by forcibly twisting the mast 53 that acts as a torsion bar, it being highly elastic and calibrated to match the size of the sail 31. As the strong wind blows harder, the sail 31 becomes more oblique to the wind by twisting the torsion bar mast 53 further, thereby, the sail 31 becomes less resistant to the violent wind, hence, the wind turbine becomes relaxed and works safely during strong winds as the torsion bar-mast 53 is twisted far enough such that the sail 31 becomes almost neutral to the wind. The mast 53 is being held against the push of the wind by means of a guy wire 76 that is tied to a forward axial bar. Said oppositely rotating turbines 53 correspondingly drive an oppositely rotating concentric drive shaft cylinders, the inner cylinder 71 having an outside drive gear rotates counter-clockwise as driven by the front turbine 53 and being extended forward to hold the front turbine 53, while the outside cylinder 70 having an inside drive gear rotates clockwise as driven by the rear turbine 53 and being extended rearward to hold the rear turbine 53. A plurality of planetary gear 75 is being inserted in-between inner gear 71 and outer gear 70 and being driven by said inner and outer drive shaft cylinders gears 71 & 70 simultaneously. Each of said planetary gears drives an electric generator 51 thru an automatic multiplying transmission gear. During low speed winds, only one electric generator is being loaded, and during high winds all the said generators 51 are being loaded and additionally the magnetic fields are being increase during high winds in order to harvest more energy from the strong winds. An additional gear is also being provided such that the magnetic cylinder of said electric generator is being driven by said planetary gear in opposite rotation against the wire coil armature. An extension bar 77 at the outer end of said mast 53 at the rear turbine is also being provided to hold the guy wire 76 for the rear turbine 53 so that the rear guy wire will not interfere with the rotation of the front turbine. It should be noted herein that the wide face sail 31 should approach the form of a square in order to deflect more wind. As the width of the sail appraches zero, wind deflection becomes zero. It should be noted that the part 15, which is an electronic gear device, is added to provide safety for the turbine by turning the sail 31 totally neutral to the violent wind to allow maintenance works. The electric generator 51 is also being replaced into an air compressor to supply compressed air to the various types of gas turbine engines shown in FIGS. 23, 24, 20, 21, 22, and 9. See FIG. 26.

Figure 12:
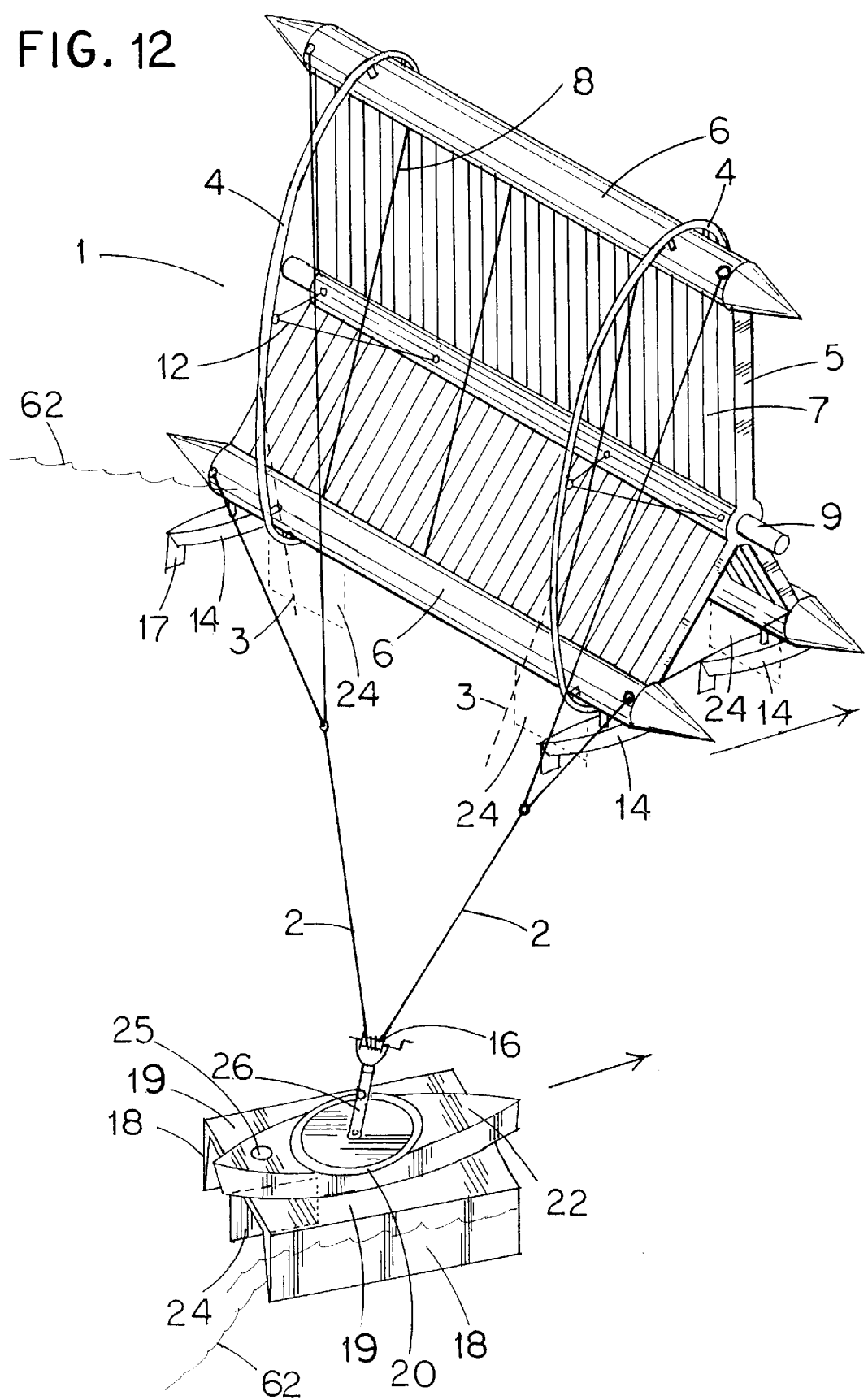
FIG. 12—illustrates how to construct a new design for an independently floating kite-sail in a 120° degrees radial formation being carried by elongated floaters.

FIG. 12—illustrates an embodiment of a new invention of a radial sail that is independently floating on water at a striding posture that functions as a non-flying kite and also acting as an independent sail boat, wherein, three pieces of wide face sails 1 are radially assembleed together such that one side of each are attached to each other at the center forming a radial figure at 120° degrees between sails so that one sail is up-right when the other two sails serve as legs standing on the water. An elongated floater cylinder 6 is attached to the outer periphery of each sail and made large enough to float the whole radial sail on the water 62. A thin wall 24 is attached at the bottom of floater 6 to serve as rudder and to prevent the floating sail from drifting sideward when seving as an independent floating sail boat by itself. When the floating sail serves purely as a sail to pull another boat 22, the thin wall 24 is taken out of the water by means of any kind of appropriate mechanism, so that said floating sail will be moving sideward, rearward and foreward as it pulls the boat 22 oblique to the wind. The sling rope 2 connects the floating sail to the boat in such a fashion so that said floating sail will act as a floating kite that moves rearward and foreward as being steered by inversely shortening and elongating the left and the right control sling rope 2 respectively, by cranking the winch 16 clockwise and counter-clockwise. The anti-overturning control bar 26 connects the sail to the boat 22 thru the rope 2 and winch 16, said bar 26 being locked to the center of the boat 22 and free to turn around and disposed to stay horizontal by means of roller bearing that bites on the horizontal circular rail 20 on top of the boat 22. Said elongated floater 6 may also be in the form of shorter floater pipes and a plurality of which are attached to the bottom of said radial sail to serve as carrier floating shoes that freely rotates to align with the water current under said sail to reduce impedance of the water.

FIG. 12—further illustrates a new design/creation of a scavanger wide face energy converter kite 1, wherein, a floater device 14 in the form of a boat/pipe is pivotally attached to each end section of the floater frame 6 in order to lift the frame 6 above the water to minimized resistance of the water against the oblique movement of the sail kite 1. The floater device 14 is further provided with a coudal tail 17 that is attached to one bottom end of floater 14, said tail being rigidly and squarely protruding downward underwater, in order to automatically steer the floater 14 along the water current when kite 1 is pushed by the wind in any direction. Frame 5 is an equeangular radial structural frame to hold the floater frame 6 in an equeangular position and to make the kite 1 rigid. Part 9 is an axle thru the central axis the kite 1 to serve as pivote connector when kite 1 is made to act as a paddle wheel when traveling windward. Part 4 is a railtract around kite 1 to serve as a revolving connector for a hook roller connector for the harnesh rope 3 as an alternative method to manipulate kite 1 in order to pull load/boat 22 in all directions. Part 16, a flat horizontal wing attached to both sides of the boat 22, is provided to enable the boat to fly a little bit above the water to avoid too much resistance being imposed by the water. Part 18 is a verical thin wall attached to the outer ends of wing 16 in order to prevent the splashing water from getting outward from under the wing 16 thereby creating more air pressure and water pressure to be confined under the wing 16 to make the boat fly better. Rudder 24 is provided with an electric steering device 25 for easy operation. The wing 16 and the fender wall 18 is a new invention for boat accessories which is another new variation of the wide face scavanger energy converter system.

FIG. 13—illustrates another varation of the wide face scavenger energy converter system, wherein, a kite 1 is made to vertically concave to the wind but framed to be horizontall straight in a rectangular shape, approaching a square to make it wide face. Kite 1 is made to be extra large size compared to the load/person it pulls so that it will work even with a slow moving wind. Kite 1 comprises an upper frame 7, a lower frame 7 and a plurality of vertical frames 7 that interconnect the upper frame to the lower frame from the left end to the right end to form a rectangular frame. String 16 is tautly tied to each ends of the vertical frame 7 in order to curve it like a bow. A traight horizontal frame is provided to hold and interconnect the midpoints of all the vertical bow frames in order to make the kite 1 horizontally straight. An X-brace string is provided at the back of the kite 1 intertieing all the corners of the rectangular frame in order to make it geometrically rigid. The pivote wheels 5 are attached to the bottom end of the outer vertical frames for easy handling when the kite 1 is used without flying or when it is being stored or transported. The grab bar 6 is privided interconnecting the upper to the lower horizontal frames at the mid-section of the kite 1, for easy handling of the kite 1 and for purposes of hand lifting of the kite 1 by the operator 3. The kite sling 4 is provided and made to be adjustable in order to make the kite 1 fly to the left or fly to the right while it pulls the load/opetrator 3 by elongating the right and at the same time shortening the left sling 4. All the spaces between the frames are coverd by strong light sheets. The load/operator 3 is on roller shoes 2, and alternatively, on shoes that float on water 11, or on snow ski or water ski. The window 19 is provided to automatically reduce the wind pressure upon the kite 1 when the wind is too strong by providing a coil spring/tortion bar/elastic frames-materials that are calibrated to allow but resist the opening of the window 19 when pushed hard by the wind. The frames of the kite 1 is being alternatively made of inflated materials shown by part 22 or that the whole kite is made of monolithically formed styrofoam or any light strong foam, such as, Ester/aerogel/reinforced foamed plastics. The kite 1 is also being provided with shoes 14 that floats on water so that the kite 1 will be used to pull loads/operators on the water. The floating support 14 of the kite is being provided with caudal tail 17 so that support 14 will turn to the direction of the water current by pivoting on the vertical frame of the kite 1. The floating shoes 11 of the load/operator 15 is provided with underwater thin wall blade 12 to prevent the operator 15 from drifting sideward when sailing transverse to the wind. The rudder 20 and the steering motor 21 is provided for easy maneuver of the floating shoes 11. The Boot shoe 8 is attached to the top of the pipe-floater shoe 11 for easy use. The tie string 13 is to prevent the floating shoes 11 from drifting apart. The alternative grab bar 9 is used to fly the kite 1 to a higher altitude, by tieing/winding each of the sling ropes to the corresponding left and right end sections of the grab bar 9. Steering of the kite 1 is done by tilting the grab bar 9 to the left or to the right. The end plate 18 is provided to prevent the sling rope 4 from sliding off the end of the steering/grab bar 9. The steering bar 9 is most useful when flying the kite 1 over the rough land/sea.

FIG. 14A—illustrates the construction of the old type multi-blade windmill with narrow face blades 41 radially arranged and mounted on a pipe tower 20. This windmill appears to be very powerful and appears to be very efficient wind energy converter, and when the 16 narrow blades 41 are arranged to become the sail of a boat 22 in FIG. 14B, the assembly appears to be very powerful sail, but by inspection, there are gaps 2 in between the narrow blades 41 in the same way that the blades are arranged in the windmill of FIG. 14A. The gaps 2 serve as scape window for the wind pressure that should be accumulated in front of the sail. There being a gap 2 between the narrow sails 41. the whole sail assembly is just the same as having a continous sail 42 with multi-rows of multi-perforations 3 as illustrated by FIG. 14C that is set to drive boat 22. The perforations 3 provides scape windows for the wind pressure that is supposed to be developed in front of the sail 42, hence, the perforated sail cannot be an efficient scavenger energy converter.

FIG. 14D illustrates a continuous wide face sail 1 without perforatoins that is mounted on the mast 15 and set to drive the boat 22. By inspection, it shows that there is no scape window for the wind, hence, this type of sail, being wide face, will be very powerful in pulling the boat 22, there being a high pressure of the wind being developed at the front of the sail 1.

FIG. 14F—illustrates the most logical design of a wide face blade 31 for a wind turbine. By inspection, the blade 31 covers about 160 degrees of the total turbine face at the left side and the same is done for the wide face blade 31 at the right side face of the turbine. This wide face blade 31 will surely develope a high wind pressure in its front face, hence, it will provide a powerful torque on the windmill. This design for a turbine blade is therefore qualified as a scavenger energy converter, it being actually a wide face wind sail. Part 54 is a front radial mast to hold the front edge of sail 31, while part 53 is the rear radial mast that holds the rear edge of sail 31. Part 7 is a radial strut or another radial mast to hold the mid-sections of the sail 31. Part 20 is the tower post that holds the wind turbine up in the air. The blades 31 are painted with circular rainbow color.

FIG. 14F—illustrates another logical design for a wide face scavenger energy converter windmill, wherein, the wide face turbine blades 31 are made into large flower petals so that the windmill appears to be a beautiful flower for a tall tree, such as, the palm tree 21. Part 8 is the hub which is designed to be an artful mlticolor center of the flower turbine 31. Part 23 is the cross-arm structure attached to the upper part of the tree 21 upon which the guy wire 26 is tied to, in order to push out the guy wire 26 away from the turbine blades 31. Wire 24 is provided to suspend the cross-arm 23 up to the tree 21. Part 25 are leaves of the live tree. Part 27 is the deadman undergroud anchor for the guy wire 26. The flower windmill is painted is painted with various art designs of multicolor to add more aesthetics in the windfarm or in the urban communities. This is one way of making the desert bloom in colors, for which, the herein inventor reserves all rights to this new idea.

FIG. 15A—illustrates a new embodiment of a wide face scavenger energy converter, wherein, a wide mouth air concentrator device parts 1 & 2 is provided to an airplane to gather large quantities of air mass into the portal 3 of the jet engine 5. This device is a form of a supercharger that pre-compress the air before it is fed into the nose 3 of the jet engine 5. Said device is in the form of a pair of vertical wind deflector walls 2 that are farther away from each other at the front and getting close together at the portal 3 of the jet engine 5. Said walls tappering to zero upfront. To make said device into an effective air scoop, a third wind deflector wall part 1, is provided, which is a forward extension of the wings, and is attached to the front body of the airplane. By inspection, it is shown that the right deflector wall 2 gathers air from below the body of the airplane, while the left deflector wall 2 gathers air from below the wings, and the top deflector wall 1 gathers air from above the wings and farther act as enclosing wall between the two vertical walls 2 in order to make an air scoop that effects a rain action on the wind as the airplane makes a high speed thrust thru the air. It should be noted at this point that the forward thrust force produced by the jet engine is directly proportional to the quantity of air mass being violently expelled to the rear by the jet engine, as proven and shown by the formula of nature—Force=mass× the square of the its acceleration. The best mode here should be to produce as much air pressure as possible at the portal of the jet engine, or at the portal of the carburetor of a car engine.

FIG. 15B—illustrates a new embodiment of a wide face scavenger energy converter, wherein, a wide mouth air concentrator device. parts 1, 2, 3, & 4, asembled as one device, is provided to a car to produce compressed air at the portal 3 by way of the wide face wind deflector 1, which is the hood of the car that is already an existing part, and by way of the wide face wind deflector vertical walls 2 that make a wide open mouth upfront to drive the wind inward to the portal 3. This small air concentrator device is used to produce continuous supply of compressed air thru the intake manifold and into the carburetor of the piston type engine of the car, when the car speeds thru the air.

FIG. 15B—also illustrates a new embodiment of a large wide face scavenger energy converter, wherein, a wide mouth air concentrator device, parts 1, 2, 3, & 5 assembled as one air scoop device, is provided to a car or to any transportation vehicle that is driven by a gas turbine engine or by a jet engine, in order to supply large quantities of compressed air mass at the large portal 3 by using the hood 1 and the windshield 1 of the car as wide face wind deflectors and by the large left and right vertical side walls 2 that prevent wind spill thru the sides. This assembly makes a large supercharger device as the car thrust thru the air. In this case, the small wind converter, 1, 2, 3 & 4 assembly, is eliminated to make the car hood a one whole piece smooth wide face wind deflector. The pre-compressed air is then rained into the large portal 3 and then conducted thru the intake manifold 5 then fed into the gas turbine engine. It should be noted at this point that the engine becomes more powerful when there is more air mass being accelerated and being decelerated by the oppositely rotating tubine blades of the engine.

FIG. 15C—illustrates a new embodiment of a large wide face scavenger energy converter, wherein, a large wide face wind deflector in the form of a butterfly shape wing 1 is provided to an airplane 6 to enable it to deflect more air, hence, to provide more lifting power to the airplane 6 and/or to serve as a parachute for the airplane 6 when the engine 5 breaks down in midair and to convert the airplane 6 into a slow moving glider and make a soft landing, thereby, to avoid heavy impact on the ground. The flap wing 7, as another large wide face wind deflector, is also provided as part of the whole Butterfly wing 1 to enable the airplane 6 to glide at a horizontal posture at low speed.

FIG. 15C—also illustrates a wide face scavenger energy converter, wherein, a large wide face tail wing 8 is provided to the airplane 6 to make a good lifting effect at the tail section as it carries the weight of the jet engine 5 while the airplane would be gliding at low speed if the engine 5 breaks down in midair. The supercharger, wide face walls 1 & 2 assembly, is also provided, to supply more air into the jet engine 5.

FIG. 15D—illustrates a new embodiment of a wide face scavenger engery converter, wherein, a large wide mouth air scoop, parts 1, 2, & 3 assembly, is provided to the jet engines 5 of a large passenger airline plane 6 under the wings of the airline plane 6, with the wings 1 serving as upper part wide face wind deflector enclosure of the air scoop supercharger device. This wide mouth air scoop supercharger device rams the air into the engine 5 as the airplane thrust thru the air, thereby, supplying the engine with compressed air. This supercharger provides more power to the engine with less fuel consumption.

FIG. 15E—illustrates a new embodiment of a wide face scavenger energy converter, wherein, the wide face properller blades 31 & 32, in the form of a semi-circle or a sector of a circle, are adapted to form the two sets of propeller assembly for a helicopter that is driven by human power in order to enable man to fly by his own power alone. The set 1 propeller comprises the wide face propeller blade 31, the drive shaft 33, the drive pulley 14, the right crank pulley 9, and the right foot peddal 10. The set 2 propellar comprises the wide face propeller blade 32, the drive shaft 34, the drive pulley 13, the left crank pulley 9, and the left foot peddal 10. The two sets of propellers, 1 & 2, are inter-driven in opposite rotation by the link drive pulley 11 and the link drive belt/chain 12. It should be noted at this point that the two sets of propellers are being driven in opposite rotation to become more efficient in driving the air down ward resulting to a higher uplift air pressure upon the bottom face of the wide face blades 31 & 32. It should also be noted at this point that man cannot paddle or drive the propellers fast enough, unlike the engine does, and that man can only move things slowly like the Butterfly does on its wide face wings, that is why man needs a more efficient fluid deflector which he can move slowly but which deflect fluid effectively at low speed, such as the wide face oar for rowing the boat, a wide face hand held fan to set up air current to cool the person fanning himself, and the herein presented semi-circle wide face propeller blade that rotate slowly but able to lift the man that drives the subject propeller, hence, the herein invention presented.

Figure 16:
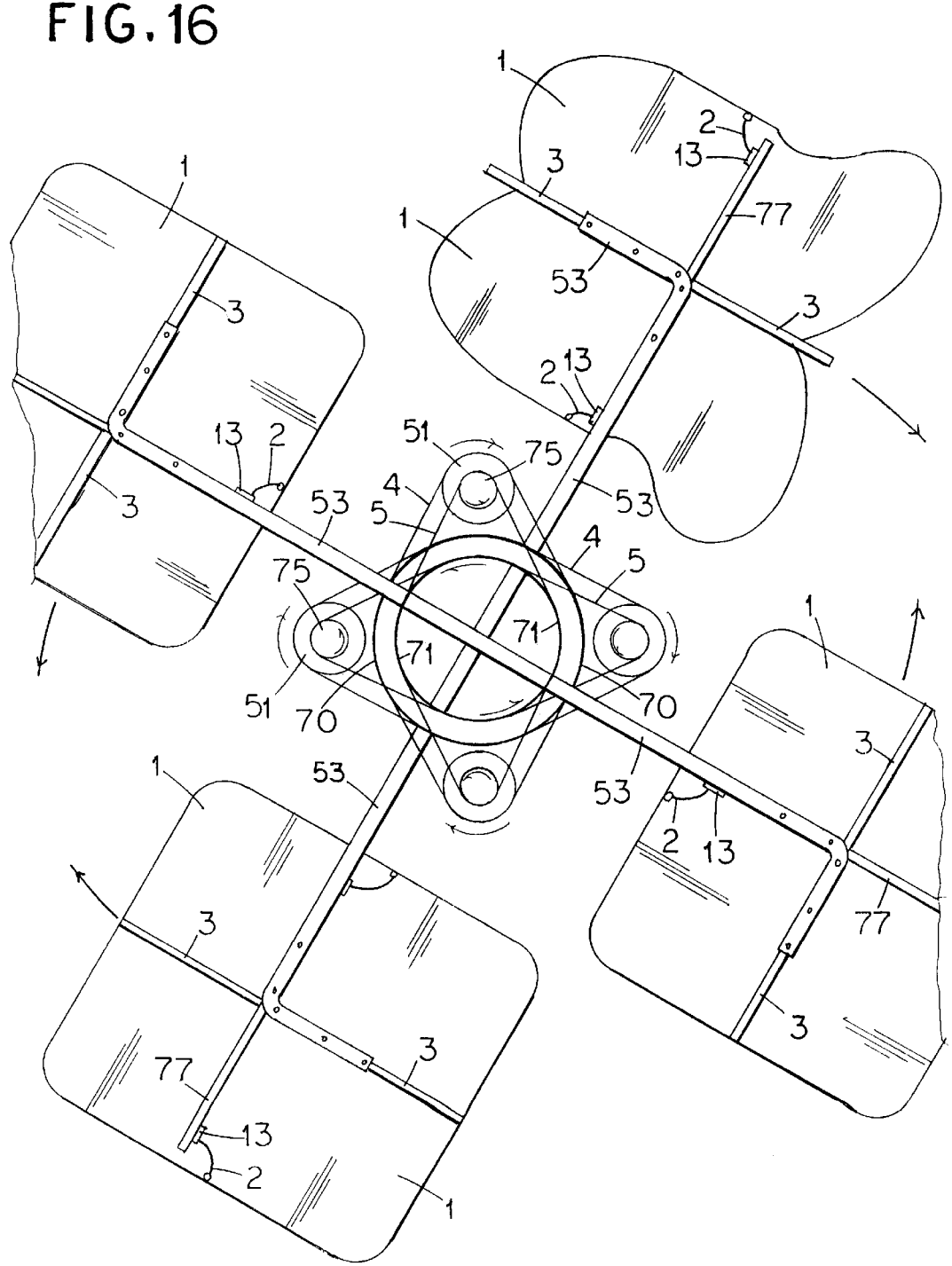
FIG. 16—illustrates a new wideface scavenger energy converter system, wherein, a folding butterfly wing is used and made safe to be a fluid deflector.

FIG. 16—illustrates a new embodiment of a wide face scavenger energy converter, wherein, a large wide face wind deflector in the form of and in the shape of a Butterfly Wing 1 is adapted to serve as turbine blade-sail of a large windmill. Semilarly, this wide face wing sail 1 is made to be able to open or unfold and also able to close or fold along its central axis 3, the same as the butterfly wings do, in order to make it relaxed but still able to work during violent weather, instead of shutting the windmill down. The resistively elongating rope 2, that is housed in the remote/radio controlled coil spring winch 13, has the function to allow the butterfly wing to fold closed during high winds, depending upon the intensity of the wind, and then to forcibley unfold wide open the butterfly wing during low winds, so that the windmill will be always running at its maximum capacity regardless of the capacity of the electric generators 51/75 at any wind speed, as there is an automatic switching device to add on to or to reduce loads from the windmill. The bar 77 is an outward extension of the mast 53 to take hold of the outer half of the butterfly wing 1 thru rope 2/winch 13. The radial mast 53 is meant to be slender so that it will function as tortion bar to further relax the butterfly wing 1 during high winds. Note that the mast 53 is placed off-center toward the front of the butterfly wing 1. This is purposely done so that there will more wind force upon the tail of the butterfly wing. It being unbalance, the tail of the wing 1 will be pushed out by the wind thereby twisting the mast 53 and makes the wing 1 be in oblique posture to the wind. As the wind blows harder. the mast 53 will be twisted further and the wing sail 1 becomes more oblique to the wind, thereby avoiding further the full force of the speeding wind, hence, the windmill will be automatically working safely in variable wind speeds. The vertical mast 53 pierces the outer hub drum 70 and is equally extended to the other side to hold the other butterfly wing sail 1 in the same maner as it holds the first wing sail 1, in order to make a couple of wing sails 1 that turns the outer hub drum 70 in a clockwise rotation. Semilarly. the other mast 53 pierces the inner hub drum 71 and is equally extended on both sides of the inner hub drum 71 to hold a couple of wing sails 1 that turns the inner hub drum 71 in a counter-clockwise rotation. The four electric generators 51/75 arranged in quadrant are the loads for the windmill. Each generator comprises an outer drum type magnet 51 that rotates clockwise as it is being driven by the clockwise outer hub drum 70 thru the drive belt/chain 4, and an inner drum type induction wire coil 75 that rotates counter-clockwise as it is being driven by the counter-clockwise inner hub drum 71 thru the drive belt/chain 5. Note that the electric generators 51/75 are called the oppositely rotating electric generators. It has been purposely designed that the magnet drum 51 rotates opposite the rotation of the induction coil drum 75 in order to double the speed of the electric generator, as the windmill must be moving slowly semilar to the sail boat in order to maximize conversion of the available energy of the wind.

Figure 17:
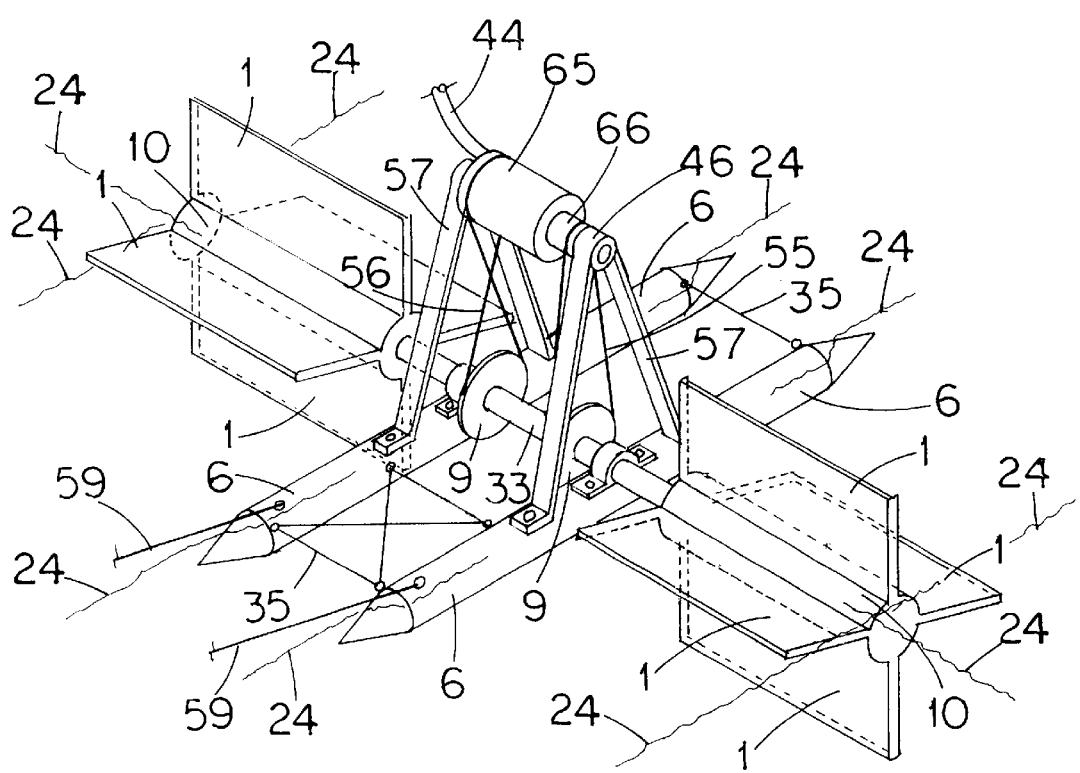
FIG. 17—illustrates a new wideface scavenger energy converter system, wherein, a paddle wheel is used to imped and convert the water current.

FIG. 17—illustrates a new embodiment of a wide face scavenger energy converter, wherein, a wide face paddle wheel 1 is adapted as water turbine that is carried on the flowing water by a floating raft or a pair of boats 6 that are tied by ropes 59 to an elevated anchor to avoid debries getting entangled to the raft 6. Raft 6 is in the form of a boat or in the form of pipe filled up with compressed air or filled up with foamed plastics to prevent water leaking into the pipe. About half of the paddle wheel 1 is above the flowing water while the lower half is submeged into the flowing water so that the paddel wheel 1 is turning counter-clockwise in one drive shaft 33 from left paddle wheel 1 to the right paddle wheel 1. The drive shaft 33 drives the left and the right drive pulley 9. The load 65/66 is either an electric generator, or an air compressor, or a water pump wherein the two principal elements, the induction coil drum 66 and the magnet drum 65 are driven in opposite rotation against each other in order to double the speed of the generator 65/66 as the paddel wheel 1 is slow moving but with large force or torque. The drive chain 56 at the right drive pulley 9 is mounted at an "X" layout in order to drive the drum magnet 65 in a clockwise rotation in oppose to the counter-clockwise rotation of the drum induction coil 66 as it is driven by the drive chain 55 In the same rotation as the paddel wheel 1. Structure 10 is the central hub of the paddel wheel which drives the dirve shaft 33. The structure 57 stands on the floater pipe 6 to carry and elevate the generator 65/66 high and dry above the water thru bearing 46. The tie rope 35 keeps the pair of floater pipes stay parallel to each other at all times.

It should be noted at this point that the usage of the wide face blade paddel wheel is not limited to the herein configuration as shown in FIG. 17, but it can be used in several variations of configuration to deflect or to imped the flow of water or various kinds of fluids. The first variation is wherein one large paddel wheel 1 is placed in between two large floater pipes/boat 6 and the paddel wheel 1 is carried by the floater 6 thru an extra length of the drive shaft 33 which is extended beyond the left and the right ends of the paddel wheel 1. The second variation is wherein several paddel wheels 1 are suspended in one line end to end accross and above the river by means of a catenary suspension cable rope at an elevation such that the lower half of the paddel wheel 1 is submerged under the flowing river water. There are many variations of apparatus configurations that can be made out of the wide face paddle wheel for purposes energy conversion as exemplified by the aforementioned configurations of which the herein inventor reserves all rights of usage.

Figure 17A:
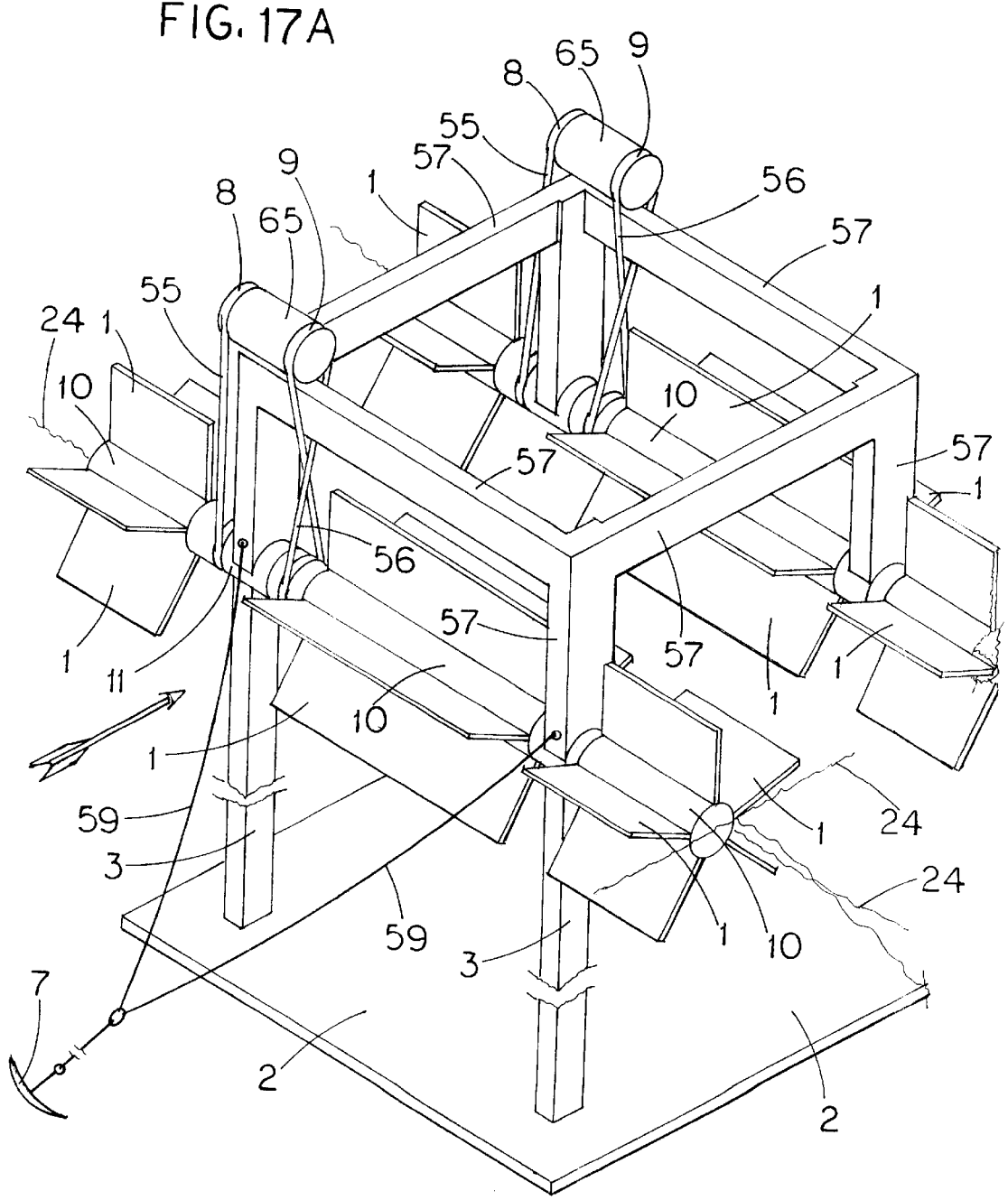
FIG. 17A—illustrates a new wideface self floating paddle wheel being attached to an underwater wideface anti-oscillation resistor, for the ocean current.

FIG. 17A—illustrates a new embodiment for a least oscillated floating water turbine apparatus set out oil certain parts of the ocean or river where there is water current. The wideface paddle blades 1 are attached to a high vouyancy pipe 10 serving as hub to assemble a self floating paddle water wheel that serves as water turbine to convert the running water into mechanical energy. The hub 10 is the principal carrier to keep the whol apparatus alfloat on water. The underwater structural posts 3 connect the whole apparatus to the wideface anti-oscillation resistor 2 to prevent too much oscillation of the apparatus by the water waves. To make the whole apparatus stand stable on the water, a second self floating paddle water turbine 1, 10, is floated down stream parallel to the first turbine 1, 10 to form a stable boat similar to a catmaran type boat. The two floating paddle turbines 1, 10 are assembled together by the superstructure 57 which is also made to be hollow and light weight so that it will also float on water. The superstructure 57 holds the water turbines thru a water tight/seald bearing 11 fitted around the floater pipes 10. A plurality of oppositely rotating electric generators 65 are mounted on the top of the superstructure 57 and are arranged to be connected to a main drive so that they will be driven by the turbines 1, 10 in a progressively increasing load corresponding to the increase in the water current. The drive pulley 8 is connected to the drum-type magnet of the generator 65 while the drive pulley 9 in connected to the drum-type induction wire coil of the same generator 65. The drive belt 55 drives the pulley 8 in a counter-clock-wise rotation, while the twiste drive belt 56 drives the pulley 9 in a clockwise rotation thereby making the generator 65 into an oppositely rotating electric generator. The whole apparatus is made stationarily floating on the flowing water by an anchor rope 59 that is tied/connected to an anchor 7 on the ocean floor. The anchor 7 is made by drilling an anchor bolt into the natural chorals/natural bed rocks, or man made rock sausages or concrete blocks layed on the ocean floor. A rock sausage is a stack pile of large boulders of rocks put together by means of a pouch net made of large steel bars tied together by "U"-bolts. The line 24 indicates the level of the water surface in relation with paddle wheel 10. The large arrow indicates the direction of the water current, wherein, the water flows perpendicular to and under the float pipe 10 and pushes the wideface paddles 1 to move around under the pipe 10 thereby making the pipe 10 into a rotating drive shaft that drives the belts 55 and 56 which, n turn, drives the generator 65. A multiple series of this kind of apparatus are floated together side-by-side on the flowing water in order to harvest more energy from the water current by inter-connecting all the generators 65 thru a wire line tower erected on part 57.

Figure 18:
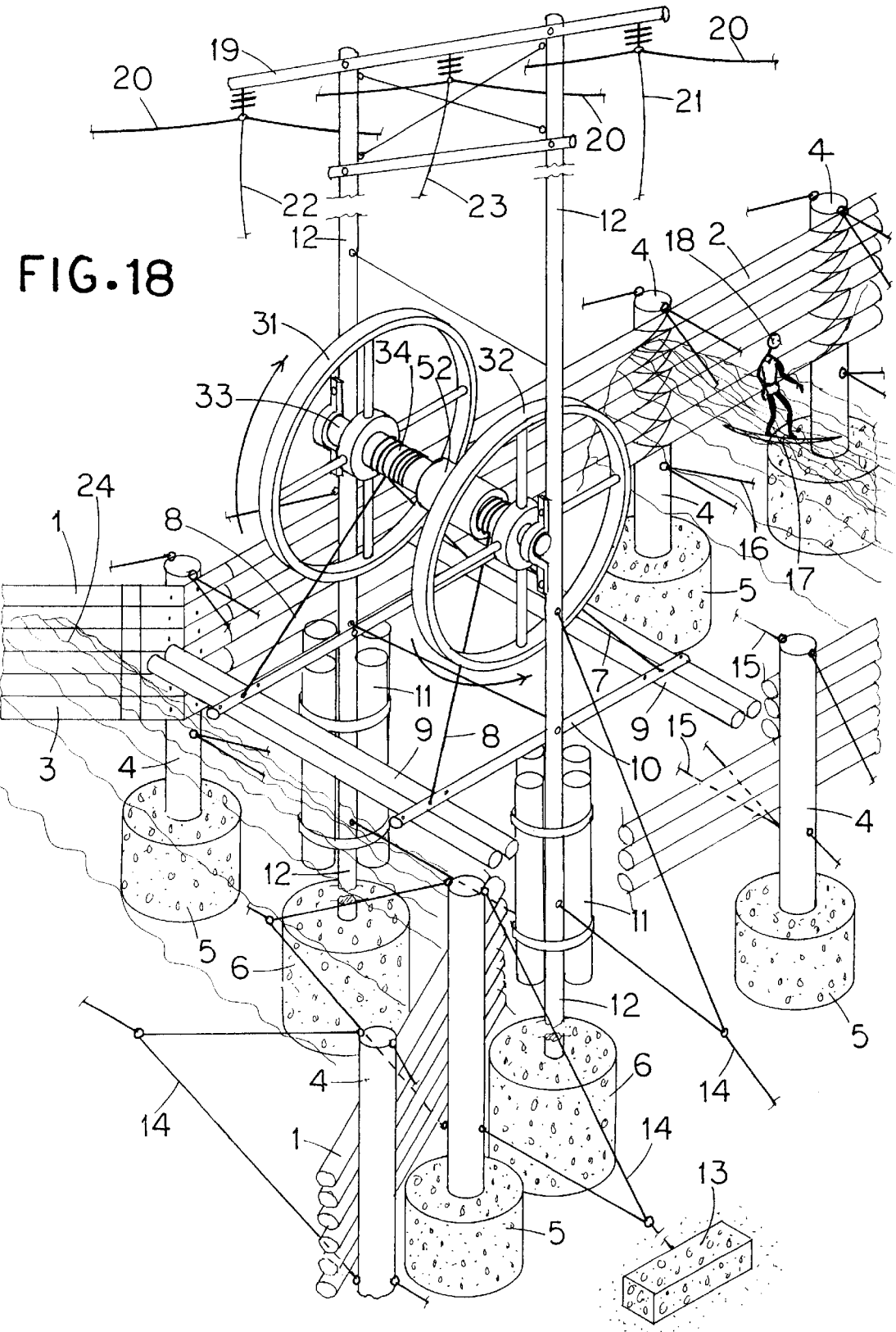
FIG. 18—illustrates a new wideface scavenger energy converter system, wherein, a floating sea wall is used to concentrate/magnify the water waves.

FIG. 18—illustrates a new embodiment of a wide face scavenger energy converter, wherein, a couple of a wide face vertical wall 1, that appears like a long fence, opposing each other and forming an entrance channel, is constructed as a floating sea wall, but firmly anchored on the underwater floor, and made oblique to the water waves, in order to deflect and amplify/conentrate the water wave as it moves toward the center rear tip of said couple of walls 1. The couple of deflector walls 1, being oblique to the water waves, provides a wide mouth portal upfront where a sufficient length of the water waves enter, and as the wave move on into the entrance channel the two ends of the wave is being compressed toward the center of the entrance channel thereby enlarging and amplifying the water wave until it becomes a giant wave at the constricted end of the entrance channel. The end of the entrance channel is then augmented by a narrow container channel formed by the couple of container walls 2 that are constructed parallel to but opposed to each to form a straight narrow channel thru which the produced giant wave continues/keeps moving on along which the surfer man 18 may play and enjoy his surfboard in a fantastic surfing adventure. The entrance channel wall 1 and the container channel wall 2 are both made up of floater light structures 3 of any kind but preferably of pipes 3 filled up with compressed air or compressed foam plastics to prevent water leaking into the pipes 3. The structures 3 may be reinforced by a back up stiffener strcuture to make it able to withstand the outward force of the water waves being deflected. The entrance channel wall 1 and the container channel wall 2 must be extended deep down underwater to prevent spill thru of the water wavess beneth the walls 1 & 2. The pipe posts 4 are keept in a vertical posture by the bottom weight 5 that is made up of concrete or any heavy material that can be attached to the bottom tip of the post 4. Pipe post 4 takes hold of the wall pipe 3 by means of tie ropes or tie wires or clamps. Tie ropes 14 and 15 keeps the channel walls stay together against the outward push of the waves. The anchor weight 13 keeps the whole apparatus stay together thru the post structures 4, the tower structures 12 and the guy ropes 14 and ropes 15. The anchor weight 13 may be in the form of an assembly of large rocks tied to each other by means of nylon cords, or in the form of rock susage—a number of rocks inside a net inclosure, or in the form of a concrete block, or in the form of concrete poured into a large drum container, or in the form of a coral rock on the ocean floor. The tower structure 12 is kept erect upright by means of the bottom weight 6 and by means of the floater pipes 11. The floater pipes 3 that comprises the whole wide face deflector wall 1 are provided with remote/radio controlled valves so that compressed air and water can be interchangeabley entering the floater pipe structures 3 by means of an air supply air hose in order to float up or to submerge down the wall 1 and the wall 2, by injecting air and/or releasing the air as needed, in accordance with the size of the water waves being converted and getting into the channel during strong winds. During the process of adjusting the elevation of wall 1 and wall 2, the length of the tie ropes 14 is also being adjusted. Likewise, the floating power of the floater pipe structures 11 is also being adjusted by mean of its air content such that the pipes 11 are mostly submergerd in order to prevent too much oscillation of the tower structure 12 due to the oscillating buoyancy of the water waves that has been amplified. The tower 12 may be in the form of a truss structure or in the form of a pressurized pipe to make it stiff and light weight structure which carry the driven load 52 thru shaft 33. The driven load 52 may be in the form of an oppositely rotating electric generator or a water pump or a compressor that are built to have oppositely rotating impellers. The floater pipes 9, mostly filled up with water so that thy are just barely floating not more than 5%, are being oscillated by the concentrated/amplified water waves. Two or more of pipes 9 are bundled together by the see-saw bar 10 and a pair of this bundle of pipes 9 are coupled together by the sea-saw bar 10 to make an oscillating see-saw energy converter. The drive chain/rope 8 transmits the energy from the front oscillator pipes 9 via the see-saw bar 10 to the drive drum 34 that is acting as winch upon which the drive chain/rope 8 is wound around in a counter-clockwise manner, and turns the drum 34 in a clockwise maner when the oscillator pipes 9 drop down on the valley of the water waves because the oscillator pipes 9 are very heavy being filled up with water. The oscillator pipes 9 at the rear activates the drive drum 34 in a counter-clockwise maner via the drive chain/rope 7 that is wound around from under the drum 34 in a clockwise maner. By means of a clockwise one way ratchet tooth and pawl, the drive drum/winch 34 drives the flywheel 31 clockwise when the drive rope 8 is pulled downward by the heavy weight oscillator 9 at the front, and in turn, the flywheel 31 drives clockwise the inner armature induccoil of the electric generator 52. Due to the inertia/momentum/or dynamic energy stored in the flywheel 31, it will be continuously driving the induction coil of the generator in a clockwise maner even after the drum 34 has stopped or has reversed into counter-clockwise rotation, as the ratchet tooth of the flywheel 31 will automatically disengage from the gears of the drum 34. Likewise, the drive drum/winch 34 drives the flywheel 32 in a counter-clockwise rotation, by way of ratchet tooth and pawl, when the drive rope 7 is pulled downward by the heavy weight oscillator 9 at the rear of the apparatus, and in turn, the flywheel 32 drives in a counter-clockwise rotation the outer shell magnet drum of the electric generator 52. Hence, the outer shell magnet drum and the induction coil armature of the electric generator 52 are oppositely rotating against each other in order to double the speed of the generator 52. Rope 15 is the lateral support of the channel container wall 2 to hold against the outward push of the entraped amplified water wave. Rope 16 is a diagonal horizontal support of the wall 2 to prevent staggered disalignment of the wall 1 and the wall 2. The channel container wall 2 is extended longer in order the maintain the size of the amplified water wave ast long distance travel towards the seashore in order to provide an opportunity for the surf person 18 to enjoy riding his surfboard in a place where the surfs are generally small. The tower 12 is made tall enough above the ocean waters and is provided with a cross-arm 19 in order that said tower 12 will serve as elevated support for the power transmission line 20 that collects energy from various power apparatus on the ocean and to deliver said collected energy to the main land or to the end user. The vertical power wires 21, 22, and 23 collect the energy from the generator 52 and put said energy into the transmission line 20. A lot more of the structure pipes 3 should be added on and under the walls 1 and 2 in order to serves as aprone under the walls 1 and 2 in order to prevent the spill thru of the concentrated water wave under the walls 1 and 2. In this case, wherein, the structure pipes 3 of the deflector wall 1 and the container wall 2 are serving as apron, then those lower pipes 3 are filled with water, in order to make those pipes 3 stay down under the water. The pipe posts 4 are filled up with pressurized plastic foam so that posts 4 will float vertically upright by the weight 5. The length of the posts 4 is being extended long enough down under water in order to make the posts 4 more stable in upright posture, and the same procedure is being done with the tower 12 to make it more upright posture. The energy converter apparatus 7 8, 9, 10 may be moved upward above the reach of the water waves during some hours of the day during week ends to give a good opportunity for the surfer 18 to enjoy a rendezvous with the giant waves. This water wave amplifier may be constructed in various places around the world to serve as play ground for the nature loving people and to illustrate the greatness of GOD's creations and HIS gifts for mankind.

FIG. 18—also illustrates a new variation of configuration on how an upright floating pipe post 4 and a tower 12 with its floater 11 are made more stable floating upright by extending the lengths down under water with a larger weight 5 and weight 6 in order to serve as a floating support post for a house built over and above the ocean anchored to the ocean floor.

Figure 19:
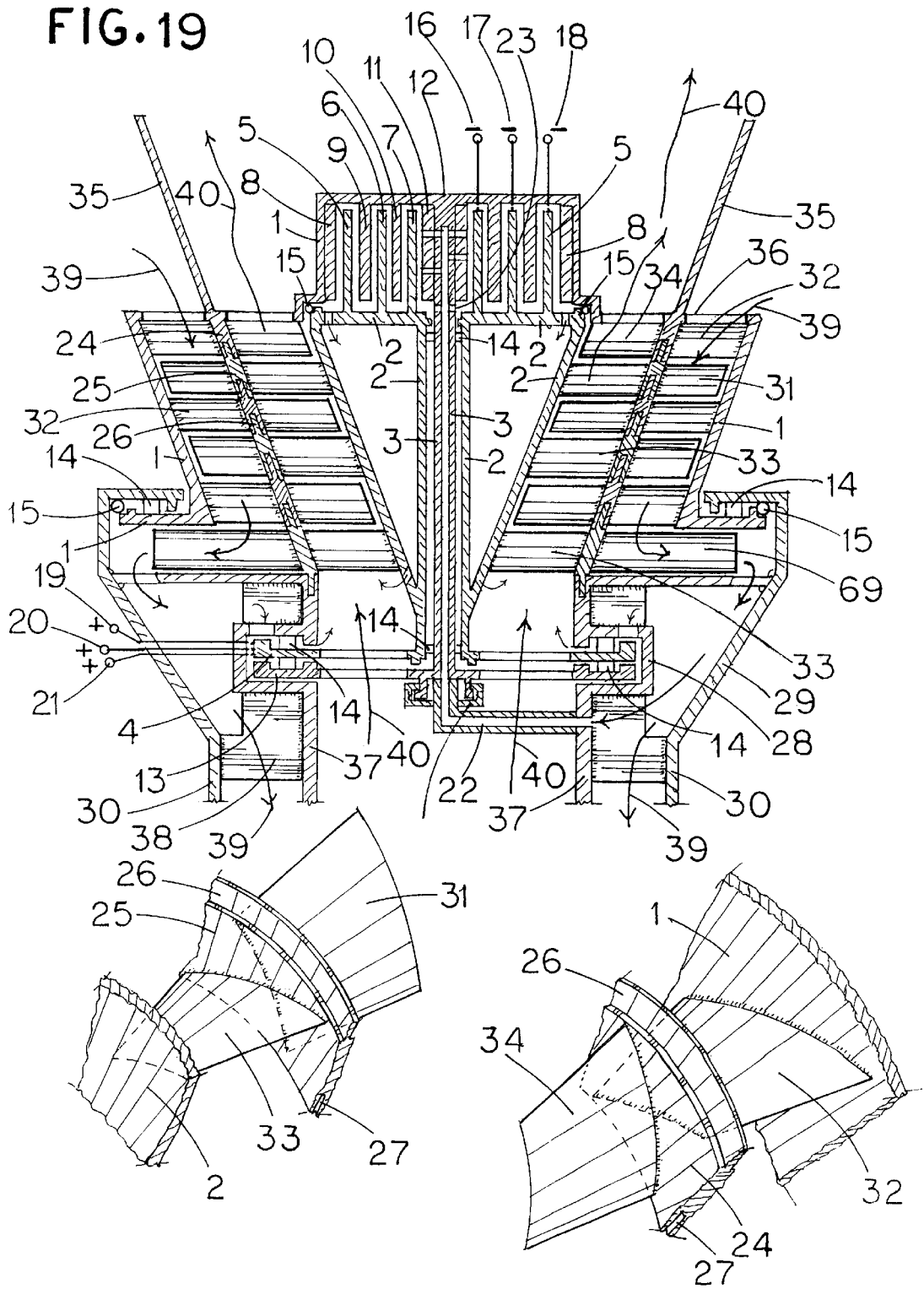
FIG. 19—illustrates a wideface turbine blade, wherein, the inner half and the outer half of each blade deflects air in opposite direction.

FIG. 19—illustrates a new embodiment of a wide face scavenger oppositely revolving fluid deflectors/sails 31, 33, that serve as counter-clockwise blades, and wide face sails 32, 34 as clockwise blades, to form the compact scavenger reverse turbine 1–2, wherein, the inner half blades 33 and 34 are exhaust blades being pushed by the expanding out going hot air 40, while the outer half blades 31 and 32 are compressor blades that push cold air 39 into the chambers. Counting from the top, the first stage, the third stage, and the fifth stage blades are the clockwise 32 & 34 blades that are welded to each other end-to-end thru the short frustum drum 24, wherein, the exhaust inner blade 34 is inclined counter-clockwise, while the compressor outer blade 32 is inclined clockwise, and the whole blade assembly is welded to the frustum drum 1 using the outer end of blade 32 as the edge being welded to the frustum drum 1. Due to the tilting arrangement of the wide face turbine blades 32 and 34, the frustum drum 1 will automatically rotate clockwise, thereby making the blades 32 and 34 to revolve around clockwise. The inner end of blade 34 does not touch the surface of the cone drum 2 but barely has clearance from cone drum 2 in order to minimize scapage of the expanding air 40 thru the inner blades. The vertical length of the short frustum drum 24 is cut equal to the vertical depth, the vertical distance between the upper edge and the lower edge, of the inclined blades 32 and 34. The upper edge of the short frustum drum 24 has an extra center tongue-like flange 26 prodruding upward that fits into the groove 27 at the bottom of the counter-clockwise rotating short frustum drum 25 of the second and fourth stage blades in order to prevent the expanding hot exhaust air 40 at the inner blades 33 and 34 from transferring into the path of the cold air 39 being compressed at the outer blades 31 and 32. Structurally, the upper edge of the first stage blades 32 and 34 are reinforced by a bar 36 thru which the drum type magnets 8, 9, 10, & 11, being attached to the top circular plate 12, are driven by the outer shell 1 which is the outer frus turn drum 1 of the blade 32 and the outer shell 1 of the generator in one unit all together with plate 12. Additionally, the frustum drum 35 is welded to the top of the bar 36 and also welded to the top of the short frustum drum 24 and rotates clockwise all together with the outer shell 1, likewise to serve as dividing wall to separate/prevent the expanding hot exhaust air 40 out of the inner blades 33 & 34 from mixing with the cold air 39 intake being compressed by the outer blades 31 & 32.

Likewise, the counter-clockwise wide face blades 31 and 33 are being held and caused to revolve by the inner cone drum 2 to which the inner end of blade 33 is welded. The inner blade 33 and the outer blade 31 are jointed end to end to each other to act as one unit blade by way of the short frustum drum 25 acting as medium. By making the inner blade 33 inclined to the right and the blade 31 inclined to the left, it is automatic that the expanding exhaust air 40 moves the inner blade 33 to revolve counter-clockwise. The blade 31 being forced to revolve counter-clockwise, then catches fresh air 30 from the top and deflect it downward in the process of compression. Likewise, as in part 24, the short frustum drum 25 also has a tongue-like frange wall at the top that fits into the bottom groove 27 of the succeeding stage short frustum drum 24, in order to prevent the hot exhaust air 40 from transferring into the path of the cold compressed air 39. Counting from the top, the counter-clockwise blades 31 & 33 comprises the second stage, the fourth stage, and the sixth stage, all being held by the center cone drum 2. The outer blade 69 of the sixth stage blade is a wide radius centrifugal impeller blade, the function of which is to step up the pressure of the compressed air 39 into the chambers enclosed between the frustum 29 and the cylinder 28, and into the chambers enclosed between the cylinders 30 and 37. The frustum drum 1 may also be inclined more outward to make the intake portal at the top to allow more fresh air 39 getting into the compression blades 32 and 31 so that the centrifugal impeller blade 69 will not get starved.

The cone 2 is a continuous shell having a central cylindrical hole 2 and a top circular cover plate 2 that has peripheral holes for the ventilation cold air to pass thru. The top plate 2 takes hold and drives the induction wire coil cylindrical drums 5, 6, & 7 in a counter-clockwise rotation in between the cylindrical drum magnets 8, 9, 10, & 11 that rotate clockwise against the rotation of the wire coil drums—this is so designed in order to double the speed of the electric generator. The central vertical pipe drive shaft 3 is welded to the top drive plate 12, and the bottom end of which being also welded to the bottom plate 13 in order to hold the outer shell 1 in place in relation with cone drum 2 via the control effected by the planetary bearings 14 that are place in between the central vertical cylinders 2 and 3. To provide mechanical control, the vertical frustum drum 1 is welded to the horizontal circular plate 1 which serves as anchor hook against the upward force of the wide face turbine blades 32 & 34. The horizontal planetary roller bearing 14 in provided in between the bottom circular anchor plate 1 and the top circular anchor plate of the frustum drum 29 to provide mechanical control and to remove friction between the two said anchor plates. The bottom of the vetical cylinder 2 is welded to the horizontal anchor plate 4 which is likewise provided with the planetary roller bearing 14 which bearings are located in the cold air chamber. The vertical control cylindrical shaft 3 for the electric generator plate 12 is welded to the horizontal control plate 13 which is likewise provided with the planetary roller bearings 14. The part 22 is a heat insulated high pressure metal stationary air duct that is connected to the bottom end of the vertical pipe control shaft 3 by means of the air seal packing connector 41, being provided to conduct cooling air supply into the electric generator parts 5 to 11 and to the bearings and air seals thru the air duct opening 23. The cooling air then makes its return trip thru the bearings 14, then thru the space between the vertical cylinder shafts 2 & 3 and also thru the interiors of the cone shell 2, then out thru the wide face exhaust blades 33 & 34. The air seal 15 is a temperature resistant packing that is continuously supplied with soaking oil, being provided to prevent scape of the cooling air. The cooling air may be mixed with water vapor by mist spray in order to make the cooling process more effective. The part 30 is long pipe line with many branches, which is either open or close bottom/end, and which is either containing the combustion chamber or being extended into various kinds of the heat energy sources including underground geothermal energy, a solar trap such as the attic of a house/building and a large wide box with transparent roof constructed on the ground/top of buildings, a garbage/trash incinerator, and a nuclear fire,—outside the pipe line 30,—in order to heat up the compressed air contained inside the pipe line 30. The part 37 is a pipe line with many branches with open end/bottom that is smaller diameter than and is placed inside the pipe line 30 in order to conduct the return trip of the heated compressed air to exit/exhaust thru the oppositely revolving wide face turbine blades 33 & 34. The parts 16, 17, & 18 are the negatively charged terminals of the electric generator, said terminals being in the form of metal rings that revolve with the spinning plate 12, which rings are being touched by carbon brushes. The parts 19, 20, & 21 are the positive stationary terminals of the generator connected by wires embedded into the vertical shaft 2 and into the control plate 4 with take off carbon brush at the periphery of plate 4.

Alternatively, in cases where hight temperature hot exhaust air works on the turbine 1–2, it is necessary that the electric generator 5–12 be kept away from the hot exhaust air, hence, the air 40 must be the cold air being compressed and reverse its direction downward and the blades 33 & 34 must be the compressor blades, the parts 31 & 32 become the exhaust blades, and the air 39 reverse its direction upward to the hot exhaust air that drives the turbine blades 31 & 32. This is reversal is done by making the outer blades 31 & 32 to be much larger face than the inner blades 33 & 34, it being that the air pressure in pipe 30 is practically equal to the air pressure in the pipe 37, hence, the blades 31 & 32 are the once driving the compressor blades 33 & 34. The centrifugal impeller blade 69 is then encclosed and separated from the exhaust blade 32 by another frustum drum that is smaller than the drum 29 and said enclosure is attached to the cold air pipe 37. Then the drum 2 and middle short drum 24 & 25 are made to be cylindrical drums, not conical or frustum anymore. The cold air pipe 22 is then re-directed to supply cooling air to the bearings at the base of the frustum drum 1.

There are many variations of configurations available for the construction and uses of this type of power plant, including a separate ordinary compressor that supplies compressed air into the pipe line 30, coupled by means of a drive chain/belt with a separate ordinary gas turbine/air motor for the exiting hot exhaust air, which couple then drives various kinds of loads, including an oppositely rotating electric generator, an oppositely rotating water pump, or an oppositely rotating compressor, and additionally, there are various uses of this type of power plant including serving as cooling system for a factory/smelting plant, cooling system for a gas/nuclear power plant/engine,—in order to recapture the wasted/tailpipe heat energy, of which original idea, the herein inventor hereby reserves all the rights to use and to exclude others from using it, and for which the herein inventor hereby applies for Letters Patent or patent rights.

Figure 20:
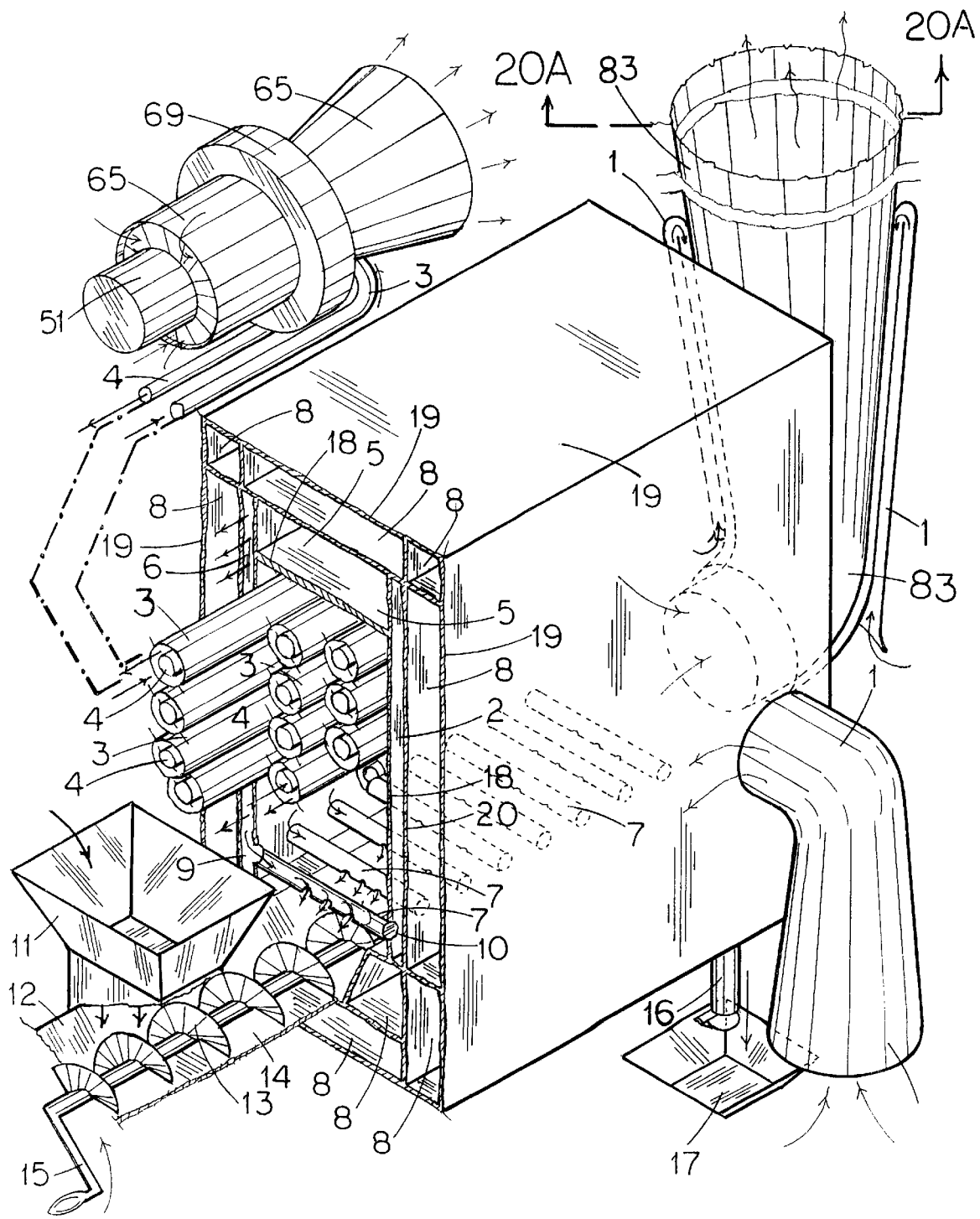
FIG. 20—illustrates a new scavenger energy converter system, with a clean trash burner and an oppositely rotating wideface blade gas turbine engine.

FIG. 20—further illustrates, as in FIG. 9 of this application, a new design of a scavenger energy converter, which is a new embodiment of oppositely revolving wide face turbine compression blades 65, assisted by the step up wide radius centrifugal compressor 69, and coupled with the oppositely revolving wide face bladed exhaust turbine 65 that drives the whole system of the compressors 65/69 and also drives the oppositely rotating drum-type electric generator 51, wherein, the compressed air at the compressors 65/69 is not heated/energized nor allowed to transfer axially into the exhaust turbine 65, but instead, the compressed air is exited thru the side of compressor 69 and conducted thru an air pipeline 4 that is coiled inside a garbage/trash incinerator 19 in which the compressed air is heated/energized. By means of the pipeline 3, the heated compressed air is conducted on its return trip out from the incinerator 19 back to and into the turbine 65 in order to move the blades of the turbine 65 without blowing out polluting combustion waste. The compressed air pipeline 4 is inside the larger hot air pipeline 3. The pipeline 4 has its end opened thru which the compressed air transfers into the pipeline 3 which has its end closed so that the hot air is forced to make a return trip into the turbine 65. The combustion chamber of the incinerator 19 is enclosed by a thick heat insulator chamber 8 and by the inner space air ducts 2, 5, & 6, by means of the walls 18 & 20. By way of intake manifold 1, the fresh cold air enters the incinerator 19 thru the first stage pre-heating air duct 2 which makes the fresh air travel to the front of the incinerator 19, then the fresh air transfers into the second stage pre-heating air duct 5 which makes the fresh air travel towards the rear, then the fresh air transfers into the third stage pre-heating air duct 6 which conducts the hot fresh air toward the front. While traveling along the air duct 6, the pre-heated air supply is then allowed to exit thru the distribution pipes 7 which has plurality of nozzles pointed down to the top of the garbage/trash being burned in order to evenly distribute the required oxygen supply for a clean combustion.

It should be noted at this point that, in order to insure clean smokeless burning, the garbage/trash must burn from the top in the same way that the smokeless candle burns from the top. Burning from the bottom will effect distructive distillation of the garbage.

The distributor pipe 7 has an open end 9 at the third stage pre-heating air duct 6 and said pipe 7 has a closed end 10 at the air duct 2 in order to force the pre-heated air supply to exit thru the nozzles. The part 83 is a chimney that is made tall enough so that it will be acting as a vacuum due to the tall column of hot air inside the chimney 83. After burning the fuel, the waste hot air is allowed to scape thru and sucked by the chimney 83. Of course, in all cases, the chimney has a cover at the top to prevent rain or snow from falling into the chimney 83. The garbage bin 11 is the entrance of trash materials from the fuel source. The garbage fuel then drops down into the open cannal 12/14 thru which the auger conveyor 13 pushes the garbage fuel into the combustion chamber under the hot air supply distributor 7. The cranking handle 15 represents any mechanical power that can drive the auger conveyor 13. As the auger conveyor 13 continues to drive the fruel to the end of the cannal 14, the waste ash drops down thru exit pipe 16 into the ash tray 17. The exit pipe 16 has a bottom cover to prevent fresh air from getting upward into the pipe 16 as there is a suction activity by the chimney 83, hence, there is an internal ash storage at the end of the cannal 14.

In the same way as it has been discussed in FIG. 19, there are many variations of configurations by which compressed air can be sent into the incinerator 19 to pick up energy, including an ordinary gas turbine engine that is not necessarily an oppositely rotating gas turbine, or by way of a separate compressor together with a separate exhaust hot air turbine coupled together by means of a drive chain/belt, which hardwares are presently ready in the market; including a new design wherein the exhaust chimney 83 is enclosed by a larger pipe that conduct pre-heated air downward into the intake manifold 2 while the said larger pipe enclosure of the chimney is further enclosed by the intake manifold 1 that conducts/supplies cold fresh air from a point below the ash tray 17 up to the intake mouth of the said larger pipe enclosure at the top of the chimney 83; and including further a new design wherein the intake manifold 1 is again further enclosed by another much larger hot air pipe which is an extension of the outer shell drum of the exhaust turbine 65, all of which configurations are for the purposes of recarpturing the wasted heat energy coining out of the incinerator 19, of which new original scavenger ideas the herein inventor hereby reserves all the rights and privileges and hereby applies for Letters Patent or patent rights to exclude others from use of these new scavenger ideas.

There are many other possible applications of this principle of an external combustion gas turbine engine, such applications includes: 1. wherein the exhaust hot air from a piston type internal combustion engine is forced to discharge and to enter into the gas turbine 65 by inserting the tail pipe of the piston type engine into the front of the gas turbine 65 in order to heat up and to mix with the compressed air getting out of the centrifugal pump 69; 2. wherein said pipe 4 coming out of the centrifugal pump 69 is extended in plurality of branches and placed on a covered geothermal hot field or hot lake and then the heated compressed air makes a return trip into the exhaust gas tubine 65 by way of the return pipe 3; and 3. wherein said heat absorbing radiator pipe 4 is filled up with cold high humid compressed air by the engine's compressor and is extended and spread over a wide solar trap or over a wide open solar heated fields or desert where the atmospheric air is hot so that the humid air expands in side the radiator pipe 4 which makes makes a return trip into the exhaust turbine 65 via radiator pipe 3. of which scavenger ideas are hereby reserved for the herein inventor.

Figure 20A:
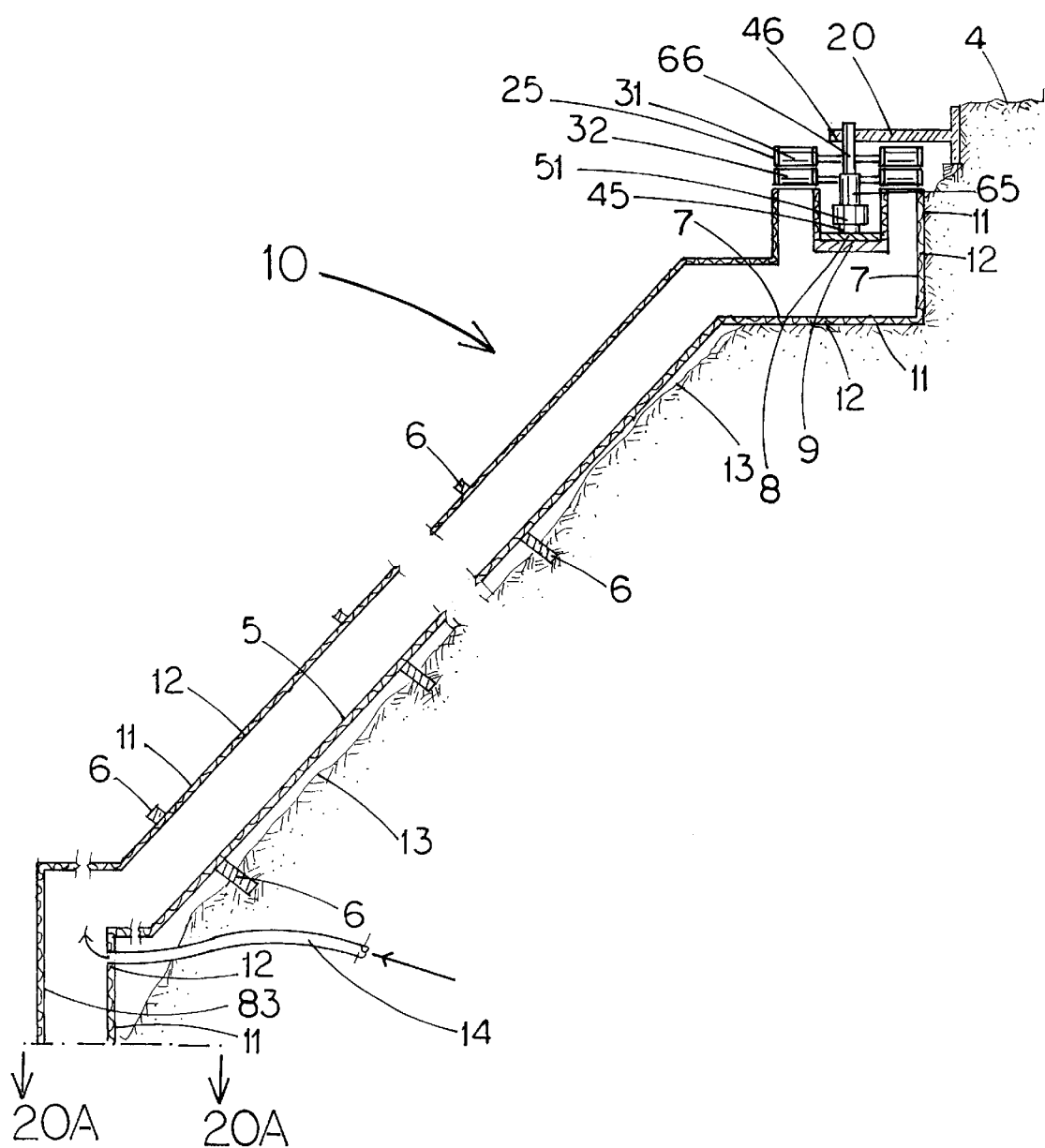
FIG. 20A—illustrates a new scavenger energy converter system whereby an oppositely rotating turbine is driven by the chimney exhaust at high altitued.

FIG. 20A—is the part above the section 20A of FIG. 20, which illustrates a new embodiment for a wideface oppositely rotating gas turbine engine 10, wherein, the exhaust hot air from the chimney 83 of the trash burner of FIG. 20 is further contained and conducted to the high altituede mountain top by another chimney extension 5 jointed to the top of the lower chimney 83. Due to the difference in weight between the cold air outside both chimneys and the hot air inside tile chimneys and due to the high column of hot air, a big difference of air pressure is created at the top exhaust of chimney 5. The high column light weight hot air inside the chimneys 83, & 5 is pushed upward by the inward pressure of the cold air at the entrance of the intake pipe 1 at the base of the burner 19 and by the cold air at the intake pipe 1 at the lower section of chimney 83, thereby creating an outward high pressure at the hot air exhaust at the top of chimney 5. The exhaust pressure it the top makes it appropriate to install an oppositely rotating, wideface blades 31, 32 gas turbine at the top of the chimney 5. Part 66 is the clockwise drive shaft holding the wideface blades 31, while part 65 is the counter-clockwise drive shaft holding the wideface blades 32 and also holding and driving the inside drum-type induction wire coil of the generator. Part 51 is the outer drum-type magnet of the oppositely rotating electric generator that is driven by the drive shaft 66 thru its lower extension 45 that rests on the bearing plate 8. Part 9 is the support structure that forms the exhaust nozzle. Part 4 is the mountain top that holds support structure 20 which in turn holds the vertical drive shaft 66 thru the bearing 46. Part 7 is the floor and the inner face of the wall at the exhaust section of the high altitude chimney. Part 11 is the outer skin of the chimney 5, said skin holds the heat insulator 12 around the chimney. Part 25 is an air confinment drum at the periphery and at the base of the the wideface turbine blades, to train/contain the exiting hot air within the turbine blades. Part 6 is the anchor structure that holds the chimney 5 onto the mountian sides 13. The exiting hot air at the top drives the wideface blades 31 and 32 in opposite rotation, thereby turning the drive shafts 65 and 66 in opposite rotation and ultimately drives the oppositely rotating electric generator, in order to retreive the energy from the hot air out of trash burning. The part 14 is an air pipe that injects cold compresss air into the chimney 5 coming from outside windmills to add more expanding air that drives the turbine at the top.

Figure 21:
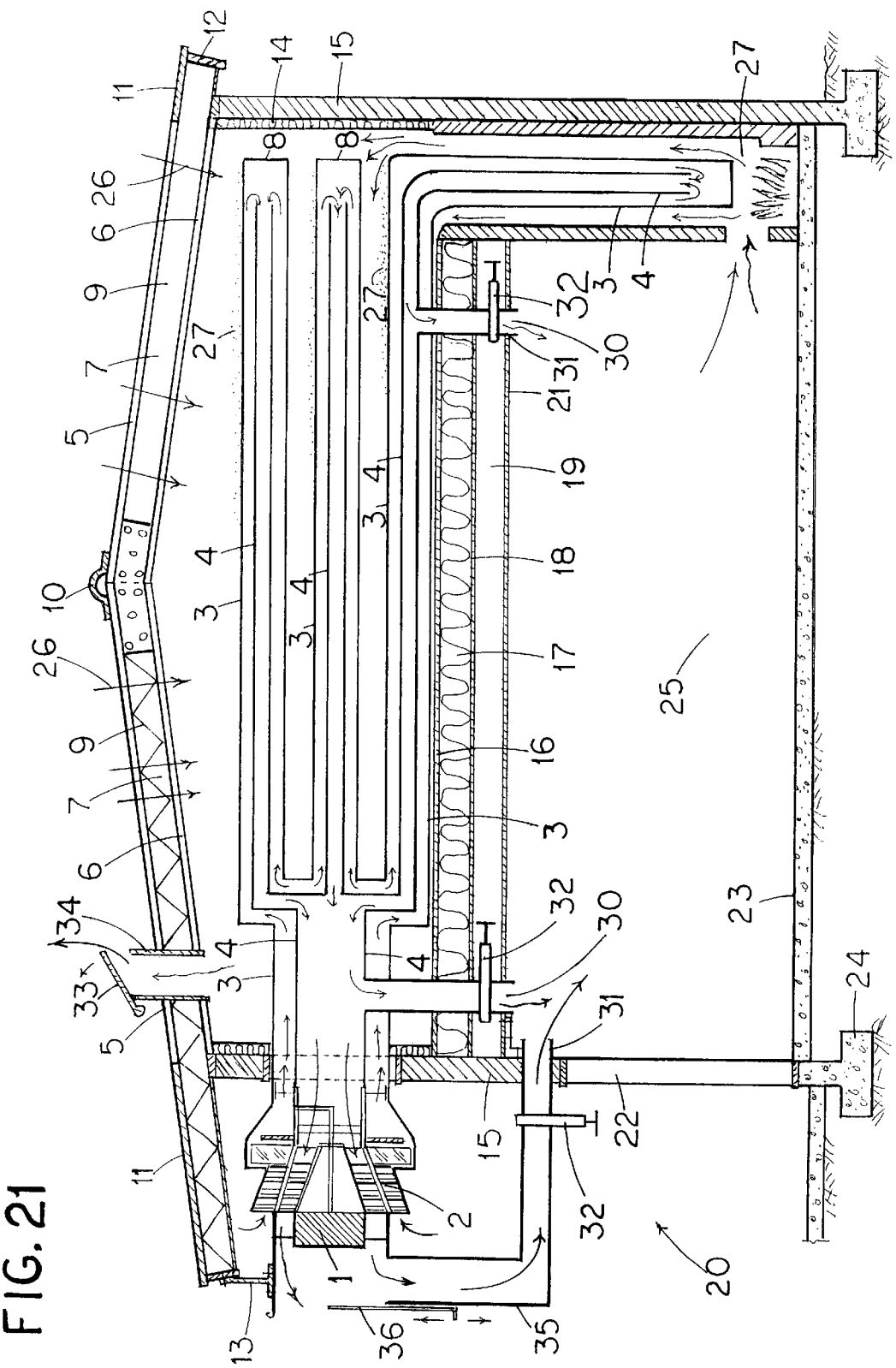
FIG. 21—illustrates a scavenger energy converter system with a solar trap house attic and a trash burning fireplace that supply the heat energy.

FIG. 21—illustrates a new embodiment of a scavenger energy converter comprising a new application for the herewith newly created oppositely rotating reverse turbine engine 2 that drives an oppositely rotating drum-type electric generator 1, as described in FIG. 19 hereof, serving as the driver and at the same time the driven in one compact unit that is energized by solar heat and by heat from the fire place 27 of a house/building 20 that bums trash/oil, wherein, said reverse turbine 2 is made to supply and drive compressed air into the heat absorving pipe 3 that is installed inside a solar trap which, in this case, is the attic of a house/building 20 that is roofed by two layers of transparent roof sheets 5 and ceiling sheet 6 with space gap 7 between sheets. Said solar trap has been dicussed in details in the previous patent application Ser. No. 07/811,470 filed Dec. 18, 1991 which has already been approved and given Notice of Allowance and the Issue Fee has been paid for. As shown on the drawing, the house 20, which may also be a large building, has the upper roof sheet 5 and the lower roof sheet 6 that are transparent or translucent that allow the sunlight 26 to pass thru and shines upon the pipes 3. The two roof sheets 5 & 6 are supported in place by the rafter/truss 9, and the center ridge 10 of the roof is also transparent, hence, except for the eves, the whole roof of the house is transparent. For purposes of being more effective scavenger—meaning to speed up absorption of the solar heat being trap into the attic, it should be practical to spread a plurality of the heat absorber pipe 3, arranged side-by-side in multilayers with enough air passage around each pipe, all over the attic in order to contact promptly all the heat energy in the attic, and further, some branches of the pipe 3 is extended and coiled into the chimney of the fire place to absorb the heat from the burning trash. The smaller pipe 4, which as an open end, is inserted/installed in the center of pipe 3 to serve as exit and to conduct the heated air on its return trip back thru the turbine 2, it being that the end 8 of the pipe 3 is closed and all the pipes are inter communicated to have one entrance and one exit to drive the turbine 2. The upper surface of the pipe 3 is painted. flat black and sprayed with black carbon powder or black sand 27 to prevent the sunlight 26 from bounching back up thru the transparent roof to make the solar trap more efficient. The attic is heat insulated on the side walls by the insulator 14, on the attic floor 16 & 18 by the sandwiched insulator 17, and the roof is heat insulated by the in between space 7. This insulation is done to conserve the entraped heat inside the attic while waiting to be absorbed by the pipe 3. The floor joist 19 is made strong enough to support the weight of the pipes 3 & 4, the insulators, floors, and the weight of the ceiling 21. Part 11 is the opaque roof of the eve. Part 12 is the facia board. Part 15 is the walls of the building. Part 22 is the post of the building. Part 23 is the concrete ground floor. Part 13 is the bracket that support the turbine 2 and the generator 1 from the roof in alignment with the exit pipes 3 & 4. Part 24 is the concrete footing of the house, and the part 25 is the living space of the house. The pipe 4 is also provided with a drop down branch outlet thru the ceiling 21 in order to provide heating air into the living/office space 25 to avoid constructing another separate heating system for the whole building.

As an alternative, the reverse turbine 2 is replaced by a separate input oppositely rotating compressor turbine at the same time by a separate exhaust hot air oppositely rotating turbine and the two machines are coupled together by a drive chain/belt to form a couple engine that drives the oppositely rotating generator 1, wherein, the impeller blades of the exhaust turbine are much larger face than the blades of the input turbine, so that the exhaust turbine will over power and drive the input turbine. In this case, the said pipe 4 is now equal to the size of pipe 3 and that pipe 4 is no longer inside pipe 3, but instead, the pipe 3 and the pipe 4 are jointed to each other end to end thereby producing a continuous coil of pipes inside the attic. Further, in this case, the input compressor turbine is connected to the start of the pipe 3 while the exhaust turbine is connected to the outlet end of the pipe 4. In another new configuration, the pipe 3 and the pipe 4 are two large pipes laid parallel to each other and they are intercommunicted to each other by a plurality of small pipes in multilayers that starts perpendicularly from pipe 3 and end up perpendicularly at the pipe 4 in order to multiply more surface of air pipes in contact with the hot air in the attic thereby making more of the molecules of the compressed air becoming in contact with the hot walls of the intercommunication small pipes, as illustrated in the construction of the radiator of the automobile engine.

It should be noted at this point that the purpose of making the compressor turbine to have oppositely revolving blades is to relatively double the speed of the compressor turbine, likewise, making the exhaust turbine to have oppositely revolving blades is to double the speed of the exhaust turbine in driving the oppositely rotating electric generator, likewise, making the generator to be an oppositely rotating machine is to double the relative speed of the magnet and the wire induction coil in passing against each other.

In places where dust pollution is not a problem to the community. the trash/garbage/oil incineration is done inside the pipe 3 in serveral branches of said pipe 3, in order to multiply the energy supply to the engine 2 and to multiply capabilities of the engine 2. Further, the attic pipe line 3 of several houses/appartments/buildings may also be intercommunicated to contribute energy that drive the engine 2. Also in places where available, the compressed air produced by windmills and the compressed air produced by the ocean wave devices, may be injected into the pipe 3 to further energize the engine 2.

FIG. 21 further illustrates a house being heated by trash burning by making the attic into a oven to heat up the heat absorbing radiator pipes 3, & 4 which. due to the air circulation being done by the engine 2, supplies clean hot air into the house thru hot air exhausts 30 & 31. The attic, being a part of the chimney, is heated directly by the fireplace and the smoke scapes to the roof top via pipe 34 with cover 33. Adjusting the control valves 32 & 36 makes the engine stonger.

Figure 22:
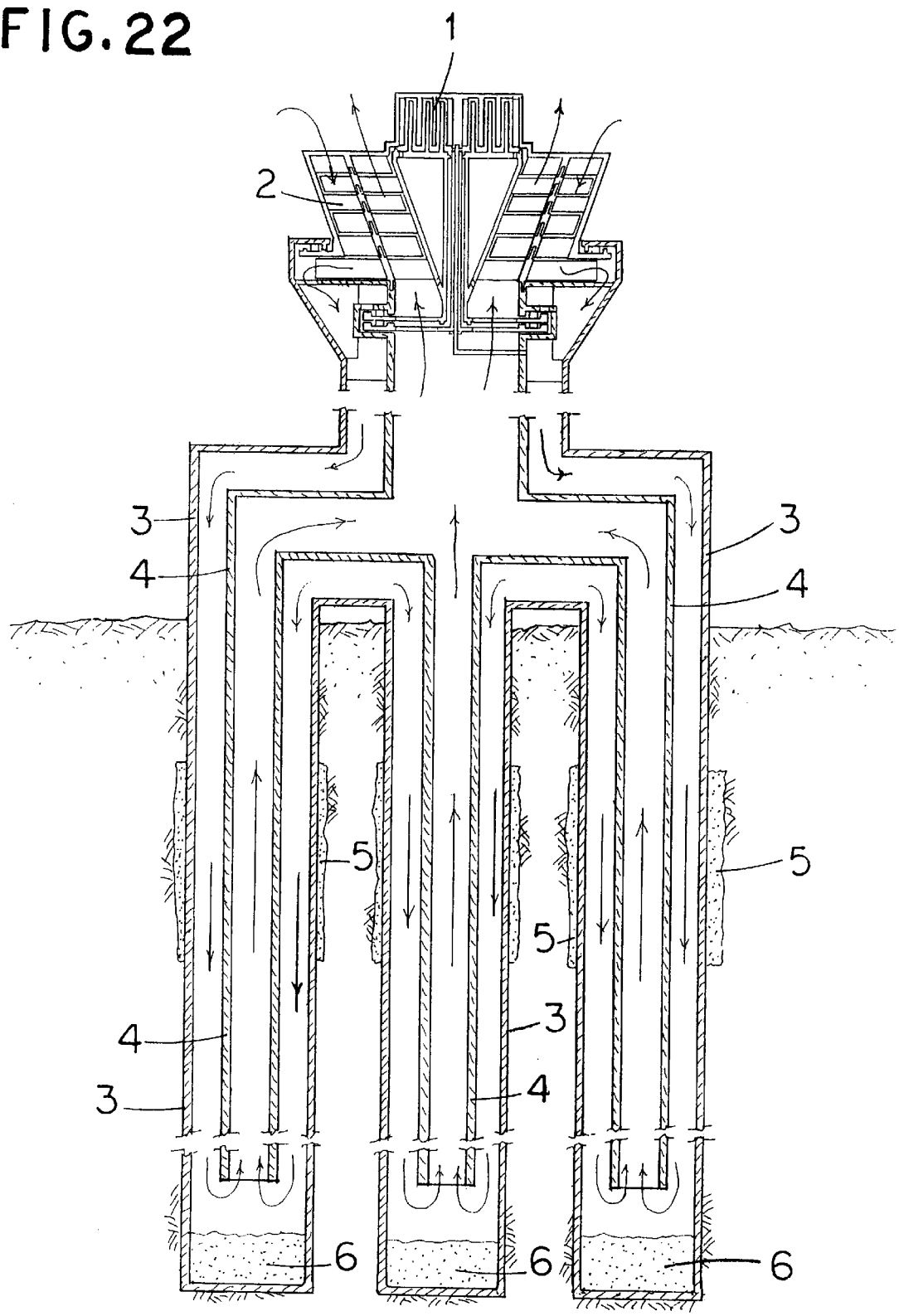
FIG. 22—illustrates a new scavenger energy converter system, wherein, sulture is prevented to get out from a geothermal well.
Figure 23:
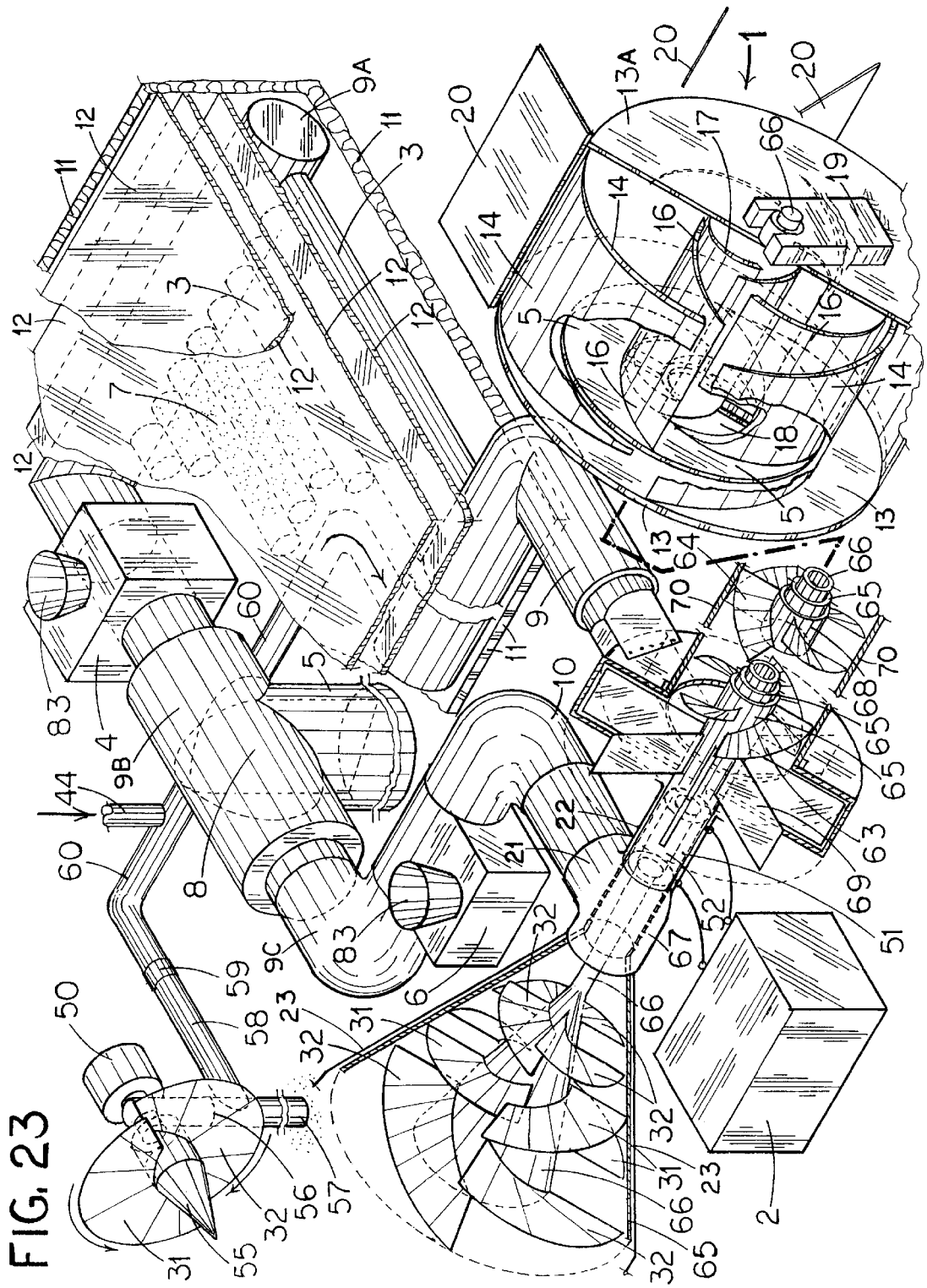
FIG. 23—illustrates a new scavenger energy converter system, with a combination of solar, trash, wind, geothermal, and nuclear energy, all in one line.

FIG. 22—illustrates a new embodiment of wide face oppositely revolving scavenger fluid deflectors serving as blades for the scavenger compact reverse turbine 2 that drives an oppositely rotating multilayer drum type electric generator 1, the details of which has been discussed in FIG. 19. As shown in the drawing, the scavenger turbine 2 is attached to the outlet of a double co-axial geothermal pipes 3 & 4 that have a plurality of branches driven into the ground that serve as deep/shallow geothermal wells. The bottom end of the pipe 3 is closed by pouring the concrete 6 into the bottom of the well 3, but to avoid geothermal pressure, the concrete 5 is poured first and let set to harden for some days and before pouring the concrete 6 the pipe 4 must be out of the well to make the job easier. Sealing the wells by means of the concrete 5 and 6, prevents sulfuric or chemical steam from getting out of the well and also to prevent steam energy from being wasted thru leaks on the outside walls of the pipe 3. The smaller diameter pipe 4 is then inserted into and set at the center of the larger well pipe 3. After proper connections without leaks, the reverse scavenger turbine 2 is started by making the generator 1 to serve as driving electric motor by passing electric current thru it, to turn the turbine 2. The turbine 2 may also be started by introducing compressed air into the chamber of pipe 3. After attaining a certain speed, the turbine 2 will be the one introducing compressed air into the chamber of the well pipe 3. With the pipe 4 being inside center of the well pipe 3, the compressed air being introduced will be traveling along and closed to the hot walls of the well pipe 3 thereby effectively heating up the in-coming compressed air while on its way down to the bottom of the well 3. The pipe 4, being open bottom/end, provides the scape outlet for the energized/heated compressed air on its return trip to the surface of the ground/earth, but forced to pass thru to move the oppposively revolving wide face fluid deflector/sail exhaust blades of the turbine 2. With the turbine 2 then running, it continuously replenishes the compressed air supply into the well 3, hence, a clean geothermal power plant without chemical pollutants is in new existence to drive the newly created multilayer drum-type electric generator 1. In a low temperature geothermal field or in situations where drilling is an obstacle/obstruction to the prompt utilization of the geothermal resource, it should be practical to build plurality of shallow wells that are close to each other and arranged in a row-by-row patern and then all wells being intercommunicated to have only one exhaust well to drive one or more turbines, additionally, the whole geothermal field must be covered by multilayer transparent roofs just above the pipe lines on the ground to prevent the cold wind from getting in contact with the pipe lines or with the grounds thereby conserving the geothermal heat getting out thru the ground and further to trap solar light/heat that pass thru the transparent roofs but prevented to bounce back by black paint/powder and by the spaces between the layers of the roofs acting as heat insulators as it has been discribed and discussed in the previous patent application Ser. No. 07/811,470 filed Dec. 18, 1991. As there are wide spaces in between the geothermal wells, it should be practical to spread a lot of heat absorbing pipe 3 that are laid down on the ground to absorb the solar heat and the geothermal heat that is trap below the said multilayer transparent heat insulator roof to serve as a tool for the heat scavenger process in order to pre-heat the supply compressed air before it gets down into the geothermal well or into the combustion chamber if fuel is used. Further, to add more tool for the scavenger process, the hot air exhaust from the reverse turbine 2 is directed and forced to enter into the solar/heat trap under the insulator transparent roof in order to recapture the heat from the geothermal wells by passing the exhaust hot air to get in contact with the pre-heating pipe lines to further pre-heat the supply compressed air that comes from the reverse turbine 2.

For more durability and safety against sulfuric acid in the geothermal deepwell, the heat absorbing radiator pipe 3 is made of glass. or other acid resistant materials, without joints or with sealed joints, and wherein the bottom of the pipe 3 is pre-closed by molten glass monolithic construction before it is inserted into the deepwell.

FIG. 23—illustrates how a wide face fluid deflector 31, 32, 14, 16, 17, 20, 63. 64, and 69 that are made to rotate opposite against each other to produce compressed air and to be driven by compressed air, serving as scavenger energy converters, in order to drive a scavenger power plant. The first stage compressor is a centrefical oppositely rotating compressor 1, wherein, blade 14 & 17 are being held by the circular plate 13 that rotates clockwise, while the blade 16 is being held by the circular plate 15 that rotates counter-clockwise. The blades 20 are outside stationary plates disposed slant to guid the incoming air counterclockwise against blades 14. Space 18 is an opening to guide the compressed air into the 2nd stage compressor that is driven by the oppositely rotating blades 63 & 64, and the compressed air is forced to enter the 3rd stage centrifugal compressor 69 to pump the compressed air into the air pipe 9. The wide face windmill compressor 50 also supplies compressed air thru pipe 58–60 into the large air pipe 9. Other compressors in the vicinity, such as, those driven by the ocean waves, those driven by solar traps in the neighboring solar fields, those driven by wind fields, those driven by geothermal and those compressors driven by trash incinerators are all interconnected to supply compressed air thru air port 44 and into the large air pipe 9. From the 1st stage air pipe 9 the compressed air enters the plurality of small air pipes 3 in going under the multilayer transparent plates/roofs solar trap 12, the black powder 7 being sprayed on top of the heat absorbing smaller pipes 3 to prevent backing out of sunlight. The solar heated compressed air then enters the 2nd stage large air pipe 9 and passes the compressed air into the trash incinerator 4 to absorb more heat, then passes the compressed air into the geothermal well 5 to absorb more heat, then passes the compressed into the nuclear fire cooling system 6 to absorb more heat, then the super hot compressed air gets into the final large super hot air pipe 10, then the superheated high pressure air gets thru the wide face bladed oppositely rotating gas turbine 31 & 32 to drive the blades and converts the energy of expanding hot air into mechanical energy. The the oppositely rotating co-axial pipe shafts 66 & 67 drive the oppositely rotating electric generator 51 & 52. The drive shaft 67 becomes the drive shaft 65 to drive centrifugal pump 69, the turbine 63, and the centrifical blade 16, while drive shaft 66 is extended to drive the centrifical plate 13 and blades 14 & 17, and finally drives turbine 64 thru the drive shaft 66 that encloses the turbine 63. The electric power from the generator 51/52 is connected and stored into the superhigh voltage capacitor 2 in the form of a building block acting as energy bank thru a step up transformer to take care of the excess electricity that is not absorbed or consumed by the utility grid in the community.

The electric generator 51–52 may produce either alternating current or direct current, and then by means of an inverter, the direct current becomes alternating current, then by means of a transformer, the voltage is stepped up to 100K alternating volts and reconverted into a high 100K volts direct current which is finally stored into the high voltage capacitor 2 that is insulated by ceramics, glass, semi-conductor/diod plates or whatever materials with high voltage insulating power. The high voltage capacitor is necessary as a newly created device available to man in order to multiply the energy storage capability of the capacitor of the same size. Then by means of a voltage regulator, the high voltage energy from the capacitor 2 is released at the standard voltage of the community.

It should be noted at this point, that in parable, there is more energy stored in a high pressure compressed air tank than in a low pressure compressed air tank of equal size, hence, there is more energy stored in a high voltage capacitor than in a low voltage capacitor of equal size.

As shown in the FIG. 23, there is the advantage of incorporating an oppositely revolving wide face bladed centrifical compressor 1 to serve as supercharger for the oppositely rotating compressors 63 & 64, it being that the air entrance to compressor 1 is a wide 360 degrees mouth all around the compressor 1—which means that the air all around is free and available to enter the compressor from all directions as being guided by the stationary vanes 20. Further, the advantage of incorporating the centrifugal compressor 69, it being a very wide diameter, is that, it is a high power compressor, yet it cannot be driven backward by the back-off air pressure. In fact, an all centrifugal pump in a series/mutistage would be easier to construct and more effective in driving compressed air into the pipe 9—same as the fireman is using centrifugal pump to shoot high speed water out into the distant fire.

The heat insulator 11 prevents dissipation of heat energy down to the ground and to the side walls of the solar trap. The top upper most transparent roof 12 may be just a thin plastic sheet just to exclude the cold wind from getting in touch with hot bottom and the middle transparent roofs 12, or said top roof may be made strong and stiff enough to serve as a airport or recreation center for wind skaters. The bottom transparent roof 12 should be a glass or a plastic that do not sag down when heated or preferably a phenolic glass that do not conduct heat to prevent heat transfer to the upper roof. The middle transparent roof 12 could be an ordinary flexiglass, accrelic, lexan plastics, mylar, or any transparent composite materials with strong flexural ability that is stiff and durable in sunlight conditions.

It should be noted at this point that the right mode should be to make the solar trap as wide as space allows in order to maximize benefits from the ever lasting free and clean solar energy.

The trash incinerator 4 has its chimney 83 made tall enough to perform a vacuum effect to enhance entrance of oxidation air into the combustion chamber. The incinerator 4 burns trash from the top to prevent production of smoke/fumes in the same way the smokeless candle burns from the top. The second stage pipe 9 branches into plurality of heat absorbing pipes 3 inside the incinerator 4 in order to expedite the absorption of heat from inside the incinerator 4 in the same way it is done inside the solar trap 12 and as it has been illustrated, discussed in, and please refer back to FIG. 20. In order to prevent production of smoke and ash flying in the air, and in order to burn clean, the trash should be burning slowly inside the incinerator 4, hence, it is necessary to build incinerator 4 into a small controllable unit, and then construct a plurality of parallel and series incinerators thru which the plurality of heat aborbing pipe 3 will undergo process, in order to handle a big volume of hot compressed air that is required to drive a large power plant. After graduating from the incinerator 4, the compressed air is then re-directed to enter into a plurality of hot geothermal wells 5 which are preferably constructed under the solar trap 12, said wells 5 being divided vertically half by a vertical wall 8 so that half of each well conducts air down into the well 5 and the other half of each well conducts the air upward out of the well 5 in order to effect the process of further heating up the compressed air. If the geothermal well 5 has lower temperature than the incinerator 4, then the compressed air must pass thru the geothermal well 5 first before getting thru the incinerator 4. If in case the nulcear incinerator 6 is available, then the compressed air should take the opportunity to serve as cooling agent and be further heated up by passing the heat absobing pipe 3 inside the nuclear plant 6 to further act as a scavenger by collecting the excess or waste heat being thrown away by the nuclear power plant 6. After graduating from all the processes of heating up, the compressed air is collected into the large exit pipe 10 which is highly insulated against heat transfer, and the compressed air re-directed to exit/exhaust thru the turbine 65/66 in order to push the wide face sails/blades 31 & 32 that make the two turbine rotate in opposite direction against each other. To further effect the scavenger mission of this energy converter, the exhaust hot air coming out from the turbine 65/66 is further re-directed by a large pipe to pass into inside the solar trap 12 to pre-heat the compressed air inside the pipe 3, before the hot exhaust air is finally set out free into the atmosphere. For more scavenger effect, water vapor in the form of mist spray is being mixed with the air intake to add more matter that expands when heated up. Further, for more scavenger effect and to ease utilization of geothermal resources or fields, the solar trap 12 is used to cover a wide geothermal field or lak to make a geothermal trap in order to conserve the heal energy coming out from the ground or lake by preventing cold wind contack with the hot grounds, and wherein, the heat absorbing radiator pipe 3, which is constracted in the same way as the radiator of a car, is then placed inside the geothermal/solar trap 12 in order to absorbe the geothermal thermal heat and heat tip the compressed air inside the radiator pipe 3 The compressed air inside the radiator pipe 3 then expands and drives the turbine blades 31 & 32. In this way, the usual drilling work, required to build the geothermal well which require high tech equipments and skills that cannot be afforded by the poor nations, can be avoided. For further scalvenger utilization of this newly created energy converter, the hot exhaust gas coming out from the gas turbine 31/32 is then re-directed to pass slowly thru a large horizontal long chamber, wherein a large quantity of fresh trash/garbage placed on a wire screen mesh conveyor are being dried rapidly in preparation for using said garbage/trash for fuel of said energy converter, in order to re-capture the heat energy being thrown away in the form of exhaust hot air.

There are many available new configurations, new designs, and new uses of these newly created devices, including the superhigh voltage capacitor 2 being used as the main locomotive power for an electric car or for any transportation, it being that it can be constricted much less weight, the whole body of the car may be the capacitor itself, and may store much more energy by more than 10 times because it is made high voltage, of which the herein inventor reserves all rights to make and use, and for which this application for patent rights has been made. Some hot air leaking from the air inlet of the gas turbine drive shaft 65 will be recaptured by the shell 23 and redirected to heat up the solar trap 3. The cover shell 22 brings cold air to the generator 52 and to the bearing that holds shaft 67. The hot air exhaust from the gas turbine engine is re-used for heating up water that is evaporated by way of mist spray and then the water vapor is condensed by high compression in cold pipes for purposes of deslination of water in making drinking water. In another alternative, the heat absorbing radiator pipes of said gas turbine engine are just exposed to the open hot atmospheric air in the desert and hot tropical places, and to direct sun-light/heat to provide expanding power for the compressed air.

Figure 24:
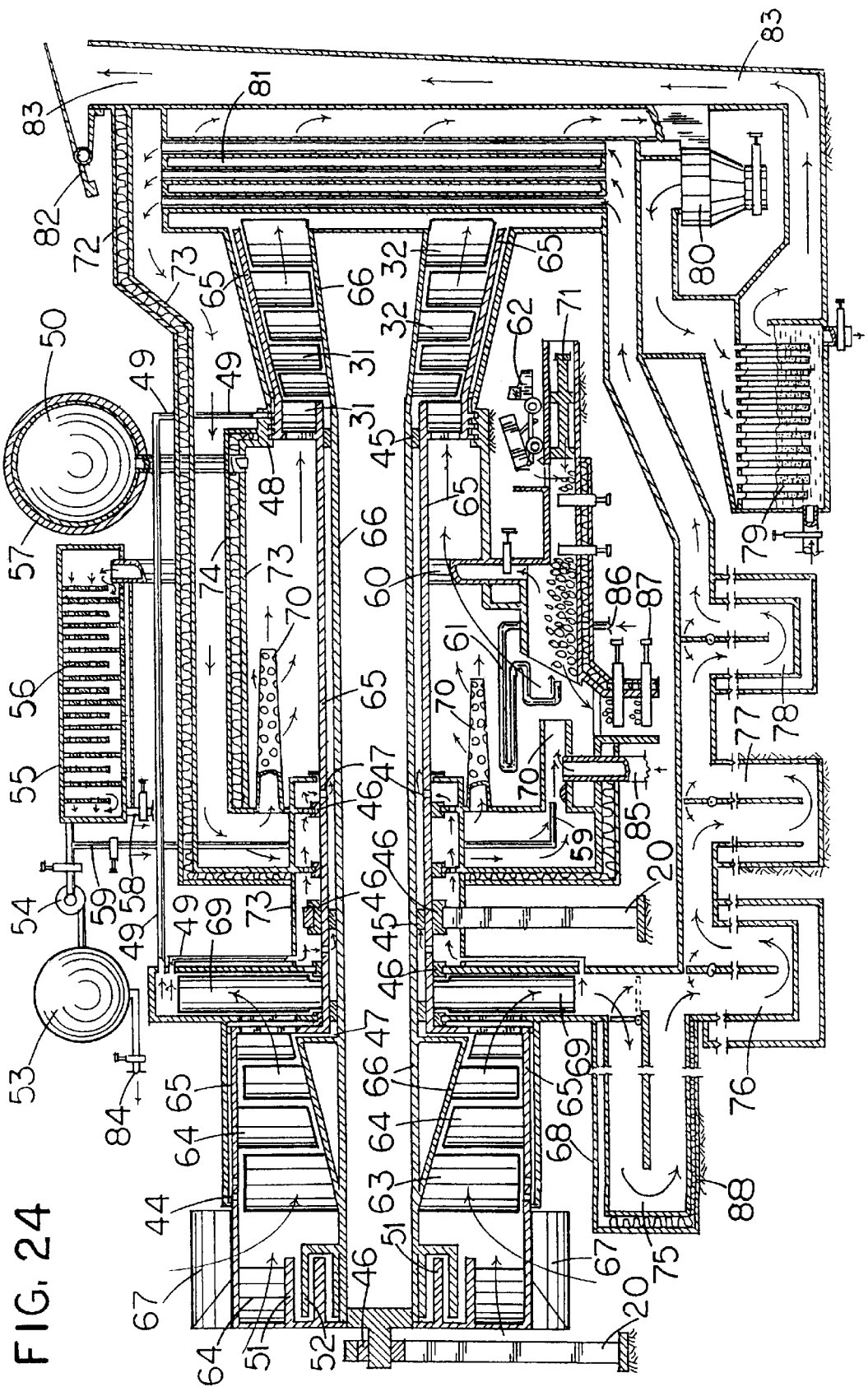
FIG. 24—illustrates a new scavenger energy converter system, an internal combustion engine combining all the fuels which are gasified in the engine.

FIG. 24—illustrates a new embodiment of the scavenger wide face fluid deflectors 31, 32, 63, 64, & 67 that are made to revolve opposite against each other by deflecting the speeding compressed air in order to drive the oppositely rotating drum-type electric generator 51–52. This newly created design to double the speed of the compressor 63/64 and double the speed of the drum-type electric generator 51/52 by making them rotate opposite against each other has been discussed in FIG. 9 of this patent application and has been claimed in the previous patent application Ser. No. 08/097,655—U.S. Pat. No. 5,435,259 but the claim was not approved, hence it is now reapplied in this application. This internal combustion turbine engine is started by passing electric current thru the electric generator 51–52 to make it function as an electric motor to turn the compressor turbine 63, 64, the centrifical blades 67, and the centrifugal pump 69, in order to introduce compressed air and push the compressed air thru the pre-heating systems, such as, thru the solar trap 75, thru the trash incinerator 76, thru the geothermal well 77, thru the nuclear fire 78, thru the radiator 81, then the pre-heated compressed air is re-directed by means of the channel 73–74, and into the combustion chamber thru the nozzles 70 where it is mixed with fuel gas supplied by the pipe 85. The torch 61 is supplied by gas/liquid fuel thru the inlet 86 to start burning the chanks of coal/trash fuel being supplied by the dump truck 62. As soon as the coal/trash fuel keeps firing, the fuel of the torch 61 is reduce, and the gas fuel pipe 85 is shut off. The mixture of superheated compressed air and gas fumes from the solid fuel is then further burn by the oxygen brought in by the hot compressed air entering the combustion chamber thru the other nozzles 70 around the chamber. The energized hot compressed air then exits and pushes to revolve the wide face sail blades 31 & 32 in opposite revolution which in turn rotates the drive shafts 65 & 65 in opposite rotation, which in turn drives the centrifugal compressor 69, the turbine compressors 64 & 64, the supper-charger centrifical compressor 67, and finally to drive the oppositely totating drum-type electric generator 51–52. As the solid fuel trash keeps burning, the piston pump 71 keeps the presence of solid fuel into the combustion chamber. The exhaust hot air then heat up the radiator 81 to pre-heat the supply compressed air before getting into the combustion chamber. As dust and ash will be blowing and mixing in the combustion chamber, the hot air exhaust is re-directed to pass thru the cyclone dust trap/separator 80 and then the dust is further remove from the exhaust air by forcibly passing the mixture thru the water filter 79 by fine boiling bubbles thru fine nozzles, then the exhaust air is set free to the atmosphere thru the chimney 83.

As there is a need to produce clean particles of coal without sulfur, during the process of cleaning, the supply of solid fuel brought in by the dump truck 62 must be purely all coal materials, and that the principal fuel being burned must be the gas fuel supplied by the pipe 85 or must be the liquid fuel supplied by the torch pipe 61. While firing the gas fuel, the chanks of coal get roasted and the sulfur content of the coal is then evaporated, which, in effect, is a process of distructive distillation. The roasted coal is then pushed on, by the piston 71, to drop down thru the valves 87. By alternately operating the two valves 87, the cleaned coal is then retreived on a bin below the valve 87. As it is hereby illustrated, heat energy spent for the distructive distillation is recaptured and converted by a scavenger ingine into electrical energy. Due to the pressure of compressed air in the combustion chamber, the gas fumes of sulfur or resin fumes from wood is forced to back off and enter the exit pipe 60 and then condensed inside the chamber 55 by passing thru a series of radiator cold plates 56. The condensed sulfur/resin is then allowed to drop down thru the pipe 58 for storage. The uncondensed fumes then continue to float and redirected into the pipe 59 which conducts the fumes into the fuel outlet/nozzle to serve as fuel for final burining into the combustion chamber of the engine.

The high pressure tank 50, which is insulated against heat transfer by the insulator 57, is provided to serve as shock absorber or to guard against sudden surge of pressure inside the combustion chamber. The high pressure tank 53, which is being filled up by the pump 54, is provided to store uncondensable gas fumes for what ever future use thru the outlet 84. The channel 73/74 is insulated against heat transfer by the insulator 72. The chimney cover 82 is provided with counter weight to make it easy to push out to remove back off pressure. The solar trap 75 is provided with transparent roof 68 and also provide with the ground heat insulator 88. Thru the supply pipe 49, the inclosure 73 around the drive shaft 65 provides cooling compressed air to the bearings 46, and thru the air outlet 47 the cooling cold compressed air is supplied to the planetary bearings 45 that work in between the drive shafts 65/66 and the cold compressed air finally exits thru the turbine blades 31/32. A second supply pipe 49 also provide cooling cold compressed air into the bearing 48. The post 20 supports the engine and the electric generator 51/52 thru the beaing 46. Part 51 is a magnet in the form of a drum, the outer face of which is south pole while its inner face is north pole, or vise versa. The part 52 is the induction wire coil of the generator, said coil being in the form of a drum to match with the said magnet drum.

The radiator 81 is made much larger having much more number of small pipes than shown in the drawing in order to take maximum benefits out of the hot air getting out of the turbine engine, as a means to further effect the scavenger process. The exhaust turbines 31, & 32 are made much wider face than the compressor blades 63, 64, 67, & 69 which are driven by the exhaust turbines 31, & 32, it being that the pressure of the heated compressed air inside the combustion chamber is equally acting forward and rearward. The advantage of having the nozzle 70 is that it distributes the oxygen evenly in the intire combustion chamber, hence, all excess gas fumes are oxidize in the combustion chamber resulting to a no smoke exhaust. The cyclone dust separator 80 may be made multistage to make it more efficient in retaining the ash/dust. Further, a plurality of the cyclone dust separator 80 are arrange parallel to accommodate the large of volume of exhaust air. The fuel supply pipe 85 may be made to supply powdered coal/charcoal/wood/newspaper/organic matters instead of gas/oil when trying to roast the coal being supplied by the dump truck 62. The chunks of coal being roasted may made to burn partially in order to serve as fuel to roast itself like the charcoal amber in the process of distructive distillation of wood.

The heat inslulator 72 is made of powdered charcoal because fiber glass can be molten down. As it has been indicated and discussed in FIG. 23, a pluality of the solar trap 75, a plurlrity of trash incinerator 76, and a plurality of the geothermal well 77 are arrange parallel and series in order to accommodate and pre-heat a large volume of compressed air in order to be able to supply a plurality of gas turbines that are arranged in parallel. The trash incineration 76 may also be done inside the compressed air chamber by the method of slow burning process which is done inside a plurality of deep burning pits similar the burning chamber being supplied by the piston 71 but the ceiling must be high enough so that the fast moving compressed air does not kick of the ash from inside the burning pits. The dust filter 79 may also be made multistage and the water supply is kept running to dispose the accummulated dust continuously. As it has been indicated in FIG. 23, the centrifical suppercharger 67 is made multistage oppositely revolving blades to make it more efficient. Likewise, as it has been indicated in FIG. 23, and as the speed of the generator 51/52 is hard to control, said generator is made to producr direct current that is being deposited into a large high voltage capacitor 2 and then the electicity is gradually released by the use of pure water as resistor in order to prevent all out discharge of the the electric power from the capacitor 2. It should be noted at this point that pure water is a poor conductor of electricity, hence, in this case, pure water is used as resistor that does not over heat, and this technology of the high voltage capacitor in combination with water that serves as an energy release controller may be used as a primary power for the electric cars, of which techinology the herein inventor hereby revserves all the rights to make and to use at the exclusion of others. For further use of this newly created apparatus to serve as a scavenger device, as it has been dicussed in FIG. 23, the exhaust hot gas coming out from the turbine 31/32 is re-directed to pass slowly thru a large drying chamber, wherein a large quantity of fresh trash/garbage are being dried up rapidly in preparation to be used as fuel for the turbine.

Figure 24A:
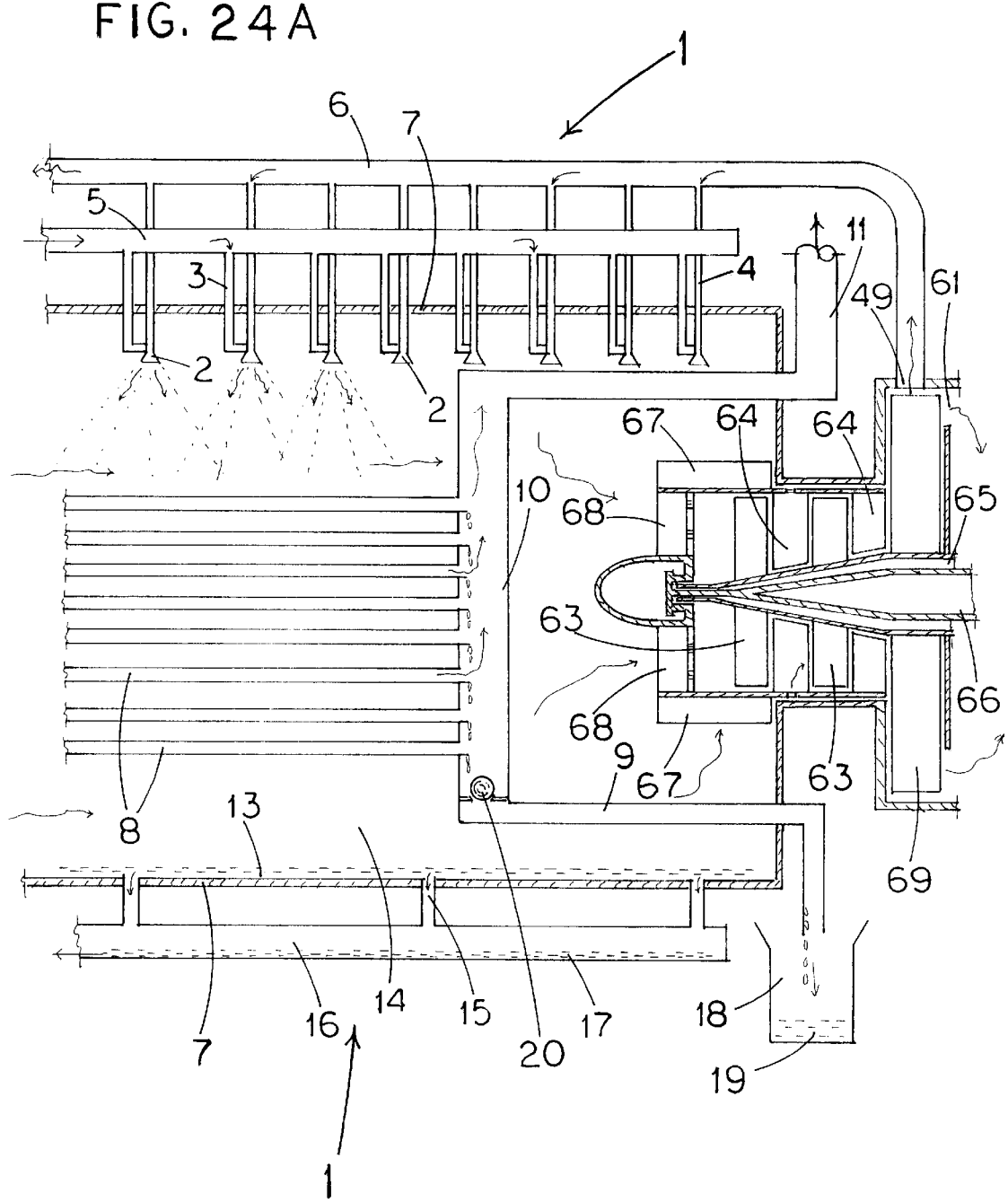

FIG. 24A—illustrates a new embodiment of a high humidity cold air maker 1 to supply abundant cold air anywhere and to serve as a condensation device, where in parts 63 and 64 are wideface oppositely rotating compressor turbine blades that are driven by the horizontal oppositely rotating pipe drive shafts 65 and 66. The drive shaft pipe 65 also drives the blades 69 of the centrifugal air pump having a peripheral main air outlet 61 and a side air outlet continued by the compressed air supply pipe 6 that is layed along the top of the air duct 7. The portal of the turbine compressor 63/64 is provided with centrifical blades 67/68 to scope in air from outside. The vacuumized air duct 7, which is resistant against implosion, encloses the portal of the compressor/blower 63/64/67/68, so that the blower 63/64 gets air from inside the air duct 7 only. A plurality of air tubes 4, communicated with the compressed air pipe line 6, are inserted into the air duct 7. Each of the air tubes 4 are provided with a venturi nozzle 2. A water supply pipe 5 is also layed along the top of the air duct, and a plurality of water outlet tubes 3 communicated with the water pipe 5 and also communicated with the venturi air nozzles to produce a fine mist spray of water inside the air duct. The air inlet mouth of the air duct is provided with a main gate valve to restrict the incoming air in order to vacuumized the air duct in order to speed up the evaporation of water in order to make the air inside the airduct into cold and humid air. The low level water outlet 15 at the bottom 13 of the air duct 7 drain the un-evaporated water which is collected by the main drain pipeline 16. To take advantage of the cold vacuumized chamber 14 of the air duct 7, a plurality of condensation radiator tubes 8 are placed inside the evaporation chamber 14 to condense any kind of vapor including water vapor for producing drinking water. The exhaust header 10 collects the condensed liquid and also collects the un-condensed gases. The un-condensed gas is further contained by the exit pipe 11 which leads the gas into the combustion chamber of the oppositely rotating gas turbine engine that drives the compressor/blower 63/64/69. The float valve 20 allows the liquid condensate to drain down but do not allow the un-condensed gas to flow downward. The collection container drum 18 serves as final collection tank for the liquid condensate.

Figure 24B:
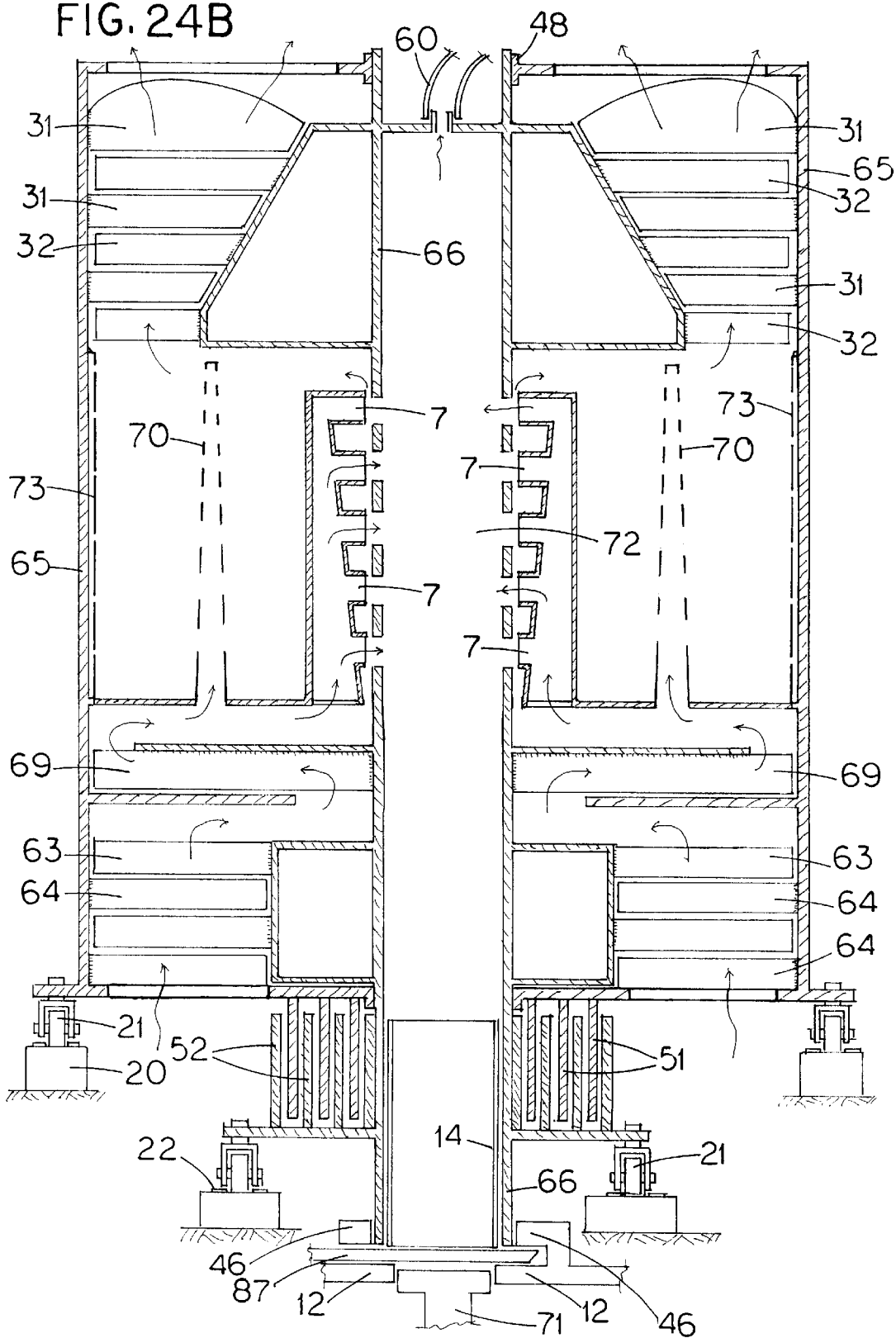

FIG. 24B—illustrates a new embodiment for a vertical axis oppositely rotating wideface bladed trash burning gas turbine engine, wherein, the inside of the inner pipe drive shaft 66 serves as the trash fuel chamber which is being filled up with trash fuel by the piston 71 thru the limiting sleeve pipe 14 which limits the diater of the fuel trash getting into inside the drive shaft 66 so that the trash will be moving up loosely inside the drive shaft 66. The valve 87 stops the trash from falling down when the piston 71 moves back down to pick up additional trash from the bin. The piston 71 and the mouth piece 12 serve as shearing dies to cut the exact sized of trash getting into the sleeve pipe 14. The bearing 46 is a lateral support for the drive shaft 66. The upper inside part of the the drive shaft 66 is provided with perforation windows to form the combustion chamber 72, wherein, the windows serve as entrance of oxygen air being injected by the air nozzles 7 to burn the trash. As the air nozzles 7 revolve around, the windows are left open so the combustion fire get out chamber 72 and then the hot air gets out of the wideface oppositely rotating gas turbine 31/32. Some of the unburned gas fumes are let to exit thru the pipe 60 which lead the distillates into a condensation chamber, and the uncondensed gases are recycled back to the combustion chamber 72. The air nozzles 70/73 revolve with the air nozzle 7 to distribute oxygen air into the unburned gases. The pipe drive shaft 66 rotates clockwise, in which case, the gas tubine blades 32, the compressor blades 63, and the centrifugal blades 69, all being attached to the drive shaft 66, also revolve clockwise, and which are all wideface blades. The drive shaft 66 further holds the multilayer drum-type magnets 52 which then revolve clockwise. The total weight of the drive shaft 66 including its loads is support by the roller bearing 21 that runs on the circular rail tract 22. The outer shell drum pipe 65. serves as the counter-clockwise drive shaft, holds and makes the wideface gas tubine blades 31, the compressor blades 64, and the multilayer drum-type induction wire coiles 51 to revolve counter-clockwise. The top bearing 48 makes the two drive shafts 65/66 to hold each other into the common vertical axis. The higher elevation roller bearing 21, running on a circualr rail tract 20, carry the total weight of the outer shell drive shaft 65 including its loads. NOTE that the generator produce different voltages from different wire drums, hence, have separate output wires, and that this whole machine is better supported by a single hanging bar with bearings.

Figure 25:
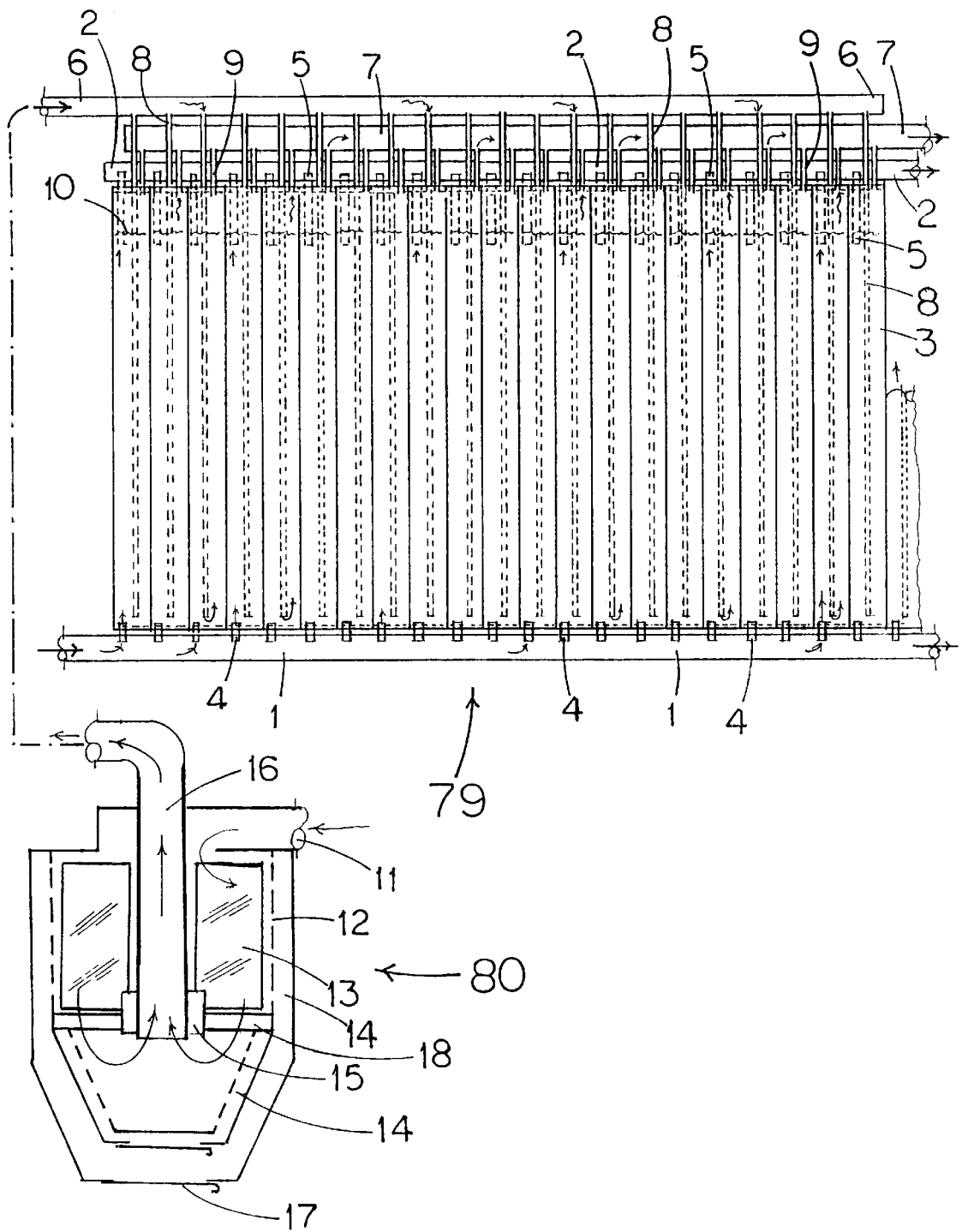
FIG. 25—illustrates a new self cleaning filter for smok, gas fumes, microdust, etc, by passing the dirty air thru a plurality of water tubes.

FIG. 25—illustrates a new embodiment of an air filter that uses water to retain dust and smoke or gas fumes, for the purpose of cleaning exhaust waste air or for cleaning fresh air to supply a clean room with clean air. This filter is designated as part 79 in FIG. 24, the function of which is to clean the large volume of exhaust hot air coming out of the gas turbine engine after passing thru the cyclone dust separator 80 as shown in FIG. 24. Pipe 1 is a large inlet pipe containing or conducting clean water that is continuously flowing and the water is distributively supplied, thru the water inlets 4, into the plurality of stand pipe water filter tanks 3 which contain the water that serve as filter up to the level 10. The water drainage horizontal pipe 2 is actually disposed at the level 10 beside and outside the water tanks 3, with a drainage slope, such that, by gravity, the continuous flow of water into the tanks 3 will continuously drain out into the pipe 2 thru the water outlets pipe 5 which intercommunicate pipe 2 to tanks 3 thru the openings at the level 10. Pipe 2 is a large pipe conducting the dirty waste water out from the whole apparatus filter 79 for final disposal or for recycling. The cyclone dust separator 80 pre-cleans the air that passes thru it. The cyclone 80 is provided with an inner wall with windows 12 to instill the air and trap the dust into the chambers 14 between the two walls. The centrifugal fan blades 13 are driven by the motor 15. which has a hollow pipe drive shaft to allow air to pass thru to get into the exhaust 16, to keep the air revolving to drive the dust particles into the windows 12. The bottom door 17 is used to take out the dusts from the stilling chambers. The air entrance 10 takes in any kind of air from outside and the air gets out of the cyclone 80 thru outlet 16 which is communicated with the header air pipe 6 and the unclean pressurized air is injected underwater into the filter tanks 3 thru the air inlets air pipe 8 which is full of fine perforations thru which the air gets into the water filter tank 3 in the form of tiny air bubbles in the same way it is done in an aquarium. The air pipes 9 are outlets of filtered air that has floated out from the water of tank 3 and which conduct filtered air into the header air pipe 7, which in turn, conducts the clean air into the clean room or to release the cleaned air out into the atmosphere. The waste water pipe 2 may be connected to a sand-type filter or vortex device for purposes of recycling the water back to pipe 1. In cases where there are some chemical fumes being collected into the water, it would be necessary to neutralize the chemicals thru a treatment plant before recycling the water back to pipe 1. In order to make the air cleaning process more efficient, this type of air filter is made multistage, the height of the water filter 3 should be reduced. because the fine air bubbles always fuse together to make a large air bubble on their way up to the water surface. After passing thru the first air filter, the pipe 7, in turn, re-directs the air to pass thru the next filter of the same type as shown in FIG. 25. Tests should be conducted to fine out how far the air has been cleaned, and if still necessary, then the air is passed thru the third stage filter.

Note that the centrifugal wideface air fan blades 13 effectively pumps the air into the outlet 16 because the air starts from the small radius entrance 10 and ends down to the instilling plate 18 that stops centrifugal motion of the air. For more effectivity of the centrigual pump, the blades 13 are reduced upward and the instilling plate 18 are increased in wideface upward to the bottom lip of the outlet 16.

It shoud be noted at this point that for less energy spent in filtering the air, the water tank 3 should be layed horizontal, such as a water pond, so that the perforated air release pipe 8 will be horizontal, hence, less air pressure is requied to inject fine air bubbles in to the shallow water.

In a large volume of air cleaning job, such as those that come out from the exhaust of a large gas turbine engine shown in FIG. 23 and FIG. 4, it is cheaper and more practical to use a large water pond or a lake of five to fifty acres, wherein, the main air pipe 6 is floating on the water with plurality of branches, and the air is injected tiny bubbles into the water thru the perforated air injection pipe which is layed horizontal underwater in the pond, The air then comes out of the water and let/set free direct into the atmosphere. The accumulated dust in the water forms a mud on the pond floor which is then dredged periodically to maintain the depth of the lake.

Figure 26:
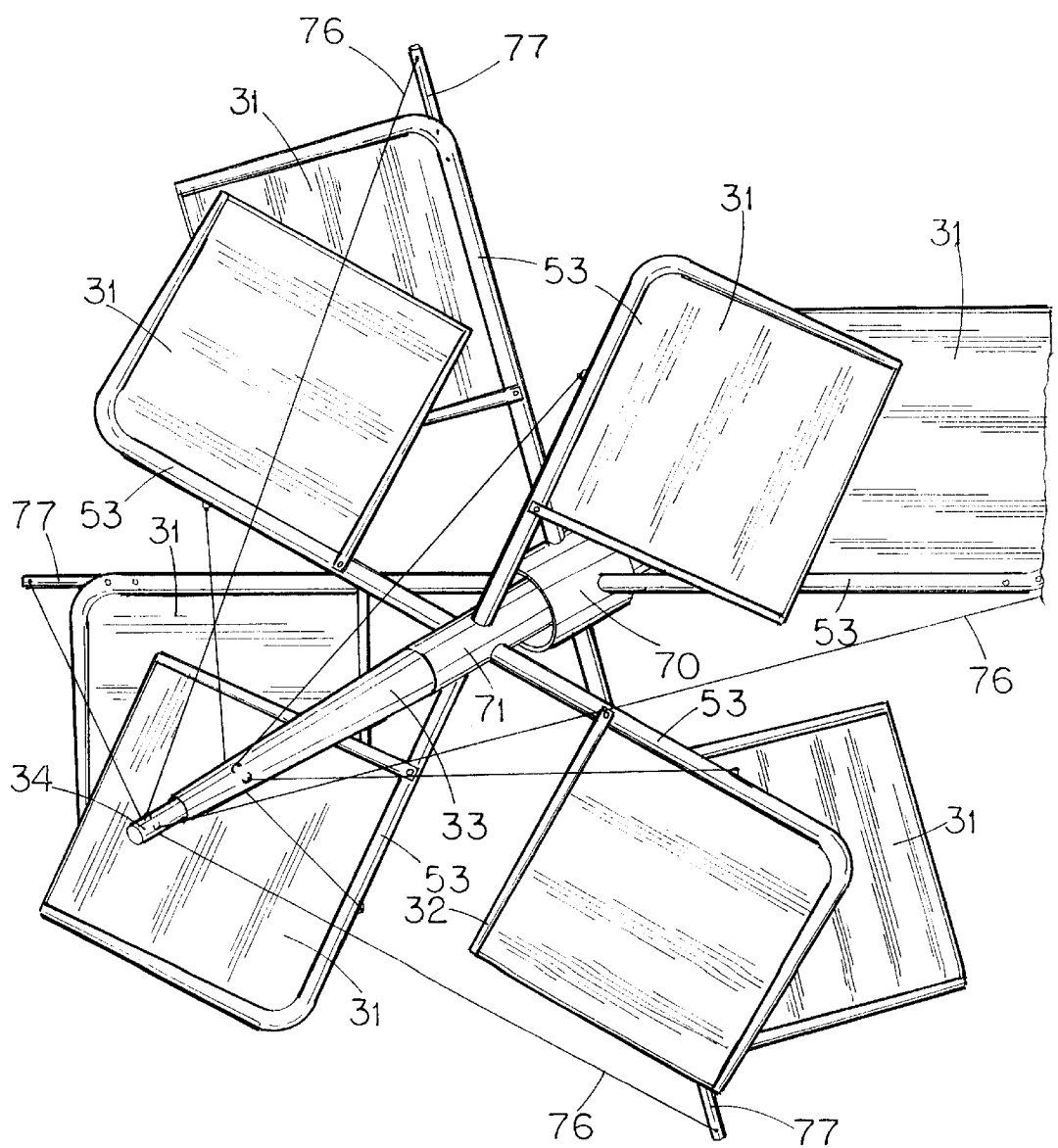
FIG. 26—illustrates a new wideface blade oppositely rotating wind turbine with radial masts holding the sail-type blade acting as torsion bars.

FIG. 26—illustrates a new embodiment of a wide face sail scavenger fluid deflector to form a scavenger oppositely rotating windmill. This FIG. 26 is a perspective view of FIG. 11 showing how the co-axial forward struts 33 & 34 are provided to support the slender mast 53, thru the guy rope 76, against the rearward force of the speeding wind in order to keep the wind-mill working safely during high winds. The slender mast 53 is made out of elastic and resilient materials, including bamboo, carbon steel, stainless steel fiber glass composite pipes to mention a few, in order to be light weight, and to be able to function as a torsion bar that can hold the wide face sail 31 at variable angles oblique against the speeding wind, and to be able to turn the outer hub 70 and the inner hub 71 in opposite rotation. Unless the rear mast 53 is longer than the front mast 53, the extension bar 77 is provided to the rear mast 53 to make the guy rope 76 stay out clear from the circle of the front mast 53. The structural frame 32 is a split pipe at the base and clamped both sides of the torsion bar 53 by a bolt that penetrates the torsion bar 53, in order to be able to twist the torsion bar 53 when the sail 31 is pushed rearward by the wind.

To provide an alternative to this type of automatic control system, a strong coil spring is provided and locked at the base of the mast 53 and the other end of the control spring is locked to the hub 70 & 71, in which case, the mast 53 is not continuous to the other side of the hub. In this case of torsion system, the wide face sails are arranged in a triangle of 120 degrees and not necessarily in quadrant arrangement.

The forward strut pipe 33 is attached to and rotates in the same direction with the hub 71, likewise, the forward strut pipe 34 is attached to and rotates in the same direction with the hub 70 in opposed to the rotation of the strut 33. With the hub 70 and the hub 71 being made to rotate opposite against each other, the herein scavenger windmill is then able to drive an oppositely rotating multilayer drum type scavenger electrict generator or to drive an oppositely rotating wide face blade turbine type compressor.

FIG. 27—illustrates a new embodiment of a multilevel high flying wide face blade windmill, that takes advantage of the high altitude winds without the need to erect a high steel tower, that is carried by a wide face scavenger fluid deflector balloon-kite 1 that floats in mid-air and can park in the sky in the night. This type of windmill has been described as FIG. 10 and claimed under the U. S. Pat. No. 5,056,477, but for some improvements, it is hereby again presented, wherein, the kite 1 is provided with wider wing extension outward and tilted upward on both sides of the kite 1 for purposes of lift and stability, and that the balloon kite 1 is constructed out of long cylindrical balloons attached to each other side-by-side to maked a wide face against the wind for lift. The kite 1, being the lifting support for the windmills 27, is provided with downward walls, one wall on each side at its ¼ point and on one slant wall at the rear, in order to make the kite concave to the wind, for purposes of creating more wind pressure upon the kite 1 and uppon the turbines 27. The side wings of kite 1 may be tilted upward to add more stability. A plurality of holes are provided on the kite 1 to provide escape windows for the wind, upon which windows, the windmills are mounted to be driven by the escaping wind. The windmill 27 is made to have two sets of wide face scavenger sail type blades that revolve opposite against each other, in order to drive an oppositely rotating multilayer drum-type electric generator that produce direct current. The electric power is then conducted down thru rope 2 into the voltage regulator 56, then thru the rotating current cutter 57, then thru the inverter/transformer 58, then thru the electric meter 59 which delivers the power to the community grid. The rope 50 is a lightning arrester that runs the electrolizer 51 to produce hydrogen and to deposit the eccess power into the high voltage capacitor 52. Part 53 is the strut to separate the left from the right kite sling 2. Part 54 is the wire stiffener for the strut 53. Part 55 is the winch anchor of the kite 1 to the ground.

Figures 28A, 28B:
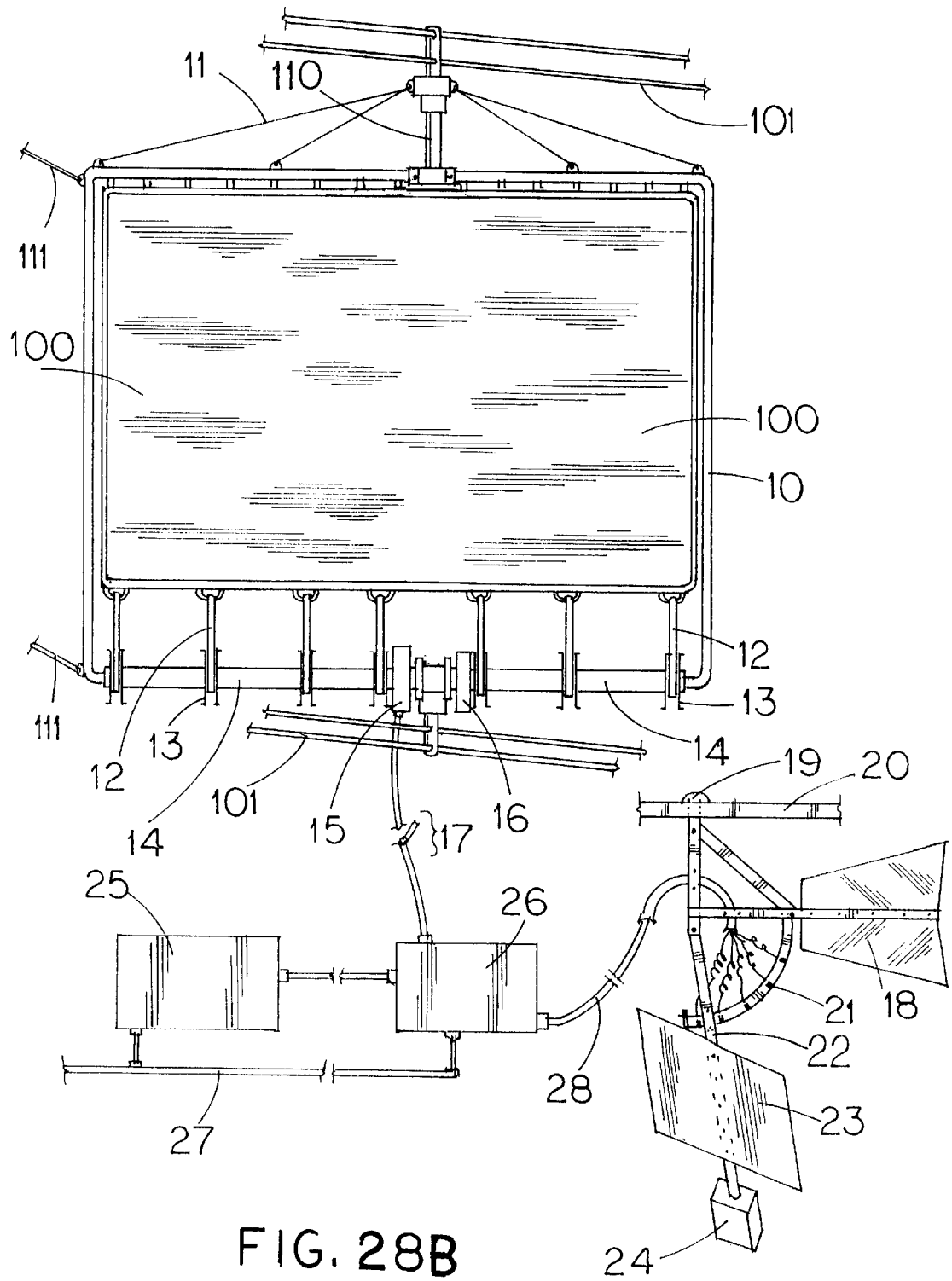
FIG. 28A—illustrates a wideface safe working wind sail with electronic control system for a sail windmill.
FIG. 28B—illustrates a wideface wind speed detector that feeds data to a Rule Base Algorithm electronic controller for the windmill.

FIG. 28A—illustrates a new embodiment of a wide face fluid deflector 100 serving as sail as the principal component for a scavenger sail-type windmill, as illustrated in the U.S. Pat. No. 4,859,146 dated Aug. 22, 1989, which sail is now hereby provided with an automatically self adjusting controller comprising a flat rope 12, a deep groove winch-pulley 13, and a coil spring or electric motor 15, to make the sail stay working during high speed winds. The sail 100 hangs from and drives the aerial cable rope 101 that serves as drive chain to turn the gears at the end loop of said rope 101. The principal issue here is the new concept of the control system of the sail to make it able to automatically adjust to and to continue to work with the high speed winds, by the use of the flat rope 12 that elongates to relax the sail 100 against the high winds and retract with the low speed winds, for purposes of making the sail 100 able to serve as a scavenger energy converter by not turning off to stop working during high winds and also able to work with the slow moving winds. The sail 100 may be either in the form of a thin sheet that has a peripheral rigid frame so that the sail 100 will be pushed out by the strong winds and swing upward pivoting at the top of frame 10 thereby forcibly elongating the rope 12 so that the sail 100 will give way partially to the excessively strong winds, or in the form of a flexible thin sheet that wound around a horizontal cylindrical winch drum at the top of the frame 10, which drum is driven by an electric motor 15 that react according to the varying wind speeds, in which case, the vertical sides of the sail 100 are held and being allowed to slide thru a groove at the inner vertical sides of frames 10. In this second case, the sail 100 is not being pushed out from the frames, but instead, the electric motor 15 rolls up and rolls down the thin sheet sail 100 in order to reduce or to increase the wide face impeding against the wind to work within the safe limits on the strength of the drive chain 101.

FIG. 28B—illustrates a new embodiment of a control system to enable the sail 100 in FIG. 28A to function as an energy scavenger safely in accordance with the varying wind speeds, wherein, the wide face fluid deflector 18 acting as rudder tail forces the wide face sail 23 to face and imped the wind squarely so that the sail 23 is pushed by the wind to swing back and up the arc switch bar 21 by way of the pivoting suspension bar 22 that is attached to slide on the arc bar 21. The calibrated weight 24 makes the sail 23 swing back down to vertical posture when the wind is low and also to make the sail 23 offer a resistance force against the wind. The arc switch bar 21 is provided with a plurality of electric switches/sensors that are connected to electric wires that convey the wind speed signals thru the cable harnesh 28 and into the electronic command module 26 that provides selection of command switches corresponding to the standardized pre-determined movements of the electrict motor 15 thru the harnest 17 in accordance with the wind speeds and the turbine safe operating limits. The command module 26 intercommunicates with the supervisory control switch board 25 which contains the fuzzy control logic or PLC that analyzes various in-coming data from various equipments in the wind farm. The supervisory control 25 feeds the command module 26 with the logical command to make. These types of automatic controller 25 and module 26 are commercially available in the market, but in this presented invention, there are new uses and applications created for the PLC/controller 25 and for the command module 26.

Figure 29:
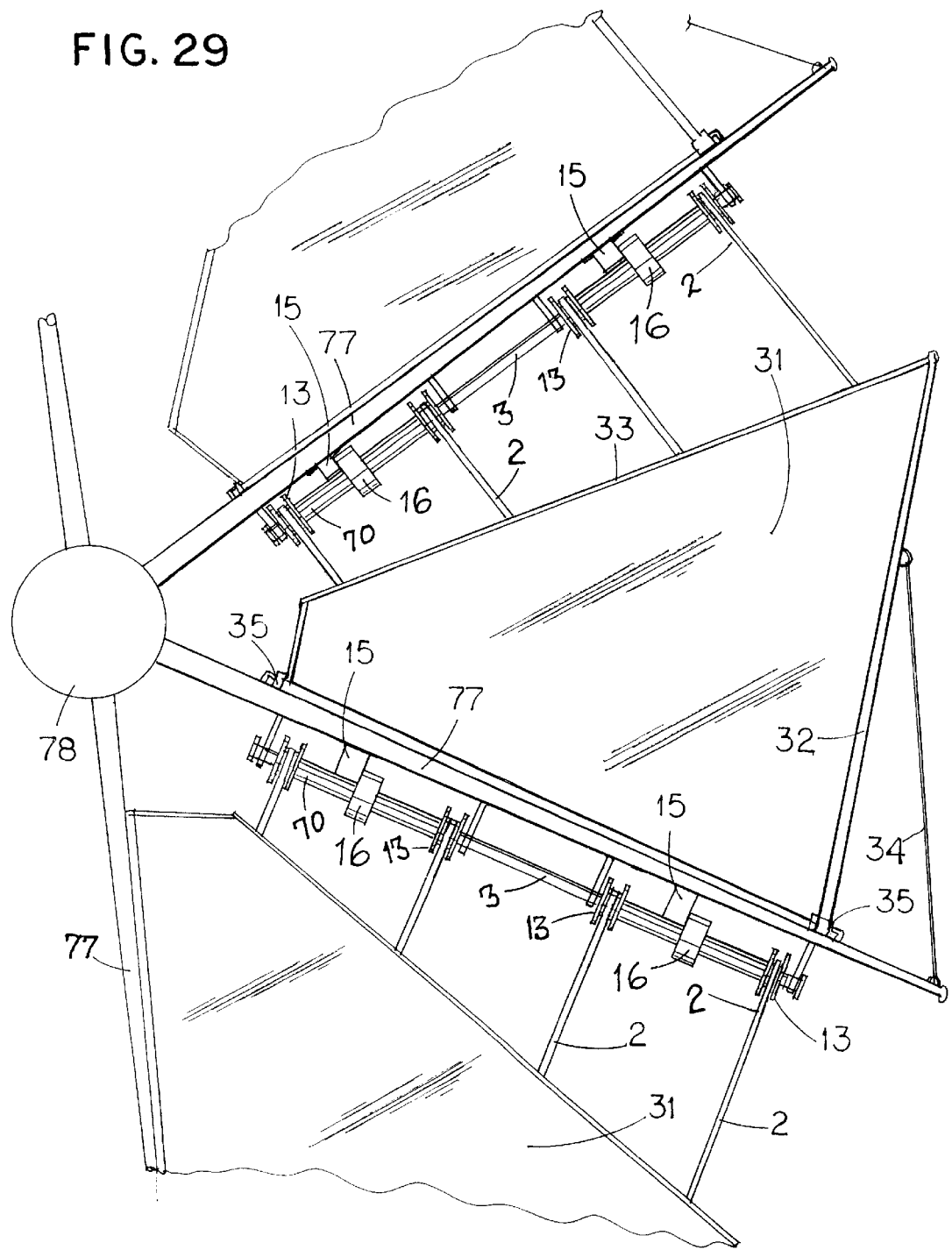
FIG. 29—illustrates an electronic controlled wideface sail wind turbine, with coil spring controlled winches.

FIG. 29—illustrates a new embodiment of a scavenger energy converter, wherein, a plurality of not more than six wide face wind sails 31 are radially mounted on a hub 78 thru the radial mast 77 in order to make a scavenger rotary windmill, and wherein, an automatic electro-mechanical control system is incorporated to enable the windmill to take advantage of the high speed winds and to convert the energy of the low speed winds out of the wide face sail 31, thereby producing a scavenger effect. As the wind pushes the sail 31 backward, the flat rope 2 resistively elongates as it is being held back by the winch-pulley 13 which is deep-grooved to accomodate the windings of the flat rope 2. The pulley 13 is locked with the pipe drive shaft 70 which in turn is locked with the coil spring 16 that resist the unwinding of the rope 2. The spring coil 16 is gear-locked with the gear of the the electric motor 15 which is provided with an electromagnetic unlock dowel that is attached to the mast 77. The electric motor 15 is used to fully release the rope 2 to stop the windmill for maintenance specially during high winds and to pull back the rope 2 so that the sail 31 will make a maximum bite on the low speed winds. It should be noted at this point that the electric motor 15 is controlled by the Programable Logic Controller shown in FIG. 28B. The part 32 is a secondary stand out mast that serves as an outer frame to stretch out the sail 31. The part 33 is the front and rear side frames of the sail 31. The part 34 is a guy rope or a tension bar to keep the secondary mast 32 stay standing out. The part 35 is an eye-hole connector to hold the sail frame to the mast 77. For further scavenger effect, two sets of this type of wind turbine are made co-axial and mechanically linked together by means of planetary gears in between the co-axial pipe drive shafts and the sail 31 of the rear turbine is attached to the right of the mast 77 to make the rear turbine rotate counter-clockwise in opposed to the rotation of the front turbine, in order to drive an oppositely rotating electric generator. The rear turbine is made to be in a larger diameter in order to deflect an equal strength of the wind and be in equal power with the front turbine, and further, to make the rear turbine act as a rudder so that the whole assembly will face the wind squarely, as the support tower is in between the front and the rear turbine.

Figure 30:
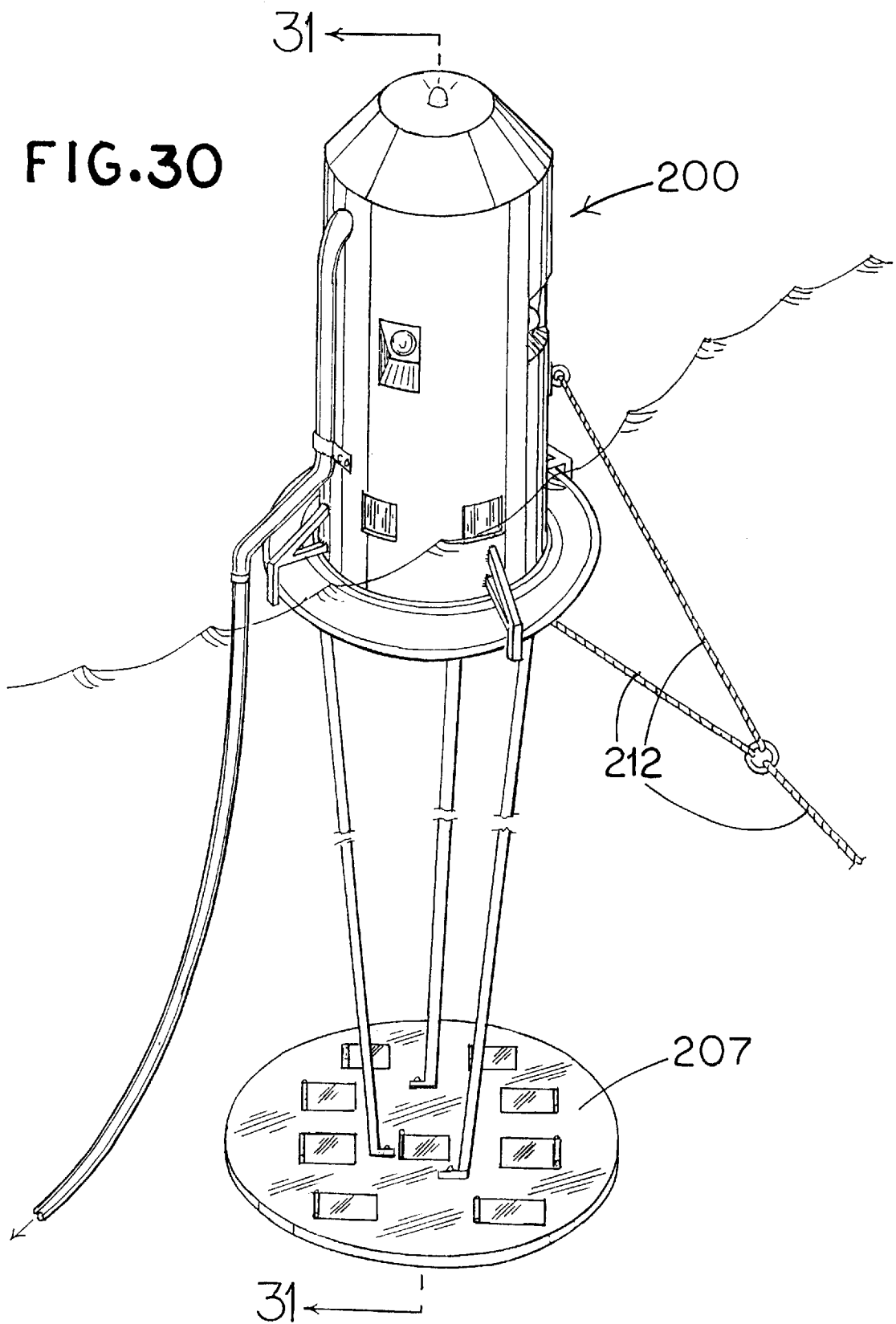
FIG. 30—illustrates a perspective view of a cylindrical capsule air compressor, using a wideface fluid impeder anti-oscillation resistor part 207 per my U.S. Pat. No. 5,094,595.
Figure 31:
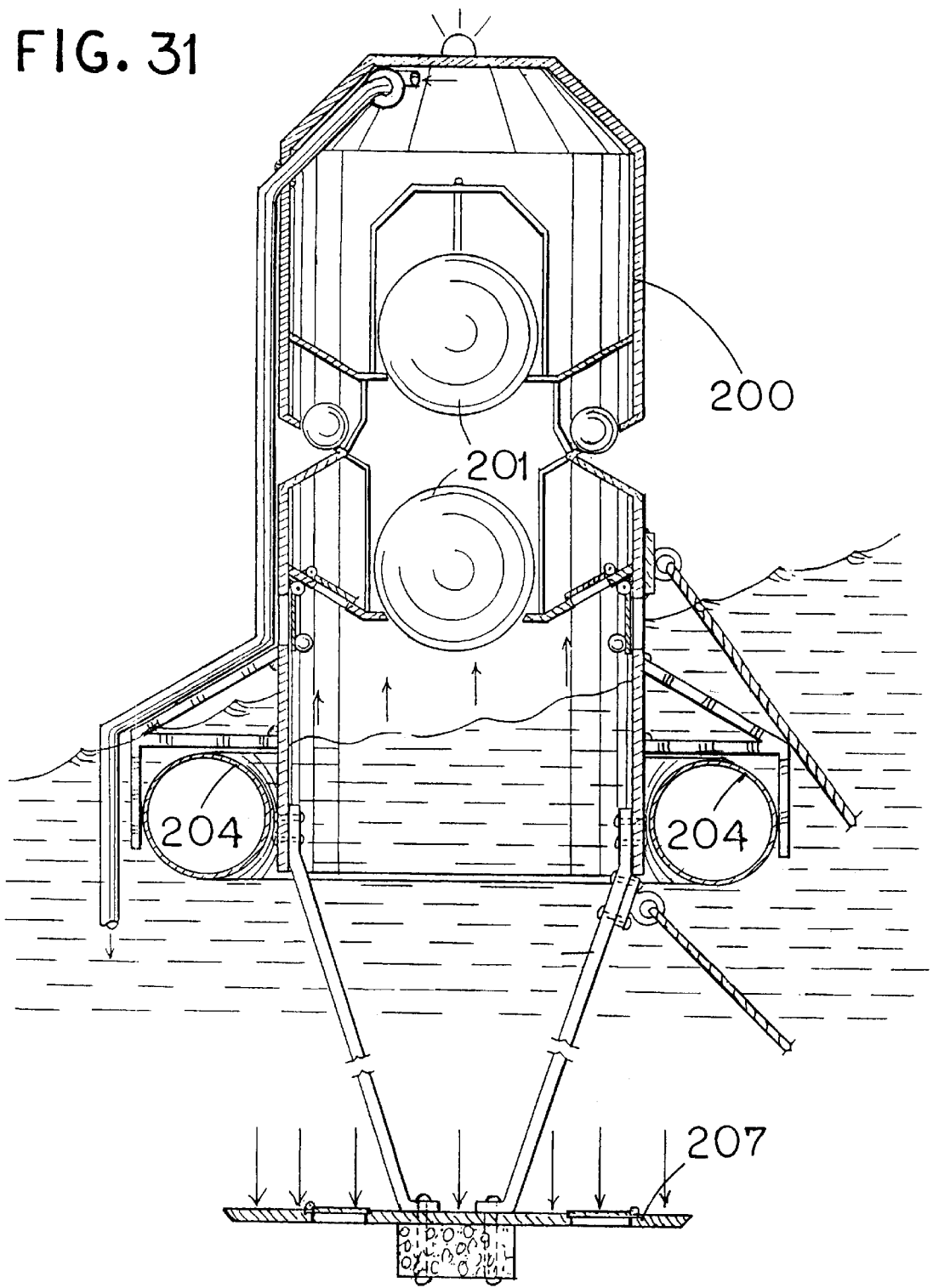
FIG. 31—illustrates the sectional view thru 31—31 of FIG. 30 showing the internal valve systems of the capsule and of the wideface resistor part 207.

FIG. 30 illustrates an embodiment of a less oscillated open bottom capsule 200 that serves as scavenger air compressor by the action of the water waves. There is shown a wideface fluid impeder anti-scillastion resistor 207 to prevent the capsule from moving up or down in order to force the water to enter the capsule via its open bottom to compress the entraped air in the capsule. FIG. 31 is a cross-section of FIG. 30 showing the internal valves that float on water. This compressor has been claimed under my U.S. Pat. No. 5,094,595 but it is now being presented to show the origin and evolution of the wideface fluid impeder.

Figure 32:
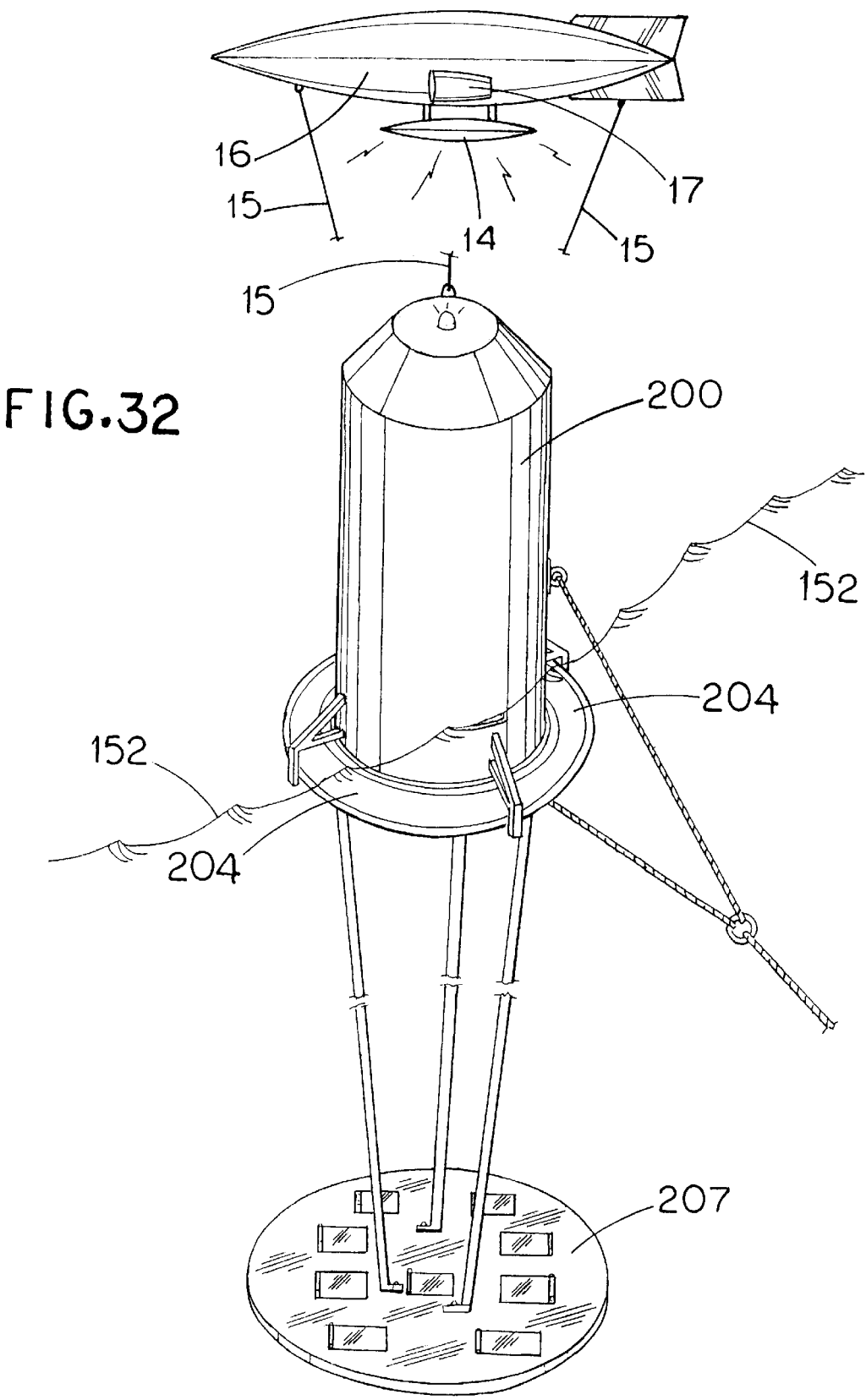
FIG. 32—illustrates a new simple floating missile silo similar to the capsule of FIG. 30 that uses the wideface resistor, with a hot air balloon on guard.

FIG. 32 illustrates the embodiment of a new concept of a simple missile silo afloat on the ocean with less oscillation by the water waves. The wide face fluid impeder anti-oscillation resistor 207 prevents too much oscillation of the missile silo 200 by the water waves. This apparatus is exactly the same floating apparatus as shown in FIG. 30 with the same part number and same corresponding function of parts. Due to evolution of ideas, the compressor shown in FIG. 30 is now converted into a floating missile silo with exactly the same parts except the bottom of the drum/capsule 200 is now closed and water tight and made to be able to float by itself without the need of the ring floater 204, hence, the ring 204 is optional for this purpose and therefore part 204 may be eliminated. There is less oscillation by the water waves 152 upon the silo 200 if the ring 204 is removed. The radar/communication device 14 is being carried high up in the sky by a new concept of a hot air balloon 16 which is held in place by a sling rope/hot air hose 15 that is connected down to the missile silo 200 which produces the hot compressed air being supplied to the hot air balloon 16. This balloon 16 may carry solar cells on its top to supply electric power for the communication system 14. The air hose 15 is made to discharge hot to the top chambers of the balloon 16 so that the air that cool off will exit to the restricted outlet at the bottom of the balloon 16. In order that the hot air balloon 16 becomes elongated and pointed. the balloon 16 is made up of internal structural frame in the form of an array of small inflated tube-like hot air balloons so arranged to serve as a peripheral strut frame, said frame being wrapped around by an outer skin to form the large pointed hot air balloon 16.

It should be noted at this point, that the pointed elongated hot air balloon 16 is also made to become an independent aircraft to be flying by itself like the blimp, by providing it with a propulsion engine 17, wherein, the hot air exhaust from the engine is being supplied into the hot air balloon 16 to keep it afloat up in the sky, and therefore, it can carry the radar/communication device over and around the ocean in the vicinity of the missile silo 200, so that the missiles deployed on the ocean can be fired from a distant command center, and the silo is protect from assault by the surveillance done by the sky radar.

Figure 33:
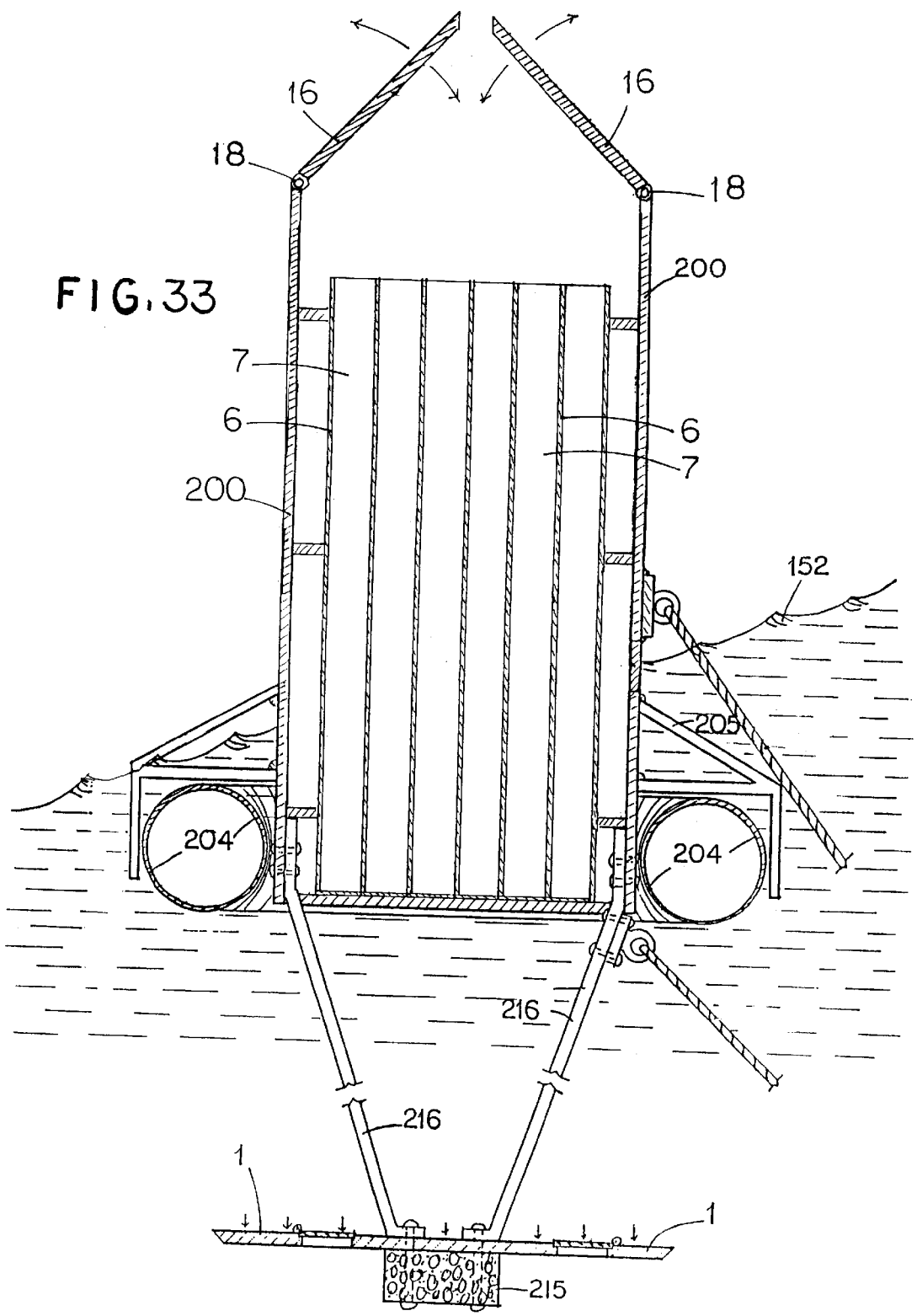
FIG. 33—illustrates the internal view of FIG. 32, showing the internal multi-chambered missile silo, and the wideface anti-oscillation fluid resistor.

FIG. 33 illustrates a vertical sectional view of FIG. 32, showing a multiple missile silo 6 and 7 inside a large missile silo 200 that is less oscillated, which is an evolution of the idea of FIG. 31 with exactly the same function of the basic parts including the wide face fluid impeder anti-oscillation resistor device now re-numbered as part #1 that prevents too much oscillation of the silo 200. As shown, it can be seen that the bottom of the large silo 200 is closed and made water tight so that now it can float independently by itself and due to the weight and distance of stabilizer 215 and part #1, the large silo 200 is being force to stay erect/upright by the rigidity of posts 216, hence, the ring floater 204 and the bracket 205 can now be eliminated. The roof cover 16 is movable to close or open thru the hinge joint 18 by adding some mechanical devices at the hinge joint 18. Since this missile silo is a very expensive and a critically sensitive facility it should be logical to make the walls of the large silo 200 into at least 12 inch thick solid carbon steel or stronger so that it cannot be destroyed by a torpedo or by a missile, and accordingly, the wide face fluid impeder anti-oscillation device 1 and posts 216 and the weight 215 must also be in solid carbon steel or stronger to make it resistant to military assault, any way, the large silo 200 has a very large buoyant power to carry all the solid steel component parts.

Figure 34:
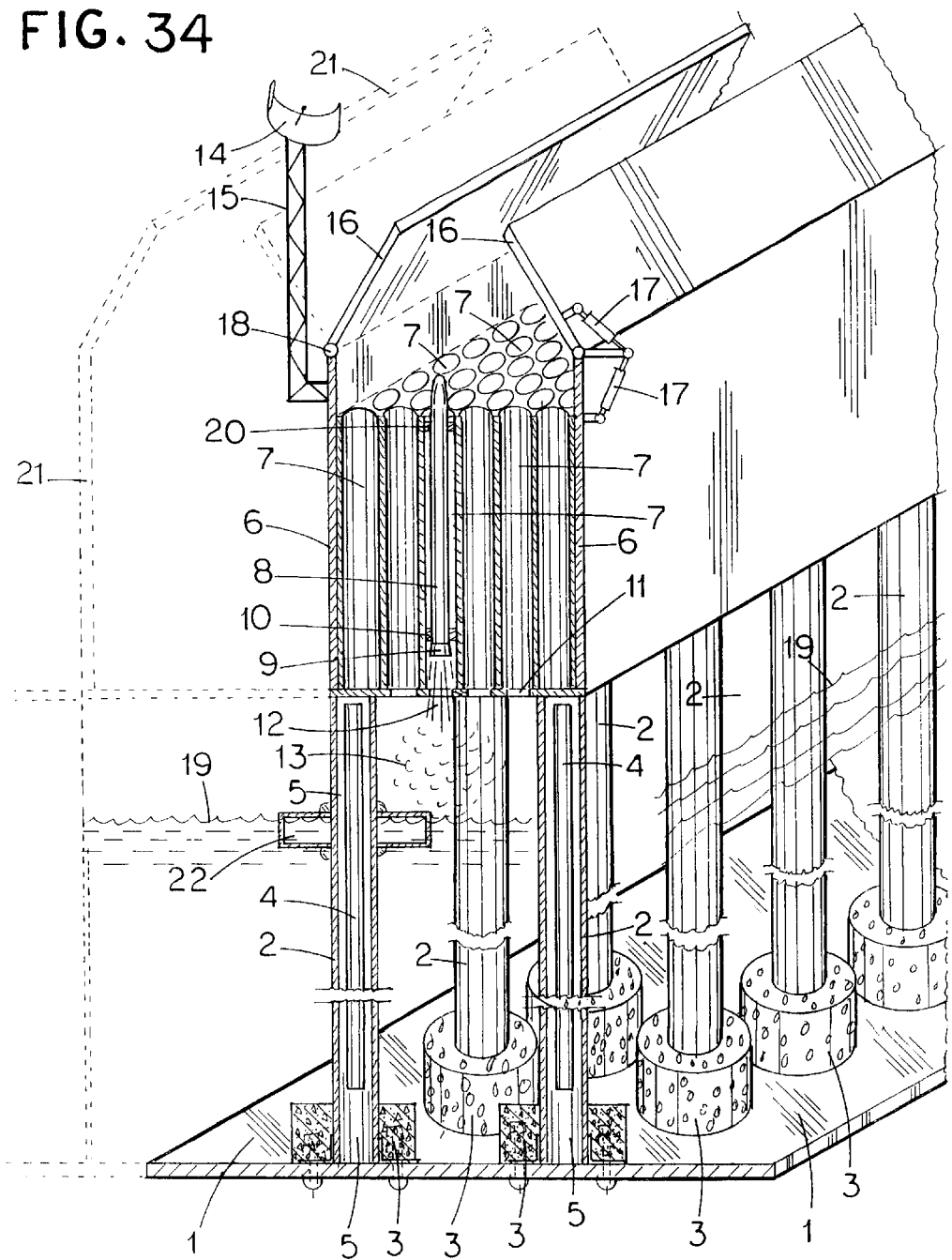
FIG. 34—illustrates a new least oscillated missile silo similar to FIG. 33, now lifted above the water by floater posts with the wideface fluid resistor.

FIG. 34 illustrates the embodiment of a new concept of a least oscillated missile silo 6 which is lifted well above the highest water wave 19 by means of a plurality of floater pipe posts 2 that are attached down to a wideface fluid impeder anti-oscillation device #1 in the deep still waters. By inspection of the drawing, it can be seen that the large silo 6 accommodates a plurality of smaller missile silos 7 which may be as many up to 1000 or more silos. Since the silo 6 is narrow like a feeding trough, it has the tendency to lean on one side, hence, it is necessary to provide stabilizer weights 3 at the bottom of the floater pipe posts 2 or as an alternative, it is necessary to make the wide face anti-oscillation resistor 1 a lot heavier and to make the pipe posts 2 a lot longer down to the deep water to make the silo 6 stay upright. The safety floater pipe 4 is a permanently sealed high pressure compressed air pipe permanently disposed inside the floater pipe post 2 to safeguard against accidental water leak into the pipe post 2. The safety floater pipe 4 is of the size enough to be able to do the minimum floating function of each pipe post 2. The chamber 5 of the posts 2 is being filled up with water to maintain the average height of the silo 6 above the water when said silo is empty, and when the silo is loaded the water is then taken out from the chamber 5. When the missile 8 is fired, the high pressure smoke 12 gets out thru the bottom outlet 11 of each missile silo, and the waste smoke 13 is then free to be carried away by the wind, hence, the missile silo will not be polluted too much by rocket smoke 13. The air plug 10 is provided to stop rocket smoke from rising up into the silo 7 and to force the smoke 12 to exhaust downward at the same time helps in lifting the missile 8 upward out of the silo 7 as the nozzle 9 will slide up the plug 10 out of the silo 7. The guide block 20 is provided to keep the missile 8 erect at all times. As a variation, the missile 8 may be fired out of the silo 7 by high pressure compressed air or by liquified gas from the adjacent silo 7 wherein the air plug 10 is placed below the nozzle 9 of the missile 8 and the bottom outlet 11 is closed. The missile 8 serves as a bullet being fired out of a giant gun, and then the rocket is ignited by radio control upon being in midair. The antenna 14 is set up the tower 15 being provided for proper radio command and control of the unmand facility. Part 16 is the armor cover of the large silo 6 that is manipulated by the hydraulic jacks 17 at the hinge joint 18 by radio control. In any case, it is more ideal to have several of this narrow silo 6 set up adjacent to each other, such as the imaginary silo 21 as indicated in dotted lines, to form a large square floor area silo 6, in order to eliminate the need for the weight 3, and therefore, the wide face anti-oscillation resistor 1 can be made to provide lift. The level stabilizer 22 is permanently filled up with water and permanently attached to each and all the posts 2 at the desired water line to keep the whole apparatus stay level in all weather conditions.

Figure 35:
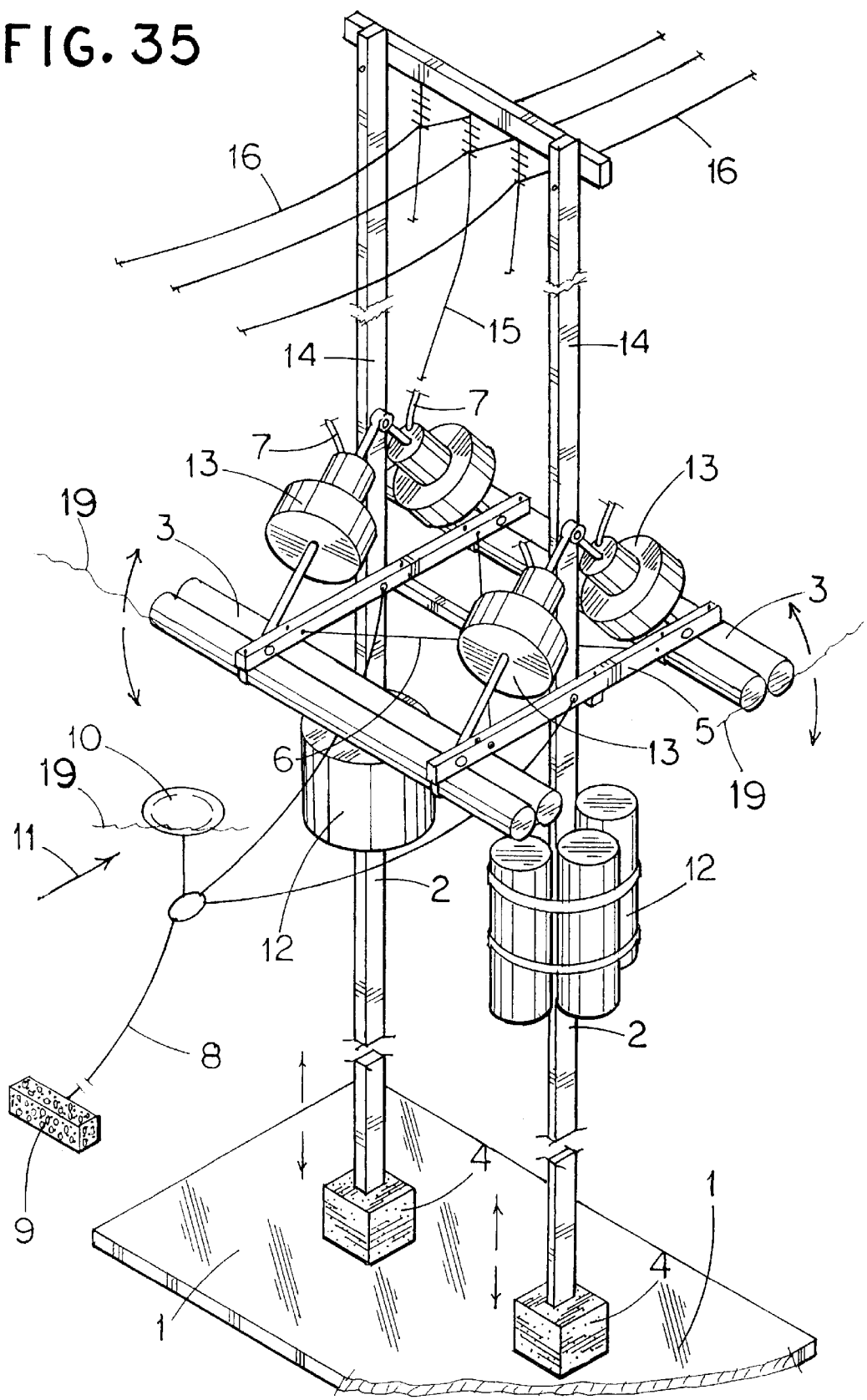
FIG. 35—illustrates a new least oscillated electric tower afloat on the ocean wth a plurality of push-and-pull machines, using the wideface resistor.

FIG. 35 illustrates a new concept of erecting a least oscillated tower 14 afloat over the ocean in congruence with the conversion of the water wave energy into compressed air or into electricity by means of the floating pipe see-saw oscillator 3 that activates the compressor 13 which may also be a push 5 and pull electric generator 13 or a combination of both operating at the same time. The see-saw bar 5 will oscillate the tower 14, and the compressor 13 will also oscillate the tower 14 due to the action of the floater oscillator pipe 3. The arrow 11 is the direction of the water waves approaching the apparatus, hence, the front oscillator pipe 3 will rise first while the rear oscillator pipe 3 will drop down, and in effect the front compressor 13 will do the compression stroke while the rear compressor 13 will do the suction stroke. In the process of this see-saw activity, the tower is being forced to lean rearward which action is being countered by the heavy weight 4 that is disposed at a distant bottom end of the post 2. The post 2 and the tower 14 must be continuous structural beam that can the resist the opposite/reversing flexural stresses. The oscillation done by the part 3 causes a lifting up and dropping down of the whole apparatus thereby causing a loss of power not being imparted to the compressor 13, hence, it is very necessary to attached the bottom of the apparatus via the post 2 to the wide face fluid impeder anti-oscillation device 1, disposed in deep still water, that prevents the up and down oscillation of the whole apparatus. The floater lifter 12, being made up of a bundle of pipes or a multi-chambered drum, is designed to carry the whole weight of the whole apparatus including the weight of the floater oscillator 3 so that all the buoyant power of oscillator 3 is being used to activate the compressor/generator 13. The floating power of the floater lifter 12 is being adjustable by filling up some parts of the chambers with water so that only less than 3 inches of its top portion is coming out of the water when it is in still waters, in order to eliminate too much variation of buoyancy due to the water waves. One alternative for this is that one of the pipes in the bundle of floater pipe 12 is made long enough to be extending a few feet out of the water to maintain enough buoyancy without being oscillated too much by the water waves. Part 7 is an air hose for the compressor 13 while part 15 is a conductor wire if part 13 is an electric generator. Part 16 is an electric transmission line interconnecting this apparatus with other generating apparatus in the vicinity. Part 6 is a cross-brace to make the apparatus stay square. Part 8 is the anchor rope attached to the anchor block or natural rock at the ocean floor. Part 10 is a buoy to lift and bend the anchor rope to prevent the horizontal impact/jerk of the water waves upon the floater oscillator 13.

Figure 36:
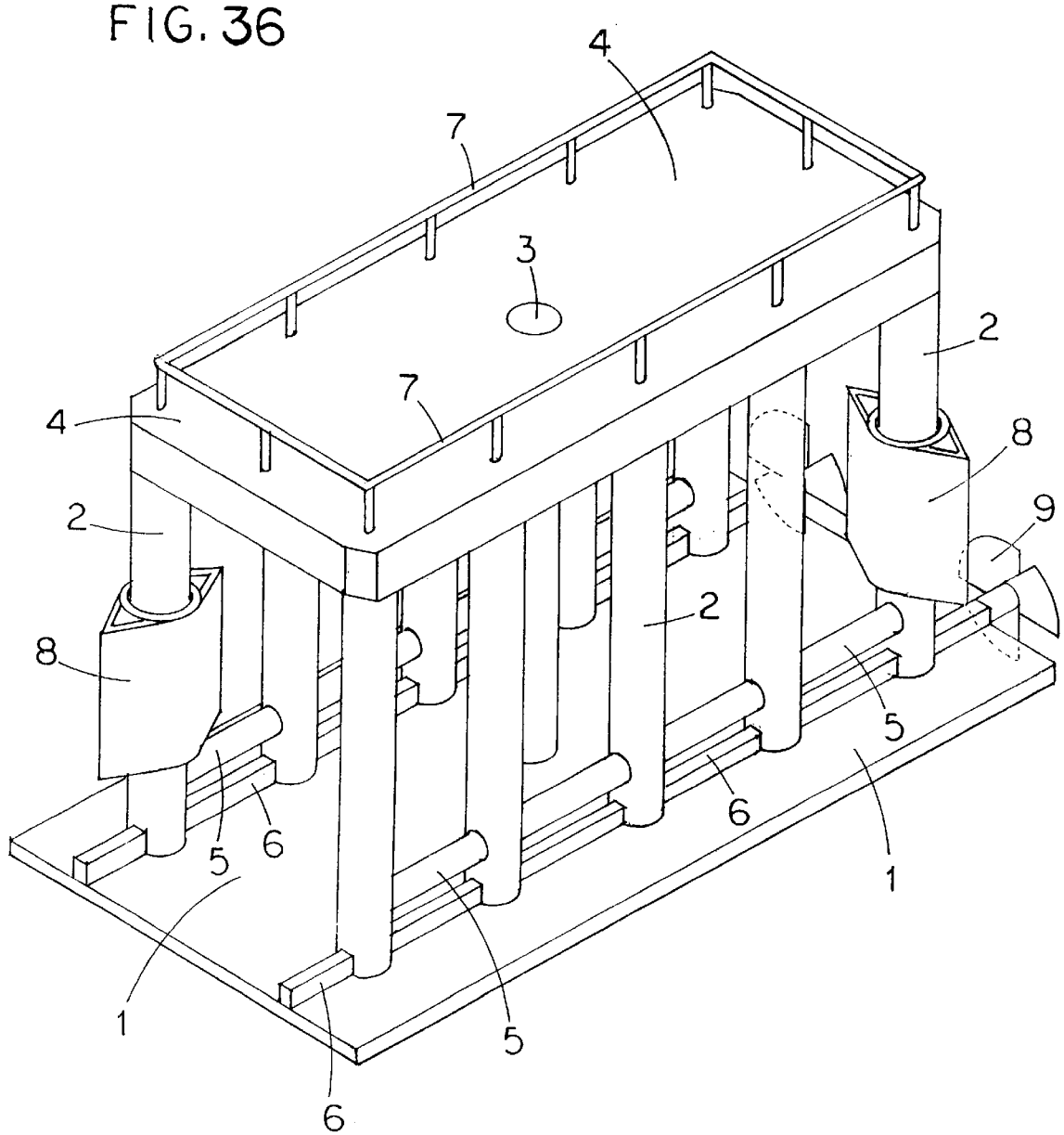
FIG. 36 illustrates a new a least oscillated ocean platform lifted above the water by floater pipe posts, using the wideface anti-oscillation fluid resistor.

FIG. 36 illustrates the embodiment of a new concept of a least oscillated ocean platform 4 lifted above the water by a plurality of floater pipe posts 2 that are attached down to a wide face fluid impeder anti-oscillation resistor 1 in the deep still water. It should be noted at this point of the basic principle of erecting a stilt house on the ocean using floater pipes as stilt posts that is least oscillated by the water waves. The smaller is the diameter of the floater pipe post, the least is the magnitude of buoyancy variation imparted to it by the ocean waves, hence, the ideal floater stilt post is the smallest possible diameter pipe post. In order to compensate for the required buoyancy of the post to carry the house above the water, the pipe post is made long enough to extend down into the deep water to provide enough water displacement, or if the water is shallow, then it wise to make the stilt post into a short one but there must be a bundle of short floater pipes, similar to part #12 of the herewith FIG. 35, attached to the stilt post at a point just below the water surface of the valley cycle of the large water waves so that this floater bundle of pipes is hidden under water and therefore does not get involved with the water waves, hence, the floater pipes 5 are provided under water to add buoyancy to the stilt post 2 The additional floater pipes 5 may be filled up with water when the load platform 4 is light in order to maintain the desired elevation of the of the platform 4 above the water because the midpoint of the wave splitter 8 must always be at the average water level. The water splitter 8, aside from eliminating the impact of waves upon the stilt post 2, is also used a steering rudder to redirect the movement of the whole apparatus. The lower half portion of the water wave splitter 8 is permanently filled up with water to eliminate its buoyancy in order to fix the elevation of the platform 4 above the water, while the tipper half of the wave splitter 8 is open top and bottom with its sides having perforations in order to allow the water to get in and out said splitter 8 to eliminate its buoyancy but does not add weight,—the purpose of this is to prevent the splitter 8 from contributing oscillation upon the ocean platform 4. After solving the all the oscillation problems via the stilt posts, the wide face fluid impeder antioscillation device 1 is attached to the bottom end of the stilt posts 2 to further solve the water wave oscillation problem upon the platform 4. The platform 4 may be a multistory building for a hotel, for a school, for a laboratory, for nuclear research, ocean research, and various industries. The pipe well 3 is being provided to serve as drilling well for oil and mineral exploration under the ocean. Part 7 is a rail guard around the top of the platform for safety purposes. Part 6 is a structural stiffener for the wide face anti-oscillation resistor device 1. The propeller 9 is provided to make the platform structure 4 travel around the ocean, said properller being double set and made to rotate oppositely against each other in order to make it more effectively powerful, which is the same as the windmill 31 illustrated by FIG. 1 in the U.S. PAT. No. 5,435,259. It should be noted at this point that it is more advantageous to make the ocean platform 2 into a square so that the wide face anti-oscillation resistor device 1 is also a square, and therefore, this wide face device 1 may be made out of compressed air or styrofoam filled floater pipes in order to make it contribute lift upon the platform 4.

Figure 37:
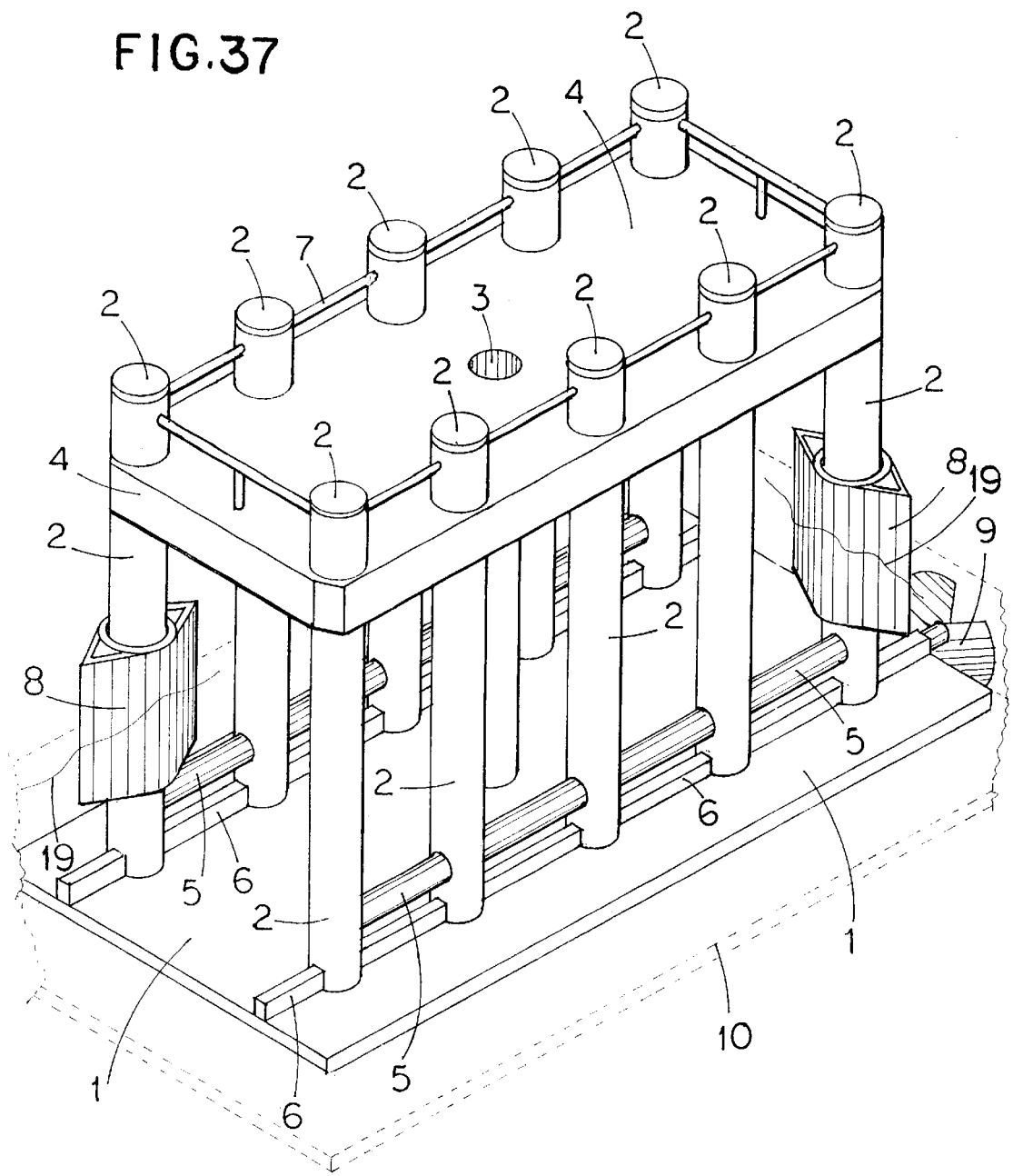
FIG. 37—illustrates a new least oscillated ocean missile station with a platform lifted above the water by means of the pipe missile silos, with wideface.

FIG. 37—illustrates the embodiment of a new concept of a least oscillated ocean missile station with a platform 4 lifted above the water by means of pipe missile silos 2 that act as floater pipe posts 2. This apparatus is the same apparatus as in FIG. 36 in all scientific principles, in all parts and in all functions of every part except that the pipe posts 2, aside from acting as floater carrier device, are also acting or functioning as missile silos that is why the pipe silos 2 are extended above the platform 2, and for the purpose of increasing the resistance against oscillation, the wide face anti-oscillation device 1 is being extended wider to the sides as indicated by the dotted lines 10.

Figure 38:
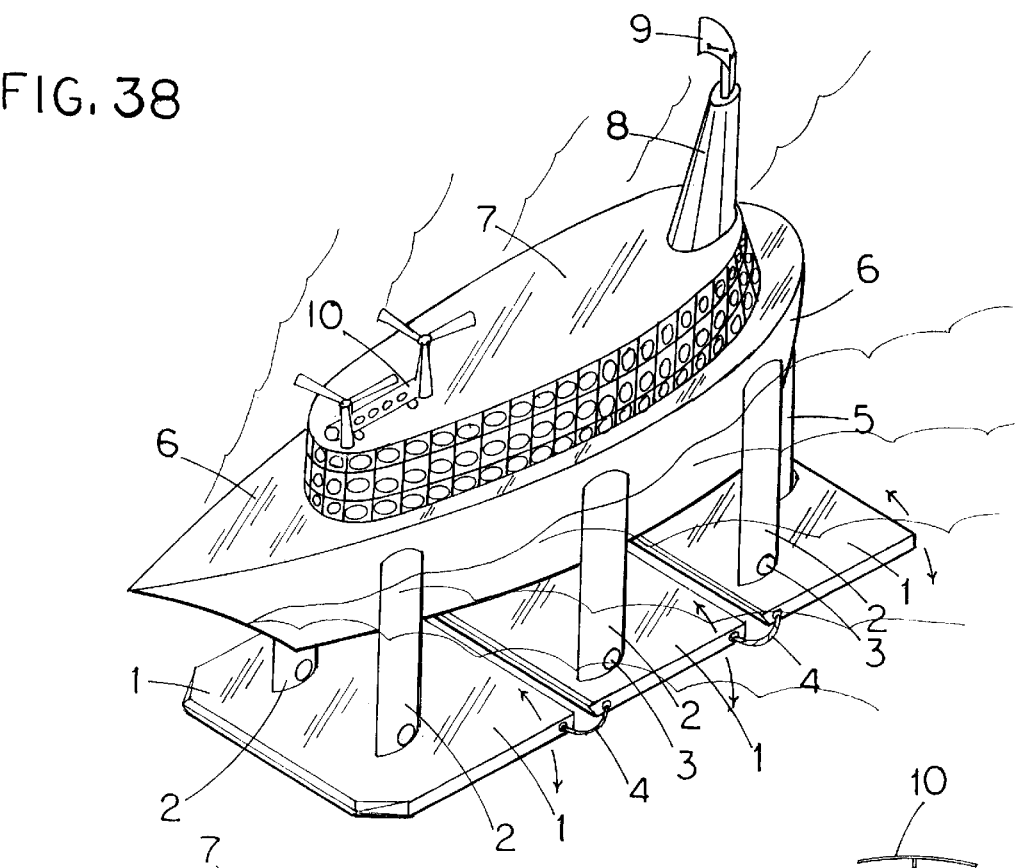
FIG. 38—illustrates a least oscillated luxury ship/boat at the same time being propelled forward by a wideface fluid impeder anti-oscillation resistor.

FIG. 38—illustrates the embodiment of a least oscillated luxury ship/boat 6 by attaching it to a wide face fluid impeder anti-oscillation device 1 which also serve as propeller to push the boat 6 forward by allowing the rear section of the wide face resistor device 1 to limitedly move up and down by the action of the water waves. This is attained by pivotally connecting the front section of the wide face resistor 1 by the pivot connectors 3 to the double bladed vertical sword-like posts 2 that are firmly attached to the boat 6. The oscillation of the rear section of the wide face resistor 1 is being limited by the rope connector 4. The paddling effect of the wide face resistor device 1 comes up during the time when the boat 6 is being lifted upward by the water waves and the rear section of the wide face resistor 1 is tilted down at the same time the wide face resistor 1 is being pulled upward by the boat 6, hence, the still water the deep is being driven to the rear by the wide face resistor 1. When the boat 6 is in the action of dropping down on the valley cycle of the water waves, then the rear section of the wide face resistor 1 is tilted up at the same time said wide face resistor is being pushed downward by the weight of the boat 6, hence, the still water below the boat 6 is being driven rearward by the wide face resistor device, hence, the boat 6 is being push forward by the wide face resistor device 1 during the valley cycle of the water waves. The flat deck 7 on top of the hotel above the boat 6 serves as heliport for air transports such as the helicopter 10, while the tower 8 holds the telecom antenna 9.

Figure 39:
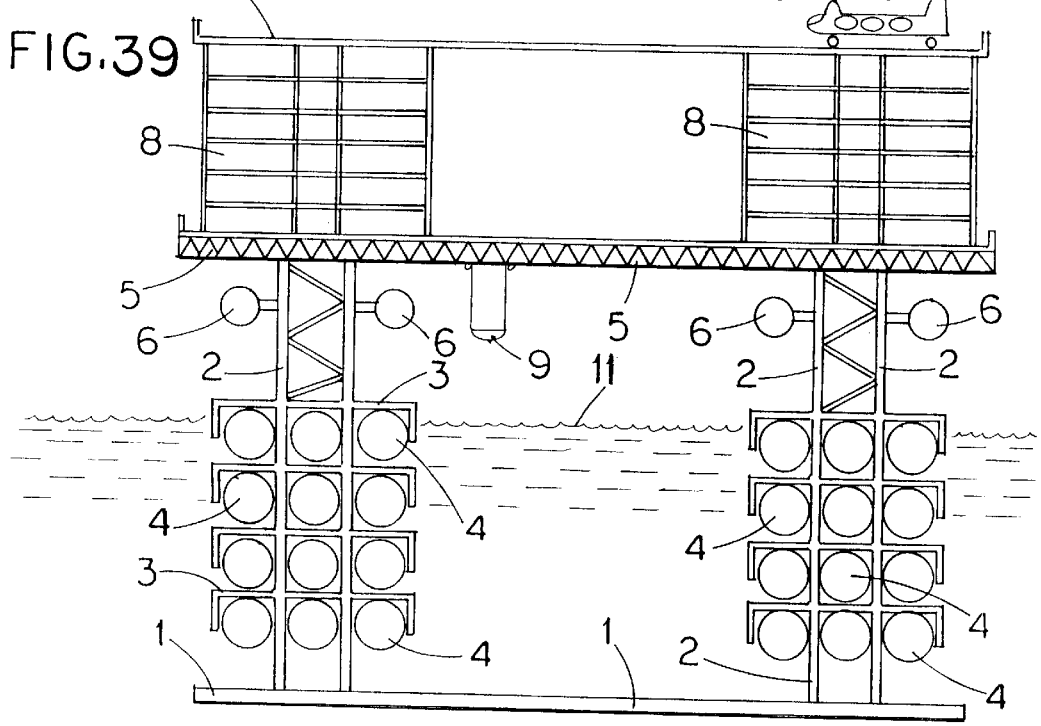
FIG. 39—illustrates a least oscillated ocean hotel building or a college facility lifted above water by stack of floater pipes, with wideface resistor.

FIG. 39—illustrates the embodiment of a new concept of a least oscillated multistory building 8 floating over the ocean, wherein, a multiple stack of floater pipes 4 are assemble together to form a floating foundation by a pair of thin posts 2 that are attached to a wide face fluid impeder anti-oscillation resistor 1, said thin posts 2 are formed into a truss to make it into a strong post which then carry the building 8 high above the water. Part 3 is a connector bracket to hold the floater pipes to the posts 2 in a stack formation. Part 5 is a superstructure that interconnect the two truss posts 2, and at the same time interconnects the two buildings 8 to form a quadrangle hotel building. The flat top deck 7 serves as heliport for the helicopter 10. The part 6 are oppositely rotating turbine jet engines attached to the posts 2 under the superstructure 8 being provided to move the ocean going hotel 8 from place to place. Part 9 is a life boat for safety purposes. The floating foundation stack of pipes 4 is being adjusted from time to time by filling the lower pipes with water so that the top pipes 4 are just mostly submerged, in this way, the buoyancy impaired by the water waves 11 upon the floater pipes 4 is almost eliminated, because the top pipes 4 are just being totally submerged into the water waves 11.

Figure 40:
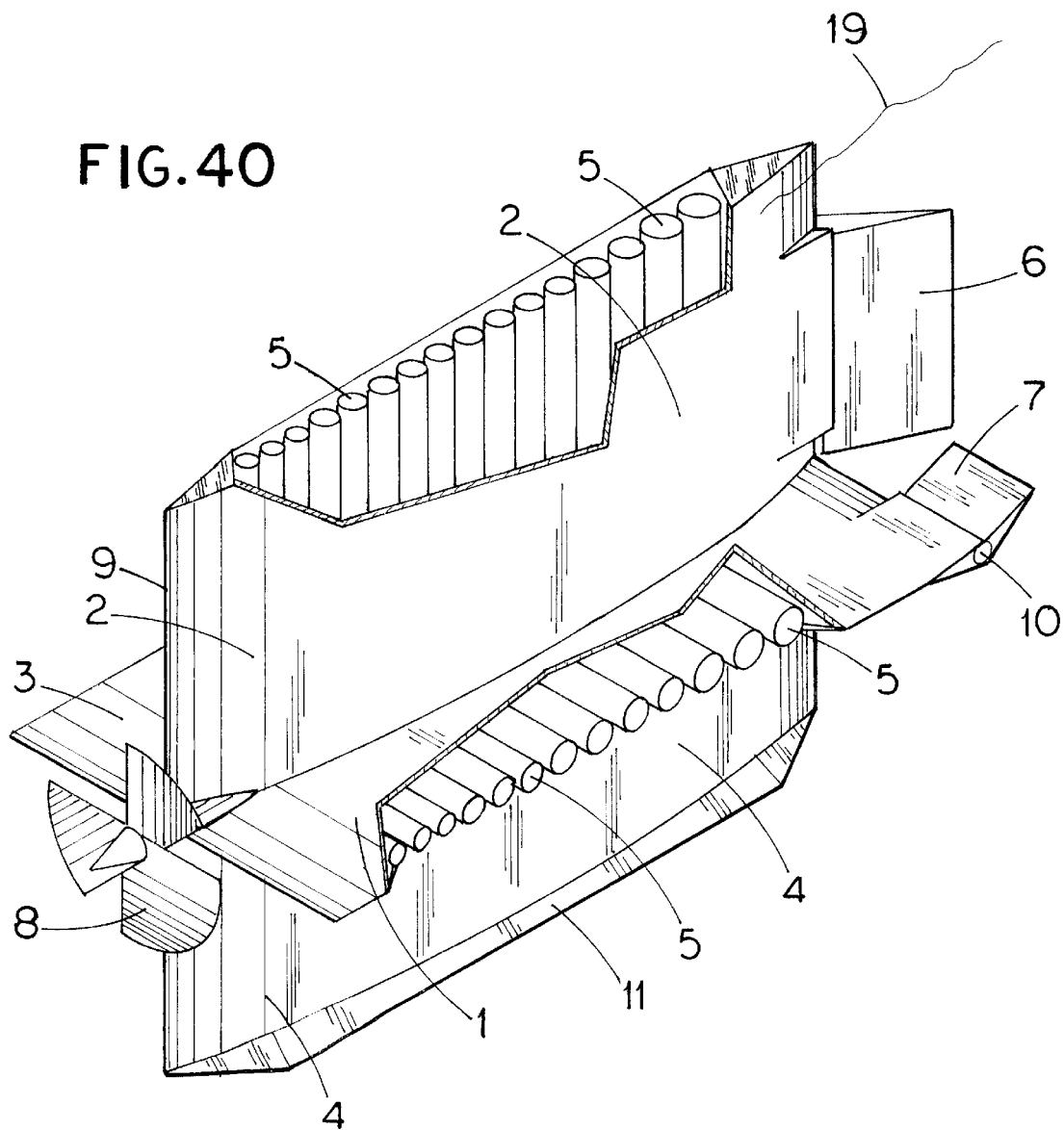
FIG. 40—illustrates a least oscillated quadrantal missile submarine in tile form of the wideface fluid resistor in all four sides made up of missile silos.

FIG. 40—illustrates the embodiment of a new concept of a least oscillated quadrantal missile submarine wherein the wide face fluid impeder anti-oscillation device is made up of an array of missile silos 5 disposed in quadrant 1, in quadrant 2, in quadrant 3 and in quadrant 4, so that the resulting body of the vehicle is in the form of thin wide face walls 1, 2, 3, 4 radially and longitudinally connected to each other to form a right angle cross if cross-sectioned, in such a way that the filing open end of each silo is at the outer edge of said thin walls. The pipe missile silos 5 vary in size starting from smallest pipe at the front to the larges pipes at the rear in order to accomodate a varying sizes of missiles, The rudder tail 6 is provided to serve as steering device to turn the vehicle left and right, while rudder 7 serves as elevator or to spin the vehicle by manipulation of the hydraulic hinge joint 10. This submarine is made slippery thru the water by making the front edge 9 of the quadrant walls into a sharp blade to split the water easily. The propeller 8 is made up of wide face blades for more power and further it may be made into a double set co-axial oppositely rotating propeller for more effectivity. An additional water jet propeller may also be provided at the rear end of this submarine.

Figure 41:
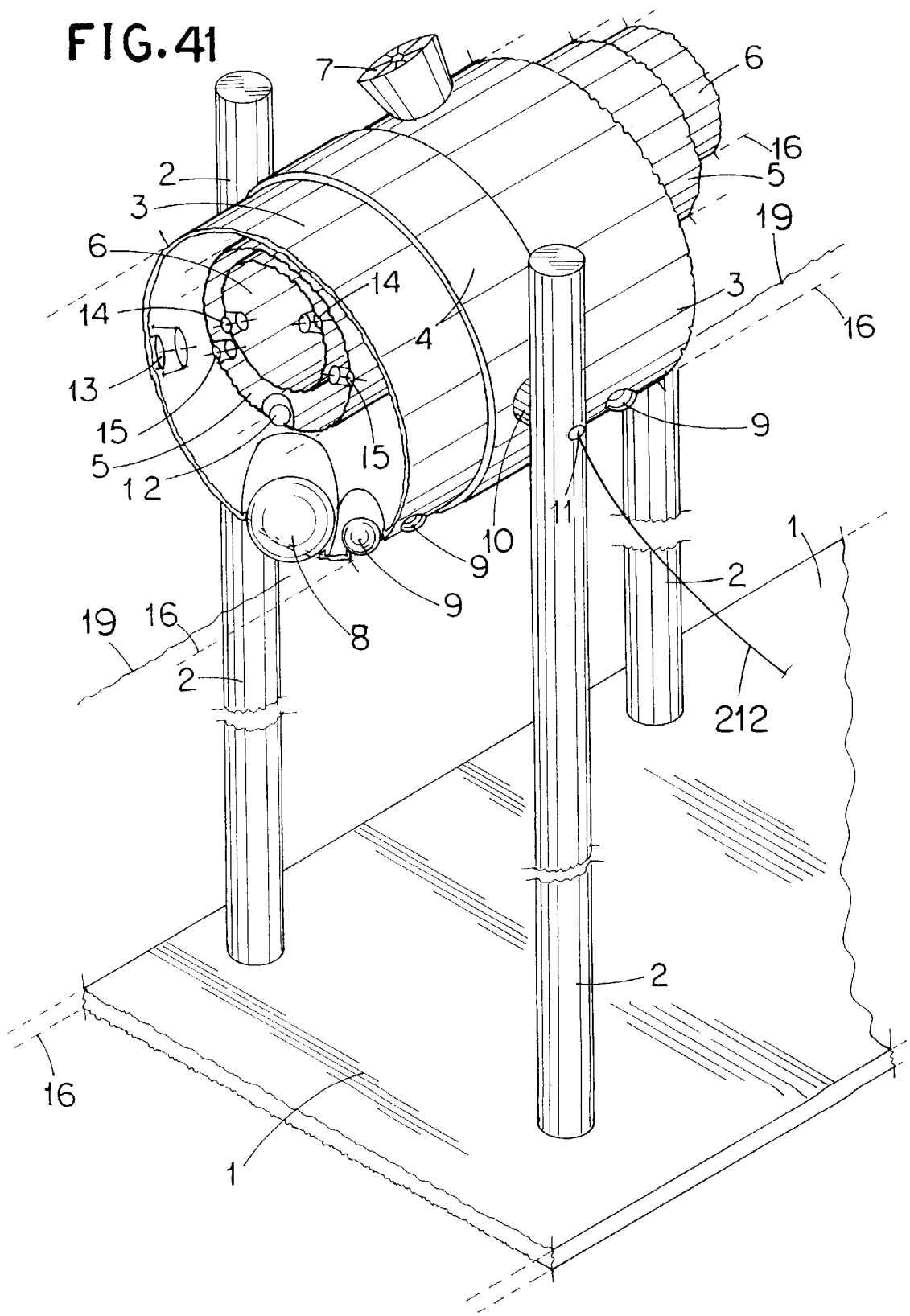
FIG. 41—illustrates a least oscillated floating pipe sea wall that functions as an air compressor by the oscillating water as pistor, using the wideface resistor.

FIG. 41—illustrates an embodimemt of a least oscillated floating sea wall in the form of a long large pipe line 3 that absorbs and converts the energy of the ocean waves into compressed air and electricity. This large pipe floating sea wall 3 is pivotally attached by pivot connectors 10 and 11 to a plurality of floater pipe posts 2, front and back, and said posts 2 being attached to a wide face fluid impeder anti-oscillation resistor 1. The strap 4 holds the large pipe wall 3 to the pipe post 2. As the water wave hits the pipe wall 3 the water, acting as piston, pushes the float ball valves 8 and 9 inward and the water gets into the chamber thereby compressing the air entrapped therein and consequently, the compressed air gets into the first inner pipe line chamber 5 thru the check valves 12 and 15, and further, the compressed air gets into the second inner pipe line chamber 6 thru the check valves 14, and finally, the compressed air find its way out thru the air turbine electric generator 7. The float ball valves 8 and 9 will continue floating to stay out of their seat until all the water that got into the chamber has drop down during the valley cycle of the water wave. The check valve 12 is also a float ball valve in order to drop down any excessive water that got into the first inner pipe chamber 5. The check valve 13 is provided to allow new air refill into the large pipe chamber 3 during the valley cycle of the water waves. Line 16 indicates an indefinite length extension of the floating sea wall 3, 5, and 6. Then, lastly, it should be a standard for this kind of apparatus that a plurality of sling anchor ropes be provided and spacedly attached to the surf side of this floating sea wall 3 and that an anchor block on the ocean floor be attached to each anchor rope, the same as part 212 in FIG. 30 and the same as part 8 and part 9 of FIG. 35, hence, need 10 not to be shown in this FIG. 41.

FIG 42—illustrates an embodiment of a new concept of a least oscillated ocean going luxury boat 5, wherein, the boat 5 is lifted above the water by stack of floater pipes 4 which are prevented from being oscillated by the water waves by means of the wide face fluid impeder anti-oscillation device 1 thru the interconnecting double blade sword-like posts 2 which is paired with another sword-like posts 3 to clip the floater pipes 4 into a single stack pile. The reason for this design of footing—wherein the floater pipes 4 are assembled into a single stack pile is to make it slippery in slicing thru the water waves the water when the boat 5 is traveling. Under the same principle, the posts 2 and posts 3 are made into a double blade sword-like vertical structures is to make these posts 2 & 3 slippery thru the water when the boat 5 is traveling. It should be noted at this point that the floater pipes 4 that are submerged way down under the water waves cannot be subjected to oscillation by the water waves, that is why there should be only one pipe 4 at the surface of the water, and this upper pipe 4 should be buoyancy adjustable in such a way that, when the whole apparatus is in still water, this upper pipe 4 is mostly submerged in water so that the water waves will not oscillate it too much. It should also be noted at this point that one basic principle is to make the floater pipe 4 stay at the average height of the water waves in order not to be oscillated by the water waves, and this can only be done when the floater pipe 4 is very rigid and be of the length equal to at least 3 wave lengths of large water waves, hence, the length of the pipes 4 are made to be at least 3 long wave lenghts.

FIG. 43—Illustrates the embodiment of a new concept of a least oscillated ocean going floating hotel or office building 8, as also shown in FIG. 39, that is lifted above the water by a stack of floater pipes 4 acting as floating footing or floating foundation which is attached to a wide face fluid impeder anti-oscillation device 1 by means of the sword-like posts 2 & 3 which also serve as clip to the floater pipes 4. All basic principles involved in FIG. 42 are also applied in this floating building including the design that this building 8 also floats independently as a boat 5 of FIG. 42 when the floating footing pipes 4 are destroyed or broken. The parts 5 & 6 are provided to serve as bearing upon the pipes 4 and to serve as clip to hold the pipes 4. The flat roof 7 of the building 8 serves as heliport. The most special feature in the design of this floating hotel is the ability to pre-submerge the floating foundation 4 well below the effective level of the water waves to avoid oscillation by means of pulling down the footing 4 thru the anchor rope 11 to the natural rocks 10 on the ocean floor or to a plurlity of any man-made heavy object 10, which may be wide net overlain by rocks, disposed on the ocean floor. This way, the large waves will just be splashing on the sword-like posts 2 & 3, hence, when this building 8 is stationed in one place, the wide face fluid anti-oscillation device 1 may be removed. This new basic principle now opens a new wide horizon for the construction of houses and all kinds of floating structures on the ocean without the fear of worry about being oscillated by the water waves.

FIG. 44—illustrates the embodiment of a new concept of a least oscillated air craft carrier ship or any boat having a thin hull 2 in the form of a double blade 9 sword-like body in order to be slippery in slicing thru the water and in order to have a small buoyancy for every foot height of the hull 2 to minimize oscillation by the water waves, in addition to the wide face anit-oscillation resistor 1 to which the bottom of the hull 2 is attached. The water jet propeller 10, being provided is also a new design in that the nozzles can be turned or steered in all directions in order to steer the boat. Part 5 are missile silos while part 7 is the flight deck. The tower 15 holds the communication antenna 14. The hull 2 and the deck 7 my be constricted to any lenght from 2 to 10 wave lengths of the large ocean water waves, the longer the hull 2 is, the lesser is the oscillation by the surf, and the deeper the hull 2 is, the less it will tilt to the left or tilt to the right. As a good variation to this design, to safeguard against tilting, it is more advantageous to make two or more or at least two of the hull 2 and arrange them spacedly parallel to each other on the same level and attach them to a common wide face anti-oscillation resistor device 1. In this way, the hulls 2 may be made shallow and the wide face anti-oscillation resistor device is then made hollow, to serve as space for anything and to contribute buoyancy to the whole boat, which may be a laminate of crisscrossing floater pipes of various sizes. The wide face anti-oscillation device 1 and the thin hull 2 are made to contain water/air for balancing and to make the whole boat able to dive into the deep water for safety, by the use of compressors and water pumps being provided in various sections of the boat.

Figure 45:
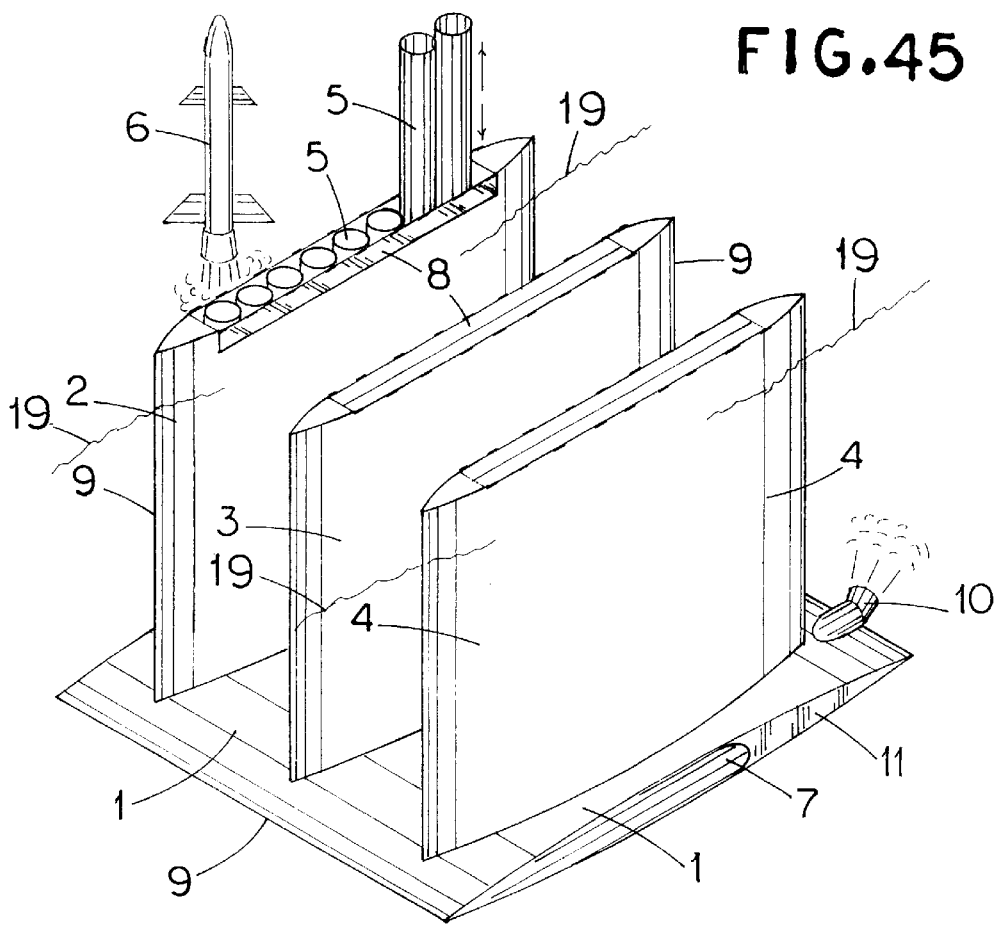
FIG. 45—illustrates a least oscillated multiple hull missile submarine made lip of vertical silo pipes to form thin hulls, with a base of wideface fluid resistor.

FIG. 45—illustrates an embodiment of a new concept of a least oscillated multi-hull missile submarine boat having at least 3 or more thin hulls 2, 3, & 4 spacedly arranged parallel to each other and assembled by attaching them to a common wide face fluid impeder anti-oscillation resistor device 1. The hulls 2, 3, & 4, and the wide face device 1 are made to have sharp front and back edges in order to be able to move forward slippery in the water. Part 7 is the water entrance for the water jet propulsion 10 which is made 360 degrees directional. Part 5 are the missile silo pipes that can be raised up when emptied to be reloaded with another missile 6. The hollow wide face anti-oscillation device may be a storage for reserve missiles 6 to be reloaded into the empty silos 5, Part 8 are the hydraulically operated armor flip cover for the missile silos. Par 11 is the side wall of the wide face anti-oscillation device 1 to show it is now hollow in this new configuration for the additional functions, including adjustment for buoyancy by filling it up with water or compressed in order to float or to submerge the multihull missile submarine.

Figure 46:
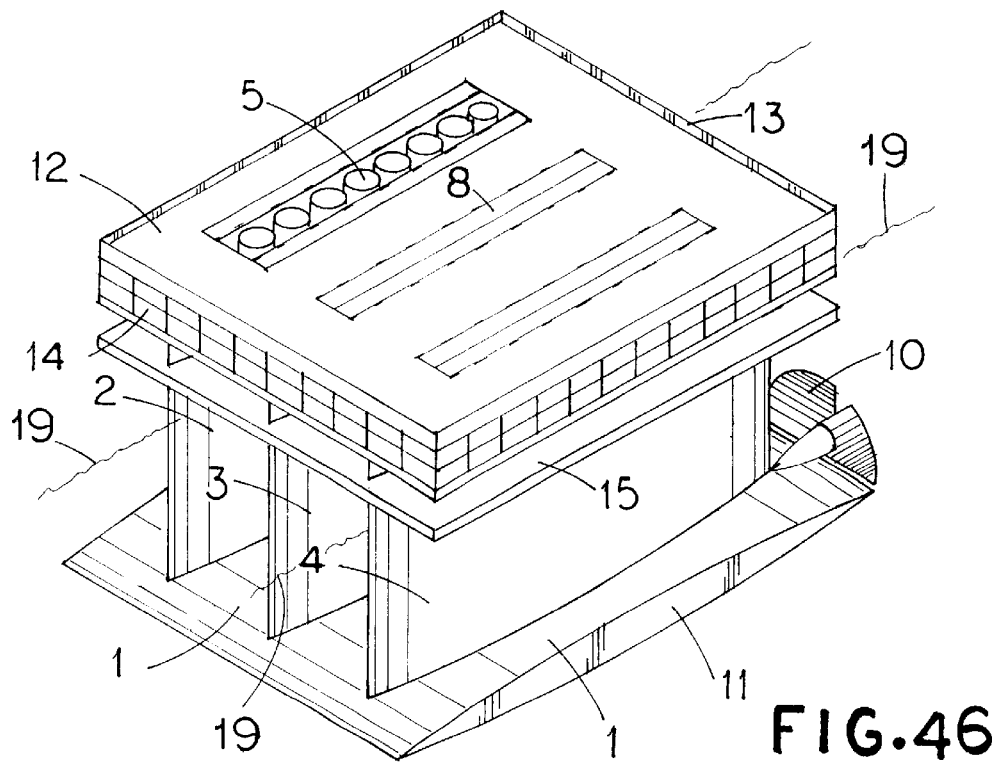
FIG. 46—illustrates a least oscillated multiple hull aircraft carrier missile ship with the platform left afloat while the hull dives underwater as a submarine.

FIG. 46—illustrates an embodiment of a new concept for a least oscillated aircraft carrier 12 which may be in the form of a multi-level flight deck 14 & 15 with a peripheral wall 13, wherein part 15 is lower level flight deck. The hulls 2, 3 & 4 which may be more than 3 or a multiple array of hulls, are the same design as the hulls 2, 3, & 4 of FIG. 45, and the same design as the hull 2 of FIG. 44, which are thin wall-like compo- sites of armor materials, having enough internal space to contain a plurality of vertical missile silos 5, All the hulls 2, 3 & 4 are spacedly arranged parallel to each other in a vertical posture and attached to a common wide face fluid impeder anti-oscillation device 1 to prevent oscillation by the water waves. The reason for the hulls being made thin is; 1. to make the hull less buoyant for every foot of its height getting submerged into the water waves, the same principle as the floater pipe post, in order to minimize oscillation by the water waves; 2. to make the hull into a double blade sword-like device so that it can easily slice thru the water when running at top speed; and 3. to make it fit to contain an array of vertical pipe missile silos. Again, the same basic principles and purposes apply to the wide face anti-oscillation device 1 which is also made into a thin blade but also hollow to contribute buoyant lift to the boat. The buoyancy of the wide face anti-oscillation device 1 is made adjustable by filling it up with water or compressed air to maintain the correct elevation of the building 14 above the water surface, in the same way to float and submerge the multihull submarine of FIG. 45. The building 14 may be made to be able to float independently and be separated from the hulls by completely submerging down the hulls 2, 3, & 4 and the hulls can then act exactly as the submarine of FIG. 45. Part 8 is the armor cover of the silo 5. Part 10 is the wide face bladed propeller which may be made of two sets co-axial propellers and made to rotate opposite to each other in order to provide a more powerful push. The side wall 11 indicates that the wide face anti-oscillation resistor device 1 has depth and therefore it is made hollow to contribute lift.

Figure 47:
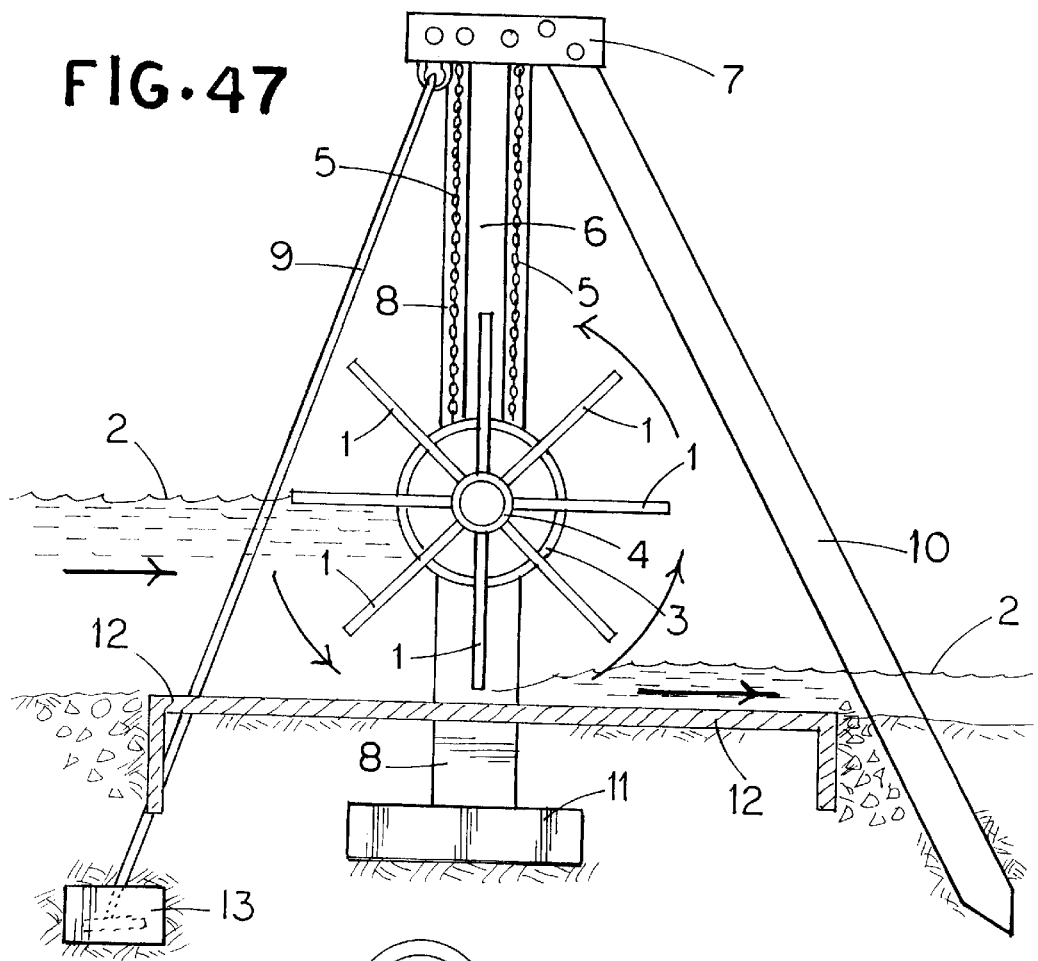
FIG. 47—illustrates a wideface fluid impeder device in the form of a paddle wheel turbine that serves as water dam on a flowing river.

FIG. 47—illustrates an embodiment of a new concept of a Water Dam in the form of a wide face fluid impeder device 1 which is assemble to form a paddle wheel on a flowing river or sea channel to raise the waterhead and to serve as water turbine at the same time. The two drums 3 & 4, serving as hub, are lacked to each other by a circular plate at the drum ends and by a plurality of internal ring plates inserted in between the two drums 3 & 4. A drive shaft is then inserted and fitted thru and inside the drum 4 to transmit power to each end of the paddle wheel. At least 8 pieces of the wide face fluid impeder device 1, made up of structurally stiff/reinforced plates serving as wide face turbine blades, are radially assembled by means of structural frames that are inserted and lock thru the slots of the drum 3, or in any method, in order to build the Dam-Turbine 1. The abutment post 8 is provided at each end of the turbine to hold the drive shaft with bearings and power transfer means. The deep groove 6 is provided on post 8 to hold the drive shaft of turbine 1 to allow the turbine to be moved up and down by the adjustment chain 5 in response to the varying elevation 2 of the impounded water. Thru the head clip 7, the strut post 10 holds the post 8 upright against the horizontal push of the impeded water upon the wide face fluid impeder device 1. The tension bar 9 help keep the post 8 stay upright thru an underground deadman 13 serving as an anchor. The footing 11 is made wide face and buried deep into the ground to prevent the post 8 from being uprooted. The slab pavement 12 serves as wearing surface on the river floor to prevent scouring of the floor and to prevent subsequent destruction of the foundations or footings 11, 13, & 10.

Figure 48:
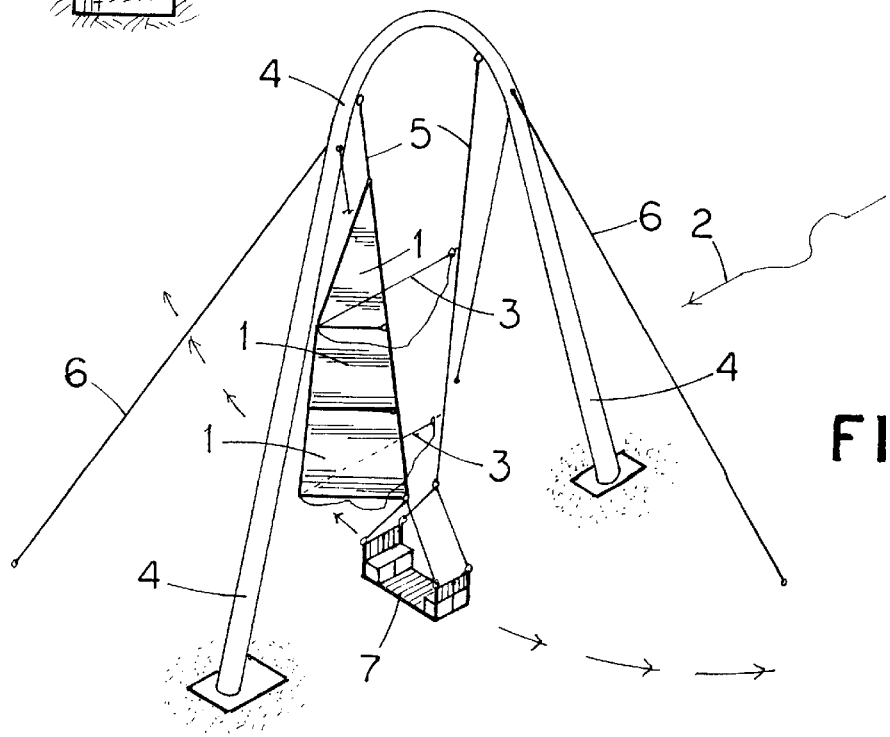
FIG. 48—illustrates a wideface wind sail that is manipulated to drive a swing seat to full swing span.

FIG. 48—illustrates the embodiment of a new concept for a high and tall recreation swing, wherein, the support posts 4 are made very tall so that the rope 5 suspending the swing seat 7 is very long, thereby forming long pendulum that has a period of at least 30 seconds or more, because the longer is the period of the swing, the more exciting it is to ride on. The special feature of this recreation swing is that the wide face fluid impeder device in the form of a wind sail 1 is put to work by attaching it to the rear suspension rope of the swing where it is manipulated as power device by deflecting the wind to the right and to the left by means of the steering rope 3 so that the wing will move to the left and to the right back and forth until the apparatus is brought up to a full swing or to a maximum displacement. An additional special feature of this apparatus is the construction of a light inflatable structural post 4 which is filled up with high pressure compressed air so that it will stand up while in the process of inflating it and the suspension ropes 5 together with the wide face wind sails 1, the steering ropes and pulleys, the seat 7, and the guy ropes 6 are all pare-attached before inflating the posts 4. The inflatable structural post 4 is made up of strong composite flexible materials, including but not limited to kevlar fibers, fiber glass, and nylon cloth, to name a few. This new design for a light structure may not be limited in application such as a post, but it open a new horizon in structural design to build light apparatus, including inflatable bridges and skyways to name a few applications.

Figure 49:
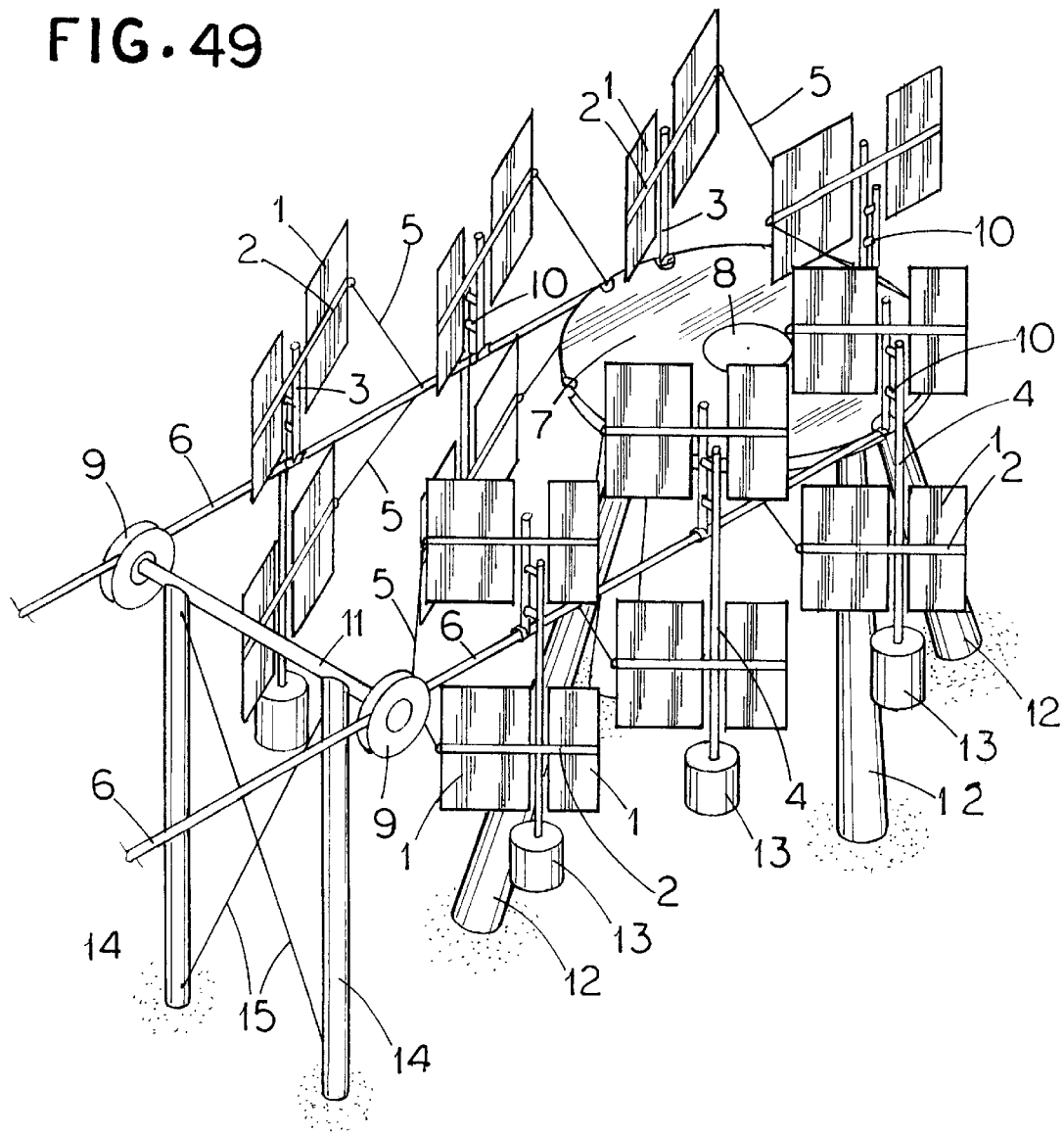
FIG. 49—illustrates a new two level wideface fluid impeder sail carried in midair by a single rope drive chain in a close loop to make a large windmill.

FIG. 49 illustrates an embodiment of a new concept of a two level wide face fluid impeder device in the form of wind sails 1 that are attached to a horizontal axis bar 2 which is in turn attached to an upper vertical mast 3 which holds by connectors 10 the lower vertical mast 4, the lower end of the upper vertical mast 3 being attached by clamp to the aerial cable rope 6 that serves as drive chain to turn the end loop gear wheel 7 that turns the vertical drive shaft 8 in order to form the two level sail windmill in a closed loop of a single aerial rope chain 6. The cable rope chain 6 being intermediately supported by the deep groove roller pulley 9 that is supported by the shaft 11 that rest on the posts 14 which is reinforced by the guy ropes 15. The control rope 5 holds the sails to stay obliquely against the wind in order to tack the sail 1 and drive the power chain 6. The connector 10 serves as spacer connector to dispose the lower mast 4 outside the deep groove roller pulley. The weight 13 is provided to keep the masts stay upright at all times and at all conditions. The upper sail and the lower sail must be equally wide face and equidistant from the drive chain 6 in order to be balance with the wind to keep the mast 3 & 4 stay erect. The most special feature of this windmill is the design of the sail 1 wherein the horizontal axis 2 of the sail 1 contains spring in order to allow the wide face sail 1 to close like a Butterfly Wing in order not to over load during high winds so that there is no need to stop the windmill during bad weather, thereby taking advantage of the high winds. The post 12 supports the end loop gear wheel 7. The splicing of the mast 3 & 4 is also a new design which permits two levels of sail 1 that can pass thru the intermediate support deep groove roller pulley 9.

Figure 50:
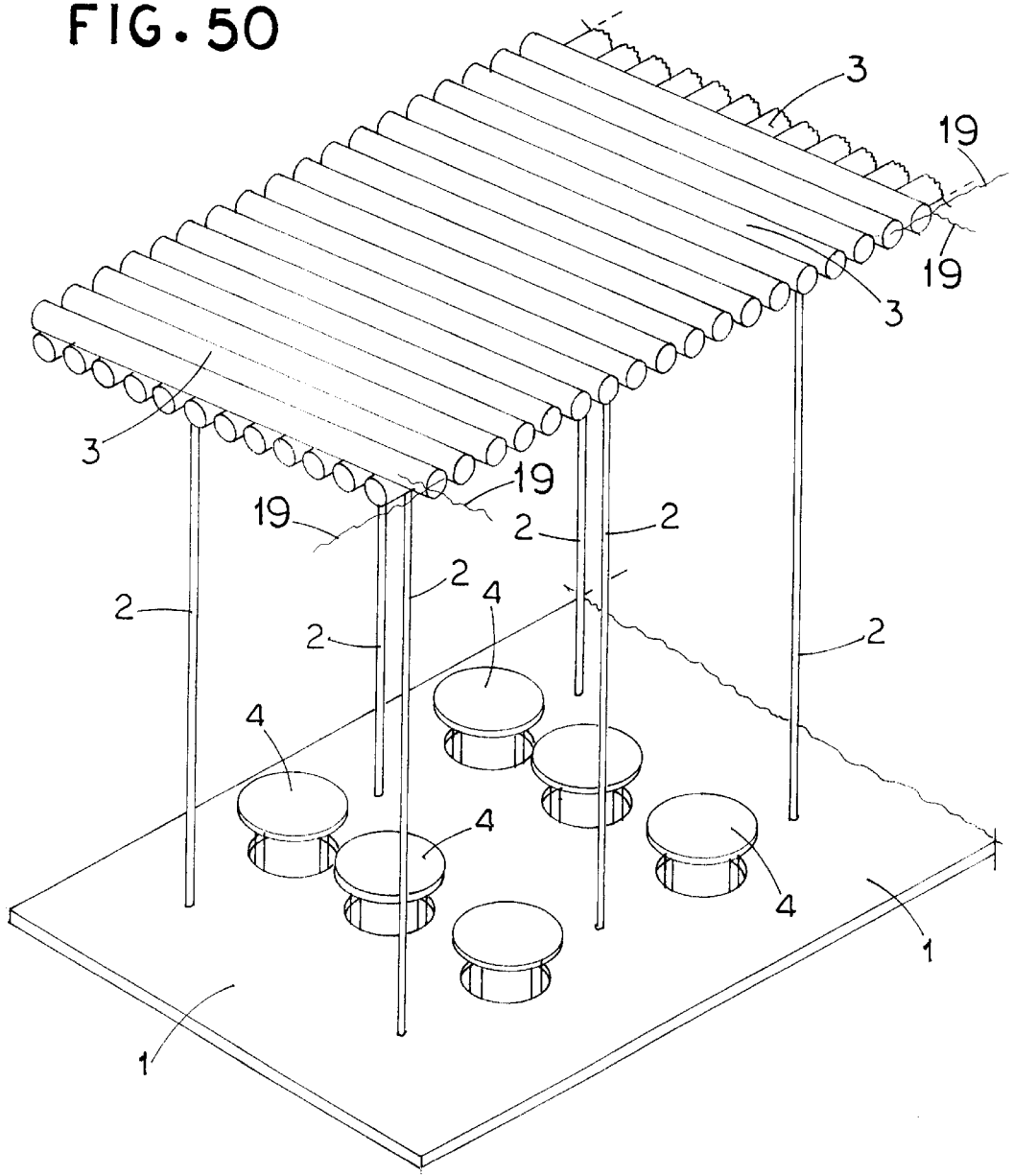
FIG. 50—illustrates a new wideface water wave suppressor in the form of a multilayer of cres-crossing array of floater pipes using a wideface resistor.

FIG. 50—illustrates an embodiment of a new concept for a new function for a wide face fluid impeder device where it serves as a floating water wave suppressor 3 that is tied down, by means of a plurality of ropes 2, to a submerged wide face fluid impeder anti-oscillation resistor 1 in the deep still water. The newly designed upward check valve 4 are provided to the wide face anti-oscillation resistor 1 which is made heavy in order to be able to drop down fast enough during the valley cycle of the water waves. The floating wide face water wave suppressor 3 and the submerged wide face anti-oscillation resistor 1 may be reinforce by kevlar fibers or fiber glass in composite construction in order to make them stiff against flexural stress. The buoyancy of the floating wide face suppressor 3 is controlled by filling up the pipes with water so that it will be just mostly submerged or just barely floating in order not to make too much pull upon the anti-oscillator 1. The floating wide face wave suppressor 3 is made up of crisscrossing array of pipes and the pipes are filled up with high pressure air and water to make them stiff enough.

There are many available variations in the use of the floating wide face water wave suppressor 3, in that it can be made into an independent floating platform out on the ocean without the need or use of the wide face anti-oscillation resistor 1, provided, that the length and the width of the floating platform 3 must be at least 3 or more wave lengths of the long water waves, and provided that the platform is made very stiff. It should be noted at this point that, in designing and constructing a wide and long, least oscillated, independent floating platform on the ocean, we should not miss the fact that the outer edges of the platform is all the time subjected to overhangs or cantilevers to as much as the length of the large water waves, and this cantilever must be supported by the floating power of the remaining, at least 75% of the body of the whole platform that rest at a horizontal posture on the water under it, which cantilever requires stiffness of the platform, hence, the platform must be very thick/deep.

FIG. 50—further indicates a new opportunity to use the underwater wideface anti-oscillation resistor 1 for an agricultural plant bed under the ocean surface by erecting walls around its edges to make it able to contain fertile soil and plant it with seaweeds to produce an underwater forest which is the most vital support for marine life. The floating platform 3, when made up into a multilayer crisscrossing pressurized pipes and is made to have length and width equal to the more than five times the length of the ocean waves, indicates a new design for a platform that supports a concrete pavement over it in order to construct a floating airports, dwellings, recreation and sports, military outposts, and floating industrial facilities.

Figure 51:
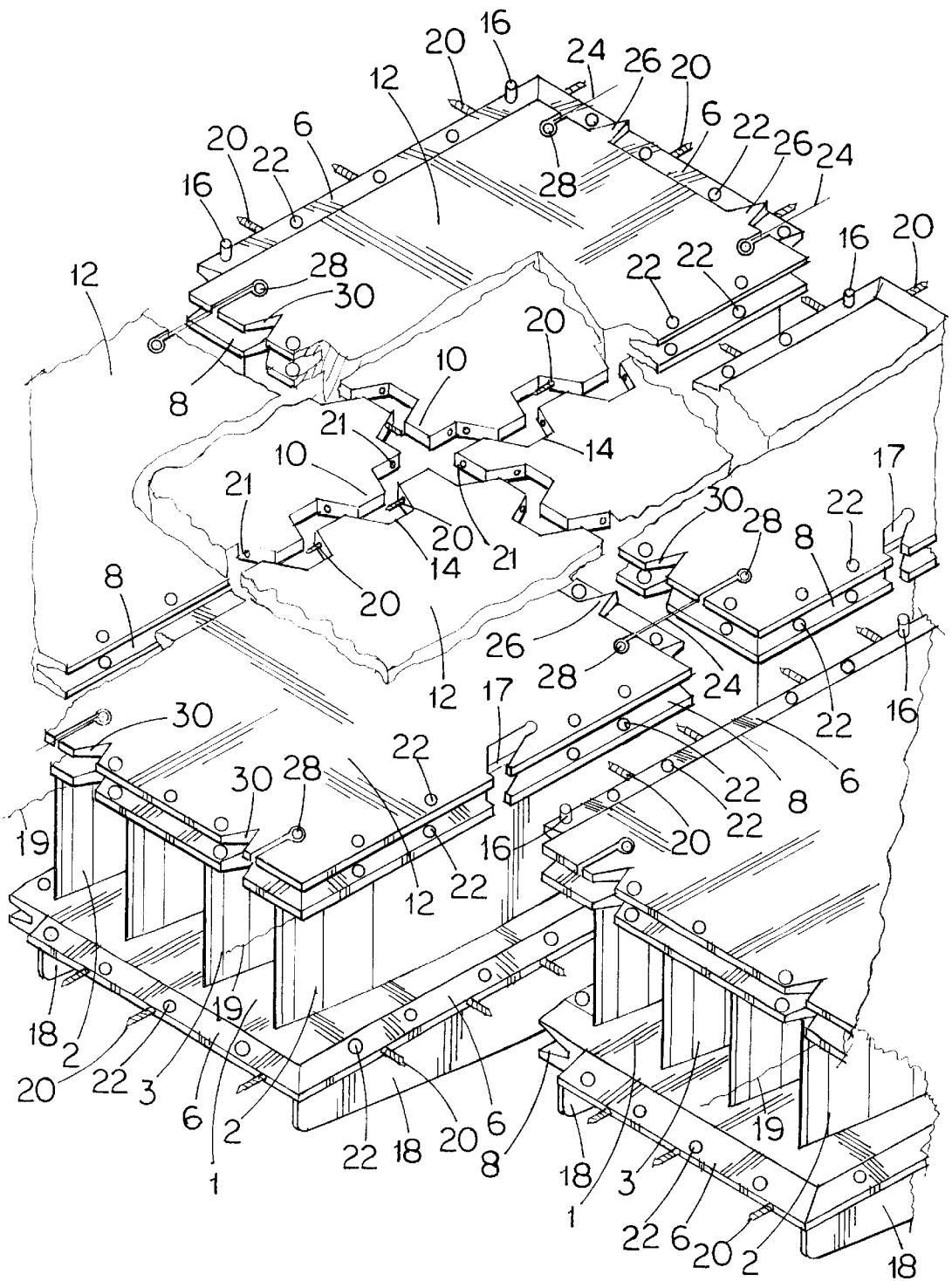
FIG. 51—illustrates a plurality of multi-hull submarine/ aircraft carrier boats being interlocked connected together and transformed into a large airport.

FIG. 51—illustrates a new design for a least oscillated wideface multi-hull aircraft carrier boat, similar to FIG. 45 and FIG. 46, wherein, the boat is designed to have the ability of a transformer vehicle, so that a plurality of this boat is transformed into a large airport floating on the ocean in few minutes, and then dismantle the large airport into separate individual boats. These boats are designed to function as an actual submarine to hide from enemy attack, and also function as a high speed boat on skii using the flat base 1 as skii board on top of the water. With the interlocking keys, such as tongue 6 and groove 8 around the sides of the top deck 12 and around the sides of the wideface anti-oscillation oscillation bottom base 1, the sides of one deck 12 fitts to interlock with the sides of the deck 12 another boat. The wall 18, below the bottom flat base 1, which is the same as the downward wall 18 in FIG. 1, confines the water pressure under the boat and prevents the sideout splashes of water when the boat is peeding up on top of the water. During the process of matchinig, the boats are jointed together end-to-end by having the key tongue 26 get into the key groove 30, and immediately following the rope 24 is hooked into winch 28 and tighten the rope 24 to make the tongue 6 get in fully into the groove 8. Then the skrew dowels 20 are turned coming out of tongue 6 and driven into the the screw holes inside the groove 8. Then the key holes 22 are filled up with portable key dowels. Then another end-to-end jointed boat is matched to the first end-to-end jointed boat by joining them side-to-side using the permanent key post 16 of several boats get into the key holes 17 all at the same time by synchronizing the speeds of the resulting long boats. Then again the screw dowels 20 are driven into the screw holes inside the groove 8, and the key dowel holes 22 are filled up with portable key dowels. During ordinary sailing, the water level is at the line 19, but during high speed sailing the water level is below the wideface anti-oscillation resistor 1, and the whole large airport will be sailing at high speed without being oscillated by the water waves. The outer hulls 2 are designed to be the floaters while the inner hulls 3 are designed to be loaded with missiles in vertical posture to make the boats more stable. The construction and operation of the thin hulls 2 & 3 and of the common base plate 1 has the same design principles as those of FIGS. 44, 45, and 46.

Figure 52:
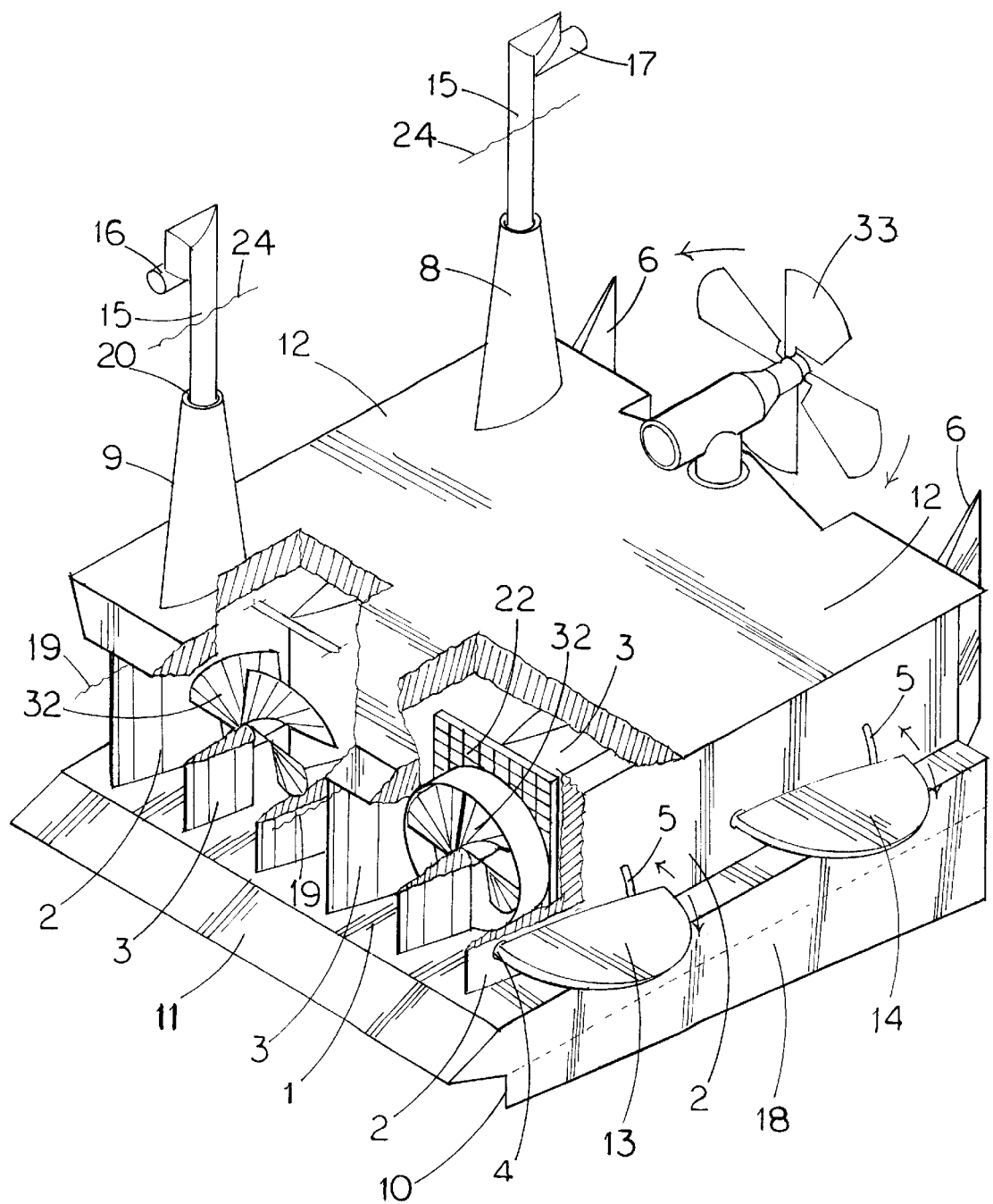
FIG. 52—illustrates a multi-hull submarine/carrier boat having ventillation towers.

FIG. 52—illustrates a that cruise on top of the water as well as cruise underwater, comprising: a wideface bottom base 1, a multi-hull 2 & 3 that are mounted/communicated on the wideface bottom base 1, a flat top deck 12 mounted/communicated on the top of the thin hulls 2 & 3, a front ventillation tower 9 and a rear ventillation tower 8 that are mounted/communicated on top of the flat top deck 12, a telescopic ventillation extension 15, mounted into tower 8 & 9 to provide fresh air circulation inside the boat when it is cruising underwater specially when there is storm and the ocean is rough. The ring seal 20 prevents water from getting into the tower 8 & 9 while the extension pipe 15 moves up and down. Fresh air gets into the inlet 16 and the used dirty air exits thru the outlet 17. The wideface propellers 32 & 33 work together when the boat cruises on top of the water as well as when cruising underwater. The wideface propellers 32 pump water to produce a water jet to the rear of the boat when cruising underwater. The rudder tail 6 steers the boat left/right while the wings 13 & 14 control the elevation of the boat up or down by hydraulic system thru the slot 5. The one-way window valves 22 alow water going into the rear but do not allow water to back off when the wideface pump 32 pressurize the water for the water jets to the rear. The pointed nose 11 of the wideface base 1 and the pointed nose of the pressure containment wall 18 split the water to reduce impedance of the water. The construction and operation of the thin hulls 2 & 3 and the common wideface base plate 1 has the same principles and structural designs as those of aforementioned FIGS. 44, 45, and 46.

Figure 53:
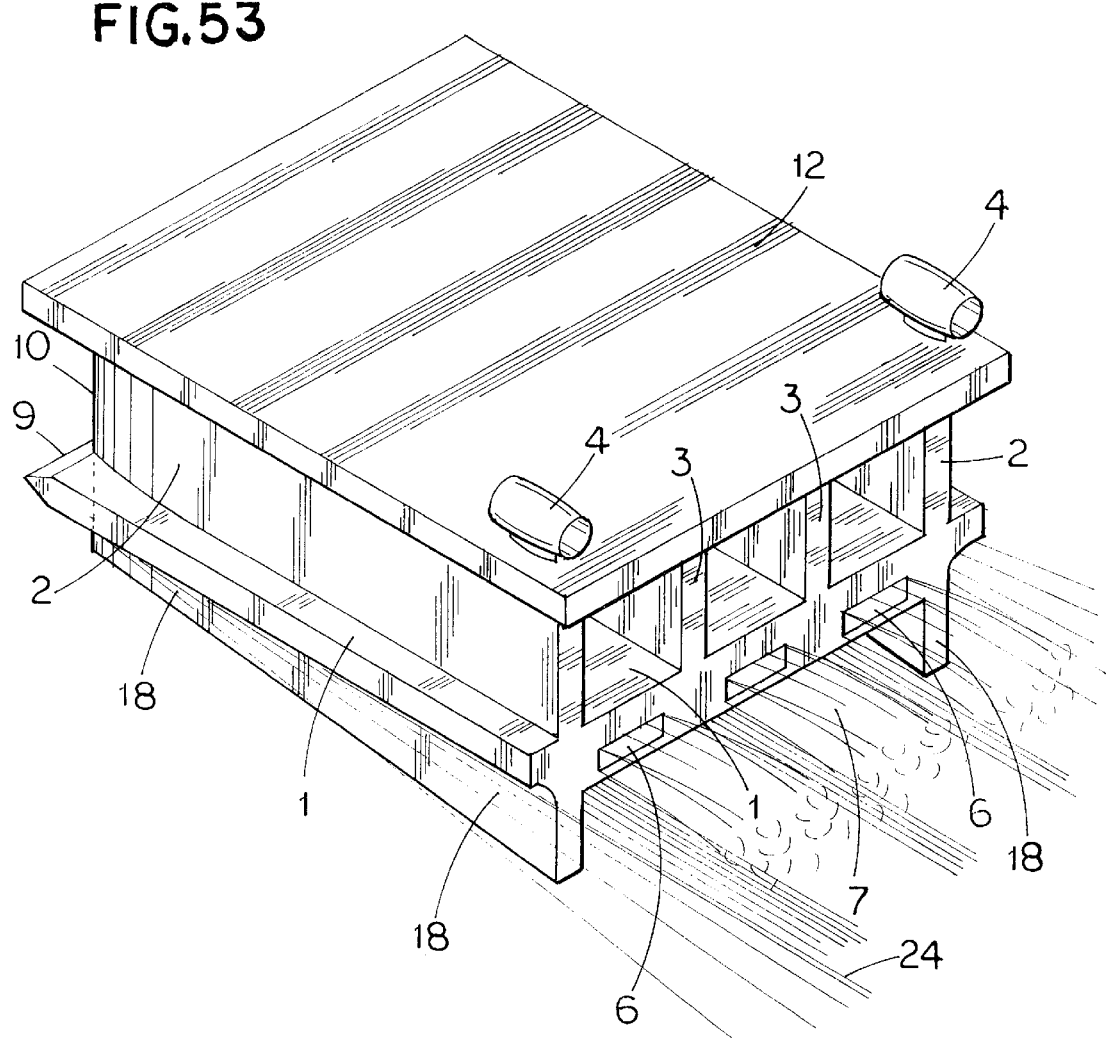
FIG. 53—illustrates a multi-hull submarine/carrier wideface bottom boat that skii on water surface at top speed by means of water jets.

FIG. 53—illustrates a boat that ski on top of the water by way of its wideface base plate 1 with a sharp nose 9 which can be tilted up to make the base plate 1 come out of the water. The thin hull 18 below the base plate 1 is a floater/sinker device by alternately filling it up with compressed air or water at the same time the hull 18 serves as containment wall to keep the water pressure under the boat instead of splashing sideout. The outer thin hulls 2 serve as floaters while the thin hulls 3 serve loaders/cargo hulls. The flat deck 12 is mounted on and communicated with the hulls 2 & 3 to provide free access from the deck 12 to the hulls 2 & 3 and into the interiors of wideface base plate 1 and into the containment hull/wall 18. The hulls 2 & 3 are provided with pointed nose 10 to reduce impedance of the water/air, and the jet engines 4 provide cruising speed of the boat. Parts 6 are the nozzles for the water jets 7, and 24 is the level of the water surface when the boat is on skii cruise.

Figure 54:
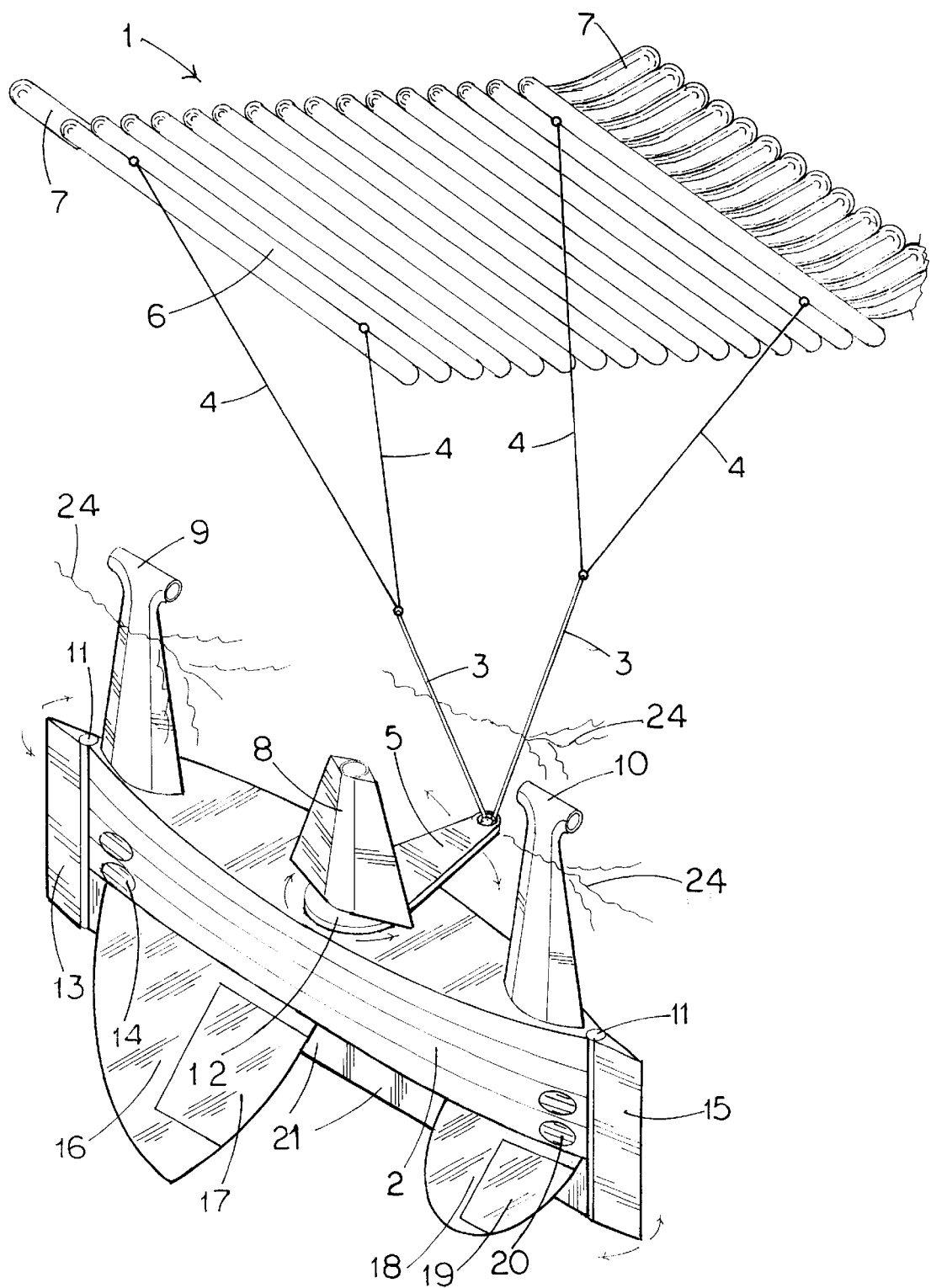
FIG. 54—illustrates an underwater boat having ventillation towers, elevator wings, and being pulled by a flat wideface balloon kite.

FIG. 54—illustrates the construction of a stift wideface inflated kite 1 used to impede/deflect the wind to convert the energy of th high altitude wind. The kite 1 is made up of crisscrossing cylindrical/elongated balloons, wherein, the lower layer balloons 6 are assemble side-by-side along the wind, while the upper layer cylindrical/elongated balloons 7 are assembled side-by-side across the wind and attached to the top of and across the lower layer 6, and further, the end sections of the balloons 7 are bent upward to make an upward tilted wing tip across the wind to provide stability of the kite 1. By means of the kite sling ropes 4 the kite 1 is tied to the anchor rope 3 which are inversely elongated and shortened to tilt the kite left/right. The ancho ropes 3 are attached to the anti-overturning bar connector of the underwater boat 2 that avoids the turbulence of the water waves by sailing underwater. The mast 8 keeps the connector bar 5 squarely with the boat. The fresh air enters the boat thru the inlet tower 9 and the used air exits thru the outlet tower 10. The towers and the mast are provided with friction reducing sharp edges to split the water. As the boat may sail foreward and rearward, the front rudder 13 and the rear rudder 15 are provided to the boat thru the hinge joints 11. The boat is also propelled by water jets that come out thru the nozzles 20 after getting into the inlet 14, The anti-overturning connector bar 5 turns around the mast 8 thru the bearing 12. The wings 16 and 18, by way of the flap wings 17 and 19 are manipulated to keep the boat 2 uptight and to keep the boat 2 in correct submergence, or to make the boat 2 come out of the water. The thin keel wall 21 prevents the boat 2 from being pull sideward by the kite 1. The line 24 is the normal level of water in relation to the boat when cruising under water.

Figure 55:
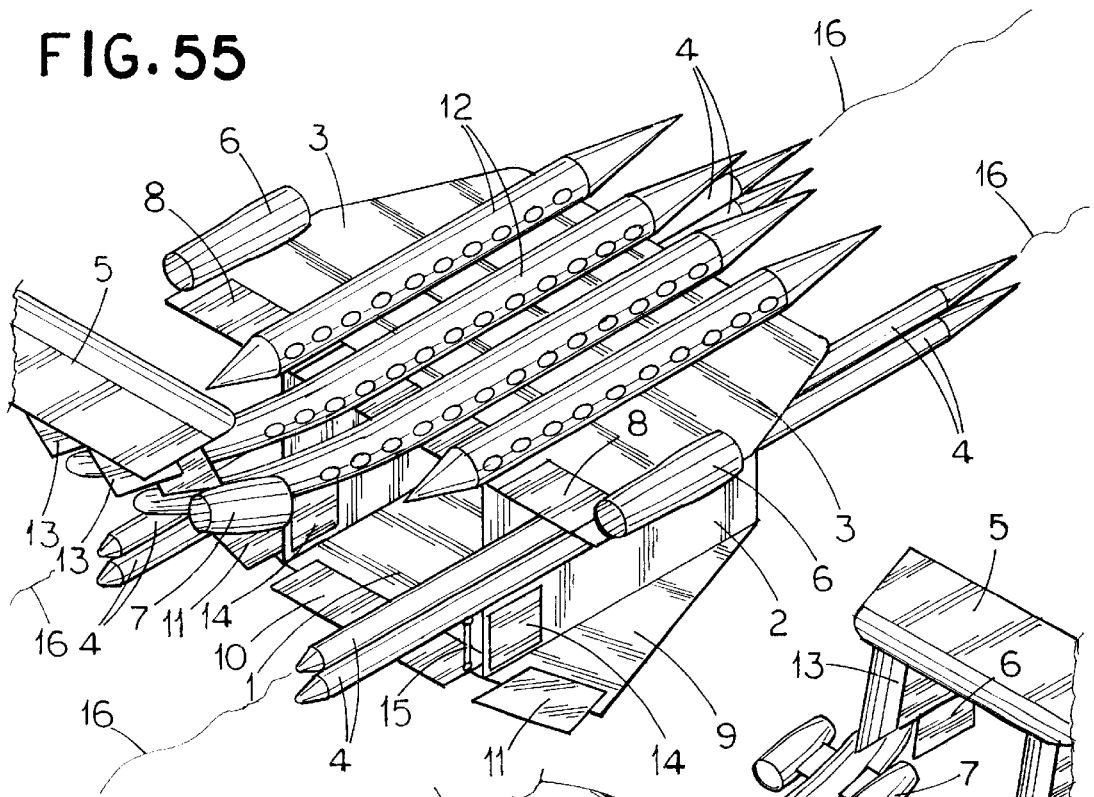
FIG. 55—illustrates a multi-body speed boat that sits on water by floater pipes and cruise at top speed above the water by way of an underwater wideface skii, and also flies up in the sky.

FIG. 55—illusttrates a wideface two level wing 1 & 3 multiple passenger-capsule jumbo jet boat/airplane 12 that: lands on water, cruise on wideface skii on water, and fly up in the sky by way of a plurality of jet engines 6 attached to the upper wing 3 and engines 7 attached to the tail of the airplane. This vehicle is hereby named "Mababang Lipad Airplane". The wing 3 should be made as wide and broad as possible to make it function as a parachute for the airplane in the sky when the engine stop running. The flap wings 8, 10, & 11 add lift to the wings 1 & 3, and further the flap wings 8 & 11 are manipulated to tilt the airplane left/right. The stack pipes 4, which are made long enough to cover two wave lengths of the ocean waves, are made large enough to float/carry the whole airplane above the water when landing on water. The free-pin connected bar 15 inter-connects the float pipes 4 to the flap wing 10 to automatically elevate or to submerge the water-wing 1 in an effort to maintain the elevation of the water-wing 1 underwater when the airplane is skiing on the water. It should be noted at this point that the water-wing 1 should stay underwater when the airplane is acting as a boat cruising on water so that there is no splash created on the water,—meaning the ski is silent underwater. The vertical flap wing 14 helps in steering left/right and further, the wings 14 serve as brake underwater. The side water-wings 9 are tilted up to serve to help in automatic aerodynamic balancing of the airplane. The vertical walls 2 are attached to the bottom of wing 3 and attached to the top of the lower wing 9 & 10. The walls 2 serve as posts that rest on the water-wing 10 to lift the airplane above the water. The tail wing 5 serves to elevate or dive the airplane, while the tail rudder 13 serve to steer the airplane left/right. The jet engines 7 are tilted down to counter act the lower line of action of the impedance force of water upon the water-wings 1, 10, & 11. It should be noted that the tail of the airplane should be longer to move the engines 7 further to the rear in order to effectively counter act the out of line force of the water impedance upon the water-wing 1, 10, & 11. The line 16 is the normal elevation of the water surface when this boat is cruising on water. Note that the upper float pipe 4 should be mostly submerge for less oscillation.

Figure 56:
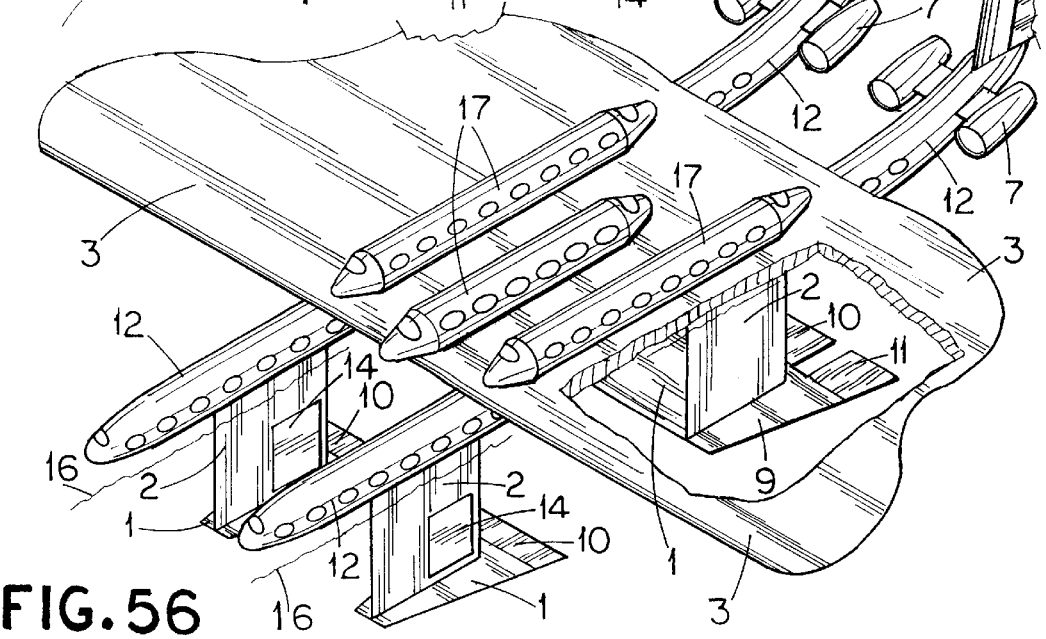
FIG. 56—illustrates a double body double story airplane/ boat that sits/lands on water and cruise at top speed above the water by an underwater wideface skii, and also flies up in the sky.

FIG. 56—illustrates an airplane/boat having: a wideface butterfly shape wing 3 that serves as parachute for the airplane when its engines 7 stop running while flying up in the sky; a lower level wideface water-wing 1 being used by the airplane/boat to ski on water; an upward tilted side water-wing 9 for balancing; a pair of wall-posts 2 that rest on the water-wing 1 and lift the airplane/boat above the water when the boat is skiing on the water. The main double body 12, which is similar to a catamaran type boat, rest/float on the water when this boat is not running that is why the rear end of the main body 12 is bent upward so that the jet engines 7 attached thereto do not get into the water. It should be noted at this point that the airplane/boat is made double body 12 so that it is stable when it lands on the water without the need for a floating stabilizer attached to the outer tip of the wings. The second story passenger capsules 17 is mounted directly on top of and communicated with the main body 12 so that the passengers in the body 12 can go upstairs to the see a better view of the sky. The vertical flap wing 14 serves for steering the boat and so serve as brake underwater by swinging it perpendicular to the water current. The vertical flap wing 6 serves to deflect the air jet exhaust of the engine in order to steer the boat left/right. The advantage of having a separate water-wing 1 with the flap wing 10 at the far front of the boat is that it acts like the front wheel of a car which provides easy steering left/right and easy maintenance of the water elevation 16 in relation with the body 12 which should not touch the water when cruising. The rudder tail 13 steers the airplane left/right while the wideface flap tail wing 5 controls the angle of flight elevation. The center top capsule 17 serves as the pilot's capsule/office containing all the necessary radio communications to fly and manage the plane.

Figure 57:
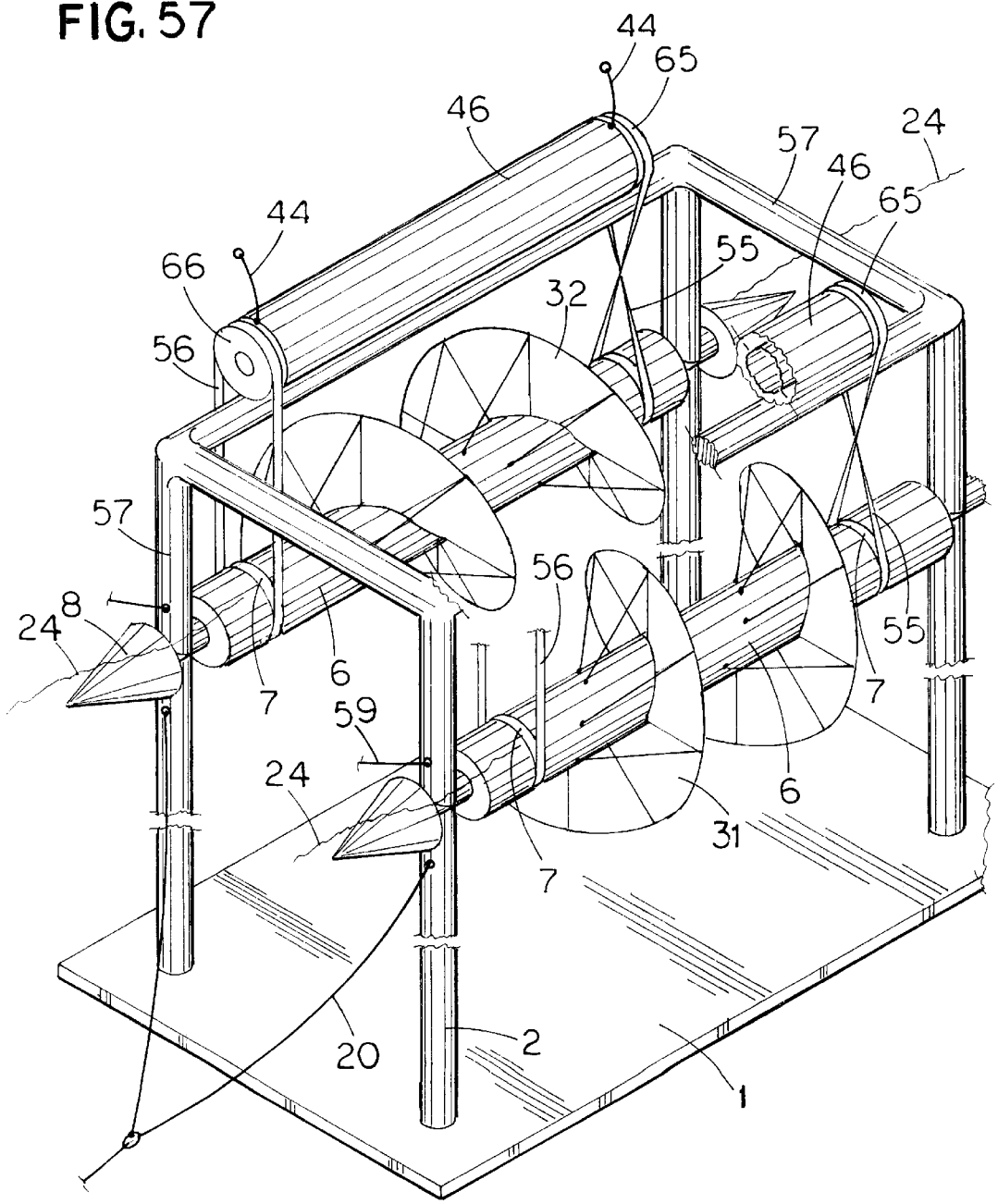
FIG. 57—illustrates a self floating auger-type ocean water turbine built to drive an oppositely rotating electric generator, and which is stabilized by a wideface anti-oscillation resistor.

FIG. 57—illustrates a new design for a wideface turbine blade in the form of an auger helical fin 31 & 32 around a floater pipe drive shaft 6 and anchored stationarily by rope 20 against the current to convert the ocean/water current into mechanical energy. A pair of floating turbine 6 are coupled together into a catamaran type boat to make the whole apparatus stable on the stormy sea. The turbine 6 is further stabilized against the oscillation of the water waves by connecting it to a wideface anti-oscillation resistor 1 by the connector post 2. The superstructure 57 holds together whole apparatus thru a sealed bearing at the ends of the turbine 6. The pointed water splitter 8 is attached to the front of turbine 6 to reduce water impedance. A toothed drive gear 7 is attached to the front and rear section of the turbine 6 to drive the toothed drive belt 55 & 56 which in turn drive the toothed drive pulley 65 & 66 in order to drive the oppositely rotating electric generator 46. The drive pulley 66 turns counter-clockwise and drives the drum type magnet counter-clockwise. The drive belts 55 is twisted in order to turn clockwise the drive pulley 65 which then turns clockwise the drum type wire induction coil of the generator, and the electric current comes out thru the terminals 44. The turbine 6 is calibrated to stay in a submergence at the water level indicated by the line 24 by filling it with some amount of water. The anchor rope 59 attached to a high post replaces the anchor rope 20 in cases where this apparatus is place on a running river where there are debris that may get entangled with the rope 20. Where this apparatus is floated on the river, there is no need for the wideface anti-oscillation resistor 1, hence, it should be removed including the post 2 to prevent entanglement with the debris. The floater pipe 6 is made large diameter to elevate the bearings out of the water.

Figure 58:
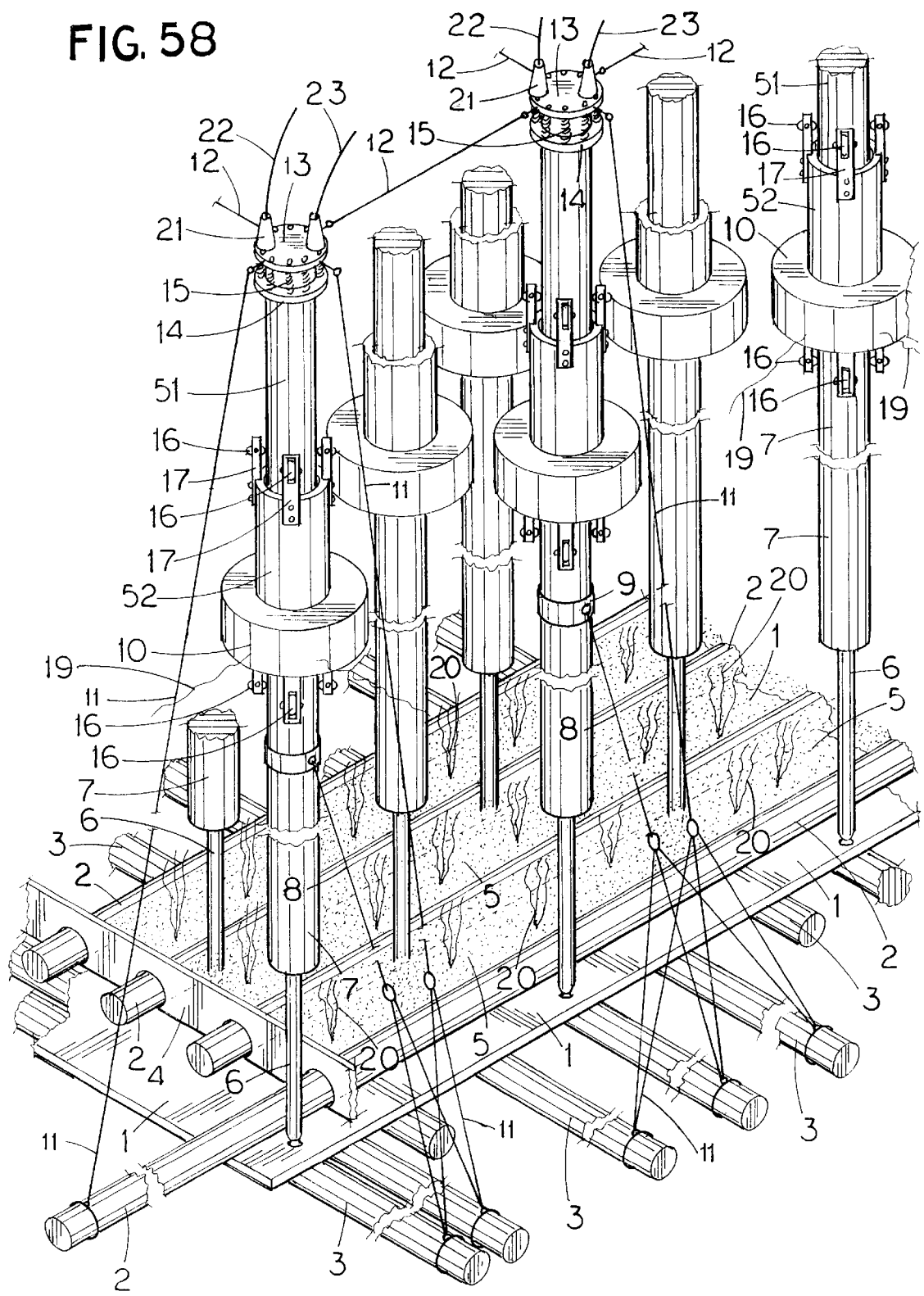
FIG. 58—illustrates a water wave suppressor in combination with multiple push-and-pull electric generators on top of the floater posts, with underwater agricultural plantation bed that serve as anti-oscillation resistor.

FIG. 58—illustrates a new design for a wideface fluid impeder anti-oscillation resistor 1 wherein it is loaded with fertile soil 5 which is planted on with water plants 20 in order to produce underwater forest to support marine life, thereby increasing marine food supply including the population of fish in the ocean. The problem on the scarcity of marine forest is due to the fact that most of the ocean floors are very deep, hence, hardly reached by sunlight, much more so, cannot be reached by carbon dioxid that supports plant growth. Wherefore, this design intends to make the ocean floor shallow by means of a floating agricultural plant bed 1, in thousands of acres. Due to the heavy load soil 5, the agri-bed 1 is partly carried and made stift by the floater pipes 3 that are horizontally and spacedly assembled side-by-side under the bed 1 and by the floater pipes 2 that are also horizontally assembled on top of the bed 1 but perpendicular to the lower pipes 3,—which means that pipes 2 and pipes 3 are crisscrossing each other to make the bed 1 stift. The outermost pipe 2 selves as wall to contain the soil 5 and there is another end wall 4 provided to contain the soil 5 at the ends of the pipe 2. The main floater pipes 7 are made vertical and attached by post bar 6 to the wideface bed 1 thru a cross joint or a ball joint to allow the floater pipe 7 sway in any direction. The main floater pipes 7 are evenly spaced so that the bed 1 remains horizontal. The advantage of the floater pipe 7 being made vertical is that only a small portion of the pipe's length is being submerged by the water waves, hence, the change of bouyancy is very minimal, therefore, the vertical pipe floater 7 produces very little force of oscillation. The floater pipe 7, being held steady by the wideface bed 1, is a very good holder for a steady drum-type induction wire coil 51 mounted on top of the steady pipe 7. A ring floater-oscillator 10 is loosely placed around the pipe 7 and is being oscillated by the water waves up and down. A drum-type magnet 52, being mounted on top of the oscillator 10, is loosely placed around the drum wire coil 51, in which contraption, as the water waves oscillate the oscillator 10, the drum magnet 52 moves up and down the lenght of the drum induction wire coil 51, thereby, generating alternating electric power. The large the water waves are, and the larger is the diameter of the oscillator 10, the more electric power is produced by increasing the magnetic field of the drum 52. The roller bearing 16, being held by the structural bars 17, are attached to and to prevent the magnet drum 52 and to the ring floater 10 from touching or from making friction with the pipe 7 and the drum wire coil 51. The floater pipe post 7 is keepped erected by way of the guy wire 11 that are anchored to the stift pipes 2 & 3, and guy 11 is attached to the top of the drum 51. The top plate 13 covers the top of the drum 51 from water spray at the same time serves as a structure to hold the guy ropes 11 & 12, and also holds the electric insulator 21 and the wires 22 & 23 power outlets. The bumper plate 14 holds the shack absorber compression springs/rubber 15. The ring oscillator 10 may be made up of a circular assembly of short pipes, or a rubber tire filled up with foamed plastics.

Figure 59:
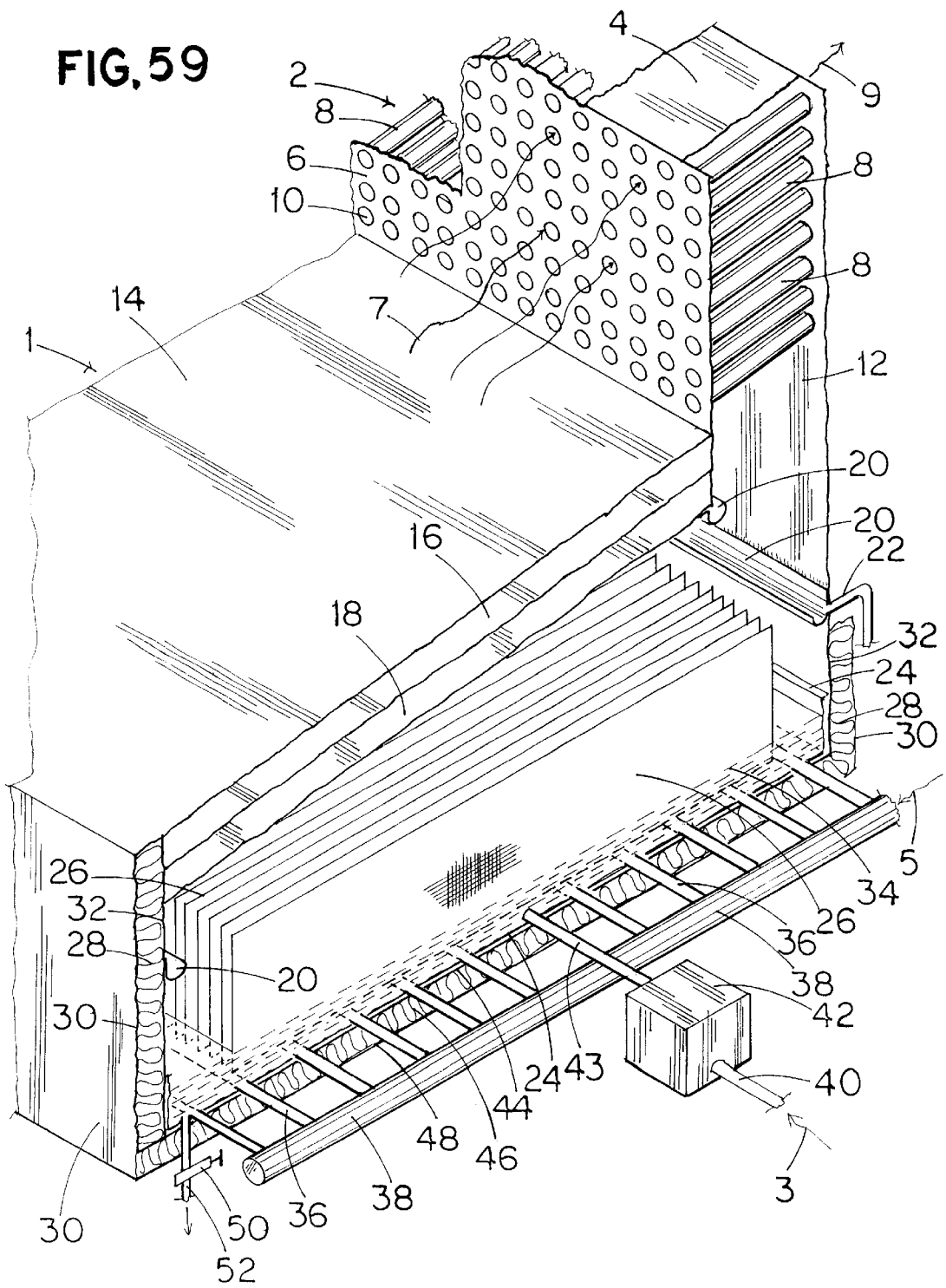
FIG. 59—illustrates a wideface solar trap water evaporator-distillation device that is further heated up by hot air from a trash burner.

FIG. 59—illusttrates a new design for a wideface solar trap distillation device 1 used for desalination of water, having a wideface multi-layer transparent roofs 14, 16, & 18 that are made as wide as possible to catch as much sunlight as possible. The wider the roof 14, 16, 18 are, the more solar heat is absorbed by the trap. The roofs 14, 16, & 18 are separated from each other by means of none heat conductive materials, such as wood, phenolic, or plastic bottles, to provide air space between sheet 14, 16 & 18 that serves as heat insulator at the same time allowing the hot sunlight to get into the chamber. The sheet 8 is hot but away from the cold wind, so due to the air space, the accumulated solar heat does not transfer to the wind cold sheet 14. Further, due to the heat insulator 28 between the inner wall 32 and the outer wall 30, the entrapped solar heat is confined in the chamber below the roof 18. Further, there is also a high bearing heat insulator 46 layed on the floor 48 and layed over by the none heat conductive upper floor 44 on which the water tank 24 rests, to further confine the entrapped heat. Hence, most of the entrapped heat is used to evaporate the water 3 getting into the tank 24 thru pipe 40 & 43. Additionally, hot air 5, from any heat source—the exhaust trash burning gas turbine engines, oil burning engines, or geothermal engines, or an ordinary trash incinerator, is passed thru the water in the tank 24 by way of the header hot pipe 38 that is communicated with the radiator pipes 36 to heat up the water if not to boil the water. A plurality of high capillary clothes 26 are spaced hanged or stand touching the water at the water level 34 to make the clothes wet up to the top edge of the clothes, in order to create a very large water surface being exposed to the air in order speed up the evaporation of the water being distilled. As the evaporation goes on, the water level 34 moves down which makes the level regulator 42, same as the toilet valve, release more water thru the low pressure pipe 43. The pipe 40 is the high pressure water supplier. At the start of heating, the whole chamber is vacuumized from the top to remove all the air while it is being replaced by the up going water vapor, so that what is contained in the chamber is all water vapor. Although the roof 18 is hot, a lot of the water vapor condenses and clings to the lower surface of the roof 18, wherefore, the water gutter 20 at the lower end of the roof 18 is attached to the wall 32 to collect distilled water. Due to the wall 6 facing the wind, the cold wind 7 is forced to enter the condensation tower 2 thru the inlet 10, pass thru the radiator pipes 8 and the wind becomes hot air 9 coming out to the rear of the condensation tower 2. Part 4 serves as roof of the condensation tower 2 to confine the up moving water vapor. As the water vapor rises up to the tower condensation 2, the vapor touches and condenses on the cold radiator pipes 8 and the distilled water is catched by the gutter 20 attached to the bottom of wall 6. Some of the vapor also condenses on the wall 12, so there should slso be a gutter 20 below the wall 12. The distilled water is taken out of the glitter thru the outlet pipe 22. The waste turbid water is take out thru the outlet 52 by opening the valve 50.

Figure 60:
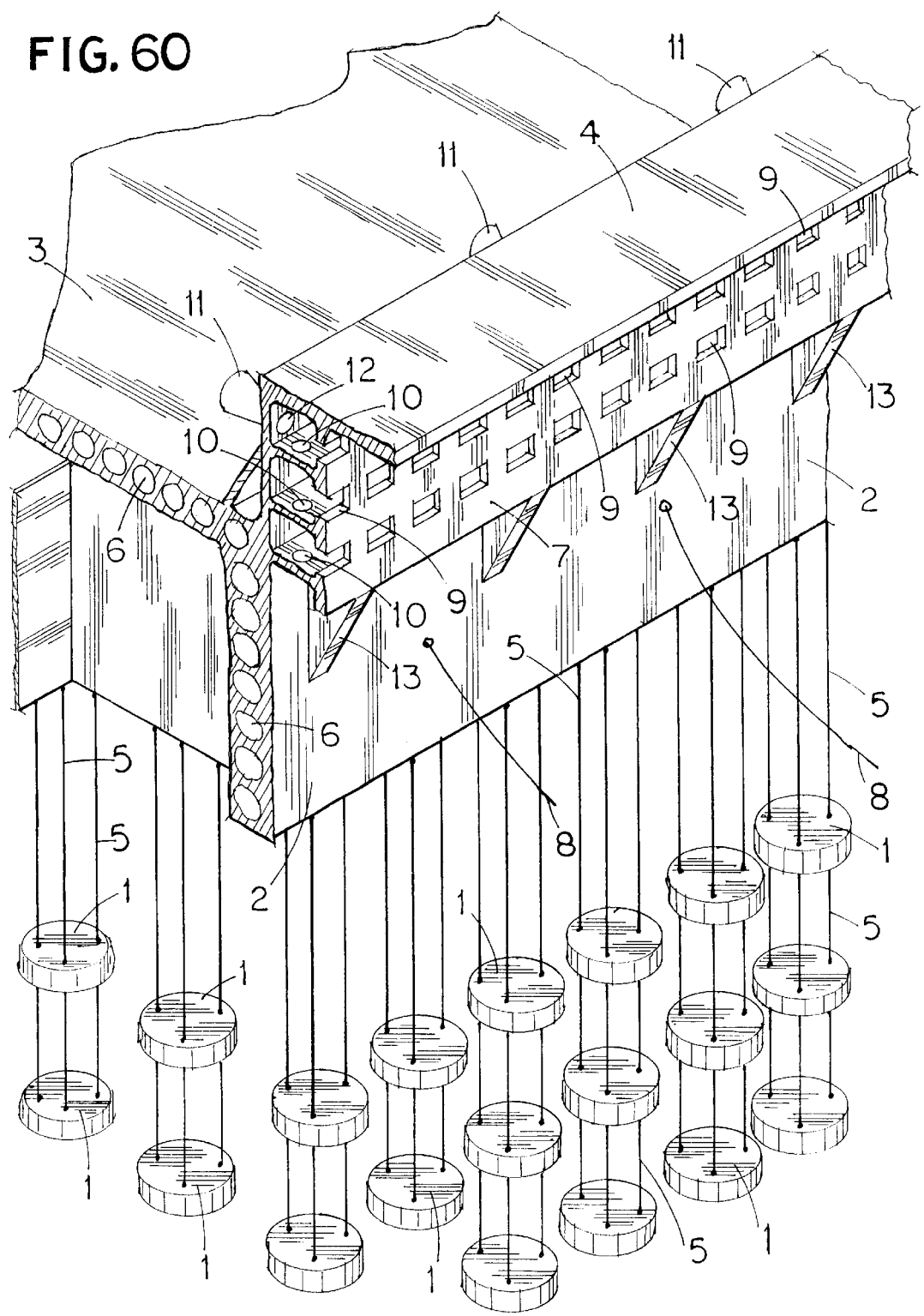
FIG. 60—illustrates a multiple wideface anti-oscillation resistor made up of used rubber tires in multilevel vertical array to hold a rubberized floating sea wall.

FIG. 60—illustrates a new design for a wideface fluid impeder 1 & 2 which form a floating sea wall apparatus to break and stop the water waves at the same time to absorb the surf energy via the upper chambered compression wall 7 into compressed air and further converts the energy into electric power via the the gas turbine generator 11. The floating wall 2 & 7 are keepped in erect posture by the action of the floating deck 3 which is always horizontal and is squarely attached to the floating wall 2 & 7. The whole appratus is made up of salt resistant honeycomb composite materials, including foam rubber, foam plastics, glass, fiber glass, metal alloys, and steel, in various forms, including pipes, empty bottles, I-beams, channel beams, and plates. One of the most practical construction for this structure is by recycling used rubber tires which are filled up with empty bottles and plastic foams and the stuffed rubber tires are used as the underwater wideface anti-oscillation resistor 1 that are hanged in multi-level vertical array by means of ropes 5 that are attached to the bottom of the floating walls 2 and the deck 3. Further, the stuffed rubber tires are arranged to become the sandwitched aggregates in pouring the molten rubber or liquid plastics to form/mould a rubberized honeycomb slab 3 together with the vetical wall 2 and the compressor wall 7 in one monolithic pouring. Constructing the floating wall by means of crisscrossing compressed air pipes makes the wall very stift, which is also a very good option. The hollow openings 6 indicate the used rubber tires or the compressed air pipes that are sandwitch in the composite construction. The brace 13 prevents the compression wall 7 from being lifted up by the water waves. The one-way window valves 9 allow the fresh air to get into the chambers during suction process and also allow the water from the surf to get into the chambers to further compress the entrapped air when the surf is large enough. The upward one-way float ball valves 10 allows the the entrapped air to get into the high chamber and also allow the excess water to drop down out of the chambers during the valley cycle of the water waves. The compressed air at the upper most chamber exits thru the opening 12 to drive the turbine 11 which in turn drive an electric generator. The roof 4 confines the compressed air at the top, at the same time it is extended to overhang on wall 7 to produce a ram effect upon the oversized water waves, thereby making a further compression of the entrapped air in the chambers. The whole apparatus is anchored to the ocean floor against the horizontal push of the water waves by way of the anchor rope 8. The horizontal push of the water waves is further reacted against by way of a plurality of vertical buffer walls, parallel to wall 2, and spacedly attached to the bottom of the wide flat deck 3 at 10 feet to 20 feet apart and further reinforced by plurality of vertical buffer walls perpendicular to wall 2 and also spacedly attached to the bottom of the flat deck 3 to form boxes that contain water, thereby forming a large mass of still water against the moving mass of the water waves. The second advantage of having the buffer walls under the deck 3 is that these buffer walls reinforce the bending resistance of the deck 3 thereby making it able to carry an airport and housing facilities.

There are many more available configurations for the use of the wideface fluid impeder device of which the herein inventor reserves all rights thereto.

What is claimed is:

1. A wideface scavenger energy converter system using a wideface sail-type fluid deflector to imped and to drive moving fluids/air in order to pump/compress, and to convert the energy of moving fluids/air into mechanical and into electrical energy, comprising:

an oppositely rotating co-axial wideface sail-type bladed centrifical air pump serving as a supercharger compressor, comprising: an air inlet mouth and an air outlet pipe acting as a larger pipe clockwise drive shaft having an inner wall; a plurality of counter-clockwise slant air guide plates disposed by a separate structure around said air inlet mouth of said compressor; a plurality of water atomizers disposed around said mouth and attached to said slant air guides; a rear clock-wise rotating circular plate having a central air outlet hole centrally attached to said air outlet larger pipe clockwise drive shaft thru said air outlet central hole; an inner and outer sets of clockwise revolving sail-type wideface blades having rear sides and front sides, spacedly and co-axially attached to said rear clockwise circular plate thru said rear sides; a front clockwise circular plate spacedly and co-axially holding said front sides of said two sets of clockwise wideface blades; an inner clockwise drive shaft having an end section, co-axially passing inside said clockwise air outlet pipe drive shaft and centrally attached to said clockwise front circular plate; a bearing post holding said end section of said inner clockwise drive shaft; an interior rear counter-clockwise rotating circular plate holding a set of counter-clockwise revolving sail-type wideface blades revolving in between said inner and outer sets of clockwise revolving wideface blades; a counter-clockwise pipe drive shaft, enclosing said inner clockwise drive shaft and co-axially inside said clockwise air outlet larger pipe drive shaft, centrally attached to drive said interior rear counter-clockwise plate;

a number of driven machines, comprising: an oppositely rotating turbine compressor having: a plurality of sets of clockwise revolving sail-type wideface blades and a plurality of counter-clockwise revolving sail-type wideface blades; a centrifugal air pump having: a sail-type wideface counter-clockwise blades, a housing shell, an inlet and an outlet main pipe; an oppositely rotating electric generator having: a multilayer clockwise drum-type induction wire coil coupled with a multilayer counter-clockwise drum-type magnet, carbon brushes connected to the wire coils, and electric power outlet wires connected to said carbon brush; and a hot gas turbine engine having: a multistage clockwise sail-type wideface bladed turbine coupled with an outer multistage counter-clockwise sail-type wideface bladed conical turbine running in between said clockwise blades, and serving as a driver machine,—all in one co-axial alignment with said centrifical air pump;

an extension of said larger clockwise pipe drive shaft, having and inside wall, from said centrifical air pump to, enclosing, and acting as an air pipe supplying compressed air to, said oppositely rotating turbine compressor, and finally ending up at the inlet of said centrifugal air pump;

said plurality of sets of clockwise wideface blades of said oppositely rotating turbine compressor being spacedly attached to said inside walls of said larger clockwise pipe drive shaft;

an extension of said counter-clockwise pipe drive shaft from said centrifical air pump to said oppositely rotating turbine compressor, and to said wideface bladed centrifugal air pump, and to said electric generator, and to said hot gas turbine engine,—holding and driving said wideface blades of said centrifugal air pump, holding and driving said counter-clockwise drum-type magnets of the said electric generator, and attached to said outer counter-clockwise turbine conical drive shaft of said hot gas turbine engine;

said counter-clockwise wideface blades of said oppositely rotating turbine compressor being spacedly attached to said counter-clockwise pipe drive shaft in a way to run in between said clockwise blades of same turbine compressor;

a drum type bearing holding around said counter-clockwise pipe drive shaft and attached to said clockwise blades of said turbine compressor;

an extension of said inner clockwise drive shaft from said centrifical air pump, passing inside said counter-clockwise pipe drive shaft, thru said turbine air compressor, thru said centrifugal air pump, thru said electric generator and connected to said inner turbine of said hot gas turbine engine and connected to drive the clockwise induction wire coils of said oppositely rotating electric generator;

a solar trap chamber, that collects solar heat, used as heat containment chamber for heating purposes, comprising: a wideface roof made as wide as space allows, having multilayer transparent sheets vertically spaced appart to have air space or vacuum space between each sheet; side walls having heat insulators enclosing said solar chamber; and a horizontal dry floor having heat insulators tightly jointed with said side walls;

a header compressed air supply pipe communicated with said outlet main pipe of said centrifugal air pump, and extended all the way inside said solar trap chamber;

a plurality of multilayer solar heat absorbing small radiator pipes communicated with said compressed air supply pipe, and extended all across said solar trap chamber;

a block powder sprayed over said solar absorbing radiator pipes to prevent reflection of the sunlight;

a header pipe air outlet getting out of said solar trap and communicated with said heat absorbing radiator pipes inside said solar trap chamber;

a plurality of other air compressor stations in the vicinity, comprising: windmill compressors, waterwave energy compressors, and trash incinerator compressor, all intercommunicated to a main air pipe line which in turn further communicated with said header compressed air supply pipe getting inside said solar trap chamber, and contributing additional compressed air being heated up inside said solar trap chamber;

a trash incinerator, that burns from the top of the trash, comprising: a main header inlet air pipe; a main header outlet air pipe; a combustion chamber; a heat insulator wall enclosing said combustion chamber; and a plurality of multilayer heat absorbing radiator pipes layed across said combustion chamber and inter-communicating said main header inlet air pipe with said main header outlet air pipe;

a main air pipe line intercommunicating said header pipe air outlet of said solar trap chamber with said main header inlet air pipe of said trash incinerator;

a plurality of geothermal heat energy radiator deepwell, compising: a main header air inlet pipe; main header air outlet pipe; a plurality of deepwell lined around by closed-bottom glass pipe and other acid resistant materials pipe; a central divider wall or a smaller open bottom pipe hanged down into but not touching the closed bottom of each said glass pipe deepwell thereby a longitudinal one-half of each said deepwell serving as air inlet pipe while another longitudinal one-half of each said deepwell serving as air outlet pipe; all said inlet pipes of each said deepwell communicated with said main header air inlet pipe while all said outlet pipes of said deepwell communicated with said main header air outlet pipe; and a main air pipe line inter-communicating said main header intlet pipe of said geothermal radiator deepwell with said main header outlet pipe of said trash incinerator;

a nuclear fuel burning facility, having: a combustion chamber, a heat exchange radiator with an air inlet and an air outlet and placed inside/around said combustion chamber; a main header air inlet pipe inter-communicating with said air inlet of said heat exchange radiator; a main header air outlet pipe intercommumicating with said air outlet of said heat exchange radiator; and a main air pipe line inter-communicating said main header inlet pipe with the said main header outlet pipe of said geothermal deepwell;

a wideface sail-type bladed co-axial oppositely rotating gas turbine converting the expanding hot air into mechanical energy comprising: a "T" form main header hot air inlet pipe and an expanded mouth air pipe exhaust; a counter-clockwise conical outer drive shaft having inner walls and a clockwise conical inner drive shaft having outer walls in co-axial with said outer drive shaft, each drive shaft having a front and an exhaust lip; said front of said clockwise inner conical drive shaft connected to said clockwise inner drive shaft that drives said clockwise multilayer drum-type induction wire coil of said generator; an axial center bearing post holding said lips of each said drive shafts by way of radial spokes; a plurality of sets of counter-clockwise revolving wideface sail-type turbine blades spacedly attached to said inner walls of said outer drive shaft; plurality of sets of clockwise revolving wideface sail-type tubine blades spacedly attached to said outer walls of said inner drive shaft in a manner that each set of clockwise blades revolves in between each set of counter-clockwise blades; a perforated counter-clockwise pipe drive shaft section inter-connecting said front of said conical outer drive shaft with said counter-clockwise pipe drive shaft connected to said drum magnet of said electric generator; said main inlete pipe of said hot gas turbine engine made much larger than said perforated pipe drive shaft section to allow air to get into said perforation from all directions; said "T" main inlet pipe extended to cover the gas turbine up to and connected to said exhaust mouth air pipe; a drum-type roller bearing provided in between said "T" main inlet pipe and said counter-clockwise pipe drive shaft going towards the generator; and an outer shell pipe covering around the generator and interconnecting said housing shell of said centrifugal air pump with said "T" main air inlet pipe of said hot gas turbine engine;

a main air pipe inter-communicating said main header inlet pipe of said gas turbine with said main header outlet pipe of said nuclear fuel burning facility;

a high voltage large capacitor, in the form of a large building block serving as an energy bank, connected by wire conductors to said wire power outlets of said electric generator thru a step up transformer to store excess energy not absorbed by the utility grid;

a glass, ceramics, plastics, semiconductor or diode serving as insulator in between plates of said capacitor to prevent high voltage discharge of stored energy;

said capacitor also serves as storage for the energy from the lightning; and a voltage regulator to gradually release the stored energy from the capacitor into the utility grid, see FIG. 23.

2. A wide face scavenger energy converter system in accordance with claim 1, including a new design for a high voltage capacitor made up of high voltage insulating materials, and built into various forms, including cubes, rectangular blocks, and in the form of the body of a transportation vehicle, for purposes of using said capacitor as a locomotive power for transportation vehicles, comprising:

a plurality of wideface plates bundled and laminated together, and built to form the shape of the body and compartments of a transportation vehicle;

a glass/plastics/ceramics/diod/semiconductor plate/sheet placed in between said wideface plates and wraparaound the whole capacitor, to serves as electrical insulator between said plates and arouind said capacitor;

a high voltage direct current charger interconnecting an electrical outlets with said capacitor to charge it at a high voltage; and a voltage regulator to convert the high voltage power from the capacitor into a low safe voltage to run the motors of the vehicle.

3. A wideface scavenger energy converter system in accordance with claim 1, including a new design for a sail boat that fly a few inches above the water to avoid resistance of the water and a new design for a wideface kite that serve as sail for the boat, as shown in FIG. 1 and FIG. 1A, comprsing:

a flat bottom wideface main body of the boat made light weight and stiff by composite construction;

a downward wideface hollow wall, partially filled with water as weight, being attached to the left and to the right sides of the main body to confine the water spray and air pressure under the main body;

a wideface flap wing attached to the front and to the rear of the main body to scoop in more air under the main body;

a circular/elliptical rail track centally and horizontally attached to the top of the main body to serve as an anti-overturning control device;

an oppositely rotating electric generator mounted on top center of the boat;

a radio controlled wideface steering rudder mounted to the front and to the rear bottom section of the boat to enable the boat sail forward and rear ward;

a pair of hook rollers that bite on the rail track, said rollers being separated from each other by a spacer bar that is provided with a roller pulley connector at each ends;

a kite serving as sail to pull the boat, comprsing: a main body made up of a pair of box-like wideface wind deflectors that are attached to each other along one side corner by making the frames of one box continued to the other box in the form of and X-frame; each said box being open at the front end facing the wind and also open at the rear so that the wind passes thru inside each box; a lifter pointed cylindrical compressed air container being attached to each side and to each bottom corner of the open boxes for lift and for floating on the water; a radio controlled vertical wide face wind deflector being attached to the rear at each ¼ point of the box kite to serve as steering rudder of the sail kite; a kite sling rope attached to each bottom corner of the box kite and tied to the connector pulley at the boat to serve as steering device for the kite;

a wideface lifter kite, which is hereby named STARKITE, attached to the top of the box-type sail kite to provide steady lift, comprising: a wideface flat horizontal rectangular/square main body; an out-upward slant wall attached to the left and to the right sides of the main body; likewise an out-downward slant wall attached to the left and to the right sides of the main body; a lifter pointed cylindrical compressed air container attached to the outer edges of said slant walls to provide air lift or floating device on the water; a rdio controlled horizontal flap wing attached to the rear end of the main body to provide up/down steering; a kite sling rope attached to the bottom edge of the kite's downward side walls and tied to the upper sling rope, having adjustment eye-hole connectors, at the top center of the box-kite to prevent the box-kite from diving;

a wideface flat bottom surfboard serving as control weight, having, a control weight in the form of a water filled downward side walls, attached by rope and sling, having eye-hole connectors, to the center of the box-sail kite, in order to prevent the sail kite from flying too high;

a wideface bladed oppositely rotating co-axial water turbine attached to and under the main body of the boat, mechanically connected to drive an oppositely rotating drum-type electric generator installed on the boat; and a high voltage capacitor to store electric energy and to serve as battery.

4. A wideface scavenger energy converter system in accordance with claim 1, including a new design for a sail windmil, as shown in FIG. 2, wherein, the blades of the windmill are made wideface sails to maximize wind contact, comprising:

a plurality of not more than 4 radial masts attached to a center hub;

a wideface sail attached to each of said radial mast;

a plurality of control ropes attached to the rear edge of each sail;

a plurality control coil springs/motorized winches attached to the front side of each radial mast to serve as outomatic sail adjuster;

said control ropes being wound around the control winches to relax or tighten the sails against the wind;

a post attached to the hub to elevate the windmill up to the winds; and an electric generator or compressor mechanically connected to and driven by the windmill thru a drive shaft mechaniclly linked to the hub by step up gears.

5. A wideface scavenger energy converter system in accordance with claim 1 or claim 4, including a new design for a sail boat, as shown in FIG. 2C, wherein, the wideface sail of the windmill is used to become the sail of the sail boat to maximize wind contact, comprising:

a long main body of the boat, which serves as a house above the water;

a plurality of masts erected on top of the main body;

a wid face sail attached to each mast;

at least one adjusting control rope attached to the rear side of each sail and tied down to the succeeding mast or to the floor of the boat;

a cross structural bar attached perpendicular to and at the ¼ points of the main body;

a shock absorber connector device, containing spring, compressed air, hydraulic oil, attached to each end of said cross structural bar, said shock absorber being provided to minimized oscillation of the boat by the surfs;

a pointed floater pipe attached to each end of the shock absorber connector device to carry the main body well above the water;

said floater pipes being partially and evenly filled up with water by inserting a smaller empty/air container pipe inside the pointed floater pipes, to prevent the sail boat from being tipped-over by the strong winds;

a plurality of guy ropes to hold the floater pipes squarely and paralllel to the main body;

a wideface vertical thin blade wall attached longitudinally to the bottom of each of the floater pipes to prevent the boat from being pushed sideward;

a pair of vertical redundant structural bars rigidly attached squarely to the bottom of each floater pipe and also attached to hold the underwater blade wall, and extended down below the water wave activity;

a wideface stiff anti-oscillation board attached to the bottom end of the vertical structural bars to prevent the floater pipes from being oscillated too much by the surfs;

said anti-oscillation board being pivotally fixed at the front vertical bar, and allowed to play up and down a few inches, thru a pipe hole, at the rear vertical bar in order to serve as a locomotive power to push the boat forward when the water waves move the floater pipes up and down;

a set of wideface bladed co-axial water turbines built to rotate opposite against each other, and attached to the rear end of the rear floater pipes, to convert the energy of the water current under the boat;

an oppositely rotating electric generator and/or air compressor installed inside the rear floater pipes mechanically connected to and driven by the water turbines; and a high voltage capacitor connceted to said generator to store the energy.

6. A wideface scavenger energy converter system in accordance with claim 1, including a new design for a multilevel sky windmill, wherein, a plurality of lifter cylindrical balloons are rotating or spinning in a multilevel vertical array formation, serving as air compressor, and serving as advertising devices up in the sky, comprising:

a multilevel array of lifter cylindrical balloons pointing to the wind, each balloon having constrictions at both ends and at third sections;

a bearing joint connector, containing an oppositely rotating air compressor, being provided and attached to each constriction of each balloon to enable the rear balloon sections rotate oppositely against the front sections;

a vertical air pipe/hose connector, intercommunicating all the compressors, serving as compressor outlet, being attached to each constriction bearing, and being extended to spacedly interconnect all the lifter cylindrical balloons in a vertical array formation thru their constriction bearings, and being extended to deliver all the compressed air into the main pipeline on the ground, said hose serving as an anchor sling rope for the sky windmill by tieing it down with a rope that is functionally wound to an anchor winch on the ground;

a high pressure cylindrical structural strut bar balloon, comprising: a joint bearing connector at mid-section of the strut balloon, an oppositely rotating turbine air compressor being installed at the joint bearing connector such that one set of impeller blades rotate clockwise while the other set of impellers rotates counter-clockwise, a bearing connector being attached to each end constriction of the strut balloon and being connected to the vertical pipe/hose connector at a point below the lowest level lifter balloon, a set of radial torsion bar acting as masts being attached to each left and right section of the strut balloon, a wideface sail being eccentrically attached to each torsion mast such that the left balloon section rotates clockwise while the right balloon section rotates counter-clockwise, and a strong skin made up of laminates of KEVLAR fibers and/or SPECTRA fibers being wrapped around the structural balloon to make it bulletproof;

a plurality of various kinds of wideface windmill blades being attached to each of the lifter balloons to make them rotate oppositely thru the wind, comprising:

1. a helical or spiral fin windmill blade attached around the upper most lifter cylindridical balloon, said fin being supported by forward guy ropes tied to the skin of the balloon, and a plurality of oblique tail fins being attached to the rear section of the upper most lifter balloon;

2. a lighter than air inflated bar windmill blade, made up of inflated balloon bars attached side-by-side to each other to form a wideface, and being attached obliquely to the lower level lifter cylindrical balloons to turn them clockwise, said balloon bars being supported by forward guy ropes tied to the skin of the balloon;

3. a sail windmill blade, made up of framed sheets/sail, being spread tip by attaching the sails to a front set and a rear set of radial mast that are attached around the upper level lifter cylindrical balloon, in order to turn the balloon clockwise, said radial mast being supported by forward guy ropes tied to the skin of the balloon;

4. a set of balloon-type lighter than air windmill blade, comprising: a plurality of framed sheets that are attached to a front and a rear set of radial masts, a small lifter cylindrical pointed balloon being attached to the outer periphery of each windmill blade as illustrated by the part NO. 45 of FIG. 6, and this windmill blade being attached to turn the rear third section of the lifter cylindrical balloons counter-clockwise;

5. a set of sail-windmill blade, comprising: a set of radial masts in one plane and in one hub, a wideface sail being attached to the rear side of each mast, a plurality of control strings being spacedly attached to the rear side of each sail, a correspondingly number of calibrated spring winches being attached to the front side of each mast to which winch the control strings are being functionally wound around to in order to relax the sail during high winds, a forward axial strut being attached to the hub, a guy rope tied to the outer end of each mast and tied to the forward end of the forward axial strut to support the masts against the wind, and this sail-windmill is being mechanically connected to drive an oppositely rotating air compressor installed at the front constriction bearing of the lower level lifter cylindrical balloons;

a balloon wing to provide more lift, comprising: a plurality of bent up small cylindrical horizontal balloons that are attached to each other side-by-side to form a wideface balloon wing, a plurality of downward cylindrical balloons bonded together side-by-side to form a balloon wall that is attached to the bottom center of the balloon wing, the bottom end of the balloon wall being attached by a pipe bearing connector to a forward axial pipe front nose of the upper level lifter cylindrical balloon, and a guy rope being being attached to each cylindrical balloon component of the balloon wing and being tied down to the bottom of the balloon wall;

a bulletproof outer skin, made up of laminates of Kevlar fibers and/or Spectra fibers being wrapped around the lifter cylinder balloons, the windmill blades, and around the air hose; and an air pipeline intercommunicating the windmill air hose to the large first stage pipe of the scavenger energy converter system of claim 1, see FIG. 6.

7. A wideface scavenger energy converter system in accordance with claim 1 or claim 3, including a new design for a wideface airborne sail that is controlled by a lifter balloon and by a parachute, in order to pull loads. comprising:

a wideface kite made up of a continuous front and side frame, an axial bar frame, a plurality of spaced intermediate wing frames parallel to the axial bar frame, a transverse bar interconnecting all the side, the wing, and the axial frames, and a sheet attached to the frames to cover the kite;

a kite-sling rope, having adjustment eye-hole connectors, being attached to the top of the kite, and being extended above the kite;

a pointed elongated lifter balloon above the kite being distantly attached, to the kite thru the kite-sling rope at the top of the kite, by means of another kite-sling control rope that is attached to and below the lifter balloon, to prevent the kite from diving;

a hot air producing propulsion engine attached to and hanging at the bottom of said pointed lifter balloon;

a hot air pipe communicated to the hot air exhaust of said engine and extended to the upper interior section of said balloon, to deliver hot air into the balloon;

a control valve at the exhaust of the engine used to force hot air into the balloon;

a control exhaust valve installed at the bottom rear of the balloon to automatically exhaust the cooler air at the bottom of the balloon when the balloon becomes over pressurized;

a boat, having a bottom keel wall, serving as a moving anchor for the kite;

an anti-overturning control bar attached transverse to the top of the boat;

a deep-groove pulley being attached to each end of the control bar;

a drive winch attached to the bottom center of the control bar;

a closed loop control rope being wound around the bottom drive winch of the control bar, then thru the end deep-groove pulleys, and each end of the rope being attached to an anchor ring connector;

an anchor control winch being attached to the top of the anchor ring connector;

a kite-sling anchor rope, attached to the axial frame bar of the kite and tied down to the anchor ring connector at the boat;

a steering control winch attached to the top of the anchor ring connector;

a steering rope attached to the kite's left wing, then wound around down the steering control winch, then up and tied to the kite's right wing;

a wideface parachute being attached on and off the tail of the kite as needed thru a pulley at the kite and a closed loop elevator rope tied down to the anchor ring connector;

a control rope, being used to inversely close and to open the parachute against the wind, being attached to the inside center of the parachute, being extended down, and being attached to the anchor ring connector;

a control moving weight being attached by string to the tail of the kite, said weight being made to float and slide on water;

an elongated weight filled up with water being attached to each side of the boat at its water line;

an oppositely rotating electric generator attached to the top of the boat;

an oppositely rotating wideface bladed water turbine attached to the boat and mechanically connected to drive the electric generator;

at least one mast erected on top of the boat; and an air hose being extended from the boat to the lifter balloon to supply light gas/hot air to the balloon, see FIG. 3 and FIG. 4.

8. A wideface scavenger energy converter system in accordance with claim 1 or claim 7, including a new design for a steerable and collapsible utility parachute being used as wind sail to pull loads sliding on ice, on water, and rolling on land, wherein, a control string/rope is being attached to the inside center of the parachute to inversely close and to open the parachute against the wind, comprising:

a parachute having a designated front and a rear, and a designated left side and a right side;

a plurality of support strings/ropes attached over-around and inside the parachute, the half left strings being bundled together to the left, the half right strings being bundled together to the right, the front strings being shorter, while the rear strings being longer than the front strings;

a main rope interconnecting the left bundle to the right bundle of strings, being adjustably attached to a load, and either end of the main rope being shorten or being elongated to steer the parachute left or right;

and a control string/rope being attached to the inside center of the parachute, being extended to and being adjustably attached to the load, and being relaxed or pulled short to open or to inversely collapse the parachute, see part 12 & 27 of FIG. 3.

9. A wideface energy converter system in accordance with claim 1 or claim 7, including a new design for a cylindrical/elongated hot air balloon, wherein, at least one propulsion engine that produce hot air is attached to the lower central section of said balloon and made enough to move the balloon thru and against the wind and made to produce enough hot air being pumped into the balloon as needed thru an air hose intercommunicating the exhaust pipe of said engine with the upper interior section of the balloon, and a safety valave installed at the rear bottom of the balloon to prevent over pressure in the balloon and to exit the old cooler air, in order to make a transportation out of a hot air balloon.

10. A wide face scavenger energy converter system in accordance with claim 1 or claim 6, including a new design for a Sky Bike, wherein, a bike mechanism is suspended from a spinning cylindrical balloon that is provided with wide face blade propellers, to provide an opportunity for a person to fly in the sky by his own man power, as shown in FIG. 7, comprising:

- a pointed lifter horizontal cylindrical balloon having constrictions at each end where a ring pivot bearing is secured, and having a friction deep-groove ring around within the middle third section of the balloon body;
- a plurality of radially and obliquely desposed wide faced inflated impeller balloons attached to the mid-section of said lifter cylindrical balloon;
- a ring pivot bearing arm connector disposed at each of the said construction of said lifter cylindrical balloons;
- a passenger capsule having a deep-groove drive wheel that is driven by a peddal thru a chain, and other appurtenant devices to suspend and to orient the capsule with the balloon;
- a drive belt that suspends said capsule from the balloon, and being wound around the friction ring of the balloon—thru the concentration roller assembly—and thru the deep-groove drive wheel;
- a steering and balancing rope to enable the passenger to point the balloon up or down;
- an additional second lifter cylindrical balloon being attached to tile rear of and co-axially disposed with the main lifter balloon;
- a double impeller blade, in the form of wide face sail inflated balloon fins, spirally attached to the second balloon;
- a large rudder to effect horizontal steering, being attached to the rear end of the second balloon, in the form of a wide face inflated ballon fin;
- a second steering rope wound thru a pulley at the bottom of the rudder and thru a winch below the seat of the passenger;
- a set of wide face balloon impeller blades attached to the mid-section of the main cylindrical lifter balloon;,
- a man powered compressor pump and a tank to store light gas; and
- a radio communication device for ground control contol assistance loaded in passenger capsule.

11. A wide face scavenger energy converter system in accordance with claim 1 or claim 7, including a new design for a wide face sail type propeller, comprising:

- a plurality of radially disposed masts being attached to a central hub;
- at least three struts spacedly attached to and perpendicularly standing out to the rear from each mast;
- a wide face sail, the front side of which being attached to each mast, while its rear side being attached to the outer ends of the struts that stand out from the succeeding mast;
- a guy string/rope tied to the outer end of each strut and anchored to the third mast, piercing the second sail;
- a guy string holding each outer strut to the outer end of each mast and another guy string holding each inner strut to the base of each mast;
- a couple of this type of propeller are being made co-axial and being rotated opposite against each other for more effectivity;
- and said sail propeller assembly being attached to the rear end of the Sky Bike, to a glider, to a boat, or to other kinds vehicles that are powered by man or by an engine.

12. A wide face scavenger energy converter system in accordance with claim 1 or claim 6, including a new design for a light weight structural member/material, wherein, said lifter cylindrical balloon is made high pressure to become stiff and made Bulletproof by using Kevlar cloth and/or Spectra Fibers, in a laminated composite construction, to serve as strong outer skin of the balloon, the volume of the balloon being made larger, such that the required "weight of balloon/weight of air displaced" ratio is less than one, said cylindrical balloon being attached below the wings of an air transport so it can land on water, and a plurality of said bulletproof structural balloons being tied together to form a wide face structure and being used for butterfly type airplane wings, for high altitude stations, for view restaurants, for a jumping out station for gliders/parachuters, for bridges, for boats, for houses on/over the ocean, and for floating/flying airports.

13. A wide face scavenger energy converter system in accordance with claim 1 or claim 3, including a new design for a fishing kite, wherein the Kite-Sail is made to fly back-and-forth by tieing it to a stationary anchor that is well elevated above the water to prevent the kite from diving into the water, and a hook-and-line, having fishing baits, is being attached to a floater weight that is being pulled by the kite-sail in order to catch fish, and wherein said kite-sail is being used to pull a person on skii going back-and-forth.

14. A wide face scavenger energy converter system in accordance with claim 1 or claim 3, including a new design for a double sail boat, wherein, the anchor for the Kite-Sail is a moving boat as being pulled by same kite and another boat, serving as control weight/carrier for the same kite, is also being pulled by the same kite, hence one kite serves as common sail between two boats, which case is a good game for teamwork sail racing.

15. A wide face scavenger energy converter system in accordance with claim 1 or claim 6, including a new design for Bulletproof Balloon, wherin the lifter balloon is made up with strong skin but made low pressure so that the balloon acts as a soft cushion to baffle the impact of the bullet, said balloon being made of large volume so that the "wigth of the balloon/the weight of the displace air" ratio is less than one.

16. A wide face scavenger energy converter system in accordance with claim 1 or claim 6, including a new design for a safe sail type double set oppositely rotating wind turbine that is able to work safely during high speed winds, wherein, elastic strings/ropes, that hold the rear side of the sail, are being connected to calibrated coil-spring winches or torsion bars that are attached to the next succeeding masts, in order to automatically relax the sail when the wind is too strong, as illustrated by parts 2, 13, 16 and 31 of FIG. 29, and by pails 2, 11, and 52 of FIG. 10.

17. A wide face scavenger energy converter system in accordance with claim 1 or claim 6, including a new design for a sail type oppositely rotating co-axial wind turbines, wherein, each wide face sail being attached to a frame is being held by each mast on one side only, said framed sail being disposed along the plane of rotation, such that, when the wind blows, the mast gets twisted and acts as a torsion bar to make the sail be on oblique posture against the wind, there being no rope holding the rear side of the sail, said masts being made up of elastic materials and being supported at the outer ends by guy strings tied to a forward axial strut, in order to relax the sail when the wind is too strong, as illustrated by parts 15, 31, 53, and 76 of FIG. 11, and FIG. 26.

18. A wide face scavenger energy converter system in accordance with claim 1 or claim 6, including a new design for an oppositely rotating electric generator or an oppositely rotating compressor, wherin, the cylindrical magnet drum of a generator or the first turbine impeller of a compressor is being rotated clockwise by a gas/water turbine, while the induction wire coil armature of said generator or the succeeding turbine impeller of said compressor is being correspondingly rotated counter-clockwise by another separate gas/water turbine, that is being driven by another stream of gas/water, thru an inter-mechanical drive chain/belt, in order to double the speed of the driven machines, said water turbine being in the form of lifter pipe/cylinders that are provided with multiple wide face turbine blades spirally attached around said cylinders and being floated or submerged in multilevel under the running water by means of various kinds of anchor on the channel floor, as illustrated by FIG. 8 and by FIG. 17.

19. A wide face scavenger energy converter system in accordance with claim 1, including a new design for a gas turbine engine, wherein, an oppositely revolving gas turbine drives an oppositely revolving turbine-type compressor and also drives an oppositely rotating drum-type multilayer electric generator, as illustrated by FIG. 9, comprising:

an outer shell main body that encloses the combustion chamber and also houses the centrifugal compressor blades;

a circular central hole being provided to said main body shell;

circular bearings fitted to the lips of said central hole of the main body;

a pair of a larger/outer and a smaller/inner pipe drive shaft inserted and fitted into the said central hole of the main body;

a set of planetary bearings placed in between the inner and outer pipe drive shafts;

a dividing wall at the inside front section of the main shell body to make a house for the centrifugal blades of the last stage compressor;

a cylindrical/conical pipe drum of larger diameter than and attached to the rear end of the inner drive shaft, and serving as inner walls of the exhaust turbine;

a conical pipe drum of larger diameter than and attached to the rear end of the outer pipe drive shaft, and serving as outer walls of the exhaust turbine;

a plurality of wide face sail-type turbine blades attached to the outer face of the inner drum walls of the exhaust turbine;

a plurality of wide face sail-type turbine blades attached to the inner face of the outer drum walls of the exhaust turbine;

a plurality of wide face sail-type centrifugal turbine blades attached to the outer face of the outer pipe drive shaft at the point corresponding to the centrifugal pump housing;

a conical pipe drum of larger diameter than and attached to the front end of the inner pipe drive shaft, arid serving as the inner drum walls of the turbine compressor;

a cylindrical drum of larger diameter than and attached to the front end of the outer pipe drive shaft, and serving as the outer walls of the compressor turbine;

a plurality of wide face sail-type blades attached to the outer face of the inner walls of the compressor turbine;

a plurality of wide face sail-type blades attached to the inner face of the outer walls of the compressor turbine;

a pipe drive shaft extension at the front of tie inner drum wall of the compressor turbine;

a pipe drum drive shaft extension at the front of outer drum wall of the compressor turbine;

a multilayer drum-type induction wire coil attached to the front end of the inner compressor drive shaft front extension;

a plurality of centrifical wide face sail-type supercharger blades attached to the front end of the outer compressor drive shaft front extension;

a plurality of radial wide face sail-type supercharger blades correspondingly attached to the front ends of the centrifical blades;

a centering plate attached to the inner ends of the radial supercharger blades;

a multilayer drum-type magnet, of diameters corresponding to the in between spaces of the multilayer induction wire coil drums, being attached to the centering plate, facing and inserted in between the induction wire coils;

a center dowel, piercing the centering plate, being extended back and inserted into the inner pipe drive shaft of the compressor with bearings, and being extended to the front to serve as support axle of the electric generator;

a support post and a bearing to hold the front axle;

a pipe outlet of cold compressed air getting out of the centrifugal pump to supply machines outside the turbine engine;

a fuel inlet pipe or a large geothermal steam inlet pipe getting into the combustion chamber;

a plurality of post to support the turbine engine; and a wire outlet of electrical energy going out of the generator.

20. A wide face scavenger energy converter system in accordance with claim 1 or claim 6, including a new design for a two set co-axial oppositely rotating turbines, wherein, the clockwise turbine has a large cylindrical/pipe drive shaft with inside saline gears, while the counter-clockwise turbine has a much smaller cylindrical/pipe drive shaft with an outside saline gears and being inserted centers inside the clockwise drive shaft, and a plurality of planetary gears are being spacedly inserted in between the outer and the inner saline gears to interlock the outer and the inner drive shafts, each planetary gear being held stationary by an electric generator that are being driven by the planetary gears,—in order to speed up the generator, as illustrated by parts 70, 71 and 75 of FIG. 11.

21. A wide face scavenger energy converter system in accordance with claim 1 or claim 6, including a new design for an oppositely rotating electric generator that is driven by an oppositely rotating turbine, comprising:

a multilayer drum type magnet in the form of concentric drums/cylinders spacedly and centers attached perpendicularly to a left circular plate;

a multilayer drum type induction wire coils in the form of concentric drums/cylinders in such diameters so that each one fits in between the corresponding space between each cylindrical/drum magnets, and being centers attached perpendicularly to the right circular drive plate;

said drum magnet assembly and said drum wire coil assembly being inter phased with each other by inserting the free end of the drum wire coil thru and in between the free end of the drum magnet;

a left pipe drive shaft that holds and pierces the center of the left drive plate, to drive the magnets clockwise;

a right pipe drive shaft that holds and pierces the center of the right drive plate, and further being inserted inside the left pipe drive shaft for alignment, to drive the wire coil drums counter-clockwise;

a plurality of appropriate bearings being provided to hold the free end/rims of the drums for lubrication, for cooling, and for alignment;

said design being done to double the speed of a driven machine being driven by a low speed turbine, as illustrated by parts 51/54 of FIG. 9.

22. A wide face scavenger energy converter system in accordance with claim 1 or claim 3 or claim 6, including a new design for a kite that stands floating on water by itself, comprising:

a radial formation of three wide face framed sails at equally 120 degrees between each sail;

a central common elongated pipe bar to hold one side edge of each sail;

a cylindrical lifter/floater elongated pipe attached to the outer peripheral side edge of each sail to float the whole assembly;

a plurality of elongated floating shoes being attached, on and off, to and below the peripheral floater pipe sail frames, by mean of a pivote pin connector so that said shoes automatically align with the water current;

a radial frame at each end and midpoint of said common central bar to hold the sails in equal radial spacing;

a plurality of guy strings interconnecting each outer peripheral frame to further equally space the sails;

a rail track ring/rope connector, having a continuous holding groove along its length, attached around the outer ¼ section of the kite assembly;

a pair of kite-sling contol rope being attached to the ring/rope connector thru said holding groove by means of a roller assembly or by pulley;

a moving anchor boat, having a wide face base board and a wide face vertical underwater walls at the side edges of the base board, being attached to the other end of said kite sling rope;

a steering winch interconnecting the boat and the kite sling rope, used to elongate or shorten either side of the control kite sling rope; and a wide face underwater vertical wall being attached on-and-off the bottom of the outer peripheral floater pipes of the sails to make the radial kite assembly be an independent sail boat at will, as illustrated by FIG. 1A and by FIG. 12.

23. A wide face scavenger energy converter system in accordance with claim 1 or claim 6, including a new design for a lighter than air wind turbine, wherein, an elongated lifter balloon is attached to the outer periphery of each wide face turbine blade, said balloon revolves with the blade around the wind turbine, and being made pointed towards the direction of revolution at a posture oblique to the wind, as illustrated by part 45 in FIG. 6.

24. A wide face scavenger energy converter system in accordance with claim 1 or claim 6, including a new design for an oppositely rotating electric generator for the purpose of being driven by an oppositely rotating turbine, comprising:

a plurality of wire coil armatures in die form of circular discs, each disc having a center hole;

a central drive shaft to which the discs are spacedly attached in a series thru said center hole, and which drives to spin the discs co-axially;

a plurality of magnets in the form of circular discs, each side of which being north pole and south pole respectively, each disc having a center hole large enough to be clear from the central drive shaft;

a pipe/drum type drive shaft, serving as outside shell of the generator, inside of which, the magnet discs are attached in a series alternately in between said wire coil discs with appropriate clearance between discs;

said outer shell drive shaft turns to spin the magnet discs co-axially in opposite direction against the rotation of the wire coil discs; and said wire coil discs being free and clear from the inside walls of the outer shell drive shaft to form a working electric generator.

25. A wide face scavenger energy converter system in accordance with claim 1 or claim 6, including a new design for an oppositely rotating water turbine to drive an oppositely rotating driven machine, comprising:

a structural material that floats on running water but anchored stationarily;

an underwater cylindrical drive shaft suspended from the floater structure thru connector bars and bearings around said cylindrical drive shaft;

a plurality of sets of wide face turbine blades, spacedly attached in a series around and along the length of the underwater drive shaft in order to produce a long turbine that is submerged under and along the running water;

a plurality of this apparatus being layed parallel to each other, in a horizontal array and in a vertical array, current wise, and being made to alternately rotate against each other;

opposite turbines are paired together and made to drive a series of oppositely rotating electric generators/compressors that are mounted above the water on top of the floater structures, thru drive belts and pulleys.

26. A wide face scavenger energy converter system in accordance with claim 1 or claim 7 including a new design for an anti-overturning control device, wherein, a control structure is attached to the mid-section of the vehicle that serves as a moving anchor for a kite sail, comprising:

a structure attached to the upper mid-section of the vehicle and sufficiently protruding/extended outside on each side of the vehicle;

a deep-groove roller pulley being provided at each outer end of the control structure;

a winch being provided attached to the contol structure; and a control rope, in a complete loop, being wound around the winch and thru the deep-groove roller pulleys, and the two ends of which are attached to the connector of the steering winch that is attached to the lower end of the kite sling rope, as shown by parts 14, 26, 28 and 29 of FIG. 4.

27. A wide face scavenger energy converter system in accordance with claim 1 or claim 7, including a new design for an anti-overturning control device for a vehicle being pulled by a kite as in FIG. 4, comprising:

a rail bar, with wide flange on top, transversely attached to the top of the vehicle, with the ends sufficiently extended far out beyond the sides of the vehicle;

a hook roller assemble being fitted to bite and roll on the top flange of the rail bar;

an eye-hole ring connector interconnecting the top of the look roller assembly with the control winch of the kite;

a water tank counter weight attached to each side of the vehicle; and at least one pipe inter-communicating the counter weight tanks to transfer water weight from either side to the other side by a pump.

28. A wide face scavenger energy converter system in accordance with claim 1 or claim 7, including a new design for an anti-overturning control device so that the kite pulls the vehicle along a line of action that passes below the centroid of the vehicle, as in FIG. 4, comprising:

a straight hollow box bar, with a longitudinal slot/opening made on top, attached transverse to the top of the vehicle, and made telescopic to be extended sufficiently beyond the side of the vehicle;

a roller bearing assembly trapped/housed inside the hollow box bar and made free to roll back-and-forth inside the box bar; and an upward connector bar, coming out thru the slot, and interconnecting tile roller assembly with the bottom of the kite's control winch.

29. A wide face scavenger energy converter system in accordance with claim 1 or claim 7, including a new design for a wide face kite that is used as a wind sail, comprising:

a continuous light structure bar frame, constructed and bent to form and serve as the front and side edges of the kite;

a central axial bar frame, one end of which being attached to the midpoint of the front frame, and said bar being extended far to the rear;

a plurality of bar frames attached to the front frame, being extended to the rear of the kite, and made parallel to the central axial bar frame;

a transverse bar frame, bent slightly upward at its midpoint, passing thru the centroid of the kite, and interconnecting all the other frames;

a rope/string interconnecting all the free rear ends of the various frames;

a wide cover sheet, having a rope around its edges, and attached to the frames and to the rear ropes, to cover the whole face of the kite;

a channel clip bring provided to each bar frame to hold the rope edges of the cover sheet;

a sling steering anchor rope attached to each side wing of the kite;

a steering anchor bar, each end of which being correspondingly attached to the left and to the right sling ropes;

a moving anchor vehicle upon which the steering bar is attached to; and a moving weight attached by rope to the tail of the kite.

30. A wide face scavenger energy converter system in accordance with claim 1 or claim 7, including a new design for a wide face fluid deflector, wherein, when it is used as a kite, said wide face is made similar to the shape of and folds like the Butterfly Wing, having various colored arts, said kite being used as a hand glider, for various adventure sports, for advertising, for multilevel formations, and for use as a kite-sail, said Butterfly Wing being also used for a water/wind turbine blade that folds closed when moving against the current.

31. A wide face scavenger energy converter system in accordance with claim 1 or claim 6, including a new design for a wide face wind deflector, wherein, two units of said Butterfly Kite are paired and attached to each other side-by-side thru the wing tips, the kite on the left being attached by a sling anchor rope to the left end of the steering control bar, while the kite on the right being attached by another sling anchor rope to right end of the same steering control bar, the center of the steering bar being attached to a load, and a lifter balloon/kite being attached to each left and right sling anchor rope to prevent the kite from diving to the ground.

32. A wide face scavenger energy converter system in accordance with claim 1 or claim 6 including a new design for a Butterfly Kite, wherein, the kite is made out of inflated cylindrical balloons that are attached to each other side-by-side in order to form a wide face balloon having the shape of a butterfly, a double oppositely rotating co-axial windmill being attached to the tail of the Butterfly Kite, and said windmill being used as power to move the butterfly wings for advertising purposes.

33. A wide face scavenger energy converter system in accordance with claim 1 or claim 3, including a new design for a double deck wide face wind deflector kite, comprising:

a box-type frame covered by light sheets with two opposite sides open, the box being positioned so that one open side faces the wind and one diagonal which is made shorter by a control string is vertical;

a sling control rope being attached to the bottom corner of the box so that the box will fly as a kite;

another box is made the same as the first box and being attached side-by-side to the first box to form a double box double deck kite; and said box kite being used as a hang glider or to tow and to carry loads by attaching a lifter pointed balloon thru a double sling rope that is tied to the top of each box, said balloon being shown in part 2 of FIG. 1 and part 3 of FIG. 3.

34. A wide face scavenger energy converter system in accordance with claim 1 or claim 3 or claim 7, including a new design for a moving weight that is connected by a rope to the tail of a kite to limit the flight elevation of the kite-sail to a few feet above the ground/water in order to have more face of the kite against the wind, wherein, said weight is not being lifted by the kite but said is made of various types to float on water, to roll on land, to slide on ice, and to serve as another vehicale as being towed thru the kite's tail, as shown in part 17 of FIG. 1 and part 35 in FIG. 3.

35. A wide face scavenger energy converter system in accordance with claim 1 or claim 7, including a new design for a wind resistor/sail, wherein a control string/rope is provided and attached to the inside center of the parachute to invertly close the parachute by pulling said control string, or to re-open the parachute by releasing said control string, said controllable parachute being used as wind resistor by attaching it to the tail of a kite in order to limit the flight elevation of the kite, and also being used as wind sail to pull loads/persons uphill or in any situation, as shown by part 12 and part 17 of FIG. 3.

36. A wide face scavenger energy converter system in accordance with claim 1 or claim 6, including a new design for a kite-type wide face wind deflector, comprising:

a wide rectangular central main body;

a butterfly wing attached to and made to pivot along each opposite sides of the main body;

said wing being made adjustable to upright position to serve as sail while the main body flaots horizontally on water;

at least one elongated floating shoe being pivotally attached to and below each opposite sides of the main body to float the kite on water;

said floating shoes being pivotally free to adjust along the direction of the water/wind current;

a jack being provided on the front shoes to tilt up the front nose of the kite in preparation to fly; and a sling anchor rope being attached to each left and right side of the main body for use to pull a load while the kite is floating on water or in flight.

37. A wide face scavenger energy converter system in accordance with claim 1 or claim 33 or claim 34, including a new design for a wide face winged airplane, wherein, the wings of the airplane are made to conform with the shape and art designs of the Butterfly Wings and made wide face enough so that the wings serve as parachute for the airplane when it is falling down to earth.

38. A wide face scavenger energy converter system in accordance with claim 1 or claim 35, including a new design for wide face winged airplane, wherein, the wings are made into square geometric figures, the outer of which being rounded off, in order to make the wings able to deflect more wind and to serve as parachute for the airplane.

39. A wide face scavenger energy converter system in accordance with claim 1 or claim 7, including a new design for an anti-overturning control device, wherein, a weight with elongated shape and made slippery on water is calibrated to slightly float on water but mostly submerged when set free on water, said weight serves as ballast weight and being attached to each side of a water vehicle/boat, on the water line, to improve/increase or to provide stability to the boat, as shown in part 23 of FIG. 4.

40. A wide face scavenger energy converter system in accordance with claim 1 or claim 6, including a new design for a wide face fluid deflector, wherein, the water turbine blade, attached around a pipe structure, is made into a continuous spiral screw fin that tapers off to zero at its front end in order to prevent the blades getting entangled with debris present in the flowing water, said pipe turbine being submerged along the water current, and a plurality of this type of water turbine in opposite rotation being co-axially jointed together in a series by means of a steady gear box structure that drive a oppositey rotating machine above the water thru drive belts, as shown by part 32 of FIG. 8.

41. A wide face scavenger energy converter system in accordance with claim 1, including a new design for an oppositely rotating device, wherein, a set of co-axial oppositely rotating driver pulleys are made to correspondingly drive another set of co-axial oppositely rotating driven pulleys, said mechanical device being used, wherein, the set of driver pulleys are attached to oppositely rotating prime mover machines, while the set of driven pulleys being away from the driver pulleys.

42. A wide face scavenger energy converter system in accordance with claim 1 or claim 35, including a new design for an aircraft, wherein, the propeller blades of a helicopter are made wide face double deck oppositely rotating propellers that are being correspondingly driven by an oppositely rotating co-axial drive shafts, the upper deck propeller being driven by the inner drive shaft, said wide face propellers being made wide enough in order to serve as parachute the helicopter plane when its engine fails to run while in flight, as shown in part 31 of FIG. 15E.

43. A wide face scavenger energy converter system in accordance with claim 1 or claim 6, including a new design for a wide face lighter than air wing, wherein, a plurality of elongated lifter balloons, bent upward at mid-section, are being attached to each other side-by-side to form a wide face wind deflector that floats in air, a kite-sling anchor rope being attached to the bottom of said mid-section bent to make the wing fly as a kite, two units of said wing being attached to each other side-by-side by the wing tip to form a double butterfly much wider deflector and to make it easier to steer, as illustrated by part 48 in FIG. 6.

44. A wide face scavenger energy converter system in accordance with claim 1, including a new design for a wide face water turbine in the form of a large paddle wheel, comprising:

a long large central floater pipe drive shaft/hub that floats the wheel;

a plurality of wide face fluid deflector boards radially and longitudinally attached along the length of the central drive shaft;

said paddle wheel being horizontally and perpendicularly submerged in running water by one-half its diameter in order to turn;

a support bearing mechanically attached to each end of the drive shaft;

a pair of rigid bars with chain/ropes serving as hanger, to adjustably suspend the paddle turbine in accordance with the varying elevation of the running water, thru said end bearings;

a road bridge or a pair of errected structural posts upon which the wheel is suspended;

a pair of drive pulley being provided at each end of the drive shaft;

an oppositely rotating electrict generator or other driven machines being attached to each of the left and the right suspension bars;

a drive belt inter-mechanically connecting the inner pulley of the drive shaft to the clockwise pulley of the electric generator;

a twisted drive belt inter-mechaniclly connecting the outer pulley of the drive shaft to the counter-clockwise pulley of the electric generator; and a set of electric wirings and converters to conduct the power out put.

45. A wide face scavenger energy converter system in accordance with claim 1 or claim 44, including a new design for a wide face paddle wheel turbine, comprising:

an elongated carrier floater/boat anchored stationarily against the running water but along the current;

a one continuous drive shaft centerly attached by bearings to the top of and perpendicular to the floater;

said drive shaft being extended well beyond and outside the floater's sides;

a large paddle wheel attached to the left section of the drive shaft;

a large paddle wheel attached to the right section of the drive shaft;

said floater being designed to float the wheels in appropriate elevation above and perpendicular to the running water;

a pair of drive pulleys being provided and attached to the drive shaft;

an oppositely rotating electric generator being mounted above the drive shaft thru structures being attached to the floater;

a direct drive belt mechanically interconnecting one pulley of the drive shaft to the pulley of the clockwise armature of the generator;

a twisted drive belt mechanically interconnecting the other pulley of the drive shaft to the pulley of the counter-clockwise drum-type magnet of the generator; and a set electric wires and converters to conduct the power output, as illustrated by FIG. 17.

46. A wide face scavenger energy converter system in accordance with claim 1 or claim 3 including a new design for a wide face wind deflector, wherein, a kite wind sail is provided with wheels that roll on the ground without flying to pull vehicles on land, comprising:

a rectangular frame upon which a light sheet is spread and attached to, to form the main body of the wide sail;

a pair of diagonal cross-brace ropes tightly intertying the opposite corners of the frames to keep the frames stay in a square shape;

a rectangular flap wing sail attached to each side of the main body;

a pivote wheel attached to the bottom end of the main frames;

control ropes for the flap wing sails;

a kite sling rope attached to the left vertical frame of the main body;

a kite sling rope attached to the right vertical frame of the main body; to make the sail stand against the wind:

a mechanized steering winch drum upon which the left kite sling is wound counterclockwise, and upon which the right kite sling is wound clockwise;

a hollow rail box bar having a length wise slot on its top to serve as anti-overturning control device;

a bracket connector, having a hook roller at its bottom end that is placed inside the hollow rail box, and which bracket holds the steering winch;

a land vehicle, having steerable wheels, upon which the anti-overturning rail box bar is transversely attached to; and a steering device being provided to the vehicle to steer the wheels; as illustrated by FIG. 5.

47. A wide face scavenger energy converter system in accordance with claim 1 or claim 46, including a new design for a wide face wind deflector, wherein, a kite wind sail is provided with floating shoes that hold the kite above the water, comprising:

a rectangular kite with rigid frames that hold the wide face sheet;

an additional frame at the rear attached to the mid-point and bottom point of the main side frames to make the sail stand on a plurality of posts;

a boat or a pointed floater pipe, serving as floater shoes, pivotally attached to the bottom end of each of all the legs to support the sail above the water;

an underwater rudder wideface board attached below one end of each shoe;

a kite sling rope attached to each of the left and the right side frames of the sail to make the sail stand against the wind;

a mechanized steering winch drum upon which the left sling rope is wound around counter-clockwise, and upon which the right sling rope is wound around clockwise;

a boat or a pointed floater pipe serving as a vehicle pulled by the sail;

at least one mast erected on the boat;

a circular/elliptical rail track centrally attached to the top of the boat;

an anti-overturning control bar, having an eye-hole at the outer end, pivotally attached to the center of the boat and attached by a hook-roller-bolt connector to the groove of the circular rail track, upon which control bar, the steering winch drum is attached to by means of connector bars or ropes;

a vertical wideface blade wall attached longitudinally to the bottom of the boat, to resist the sideward pull of the kite sail;

a wide face rudder attached below the ends of the boat; and a pointed logitudinal weight bar attached to the bottom of the blade wall to keep the boat upright against the various lateral forces, as illustrated by FIG. 5A.

48. A wide face scavenger energy converter system in accordance with claim 1, including a new design for a windmill, wherein, a wide face wind sail is eccentrically attached to a mast that act as torsion bar, and wherein, a set of four of this sail turns a large drum-type drive shaft clockwise, while another set of this sail turns counter-clockwise another smaller drum-type drive shaft that is inserted inside the first drive shaft, in order to drive a plurality of electric generators that are inserted in between the two drum-type drive shaft, comprising:

an outer drum drive shaft, having spline gears on the inside walls, serving as hub for the rear set of turbine blades;

an inner drum drive shaft, having spline gears on the outside walls, serving as hub for the front set of turbine blades;

a pair of slender pipe mast that pierced thru each of the inner and the outer hubs to form four radial masts around each of the drum hubs;

a radio controlled motorized coil spring attached to the base of each radial mast at a point where the mast is cut, to provide a control device to nutralize the sails during violent winds or during maintenance;

a wide face wind sail eccentrically attached to the right of the outer section of each of the rear radial masts, so that the mast get twisted when the wind blows very hard, and to drive the rear masts counter-clockwise;

a wide face wind sail, likewise, eccentrically attached to the left side of the outer section of each of the front radial masts, to drive the masts clockwise;

a plurality of planitary gears spacedly inserted in between the spline gears of the outer and the inner drum hubs;

a stationary electric generator or compressor mechanically attached to hold each of and set to be driven by the planetary gears;

a strut structure centrally attached to the front of the inner hub drum to serve as forward guy post, with a pivote connector at the front end;

a stiff bar extension attached to the outer end of each of the rear masts;

a guy wire/rope attached to the outer end of each of the front masts and tied to the front end of the guy post; and a guy wire/rope attached to the bar extension of the rear masts and tied to the front pivote connector of the struts, see FIG. 11 and FIG. 26.

49. A wide face scavenger energy converter system in accordance with claim 1 or claim 48, including a new design for an oppositely ratating windmill, wherein, a wide face butterfly-type wind sail is used as wind turbine blade, comprising:

an inner and an outer drum hub;

a plurality of slender front set and rear set of radial masts correspondingly attached to and pierced thru the inner and the outer hubs;

a right angle bent outer extension of each of the masts;

an outer bar extension of the masts;

a transvers bar connector attached to the bent end of the masts;

a wide face butterfly wing type sail, in the shape of a butterfly wing or in the shape of a rectangle, that opens/closes transverse to the mast, being attached eccentrically to the mast and along the the transverse bar connector, in such a way that the inner hub turns counter-clockwise, while the outer hub turns clockwise;

a radio controlled control system that keeps the butterfly wing-type sails wide open against the wind, and to close same sails in times of emergency;

a plurality of groove/gear belt driver rings set around the drum hubs;

a plutrality of stationary oppositely rotating multilayer drum-type DC electric generators set around the drum hubs, with the drum magnet serving as the outer shell of the electric generator;

a groove/gear drive pulley attached to the plate that holds the drum magnets of each of the electric generator, likewise, another gear drive pulley attached to the plate that holds the induction wire coil drum of each electric generator;

a plurality of drive belts inter-connecting the drive rings of the hubs with the drive pulleys of the electric generators, in such a way that the inner hub drive rings drive the induction coil drums counter-clockwise, while the the outer hub drive rings drive the magnet drums clockwise;

an inverter/voltage regulator to step up the DC output;

a supper high voltage capacitor to serve as energy bank to store the electric energy produced; and a voltage regulator/inverter to release the energy from the energy bank and feed to the community grid, see FIG. 16.

50. A wide face scavenger energy converter system in accordance with claim 1 or claim 46, including a new design for kite-sail that pulls a person holding it thru a grab-bar/kite-sling, comprising:

a rectangular wide face kite that serves as wind sail;

a plurality of pivote wheels/floaters/ski shoes attached to the bottom of the sail to make the sail self supporting and to run on the ground/water/snow;

a pair of bow grab bar attached to the kite or a horizontal grab bar attached by sling ropes to the kite thru which the operator holds and steers the kite;

a saddle sling rope by which the kite pulls the operator by his butt; and a pair of shoes that rolls on land, float on water, or slide on snow, see FIG. 13.

51. A wide face scavenger energy converter system in accordance with claim 44 or claim 50, inlcuding a new design for a kite, wherein, ester/aerogel/foamed plastic is used to form the kite to make it light as possible, and wherein, a grab bar is used as a means to steer the kite, by tieing the grab bar to the kite by the kite sling rope, as in FIG. 13.

52. A wide face scavenger energy converter system in accordance with claim 1 or claim 45 including a new design for a paddle wheel type prime mover, wherein, the carrier floater pipes/boats are placed at each end of the paddle wheel that is half submerged across a running water, and wherein, the carrier floater/boats are tied by ropes to an anchore that is above the water to avoid debbrie being caught on the anchor ropes, as shown in FIG. 17.

53. A wide face scavenger energy converter system in accordance with claim 1, including a new design for a wind turbine, wherein, the blades are made to be almost half circle to make them wide face, which are in the form of hand air fan and attached spirally on the drum-type hub, in such a way that the pair of blades revolve opposite against each other, said blades being painted with a rainbow design in multicolor, as illustrated by FIG. 14E.

54. A wide face scavenger energy converter system in accordance with claim 1 or claim 53, including a new design for a wind turbine, wherein, a plurality of wide face wind deflectors are made in the form of a petal of a flower and painted into various multicolor designs, said petals are spirally attached to the drum-type hubs that are attached to a tree by means of a circular rail-type bearing strapped around the tree in such a way that one set of large flower is in front of the tree while another set of larger flower is at the back of the tree, the two flowers being made to rotate opposite against each other, and a plurality of guy wires/ropes being provided thru a cross arm/bar at the upper section of the tree, as illustrated by FIG. 14F.

55. A wide face scavenger energy converter system in accordance with claim 1 or claim 3, including a new design for a wind concentrator, or ram-type supper charger, wherein, an inclined wide face fluid deflector is use as base for two opposing vertical walls that gradually get nearer to each other at the rear end in order to ram the speeding wind into the intake manifold of an engine in order to supercharge or pre-compress the air before it gets into the engine, said ram being attached/constructed on the hood or on the top of a car or truck, to supply pre-compressed air into the carburetor or into the gas turbine engine of the truck, as illustrated by FIG. 15B.

56. A wide face scavenger energy converter system in accordance with claim 1 or claim 55, inlcuding a new design for a transportation vehicle, wherein, in order to take benefits from the scavenger effect of a ram-type suppercharger, an oppositely rotating gas turbine engine, that takes in the pre-compressed air supply from the supercharger, is installed to serve as the principal locomotive power for the car/truck.

57. A wide face scavenger energy converter system in accordance with claim 1 or claim 55, including a new design for a an airplane, wherein, the lower face of the airplane wing serves as an inclined wide face base for the vertical opposing wind concentrator walls in order to form a ram-type supercharger below the wing and at the mouth of the jet engine, in order to add more mass of matter being expelled violently to the rear by the jet engine of the airplane, the body of the airplane being made to serve as one of the fluid deflectors with an additional vertical guide concentrator wall starting from below the body, getting out larger towards the side, and ending without leak at the mouth of jet engine, as illustrated by FIG. 15A.

58. A wide face scavenger energy converter system in accordance with claim 1 or claim 57, including a new design for a large transport airbus, wherein, a plurality of wide face wall ram-type air concentrators are built under the wings of the airbus in alignment without leak to the mouth of each jet engine, in order to supercherge the engines, as illustarated by FIG. 15D.

59. A wide face scavenger energy converter system in accordance with claim 1 or claim 7, including a new design for a parachute, wherein, a control rope is attached to the inside center of the parachute, said control rope is being used to collapse or to re-open the parachute against the wind, said parachute being used for sports or being used as sail to pull loads.

60. A wide face scavenger energy converter system in accordance with claim 1 or claim 42 including a new design for a man-powered helicopter, wherein, a double deck oppositely rotating properllers having almost half circle wide face blades that are spirally attached to correspondingly inner and outer pipe drive shafts are driven by man power or by the passenger thru foot peddals that are mechanically attached to drive pulleys and twisted belts, as illustrated by FIG. 15E.

61. A wide face scavenger energy converter system in accordance with claim 1 or claim 55 or claim 57, including a new design for a water wave magnifier, wherein, a pair of wide face fluid deflectors in the form of opposing floating sea walls constructed on the ocean, having wide open mouth outfront and getting nearer to each other at the rear to concentrate the in coming water waves, for energy conversion, comprising:

- a pair of opposing wide face water wave deflector floating sea walls disposed oblique to the water waves and set to be further apart from each other upfront to make a wide mouth entrance channel, but constricted to the rear end like a funnel;
- said entrance walls being made to be wider face towards the rear;
- a plurality of controller compressed air container pipes stacked at the bottom of and made part of the floating sea wall, having water entrance valves and air hose connectors, being used to refloat and to sink the walls under water during violent weather, as illustrated by the part No. 4 of the U.S. Pat. No. 5,027,735;
- a wide face floating sea wall disposed perpendicular to the water waves and attached to each rear end of the surf magnifier walls, to form a canal-like channel to contain the magnified surf for a long distance for sports;
- said entrance deflection walls and the container walls being extended sufficiently down under water to prevent spill thru of the surfs under the walls;
- a plurality of floating vertical posts attached to and to support the walls;
- a heavy weight attached to the bottom of each floating post;
- a plurality of inside guy sling ropes inter-tieing the walls;
- a plurality of outside guy sling ropes attached to the walls;
- a heavy anchor block laid on or burried in the ocean floor and tied to the outside guy sling ropes;
- a pair of tower posts alignedly attached to the channel container walls;
- a heavy weight attached to the bottom end of each tower post;
- a plurality of floater mostly submerged pipes attached to each tower post at the water level to keep the tower posts erect and floating;
- said tower posts being extended long enough down into the deep water to make the towers more upright;
- a plurality of cross-arms and X-braces attached to the top section of the tower posts to reinforce the tower and to serve as hanger for the wires;
- an oppositely rotating multilayer drum-type electric generator and an air comprssor serving as driven loads;
- a clockwise rotating flywheel having a hoist drum and a drive shaft mechanically attached to and set to drive the induction wire coil drum of the electrict generator;
- a counter-clockwise rotating flywheel having a hoist drum and a drive shaft mechanically attached to and set to drive the magnet drum of the electric generator;
- a ratchet tooth gear and pawl assembly inter-connecting each flywheel to each corresponding hoist drum such that the flywheels are driven one way;
- a carrier pipe shaft inserted thru the center holes of the flywheels, thru the center holes of the hoist drums, and thru the center hole of the generator, and inter-connecting the two tower posts at an elevation above the water;
- an oscillator floater pipe see-saw assembly pivotally attached to the tower posts at a point of the mean or undisturbed water level;
- a plurality of ropes wound around the hoist drums, clockwise and counter-clockwise, and tied to the oscillator see-saw assembly to drive the hoist drums clockwise and counter-clockwise alternately; and
- a power transmission line attached to the top cross-arm of the tower posts connected to the electrict generator to pick up the energy produce from the various power stations floating on the ocean, see FIG. 18.

62. A wide face scavenger energy converter system in accordance with claim 1 or claim 61, including a new design for a trans-ocean power transmission line, wherein, an assembly of outward spreaded multiple legs that have weights is attached to the bottom section of each tower post, each leg being tautly tied to the anchor on the ocean floor, such that the floater device attached to the water level section of the tower body is totally submerged underwater to make the tower permanently erect against the surfs and to stay at a permanent elevation against the rising tides.

63. A wide face scavenger energy converter system in accordance with claim 1 or claim 61 or claim 62, including a new design for a floating house/station, wherein, a house or building is constructed on or being supported by a plurality of the said floating tower posts that have multiple out-spread legs without weights, but each leg being tautly tied down to an anchor on the ocean floor such that the floater device attached to the tower post body is totally submerged underwater, and wherein, the buoyant power of the floater device for each tower post is made much more than the weight being carried/supported by each tower post.

64. A wide face scavenger energy converter system in accordance with claim 1, including a new design for a reverse oppositely rotating compact wide face blade gas turbine engine, wherein, the inner section of each turbine blade is inclined to the right while the outer section of the same blade is inclined to the left, comprising:

- an assembly of wide face half exhaust and half compressor turbine blades spacedly attached to a top covered inner drum that rotates counter-clockwise;
- an assembly of wide face half compressor and half exhaust turbine blades that are spacedly attached to an outer drum that rotates clockwise, these blades being inserted in between the counter-clockwise blades, the outer drum serving as outer shell of the engine;
- a dividing drum wall having an upper edge tongue and a lower edge groove placed in between the exhaust section and the compressor section of each turbine blade, said tongue fits loosely to the bottom groove of the upper succeeding dividing drum of the opposing blade;

a centrifugal wide face impeller blade that serves as last stage compressor blade and attached to the outer end of the first stage exhaust blade;

an assembly of multilayer drum-type induction wire coils attached to the top cover plate of the inner drum;

an assembly of multilayer drum-type magnet inserted in between the induc-wire coil drums and attached to the plate structure driven by the outer drum, in order to form an oppositely rotating electric generator that is driven by the turbine engine;

a circular structural anchor plate attached to and covering the bottom end of the inner drum, which plate being extended outside the inner drum and beyond the path of the exhaust air, being provided with circumferencial catch wall, and having a plurality of large perforations thru which the exhaust air passes;

a cylindrical pipe center hole being attached to and pierces the upper and the lower cover plates of the inner drum;

a structural plate attached to and covering the upper end of the outer drum, having a plurality of large perforation holes for the intake and the exhaust air to pass thru, said plate holds and drives the magnet assembly of the electric generator;

a structural anchor circular plate, attached to and outside the lower lip of the outer drum, and having a circumferencial catch wall;

a cylindrical pipe center hole attached to the center of the top cover plate of the outer drum, passing down thru the center and inside the pipe center hole of the inner drum;

a bottom circular anchor plate below the bottom anchor plate of the inner drum and attached to the bottom end of the pipe center hole of the outer drum, said plate having a circumferencial catch wall;

a rotating chimney wall attached to the top of the top cover plate of the outer turbine drum, separating the cold intake air from the hot exhaust air;

a plurality of roller bearings set between the anchor plates and between the cylindrical pipe center holes to allow free movements of said parts;

a cooling system, comprising: a cold air inlet supply pipe connected to the bottom of the center pipe hole of the outer drum, a plurality of holes allowing the cold air to get into the various parts of the electric generator and into the roller bearings, air seals, and outlet/exit holes;

a plurality of electric power take off connectors at the generator, and a plurality of power take off connectors below the turbine;

an inner deepwell open bottom pipe, centerly connected to the bottom of the exhaust turbine, serving as exhaust path of hot air, and extended to the source of heat energy, such as a geothermal or a trash burner, among others;

a circular anchor track attached to the top of the inner deepwell pipe to take hold of the bottom anchor plates of the center pipe holes;

an outer closed bottom deepwell heat absorbing radiator pipe centerly containing the inner deepwell pipe, centerly connected to the output end of the compressor turbine, serving as path and heating chamber for the cold compressed air, and extended to the source of heat energy such as trash burner;

a circular anchor track attached to the top lip of the outer deepwell pipe, and holds the structural circular bottom anchor plate of the outer drum; and a house covering the power plant, see FIG. 19.

65. A wide face scavenger energy converter system in accordance with claim 1 or claim 64, including a new design for a heat energy converter wherein, the heat absorbing radiator pipe well is in the form of a plurality of branches extended into the heat source, and intercommunicated into one pipe line that is connected to at least one unit of reverse compact wide face bladed gas turbine, comprising:

an attic of a house/building, having thick insulators against heat on the walls and on the floor to prevent scape of the heat energy;

a transparent roof for the building, that allows sunlight to pass thru and get into the attic, having a top transparent roof sheet and at least one lower transparent sheet, and said roof sheets being spaced and separated from each other by air or by a vacuum, to form a solar trap attic;

a heat absorbing radiator assembly of a plurality of double pipes installed into the solar trap attic, having at least one cold compressed air inlet and at least one hot air outlet;

a flat black paint or black dust being sprayed on the radiator pipe's surface;

at least one fire place or trash burner into which some branches of the radiator pipes are extended, to run the turbine engine when the sun is out;

at least one reverse compact gas turbine engine connected to said radiator pipe assembly; and an electric generator driven by the gas turbine, see FIG. 21 and FIG. 22.

66. A wide face scavenger energy converter system in accordance with claim 1 or claim 65; including a new design for an external combustion trash fuel engine, wherein, a clean burning fireplace is directed to exhaust the hot combustion air into the fireproof attic of the building to heat up the radiator pipes installed in the attic, making the attic as a chimney chamber, in order to run the oppositely rotating wide face bladed gas turbine engine, said engine comprising: a separate compressor turbine, a separate hot air exhaust turbine, a separate oppositely rotating electric generator, and said three component parts being interlinked to run together by means of drive belts and pulleys, and wherein, the last part of the exhaust chemney is installed at the other side end of the attic away from the fireplace, and wherein, some of the clean hot air from inside the radiator pipes is being supplied thru air ducts into the living spaces of the building, see parts 30, 31, 32 of FIG. 31.

67. A wide face scavenger energy converter system in accordance with claim 1 or claim 65 or claim 66 including a new design for an external combustion clean burning trash fuel engine, wherein a plurality of heat absorbing radiator pipes are installed into the combustion chamber of a trash incinerator in order to run the oppositely rotating gas turbine engine, and wherein the trash is made to burn from the top, comprising:

an elongated trash combustion chamber having a high spacious head room;

an assembly of a plurality of heat absorbing radiator pipes installed into the spacious combustion chamber;

a canal on the floor of the combustion chamber to serve as buring pit;

an auger-type conveyor to drive trash into the burning pit;

a bin with a bottom funnel gate to gradually release the fuel trash;

a plurality of hot air supply bars having a plurality of downward nuzzles, said bars being on top of and perpendicular to the burning canal;

an air supply passage wall enclosing the combustion chamber on the rigth wherein the air is flowing towards the front;

an air supply passage ceiling enclosing the combustion chamber on the top, wherein the air is flowing towards the rear, and which is communicated at the front with the right wall air supply passage;

an air supply passage wall enclosing the combustion chamber on the left, wherein the air is flowing towards the front, which is intercommunicated at the rear with the ceiling air supply passage, and which is intercommunicated with the hot air nuzzle bars;

a thick insulator against heat transfer totally enclosing the outer sides and the roof of the air supply passages, the ends of the combustion chamber, and also enclosing the bottom of the combustion chamber;

an ash drop off outlet pipe at the end of the burning pit with a pan;

an air intake supply pipe connected to the right air passage wall and extended open bottom well below the elevation of the combustion chamber, to prevent back flow of the supply air;

a tall pipe exhaust chemney connected to the bottom rear end of the combustion chamber, and extended well upward to make a vacuum effect upon the waste combustion hot air;

an air intake supply pipe enclosing the chimney and connected to the right air supply passage wall to recapture the heat from the chimney;

a valve regulator in each air intake pipes to slow down air flow to prevent dust kick off on the ash;

an oppositely rotating gas turbine engine with a driven electric geneator;

a cold compressed air pipe line intercommunicating the last stage compressor of the engine with the outer pipes of the heat absorbing radiator;

a hot air pipe line intercommunicating the first stage of the exhaust turbine with the inner pipes of the heat absorbing radiator; and a heat insulator enclosing said intercommunication pipe lines, see FIG. 20.

68. A wide face scavenger energy converter system in accordance with claim 1 or claim 65 including a new design for a power house, wherein, the walls, the floors, the ceilings, and the roofs of the buildings are in the form of a high voltage capacitor, and wherein said parts of the buildings are integarated/interconnected to each other to form a large capacitor, and wherein, in addition to the solar trap energy converter, a plurality of solar cells or photovoltaic cells are installed on the roof to charge the high voltage capacitor house/building thru the assistance of an inverter and a transformer..

69. A wide face scavenger energy converter system in accordance with claim 1, including a new design for an internal combustion trash fuel oppositely rotating wide face blade turbine engine, wherein, the trash/garbage is burned by the air being compressed by the engine, wherein, the trash/coal fuel is being distilled out of its sulfure content, and wherein, the exhaust gas out of the turbine is being cleaned before being set free to the atmosphere, comprising:

an oppositely revolving wide face sail-type bladed hot gas turbine;

an outer and an inner oppositely rotating turbine drums that correspondingly hold the wide face turbine blades;

an inner and an outer pipe drive shaft correspondingly attached to each turbine drum, each pipe drive shaft being extended to the front of the engine;

a centrifugal compressor driven by the outer pipe drive shaft;

an oppositely revolving wide face sail-type bladed compressor turbine attached to and correspondingly driven by the said inner/outer pipe drive shafts;

a supercharger in the form of an oppositely revolving wide face sail-type bladed centrifical compressor correspondingly drivin by the inner/outer pipe drive shafts;

an upfront oppositely rotating multilayer drum-type electric generator correspondingly driven by the inner/outer pipe drive shafts;

a combustion chamber centrally containing and holding the pipe drive shafts, and placed in between the compressor and the hot gas turbine;

a plurality of bearings inter-holding the drive shafts, turbines, and the combustion chamber;

a plurality of heat energy producing devices intercommunicated in a series connection by means of an insulated air duct high pressure pipe that is connected to the outlet of the centrifugal compressor, comprising: a solar trap, a trash incinerator, a geothermal well, a nuclear burner, and a heat absorbing radiator at the exhaust tail of the hot gas turbine;

an insullated hot air duct intercommunicating the radiator with the combustion chamber;

a plurality of hot air nuzzles installed inside the combustion chamber to distribute the hot air supply to the trash fuel and around the chamber;

a gas fuel pipe inserted into the combustion chamber thru the lowest hot air nuzzle that is directed to blow on the trash fuel;

a trash fuel injection chamber, comprising: a piston to push in the trash, a trash burning chamber that receives the trash from the piston, said trash burning chamber being much larger than the piston chamber to provide head room for burning the trash fuel, a large bin above the piston to receive trash from a dump truck, a pair of alternating trash inlet gate valves to work with the piston, a bin at the forward end of the trash burning chamber to receive roasted coal chuncks, an upward pipeline having a regulator gate valve to serve as exit of gas fume distillates from the trash fuel, and an alternating exit gate valve to release down the roasted chunks of coal;

a liquid fuel injection pipeline inserted into the combustion chamber, having an evaporator coil above the trash combustion chamber, and directed to blow gasified fuel into the trash burning chamber and serving further as torch;

a cold tower condensation high pressure chamber having a plurality of cold radiator plates, to receive and to condense the distillate fumes from the trash burning chamber;

a pipeline intercommunicating the upper section of the condensation chamber to the combustion chamber to burn the uncondensable fumes;

a liquified gas chamber having high compression pump and intercommunicated with the condensation chamber to store the uncondensable gas fumes;

a heat insulated surge tank interconnected with the combustion chamber;

a cooling system in the from of pipelines and passages intercommunicating the centrifugal compressor with the various bearings around the engine;

a plurality of multistage cyclone-type air cleaner, inter-communicated with the hot air exhaust of the hot gas turbine to trap ashes and dusts;

a water-type filter, in the form of a water tank having a plurality of air tubes with fine perforations that release fine air bubbles into the water to trap the dusts and smoke into the water, said water tank having continuous flow of in and out going water;

a large chimney connceted to the outlet of the water-type filter to direct the waste air upward; and a large high voltage voltage capacitor having regulators to store the electric energy and to regulate the release of power thru a transmission wire into the community grid, see FIG. 24.

70. A wide face scavenger enegy converter system in accordance with claim 1 or claim 69, including a new design for a water-type air filter that supplies clean air to a clean room, wherein, a plurality of tall water tanks are assembled to make a transparent wall, and wherein, the air that is being filtered is released in the form of fine air bubbles at the bottom of each water tank and then the air is collected by a large pipe at the top of the water tanks, comprising:

a plurality of tall almost full water tanks assembled in the form of a transparent wall, each tank being closed at the bottom and closed at the top;

a main air supply pipe running along to the top of said water tanks wall;

a closed bottom finely perforated vertical air pipe communicated with said main air supply pipe and submerged deep into each said water tanks to release air underwater in the form of fine/tiny bubbles;

a main air collector pipe running along the top of said water tanks wall;

an open bottom air collector pipe inter-communicating said main air collector pipe to the top of each water tank;

a main water supply pipe inter-communicated with and thru the bottom of each water tank by means of a water pipe pointed to the floor of the water tank;

a floater water control valve in one water tank mechanically connected to the water supply pipe to regulate water flow;

an overflow water pipe connected to the upper section of each water tank, having a downward submerged open end inside the water tank;

a water collector disposal pipe inter-communicated with each water tank thru said overflow water pipe;

a plurality of multistage cyclone-type dust separator, connected to the inlet of said main air supply pipe, thru which the air supply passes before it gets thru the water filter;

an air instilling peripheral chamber, inside said cyclone dust separtator created by an inner drum wall having a plurality of windows thru which the dusts get into said instilling chamber;

a wideface bladed centrifugal air pump centrally installed inside said cyclone separator to drive the dust into said windows and to pump the air in and out of said cyclone separator;

a motor, driving said wideface blades, in the form of a pipe drum fitted around the air exit pipe inside said cyclone;

a lower peripheral air instilling chamber at the lower section of said cyclone;

a dihumidifier device connected to the outlet of said main air collector pipe to dry up the cleaned air;

a plurality of distributor air pipes, connected to the outlet of said dihumidifier device and extended to the various customer clean rooms; and an oppositely rotating wideface bladed turbine-type multistage compressor inter-communicated to the inlet of the cyclone-type dust separator, to force the fine air bubbles thru the water tanks, see FIG. 25.

71. A wideface scavenger energy converter system in accordance with claim 1 or claim 6 or claim 43, including a new design for a high altitude multilevel airborne windmills used to harvest the energy from the high altitude winds, comprising:

a plurality of wideface wind deflectors serving as kites strung in a vertical array up in the sky, having a plurality of large holes thru which the wind passes, and with side wings tilted upward;

a downward wall set along the wind and attached to the bottom of each kite at the ¼ points of the kite's wings;

a downward slant adjustable flap-wall wing having large holes, set facing the wind, and attached to the rear section of each kite and also attached to the rear ends of said downward walls;

a rope attached to each corner of each kite to strung all the kites in multilevel vertical array;

a kite sling rope attached to each left and right corner of the lowest kite;

a ground anchor winch attached to the kite sling rope, said anchor being able to turn around pivotally in accordance with the wind direction;

a hroizontal strut structure, the ends of which being attached to the left and the right sling ropes to separate said sling ropes;

a wide face bladed oppositely rotating wind turbine installed at each large hole of each kite;

an oppositely rotating drum-type electric generator mechanically attached to and being driven by each said wind turbine;

a plurality of electric wires interconnecting all the electric generators on all the kites, and extended down to the ground level;

a variable automtic step up transformer connected to said electric wires to step up the voltage produced by the wind turbines;

a high voltage capacitor at ground level connected to the step up transformer to store the electric energy;

a voltage regulator and metering system connected to the output of the high voltage capacitor to release the electric power to the community grid, see FIG. 27.

72. A wide face scavenger energy converter system in accordance with claim 1 or claim 71, including a new design for a high altitude multilevel airborne windmill, wherein, the kites are made up of stiff lighter than air materials, comprising: high pressure balloons and aerogel in composite constructions, and wherein, the left and the right end sections of the wings are bent slant upward, see FIG. 27.

73. A wide face scavenger energy converter system in accordance with claim 1 or claim 4 or claim 49, including a new design for an automatically self adjusting half-butterfly type sail that serves as the prime mover for the sail-type windmill as illustrated in the U.S. Pat. No. 4,859,146 dated Aug. 22, 1989, wherein, a framed sail swings back upward pivoting at the top when the sail is pushed by the speeding wind, for safety, comprising:
- a vertical mast attached to the upper and to the lower aerial drive chain;
- a rectangular frame eccentrically attached to the mast;
- a framed sheet, covering each window of the rectangular frame, and pivotally attached to the upper structure of the rectangular framed;
- an electronically operated control system that allows the sail to resistively relax against the speeding winds, comprising:
  - a plurality of flat ropes spacedly attached to the bottom edges of the sail;
  - a deep grooved winch pulley to which each flat rope is wound around;
  - a control coil spring mechanically attached to each winch pulley;
  - a pipe drive shaft, containing the lower structure of the rectangular frame, and mechanically attached to each coil spring and to each winch pulley;
  - an electric motor, mechanically attached to the pipe drive shaft and to the vertical mast, to totally let loose the sail or to rewind the flat ropes against the wind;
  - a programable logic controller or PLC, connected to the electric motor;
  - a variable wind speed sensor switch connected to the PLC;
  - a vertical arch bar containing the varialble speed sensor switches;
  - a swinging mast, pivotally attached to and hanging from a support structure, and mechanically attached to the arch bar to activate the speed sensor switch;
  - a wide face sail attached to the swinging mast;
  - a calibrated weight attached to the bottom end of the swinging mast;
  - a support structure, above the mast, to hold the arch bar and the mast;
  - a wide face rudder tail to make the sail keep on facing the wind squarely;
  - a high voltage capacitor, having voltage regulators, being recharged by the generator that is driven by the sail-type windmill; and
  - a wire cable harness enter-communicating the PLC, the electric motor, and the high voltage capacitor, see FIG. 28A and FIG. 28B.

74. A wide face scavenger energy converter system in accordance with claim 1 or claim 73, including a new design for an automatically self adjusting sail, wherein, the sail sheet is side-framed by a rope that is held by a lock groove channel along the said vertical mast and along the side structures of the said rectangular frame, and a winch drum, upon which the sail sheet is wound around, is attached to the upper structure of the said rectangular frame, said winch drum being activated by the electric motor to hoist up the sail partially during high speed winds.

75. A wide face scavenger energy converter system in accordance with claim 1 or claim 73, including a new design for an automatically self adjusting sail, wherein, the sail is framed to form a complete butterfly wing that is placed inside the said rectangular frame, said buterfy wing having a horizontal central axis bar that is attached to the mid-points of the vertical side frames of the said rectangular frame, the said vertical mast being discontinued inside said rectangular frame to give room for a large continuous butterfly wing, and a plurality of torsion spring bars attached to the horizonal axis bar being provided for the wings to open and to resistively close against the high speed winds.

76. A wide face scavenger energy converter system in accordance with claim 1 or claim 49 or claim 75, including a new design for a Butterfly-Type sail bladed oppositely rotating wind turbine, wherein, the axis of the wind turbine is in a vertical position, the turbine rotates horizontally, the horizontal radial masts serving as the horizontal central axis bar of the butterfly wings, and wherein, the wind turbine is attached to the large trunk of a tall tree, comprising:
- a tower/post/trunk of a tree to hold the turbine up in the air;
- an upper and a lower circualr inner adaptor rail track attached to and around the upper and the lower section of the tower/post/trunk of the tree;
- an inner large pipe/drum/round truss structure, serving as an elongated hub, set around the post, and having rollers/wheels that bite on the upper and on the lower inner adaptor rail track;
- a drum-type magnet attached around the outer face mid-point of the inner elongated drum hub;
- an upper and a lower set of at least three horizontal radial masts, with rope braces, attached respectively to the upper and to the lower section of the inner hub to form the upper turbine and the lower turbine that move together as one unit in a clockwise rotation;
- an upper and a lower circular outer rail track attached to the outer face mid-section of the inner drum hub, the magnet drum being in between the outer rail tracks;
- an outer drum hub having roller wheels that bite on the upper and on the lower outer rail tracks;
- a drum type induction wire coil attached to the inner face of the outer drum hub in an alignment to form an oppositely rotating electric generator with the drum magnet;
- a set of at least three horizontal radial masts, with rope braces, attached to the mid-section of the outer drum hub to form the middle turbine that rotates counter-clockwise opposite to the rotation of the other two turbines;
- a wide face wind sail pivotally attached to the upper side of each horizontal mast;
- a wide face wind sail pivotally attached to the lower side of each horizontal mast, making a complete butterfly wing that opens and closes;
- a plurality of torsion bars attached to each mast and connected to each wind sail to keep the butterfly wings almost closed but partially opened when moving against the wind, so the wind will be able to reopen the sail;
- a control rope, attached to each outer corner, midpoint, and ¼ points of the outer edge of each sail/wing, and tied to each succeeding mast, to open the wings like a parachute when facing the wind;
- an electro-mechanical control system being provided to resistively let go the control ropes and close the wings towards the rear during unsafe wind speeds;
- a high voltage capacitor connected to the generator serving as storage battery; and
- a voltage regulator, connected to the capacitor, see FIG. 16 and FIG. 14F.

77. A wide face scavenger energy converter system in accordance with claim 1 or claim 48 or 49 or claim 73, including a new design for a sail-type, wide face bladed, co-axial, oppositely rotating, horizontal axis, wind turbine, wherein, a wide sail, that has a strut out support structure, is pivotally attached to the rear side of each radial mast, and wherein, an automatic electro-mechanical control system, that controls the rear side of the sail thru inter-tieing flat ropes, is evenly attached to the front side of each radial mast, as illustrated by FIG. 29.

78. A wide face scavenger energy converter system in accordance with claim 1 or claim 19 including a new design for a supercharger for a piston-type internal combustion engine, wherein, the hot air exhaust pipe of a piston-type engine is intercommunicated with and set to totally energize an oppositely revolving gas turbine engine that drives an oppositely revolving compressor which in turn produces fresh compressed air that is forced to enter and to supercharge the said piston-type engine, by intercommunicating the compressor with the intake manifold, as illustrated by FIG. 9.

79. A wideface scavenger energy converter system in accordance with claim 1 or claim 69 or claim 70, including a new design for a cyclone dust separator, wherein, a peripheral air instilling chamber inside the cyclone drum is provided by way of an inner perforated drum into which the dusts are collected, and wherein, a wideface bladed centrifugal air pump with a drum-type motor is installed inside said cylcone drum around the main air exit pipe, see FIG. 25.

80. A wideface scavenger energy converter system in accordance with claim 1 or claim 44 or claim 45, including a new design for a self flooting paddle wheel water turbine, comprising:
- a pair of parallel floater pipes layed floating across the water current and serving as drive shafts;
- a drum-type bearing and a set of toothed drive pulleys attached to the ¼ points of and around each pipe;
- a plurality of longitudinal wideface paddle blades attached around each pipe but leaving spaces at said bearings and drive pulleys, to make a water turbine;
- a light superstructure well above the water, having posts, and interconnecting all said bearings of said water turbines, to assemble said pair of turbines together;
- the bottom of said post holding and enclosing around said bearings;
- an underwater vertical downward post attached to the bottom of each of said superstructure post below said bearings, and being suficiently extended down underwater;
- a wideface anti-oscillation resistor board attached to the bottom of said underwater posts, to prevent oscillation of the whole apparatus due to the water waves;
- a kite sling type anchor rope attached to said superstructure posts, joint together into one main anchor rope attached to an anchor block on the ocean floor;
- a plurlity of oppositely rotating electric generators, each having clockwise driven pulley and a counter-clockwise driven pulley, mounted on top of said superstructures;
- a looped endless toothed drive belt arouind said counter-clockwise drive pulley of each said generator; and a twisted endless looped toothed drive belt around said clockwise pulley of said generator; see FIG. 17A.

81. A wideface scavenger energy converter system in accordance with claim 1, including a new design for veretical axis oppositely rotating gas turbine, comprising:
- a hot air exhaust chimney stock for a trash incinerator starting from a low elevation and ending up to a high mountain top;
- a heat insulator around said chimney stock;
- a plurality of fastening devices holding said chimney to the sides of said mountain;
- an upward circular-peripheral air exhaust nozzle at said mountain top, created by a closed bottom drum-type pit at the center of said nozzle, and serving as upper end of said chimney;
- an inner pipe drive shaft erected on a bearing at the bottom center of said pit;
- a plurality of clockwise wideface turbine blades evenly placed around said peripheral nozzle, and attached by an upper circular plate to said inner drive shaft;
- a horizontal bearing structural support attached to the mountain top, and holding the top end of said inner drive shaft;
- a lower circular plate attached around the lower section of said inner drive shaft;
- a circular bearing around said inner drive shaft and resting on said lower circular plate;
- an outer pipe drive shaft around and co-axial with said inner pipe drive shaft erected on said circular bearing on said lower circular plate;
- a plurality of counter-clockwise wideface turbine blades, below said clockwise blades, evenly placed around said peripheral nozzle, and attached by a plate to said outer pipe drive shaft;
- a multilayer drum type magnet attached around said outer pipr driver shaft with the free ends of the each said drum pointing downward;
- a multilayer drum type induction wire coil attached to said lower circular plate, with the free ends of said wire coil drums pointing upward;
- said wire coil drums evenly spaced and inserted in between said magnet drums so that the wire coil drums rotate opposite the rotation of said magnet drums;
- a plurality of power output wires coming out of said wire coils by means of carbon brushes; and
- a compressed air supply pipe, coming from outside compressors, communicated with said chimney, to add more expanding air inside the chimney, see FIG. 20A.

82. A wideface scavenger energy converter system in accordance with claim 1, or claim 69, including a new design for a high humidity cold air supply system, wherein, the air entrance portal of an oppositely rotating turbine air compressor/blower is in the form of a vacuumized air duct that is strong against implosion and having a plurality of water atomizer nozzles inside said air duct, comprising:
- a multistage oppositely rotating wideface bladed turbine compressor, having an air entrance portal, with its last stage in the form of a centrifugal air pump;
- an air duct, with its one serving as an air portal, while its other end enclosing said air entrance portal of said air compressor/blower;
- an air regulator main gate valve provided at said air portal of said duct, being adjusted to create a partial vacuum inside said air duct;
- a compressed air outlet pipe communicated with said centrifugal air pump and extended along the axis of and along the outside walls of said duct;
- a plurality of evenly spaced air outlet tubes piercing said duct and communicated with said compressed air outlet pipe;

a venturi nozzle provided at the end of each air tube inside said air duct;

a water supply pipe placed along side of said compressed air pipe;

a plurality of evenly spaced water outlet tubes piercing said air duct, one end of each communicated with said water pipe, while the other end of each being communicated with each said venturi air nozzle;

a plurality of condensation radiator piping system installed inside said air duct;

a main vapor inlet header pipe entering said air duct near said main gate valve of said air duct, and communicated with said condensation radiator piping system;

a main header uncondensed gas outlet pipe, communicated with said condensation radiator piping system, and getting out of said air duct at a point near said air compressor;

a downward extension of said gas outlet pipe, getting out of said air duct, and serving as low lever outlet of condensate liquids/solids;

a plurality of low level outlets at the bottom of said air duct, communicated with a main exit pipe line, and serving as outlet for un-evaporated water;

a float valve at the low level outlet of said main header gas outlet; and a liquid container drum at the outlet of said condensate outlet, see FIG. 24A.

83. A wideface scavenger energy converter system in accordance with claim 1 or claim 69, including a new design for a vetical axis trash burning gas turbine engine power plant with its inner pipe drive shaft serving as combustion chamber, comprising:

a vertical clockwide inner pipe drive shaft, serving as trash fuel duct, having: a bottom section, a lower third section, a middle third section serving as combustion chamber, and a top end section, said bottom section and lower third section serving as trash fuel duct;

a plurality of combustion windows, around said combustion chamber, created on said middle third section of said inner pipe drive shaft;

a lower circualr plate attached to said inner drive shaft;

a plurality lower level roller wheel bearing attached to the periphery of and carrying said lower circular plate;

a lower level circular rail tract carrying said lower level roller bearing;

a plurality of concentric drum type magnets spacedly placed around said inner drive shaft and spacedly attached to said lower circular plate;

a sleeve pipe drum inside said bottom section of the inner pipe drive shaft;

a sliding blade valve covering the bottom of said drive shaft and also covering the bottom of said sleeve pipe;

a piston, serving as shear die, moving up and down below said valve and thru said sleeve pipe;

a mouth piece shear die thru which said shear piston pushes trash fuel up said sleeve pipe;

a lateral support bearing holding the bottom end of said inner drive shaft;

a close ring drum attached around said lower third of the inner drive shaft;

a plurality of wideface turbine compressor blades spacedly, radially, and horizontally attached around said ring drum;

a plurality of wideface centrifugal blade radially, horizontally, and spacedly attached to and around said inner drive shaft with a space above said turbine compressor blades;

a dividing circular plate above said centrifugal blades, and attached to said inner drive shaft to form a centrifugal air pump;

a closed bottom-open top ring drum, having: an outward slant inner wall with a plurality of spaced air outlet nozzles pointed to said windows of said combustion chamber;

a vertical wall creating a air duct behind said air nozzles and attached to said bottom of said ring drum; a plurality of open bottom perforated vertical, connical air pipe attached to an opening at the middle of the bottom plate of said drum; a perforated peripheral wall attached to said bottom plate, and said bottom plate being attached to said middle third section of said inner drive shaft at a point below said wind combustion windows;

a closed upright connical ring drum attached to said upper thired of said inner drive shaft;

a plurality of wideface gas turbine blades spacedly, radially, horizontally attached to the outer walls of said closed connical ring drum;

a circular plate, having a center air outlet nipple pipe, attached to cover the top of said inner pipe drive shaft;

a vertical outer shell drum, having: an inner face, a perforated top cover plate and a perforated bottom cover plate, and serving as counter-clockwise drive shaft;

a plurality of concentric drum-type induction wire coils with free bottom edges inseted in between said concentric magnet drums, and spacedly attached to and below said bottom cover plate of said outer shell drum drive shaft;

a plurality of wideface turbine compressor blades radially, horizontally, and spacedly attached to said inner face of said outer shell drive shaft, and inserted in between said clockwise turbine compressor blades;

a circular plate with center hole attached to said inner face of said outer shell drive shaft, above said compressor blades, below said cemtrofugal blades, and creating an air passage space above said compressor blades;

a plurality of upper level roller wheel bearings attached to the periphery of and below said bottom cover plate of said outer shell drive shaft, supporting said outer shell;

an upper level circular rail tract carrying said upper level roller wheel bearings;

a plurality of counter-clockwise wideface gas turbine blades, spacedly inserted in between said clockwise gas turbine blades, radially, horizontally and spacedly attached to said inner face of said outer shell drive shaft;

a center hole created on said perforated top cover plate of said outer shell;

a bearing attached to the lips of said center hole of said top cover plate and holding on the top end of said inner pipe drive shaft;

a pair power outlet wires coming out from each induction wire drum;

a trash fuel bin from which said piston takes up trash; and a trash drying oven serving as exhaust chimney for the hot air coming out from said gas turbine engine, see FIG. 24B.

84. A wideface scavenger energy converter system in accordance with claim 1 or claim 67 or claim 69, including a new design for clean trash burning system, wherein, a plurality of perforated air pipes are placed inside the combustion chamber or inside the fire in order to evenly supply/inject hot oxygen air inside the fire or inside the combustion chamber, see FIG. 20, and FIG. 24.

85. A wideface scavenger energy converter system in accordance with claim 1 or claim 70, including a new design for a transparent water container wall, wherein, said water wall of claim 70 is made up of a plurality of slender water tanks made into prisms and assembled side-by-side and attachd corner-to-corner to produce a rainbow light, and said transparent prism water wall is used as window, door, and roof, to conserve energy, to filter air, and for decoration purposes in and around offices and houses.

86. A wideface scavenger energy converter system in accordance with claim 1 or claim 70, or claim 85, including a new design a prism transparent water wall, wherein, the side transparent panels of said water container wall are corrogated with sharp corners and concave sides and made stiff.

87. A wideface scavenger energy converter system in accordance with claim 1 or claim 5 or claim 80 including a new design for a least oscillated multi-hull aircraft carrier-missile ship/boat by using an underwater wideface fluid impeder device to prevent oscillation by the water waves, comprising:

an underwater horizontal wideface stiff thin platform serving as an anti-oscillation device against the effects of the water waves, having internal multi-chambers to contain missiles and to contain water/air to adjust its buoyant power, with its front and rear edges being made sharp, and having a length of at least equal to three water wave length;

a plurality of water pumps and compressors being provided in the underwater platform to move water and air in and out of its chambers to adjust its buoyant lift in order to serve as submarine when needed;

at least two or more units of vertical thin hulls being parallel and spacedly attached to the top of said underwater wideface platform to intercommunicate the chambers of the underwater platform to the chambers of the vertical hulls;

said thin hulls having vertical side walls, a sharp vertical edge at the front and at the back, having a plurality of vertical chambers in at least one array formation, and having a length equal to at least three water wave lengths;

a vertical pipe missile silo being inserted into each chamber of the hulls to form at least one line array of vertical pipe missile silos;

a multi-level flight deck and multi-story office building in the form of a wide face floating platform being superimposed on and enclosing all the top of the hulls, with the hulls coming out to the roof of the building;

a disconnect device being provided to the floating platform to separate it from the vertical hulls and let the hulls drop down into the deep waters together with the underwater platform in order to act as a submarine for safety;

the flat roof of the floating platform serving as an airport of any kind;

a plurality of armor plates, having the capacity as runway, attached to the level of the airport floor to cover the missile silos;

a plurality of double set of wide face blade co-axial oppositely rotating propellers installed and attached to the rear of the underwater platform to push the boat forward by means of engines disposed inside the platform;

the propellers being made directional to steer the boat; and a rail/wall attached to the perimeter of the flat roof airport to provide safety, see FIG. 46.

88. A wideface scavenger energy converter system, in accordance with claim 1 or claim 80 or claim 87, including a new design for a least oscillated multi-hull missile submarine, by using an underwater wideface fluid impeder anti-oscillation resistor to prevent oscillation by the water waves, comprising:

an underwater horizontal platform in the form of a wideface fluid, impeder anti-oscillation device, having internal multichambers to contain missile and to contain water/air to adjust its buoyant power, and having sharp front and back edges;

at least one or more units of the thin vertical hulls being disposed parallel to each other and being spacedly attached to the top of the underwater platform in order to intercommunicate the internal chambers of the underwater platform with the chambers of the hulls, the hulls having vertical walls and also having sharp vertical edges at the front and at the back of each;

a plurality of vertical internal subdivision chambers in at least one array formation being created inside each hull;

a plurality of vertical, heat resistant pipe missile silos being inserted into the chambers of the hulls to form at least one array of missile silos;

the silos being movable and being lifted up from the hulls when being reloaded with missiles;

a plurality of armor water tight movable cover plate being attached to the top of the hulls; and a plurality of 360 degrees directional water jet propellers being attached to the rear of the submarine, see FIG. 45.

89. A wideface scavenger energy converter system, in accordance with claim 1 or claim 80 or claim 88, including a new design for a least oscillated multi-hull missile radial submarine, by using an underwater wideface fluid impeder anti-oscillation resistor to prevent oscillation by the water waves, comprising:

a thin hull, having vertical walls and vertical sharp front and back edges, having vertical subdivision multi-chambers of gradually varying sizes in an array formation, and movable top covers;

a pipe missile silo inserted into each of the chambers of the hull to form an array of silos in accordance with the varying sizes of the hull's chambers;

an additional three units of the same thin hull to complete four units of hulls, the hulls being radially attached to each other along a central axis to form a four quadrant vehicle, such that, when the quadrant 2 is on water surface the quadrant 1 and 3 serve as the wide face anti-oscillation resistor;

a plurality of 360 degrees directional water jet propellers being provided and attached to the rear of the submarine;

a wide face bladed propeller being provided and attached to the front of the submarine; and a plurality of caudal rudders being provided and attached to the rear to steer the submarine, see FIG. 40.

90. A wideface scavenger energy converter system, in accordance with claim 1 or claim 80 or claim 87, including a new design for a least oscillated aircraft carrier and missile ship, by using an underwater wideface fluid impeder anti-oscillation resistor, to prevent oscillation by the water waves, comprising:
- a horizontal wide face underwater multi-chamber platform, having a length of at least three or more water-wave lengths, to serve as an anti-oscillation resistor, and to serve as weight;
- a multi-chamber vertical thin sword-like hull being centerly attached to the underwater platform, having at least one or more array of vertical subdivision chambers that serve as missile silos, having vertical side walls, having vertical sharp edges at the front and at the back, and having a length of at least three or more water-wave lengths;
- said hull being made deep enough to prevent tilting and to stay upright;
- a platform of at least two level decks, having a length of at least three or more water-wave lengths, carried above the water and attached to the top top of the hull, to serve as an airport;
- both the underwater wideface platform and the hull being made to contain water/air alternately for diving the whole boat into the deep water;
- a plurality of compressors, water pumps, and pipelines installed in various sections of the boat, for balancing and for diving;
- a tower being provided and erected on one corner of the airport;
- a communication antenna attached to the top of the tower; and
- a plurality of directional water jet propellers being provided and being attached to the rear of the wideface underwater platform, see FIG. 44.

91. A wideface scavenger energy converter system, in accordance with claim 1 or claim 80 or claim 87, including a new design for a least oscillated ocean going floating hotel building by using an underwater wideface fluid impeder anti-oscillation resistor to prevent oscillation by the water waves, comprising:
- a horizontal wideface underwater platform to serve as an anti-oscillation resistor, having internal cavities to contain water/air alternately to provide adjustable buoyant lift;
- at least two units of single pile stack of pointed floater pipes clipped together, to serve as footings, by spacedly arranged vertical sword-like posts with bearing blocks, the bottom ends of the posts being attached to the underwater platform, such that one unit of stacked pipes is on the left and on the right half of the underwater platform;
- said floater pipe footings having adjustable bouyancy such that the water line is just barely at the top of the upper most floater pipe;
- an independently floatable quadrangle multistory building being superimposed and attached to the top of the sword-like posts which are made tall enough such that the building is carried well above the high water waves;
- a plurality of compressors, water pumps, and pipelines installed inside the top floater pipes to pump air/water in and out of the pipes for balancing and to maintain the correct water line or the correct submergence;
- a plurality of 90 degrees directional jet engines being provided for propulsion and being attached to the rear posts of the building;
- a plurality of anchor ropes attached to the bottom end of the posts and tied down to the natural rocks or man made anchor weights on the ocean floor to pull down and to pre-submerge the floater pipe footings; and
- a plurality of man made anchor weight on the ocean floor, such as a wide plate or a net that is spread and overlaid by rocks and dirts, upon which the anchor ropes are tied down to, see FIG. 39 and FIG. 43.

92. A wideface scavenger energy converter system, in accordance with claim 1 or claim 80 or claim 87, including a new design for a least oscillated boat that is lifted above the water by a floating footing in the form of stack of floater pipes with sword-like post clips that are attached down to an underwater horizontal wideface multi-chambered anti-oscillation resistor board, and a plurality of 90 degrees directional jet engines being provided for propulsion and attached to the rear of the boat, see FIG. 42.

93. A wideface scavenger energy converter system, in accordance with claim 1 or claim 80 or claim 87, including a new design for a least oscillated building or boat that is lifted above the water, wherein, the posts used to clip a stack of floater pipes are in the form of continuous plates from the front to the rear and from the top to the bottom reduce resistance on the water, and the bottom of said plates being attached to an underwater horizontal wideface fluid impeder anti-oscillation resistor.

94. A wideface scavenger energy converter system, in accordance with claim 1 or claim 80 or claim 87, including a new design for a least oscillated boat/ship that is being driven forward by the power of the ocean waves, by way of an underwater wideface fluid impeder anti-oscillation resistor, comprising:
- a boat floating on the water;
- a plurality of vertical double bladed sword-like posts attached pair by pair to the opposite sides of the boat;
- a stiff underwater horizontal wideface fluid impeder anti-oscillation board eccentrically and pivotally attached to each pair of post, such that the rear end of the board flips up and down as the water waves move the boat down and up;
- a plurality of flexible rope inter-connecting the rear end of the preceding board with the front end of the succeeding board to limit the flip angle;
- a center vertical post that pierces the center rear section of the last board, being provided and attached to the rear of the boat, having stopper bars above and below the board to limit the flip angle of the last rear board;
- a caudal rudder being attached to the rear of the boat; and
- a propeller of any kind attached to the rear of the boat to push the boat; see FIG. 38.

95. A wideface scavenger energy converter system, in accordance with claim 1 or claim 80 or claim 87, including a new design for a least oscillated multi-purpose ocean platform or a floating airport that also serves as a missile station, by using an underwater wideface fluid impeder anti-oscillation resistor, comprising:
- a stiff underwater horizontal wideface multi-chamber platform, having an adjustable buoyancy to provide lift and weight alternately, to serve as an anti-oscillation resistor;
- a plurality of vertical floater pipe posts, that serve as missile silos, arranged in at least two or more rows, and erected on the underwater platform;
- a multi-level deck platform, designed to float independently, superimposed on the top of the vertical pipe posts, and carried by the posts well above the water;

said missile silo pipe posts being made adjustable and extendable to come out above the deck when necessary to fire missiles;

a vertical pipe hole thru the deck and thru the underwater platform being provided and attached to the two platforms to serve as a drilling well;

a portable rail guard attached to the top perimeter of the upper deck;

a water wave splitter device mechanically attached to the pre-determined water line of each pipe post, and able to rotate 360 degrees around the post to split the waves coming from all directions, and to serve as rudder;

said wave splitter device being filled up with water in its lower half, and being open top and bottom with perforated side walls on its upper half;

a plurality of additional floater pipes being alternately filled up with water and compressed air to maintain the waterline, being provided and attached to each pipe post at a point below the water waves; and a plurality of propellers or jet engines attached under the deck, see FIG. 36 and FIG. 37.

96. A wideface scavenger energy converter system, in accordance with claim 1 or claim 80 or claim 87, including a new design for a least oscillated missile silo or warehouse that is lifted well above the ocean water, by using an underwater wideface fluid impeder antioscillation resistor, comprising:

a stiff underwater horizontal wideface platform for an anti-oscillation device;

a plurality of floater pipe posts in a multiple row erected and attached to the underwater platform anti-oscillation device;

said pipe posts being of armor type designed to be indestructible by torpedo;

said pipe posts being of such length and diameter to provide enough buoyant lift and to dispose the anti-oscillation platform down into the deep water;

a set of compressors and water pumps being provided and installed in each pipe post to fill up the posts with water and air alternately;

an additional weight being provided and attached to the base of each post to make the post stay upright;

a safety floater pipe capsule, permanently sealed and filled up with compressed air, being permanently placed inside the pipe posts;

a water level stabilizer and elevation controller, that has no weight when submerged in water and has no buoyancy when submerged in water, in the form of a flat armored container filled up with water and air, being provided and horizontally attached to each pipe post at the desired water line;

a missile silo warehouse, having a wide floor area, being superimposed to the top of the floater pipe posts and lifted by the posts well above the water;

a plurality of armor subdividing walls attached the warehouse floor and armor covers being assembled to subdivide the warehouse for safety;

a plurality of missile silos assembled side-by-side inside the warehouse;

an air plug fitted to the silo being placed below the missile in order to fire missile out of the silo by compressed air that is stored in the adjacent silo;

and, an electronic command and control device, having antenna on a tower, being provided and attached to the side of the warehouse, to fire the rocket of the missile after it is already out of the silo, see FIG. 34.

97. A wideface scavenger energy converter system, in accordance with claim 1 or claim 87 or claim 96, including a new design for a least oscillated floating platform, wherein, the water level stabilizer and elevation controller device in the form of a flat water container in claim 96 is made into a wideface flat horizontal container, filled up totally with water to eliminate its buoyancy which is superimposed on the top of a floater wideface platform that has a buoyancy of less than one-half of the weight of the wideface water container, and this composite platform being used as a floating foundation for any house or any structure on the ocean, the buoyancy of the floater platform being adjusted by its internal chambers such that the water container platform is just barely coming out of the water after it has been loaded with structure, and this composite platform being tied down by a plurality of ropes to a wideface anti-oscillation resistor that is disposed in the deep water.

98. A wideface scavenger energy converter system, in accordance with claim 1 or claim 80 or claim 96, including a new design for a least oscillated floating missile silo in the form of a vertical cylindrical warehouse attached to an underwater wideface fluid impeder anti-oscillation resistor, comprising:

a cylindrical close bottom drum-type capsule structure having large buoyancy vertically floating on the ocean to serve as a warehouse and to contain missile silos;

said capsule structure being made indestructible by missile/torpedo by having the walls made out of solid steel of at least one foot thick;

a plurality of posts rigidly attached to the bottom of the floating warehouse;

a stiff wideface underwater platform having weight being attached to the bottom ends of the posts to serve as an anti-oscillation resistor board;

the posts being made long enough to dispose the wideface anti-oscillation resistor down into the deep water and to make the warehouse stay upright;

a plurality of upward check valves being made on the anti-oscillation resistor;

a kite sling anchor rope being provided and attached to the capsule and tied down to an anchor block on the ocean floor;

a multiple armor petal flower-type hydraulically operated radio controlled cover being provided and attached to the top of the warehouse;

an elongated torpedo-type hot-air balloon disposed in the sky and anchored down, by a kite-sling control rope, to the top of the warehouse;

a radio communication, command/control, and radar device being provided and attached to bottom of the balloon;

the kite-sling control rope of the balloon being in the form of an air hose, being used to supply gas fuel to the balloon;

a gas turbine engine attached to the bottom of the balloon to burn the fuel in order to supply pressurized hot air to the balloon thru an interconnecting hose, and to supply electric power to the facility; and a plurality of inflated light structures serving as internal framework placed inside the balloon to pre-form the balloon into torpedo-type, see FIG. 32 and FIG. 33.

99. A wideface scavenger energy converter system, in accordance with claim 1 or claim 7 or claim 98, including a new design for an elongated torpedo-type hot air balloon, comprising:

an air tight body tailored to be elongated torpedo-type to be slippery thru the wind;

a safety valve air outlet at the bottom of the balloon to maintain compressed hot air inside the balloon;

at least one of any kind of engine, being provided to burn fuel and supply pressurized hot air into the balloon, and being attached to the bottom of balloon;

an oppositely rotating wideface bladed propeller being mechanically connected to each engine, being used to drive the balloon;

a temperature resistant air hose or tailpipe being connected inter-communicating the exhaust of the engine with the air inlet or air portal of the balloon and being extend inside the balloon to discharge hot air into the upper portion of the balloon; and said balloon being used to carry and transport loads needed to be in the sky, see FIG. 3 and FIG. 32.

100. A wideface scavenger energy converter system, in accordance with claim 1 or claim 98, or claim 99, including a new design for a light weight structural frame for various purposes including for the construction of an elongated hot air balloon, comprising:

a plurality of inflated tubes made of light materials, to serve as light weight structural member;

a calibrated safety valve being installed on each inflatable tube to insure that the compressed hot air inside the tube is lighter than the outside air, and such that the tubes discharge hot air into the main body of said balloon;

said inflated tubes being pointed at each end, and being tailored to have gradually increasing diameter towards the center or midpoint;

said inflated tubes being assembled together side-by-side, by means of flat straps, into a closed loop to form an elongated pointed balloon framework;

an air tight outer skin cover cloth being wrapped around said tube-balloon framework making the main body of said balloon;

a plurality of air hoses communicated into the inflated tube frames, and into the main balloon; and an engine attached to the bottom of the balloon to serve as propulsion means and to supply hot compressed air into the air hoses, into the tube frames, and into main balloon, see FIG. 32.

101. A wideface scavenger energy converter system, in accordance with claim 1 or claim 98 or claim 99 or claim 100, including a new design for a light structural member, wherein, a strong sheet or fibrous material is made into an inflated high pressure tube/pipe of various sizes and forms, having a calibrated safety valve, an inlet/outlet valve, and inflated with air, or hot air, or light gas, for various uses, including but not limited to balloons, posts, bridges, structural beams, marine structures, composite construction, and including a transparent aerial pipe or roller coaster pipe thru which a capsulized passenger transport is pushed by additional compressed air or by other catapulting means.

102. A wideface scavenger energy converter system, in accordance with claim 1 or claim 98, including a new design for a least oscillated vertically floating cylindrical capsule that converts the energy of the water waves into compressed air, comprising:

a open bottom cylindrical body capsule vertically attached to a fixed structure at the level of the water waves;

an assembly of a water level detector and a vertical gear bar connector attaching said capsule to said fixed structure, to automatically adjust said capsule to the changing elevation of the tide;

a plurality of horizontal subdivision walls, having center holes, across said cylindrical body to create multistage compression chambers;

a floating ball sitted on each said center holes serving as oneway upward valves, which allow the excess water to get out but not the compressed air;

a plurality of inward check valve windows constructed around the side walls of said capsule to serve as air and water entrance;

an air turbine-generator communicated with the upper most chamber of said capsule to produce electricity out of the compressed air created by the water waves;

an underwater wideface fluid impeder anti-oscillation resistor board attached by posts to the capsule to help prevent oscillation by the water waves, see FIG. 31.

103. A wideface scavenger energy converter system, in accordance with claim 1 or claim 61, including a new design for a least oscillated ocean tower post with a water wave energy converter attached thereto, by using an under water wideface fluid impeder anti-oscillation resistor board, comprising:

a pair of tower posts spacedly made to stand high above the water and sufficiently extended down into the deep water;

a weight block attached to the base of each post;

a stiff underwater wideface multi-chamber platform, that contribute stabilizing weight, and serving as anti-oscillation board, being attached to the bottom end of each post;

a plurality of floater pipes being vertically attached to each post at a point below the waterline, the buoyancy of this pipes being adjustable, such that, only one of the floater pipes is barely floating out of the water;

a horizontal see-saw bar pointing to the incoming waves, the mid-point of which being pivotally attached to each tower post;

a bundle of at least two floater pipes, serving as oscillators, being attached to each end of and below the see-saw bar, and interconnecting the two see-saw bars;

a compressor pump or a push-and-pull electric generator being pivotally attached to and inter-connecting the ends of the see-saw bar with the tower posts at a point such that the compressor or the generator is at 45 degrees;

a power take off wire connecting the generator to the transmission line wires that hang at the top of the tower posts;

a sling anchor rope attaching the apparatus to an anchor block on the ocean floor; and a floating buoy attached by a rope to the anchor rope to prevent jerk, sse FIG. 35.

104. A wideface scavenger energy converter system, in accordance with claim 1 or claim 103 or claim 102, including a new design for a least oscillated floating sea wall that break up, suppress, and convert the energy of the water waves into compressed air and electricity, comprising:

a large outer shell floating pipeline set parallel to the water waves;

a plurality of flat ring bracket holder spacedly strapped around the large pipe;

a pair of buoyant floater posts pivotally attached to the opposite sides of each of the strap holders, and being extended to the deep water;

a stiff underwater wideface platform, serving as stabilizing weight and anti-oscillation resistor, being attached to the bottom ends of the posts;

a plurality of inward float ball check valves of variable sizes being spacedly installed along the bottom and front sides of the large pipeline;

a plurality of inward check valves being spacedly installed along the rear upper sides of the large pipeline;

a smaller second inner pipeline, having bottom float ball valves and side inward check valves, inserted inside and hanged into the upper half chamber of the large pipeline;

a much smaller third inner pipeline, having side inward check valves, inserted inside and hanged into the upper chamber of the second pipeline;

a plurality of air turbine electric generator spacedly installed along the upper rear side of the large pipeline;

an outlet pipe, provided for each air turbine, intercommunicating the third inner pipeline with the air turbine;

a plurality of anchor ropes spacedly strapped around the large pipeline and attached to a plurality of anchor blocks on the ocean floor, as shown by parts 8 and 9 of FIG. 35; and a power transmission line interconnecting all the turbines, and supported by tall posts, as shown by part 14 of FIG. 35, erected on top of the floater pipe posts, see FIG. 41.

105. A wideface scavenger energy converter system, in accordance with claim 1, including a new design for a least oscillated floating wideface water wave suppressor, comprising:

a stiff floating wideface platform, having a width of at least one-half wave length and at least onehalf mile long, set out on the ocean and layed parallel to the water waves;

said floating platform being made up of crisscrossing stiff materials in composite construction, having adjustable buoyancy, and made barely floating;

a plurality of ropes spacedly attached to the bottom of the floating platform and being extended vertically down to the deep water;

a stiff underwater wideface platform that sinks fast, serving as an anti-oscillation resistor, being attached to the bottom ends of the vertical ropes; and a plurality of upward check valves spacedly constructed on the underwater wideface anti-oscillation resistor, see FIG. 50.

106. A wideface scavenger energy converter system in accordance with claim 1 or claim 45 or claim 80, being adapted to form a new design for a paddle wheel turbine that serves as water dam across a river, comprising:

a plurality of stiff wideface fluid impeder boards or plates radially assembled together to form a paddle wheel, the wideface boards serving as water dam;

a hub comprising of an inner and an outer concentric drums interlock together by a plurality of internal ring plates and end plates;

said outer drum having slots thru which the wideface boards, serving as turbine blades, are inserted and attached to both inner and outer drums;

a drive shaft inserted and attached to both ends of the inner drum;

a support abutment post erected at each end of the wheel, made tall enough to adjust the turbine with the floods;

a deep vertical groove cut out centerly along the side of the abutment post facing the wheel/turbine;

an end gear/bearing block assembly mechanically attached to the ends of the drive shaft, and slidably attached to the groove of the abutment post;

a drive chain mechanically connected to each end of the drive shaft, these chains serving to adjust the elevation of the wheel during floods, and set up to drive an oppositely rotating electric generator or to drive a water pump;

a down stream strut post inclinedly erected and attached to the top of the abutment post;

an upstream tension rope/bar anchored to the upstream grounds attached to the top of the abutment post;

a water tight abutment wall constructed and attached to the back side of the abutment post; and a wearing surface under the turbine, in the form of a wide water tight pavement with deep footings constructed on the river bed, see FIG. 47.

107. A wideface scavenger energy converter system in accordance with claim 1 or claim 80 or claim 106 being adapted to form a new design for a paddle wheel-type turbine, wherein, the paddle-wheel-turbine is made self floating across the stream of a large body of water, and wherein, the support posts holding the ends of the drive shafts are each erected on a boat or on floater pipes that are anchored to the channel floor or to the river bed.

108. A wideface scavenger energy converter system in accordance with claim 1 or claim 6 or claim 100 or claim 101 or 46, including a new design for a recreation long period swing that hangs from high tower posts, comprising:

a plurality of high tower posts of any kind of material, erected and aligned along the wind;

a plurality of guy ropes/wires attached to the tall posts and anchored to the ground;

a long suspension wire/tendon/rope/chain attached to the top of each of the tall posts, and extended to the ground level;

a sit, for a passenger, suspended above the ground by a pair of the tendons;

a wideface fluid impeder device, in the form of a framed wind sail, mechanically attached to the down wind suspension tendon; and a plurality of steering/control ropes/strings attached to the rear frames of the wideface sail, then thru the pulleys at the front suspension tendon and ending to the passenger, to manipulate the sail against the wind, to keep the sit in full swing, as illustrated by FIG. 48.

109. A wideface scavenger energy converter system, in accordance with claim 1 or claim 6 or claim 101 or claim 108, including a new design for light weight inflatable structural frames to construct high tower posts, frames that float in the air, frames for skyways, frames to form the elongated hot air balloon, and for constructing a pipe roller coaster wherein the passenger is placed in a capsulized car that runs inside the inflated pipe, comprising.

an air tight strong fibrous flexible sheet/cloth, being reinforced by stiff threads/strings, being assembled to form an air tight inflatable tube/pipe of any shape, branches, and any configurations of joint tubes/pipes;

a plurality of inlet/outlet valves installed on the tube at the erection end;

a plurality of calibrated safety/blow off valves installed on the tube/pipe; the structure being erected by inflating the tubes, as illustrated by FIG. 48.

110. A wideface scavenger energy converter system, in accordance with claim 1 or claim 73 or claim 75, including a new design for a sail windmill, comprising:

a pair of end loop large wheel-gear, having a groove and equidistant notches, set up distant from each other across the wind, being supported to a high elevation by structurally assembled posts thru a hub bearing, and by the downward vertical drive shaft;

a single closed loop aerial cable drive chain/rope/tendon set up tautly into the groove of the end loop wheel-gear;

a plurality of deep groove roller pulleys, supported by axle and posts, spacedly supporting the aerial cable chain, along its span, thru the deep groove of each pulley;

a plurality of upper mast vertically and spacedly attached to the top of the aerial cable drive chain;

a lower mast vertically attached, with spacer blocks, to the base of each of the upper masts, such that the lower spacer block passes clear above the lips of the deep groove of the span support pulleys;

a wideface fluid impeder device, in the form of a wideface wind sail, having a horizontal axis bar that is being eccentrically, perpendicularly, and pivotally attached to each of the upper masts, and another sail of the same kind being attached to each of the lower masts;

said horizontal axis bar being made with springs to allow the sail to resistively fold closed like the wings of the Butterfly, along the axis bar, during high winds;

a weight being attached to the bottom end of the lower masts to keep the wind sails upright;

a control rope being attached to the outer end of the horizontal axis bars and anchored to the aerial cable drive chain; and an oppositely rotating electric generator being mechanically connected to the vertical drive shaft of the end loop gear wheel, see FIG. 49.

111. A wideface scavenger energy converter system, in accordance with claim 1 or claim 73, including a new design for a wideface sail used for an aerial cable railway driven sail windmill, comprising:

a sail frame; having a top bar, a bottom bar;

a wideface sheet attached covering the whole sail frame;

a plurality of eye-hole connectors attached to said bottom bar of said sail frame;

an outer frame having a top bar, a bottom bar, and left/right side bars, thru which the sail frame plays freely;

a plurality of eye-hole connectors attached to said top bar of said outer frame;

said top bar of the sail frame pivotally attached to said top bar of the outer frame;

a closed loope upper aerial cable being held tautly by a couple of deep groove drive pulleys;

a vertical bar connector attached to and hanging from said aerial cable thru its upper end, said bar connector having a lover end;

said top bar of the outer frame perpendicularly and pivotally attached to said lower end of said vertical bar connector;

a couple of left and right eye-hole connector attached to the upper section of said vertical bar connector;

a plurality of tie wire/ropes inter-connecting said eye-holes of said top of the outer frame with said left/right eye-holes of said vertical bar connector, to make the top bar of the sail frame horizontal;

a lower vertical bar connector, having a lower end, and an upper end attached to said bottom bar of the outer frame; said lower end attached to a lower aerial closed loope cable that drives a couple of drive pulleys;

an outer pipe placed around said bottom bar of said outer frame, serving as hoist drum;

a plurality of deep-groove pulleys spacedly attached around and along the length of said hoist drum;

a hoist-rope wound around each said hoist pulley/drum with its other end attached to each said eye-hole connector of said bottom bar of the sail frame; and a resistive coil spring attached to said pipe hoist drum, to rotate back said hoist drum, in order to make the sail fully faced against the wind, see FIG. 28A.

112. A wideface scavenger energy converter system in accordance with claim 1 or claim 110, including a new design for a sail-type water turbine, wherein, the windmill of claim 110 is installed under water current, and wherein, a floater underwater pipe is attached to the horizontal axis of the upper butterfly sail, to make the mast further firmly vertical.

113. A wideface scavenger energy converter system in accordance with claim 1 or claim 87, including a new design for a large transformer floating airport out on the ocean, wherein, the submarin-aircraft-carrier of claim 87 is built to have its right side in the form of groove and its left side into a tangue, its front side into a groove while its rear side into a tangue, its front and left sides having key notches while its it right and rear sides having keys and dowel skrews, and wherein, a plurality of this flat bottom aircraft carriers are jointed together side to side and front to rear, in order to form a large airport out in the ocean, see FIG. 51.

114. A wideface scavenger energy converter system in accordance with claim 1 or claim 87, including a new design for an aircraft carrier that serves as a submarine boat, wherein said boat is provided with telescopic pipe tower fresh air intake at its front section and another telescopic pipe tower used air outlet at its rear section so that it cruises under the ocean waves, see FIG. 52.

115. A wideface scavenger energy converter system in accordance with claim 1 or claim 87, including a new design for a skii boat, wherein, the multi-hull wideface top/bottom boat of claim 87 is provided with a downward wall on both sides below its flat base, and wherein siad boat is provided with jet engines and water jet pumps so that it cruises by skiing on the water surface, see FIG. 53.

116. A wideface scavenger energy converter system in accordance with claim 1 or claim 87 or claim 114, including a new design for an underwater boat, wherein, said boat is provided with flap wings to control its elevation, its air intake/outlet towers are made with shart edges facing the water current, and wherein the balloon kite pulling it is made up of multi-layer crisscrossing cylindrical balloons to make a stiff wideface kite, see FIG. 54.

117. A wideface scavenger energy converter system in accordance with claim 1 or claim 87 or claim 115, including a new design for a wideface winged airplane that skii on a wideface water wing while on cruise, comprising:

a wideface air wing having rear flap wings;

a plurality of propulsion engines attached to each left/right sides of said air wing;

a plurality of passenger capsules mounted on top of said air wing, two of which capsules extended to the rear forming a tail;

a couple of wideface rudders and a wideface elevator tail wing attached to said tail;

a plurality of propulsion engines tilted downward attached to said tail;

a vertical longitudenal wall attached to and below each third points of the air wing;

a stack of floater pipes adjustably attached to the vertical midpoints of each vertical wall to float the airplane on water;

a rectangular underwater main wing attached to the bottom end of and interconnecting said vertical walls, serving as waterwing;

an upward tilted front tappered side wing extension of said waterwing;

a flap elevator wing attached to the rear ends of each said main water wing and each said side wings;

a wideface rudder wing attached to the rear section of said vertical walls that also serve as water brake wings;

a vertical strut/tendon bar pivotally connected to and below said stack of floater pipes and to said elevator flap wing of said main waterwing, providing automatic control of the water line while said airplane is cruising on the water; and said airplane is named "Mababang Lipad" airplane, see FIG. 55.

118. A wideface scavenger energy converter system in accordance with claim 1 or claim 115 or claim 117, including a new design for a boat-airplane that skii on water while on cruise, wherein, two airplane bodies are spacedly coupled together under a wideface butterfly wing and floated on water making a catamaran boat under a wing, and wherein, an additional wideface underwater wing having elevator flap wings and rudder flap wings is provided at the front section of said boat-airplane to control the correct elevation of the water line while said boat is on cruise with its water wings kept underwater, and wherein, an additional second deck passenger capsule is mounted on top of each said airplane bodies; and said boat-airplane is also named "Mabang Lipad" airplanes, and wherein, a center capsule is mounted on top center of said wideface wing serving as pilot's cabin.

119. A wideface scavenger energy converter system in accordance with claim 1 or claim 117 or claim 118, including a new design for a floating restaurant/hotel, wherein, said boat-airplane of claim 117 and said boat-airplane of claim 118 are used as floating restaurants and floating hotels for tourist, they being least oscillated by the water waves.

120. A wideface scavenger energy converter system in accordance with claim 1 or claim 45 or claim 80, including a new design for a self floating spiral type water turbine, wherein, two units of floater pipes are layed horizontal, parallel to each other, parallel to the water current, floating independently, provided with sealed bearings at each end, and provided with wideface turbine blades in the form of spiral/auger fine around each pipe to form a water turbine; and wherein, a superstructure carrying an oppositely rotating electric generator is attached to said bearings to hold said turbines together into a catamaran-type boat; and wherein, said oppositely rotating generator is driven by said turbines thru a direct and a twisted drive belts thru a drive pulley around said pipe turbines; and wherein, a wideface anti-oscillation resistor underwater board is attached to and under said turbines thru said bearings; and said apparatus anchored against the water current by means of anchor ropes attached to the supperstructure and tied down to the ocean floor thru an anchor block, to generate electric power, said floater pipes made of large diameter to elevate the bearings above the water, see FIG. 57.

121. A wideface scavenger energy conveter system in accordance with claim 1 or claim 103, including a new design for underwater agricultural bed in combination with a plurality of push-and-pull electric generators attached thereto, comprising:

a wideface underwater anti-oscillation resistor, comprising:

a plurality of boards put together parallel and crisscrossing each other to have no gaps between boards; a plurality of stiff pipes/structural members put together in parallel attached to and under said boards, serving as floater carrier for said boards; a plurality of stiff floater pipes/structural members put together in parallel attached to and on top of said boards and across the said structural lower pipes in even spacing; a spacer vertical wall board having holes holding said upper structural pipes in even spacing making a soil box in between said upper structual floater pipes and on top of said boards; a plurality of anchor ropes attached to said wideface agricultural bed and the other end of said anchor ropes attached an anchor block on the ocean floor; a large quantity of fertil soil loaded on said soil boxes on said boards in order to sink said wideface underwater anti-oscillation resistor-agri-bed; a plurality of water plants planted on said agri-bed;

a plurality of vertical strut/tendon posts spacedly and pivotally attached to and standing on said wideface agri-bed oscillation resistor;

a vertical strut post-floater structural pipe co-axially attached to the top end of each said strut/tendon posts, and calibrated lifting said agri-bed above the ocean floor with sufficient length of it remaining floated above the water;

a drum-type induction wire coil co-axially attached to the top of each said vertical floater pipes;

an electically insulated cover plate attached to the top of said induction wire coil drum, having eye-hole connectors;

a bumper plate, with compression springs and large centrally cut hole, attached by bolts to said top cover plate, around the coil;

a couple of electric wire power outlets attached of said induction wire coils thru an insulated connector on top of said cover plate;

a plurality of guy wires/ropes attahced to said top cover plate and anchored to said structural pipes of said bed;

a circular dough-nut floater oscillator loosely placed around each said vertical floater post pipe, set free to oscillate up and down by the water waves while said floater post pipe is steady;

a drum-type magnet, place loosely around said floater post pipe, loaded on and attached to the top of said dough-nut oscillator;

a plurality of roller bearings attached around the upper lips of said drum magnets, and plurality of roller bearings around the lower lips of the dough-nut oscillator, and said bearings resting on said vertical floater post pipes to remove friction between said oscillator drums and the vertical post pipes;

said induction wire coil drum being adjusted to correct elevation so that the oscillation movement of said drum magnet is always within the vertical length of said induction wire drum;

and a tower post erected on top of some of said vetical post pipe serving as carrier of a wire transmission line collecting the generated electric power, see FIG. 58.

122. A wideface scavenger energy converter system in accordance with claim 1 or claim 121, including a new design for a floating agricultural bed, wherein, said underwater wideface anti-oscillation agri-bed is made floating on the water and used for general agricultural plantaion or horticulture.

123. A wideface scavenger energy converter system in accordance with claim 1, including a new design for for a water evaporator-distillation plant, wherein the wideface solar trap of claim 1 is built tilted facing the sun, comprising:

a multi-layer transparent sheets installed, with air spaces in between layers of sheets, to cover the space between two heat insulated walls of unequal heights making an inclined roof facing the sun;

a heat insulated floor under said roof;

a heat insulated side wall attached to cover the side ends of said roof together with the side ends of said floor and with the ends of the said roof carrier walls, making an evaporation chamber;

a water tank placed inside said evaporation chamber, resting on said floor and with its wall resting against said heat insulated walls, and with a dept of not more than 8 inches;

a condensation tower, having: a wideface vertical front wall connected air-tight with upper end of said transparent roof and extended upward facing the wind, serving as condensation wall; a rear vertical wall parallel to said front vertical wall attached air-tight with said lower rear heat insulated wall and extended upward to a few inches higher than said front wall, serving also as condensation wall; a side condensation wall attached air-tight with each left/right ends of said front and said rear condensation walls; an inclined condensation roof covering air-tight and interconnecting the top of all said front, rear, and side condensation walls, forming a condensation chamber; a plurality of inclined condensation radiator tubes spacedly and perpendicularly piercing and ending at said front condensation wall, likewise its upper end piercing said rear condensation wall, forming a plurality of wind passages inside said condensation tower making said tubes cool;

a condensate collection gutter water-tightly and slopingly attached to the base of each said inclined transparent roof, said front condensation wall, said rear condenation wall, and said side condensation wall, having a water outlet thru walls;

a plurality of high capillarity clothes hanging from the roof at even/close spacing with the lower section sugmerged into the liquid being evaporated;

a water supply pipe piercing said evaporation chamber walls at the desired elevation of water in the water tank and ending in said water tank;

a water level regulator similar to the toilet tank inter communicating said water supply pipe with a main unpurified water line;

a plurality of hot air radiator tubes piercing one wall of said evaporation chaamber, submerged into the water tank, and coming out thru the opposite side of said evaporation chamber;

a header main hot air supply pipe communicated with said hot air radiator pipes, and coming from a trash burner;

a header main exhaust pipe communicated with the outlets of said water submerged hot air radiator pipes, and extended into an oven for drying trash;

a low level out downward thru the floor of said tank/ chamber having a control valve to expell concentrated brine; and a high pressure water pump unit outside said chamber, havings its suction pipe communicated with the hot water inside said chamber, and its high pressure outlet pipe communicated with a plurality of water misting nozzles evenly/spacedly attached to an structure below said solar roof, see FIG. 59.

124. A wideface scavenger energy converter system in accordance with claim 1 or claim 102 or claim 105, including a new design for a floating sea wall/wave suppressor and for a new recycle use for old used rubber tires, comprising:

a floating wideface rubber/plastic horizontal mat made and set out floating on the ocean, having internal honeycomb air voids created by embedding empty pipes, empty bottles, old/used rubber tires filled up with styrofoam, and foamed plastics during its molding process; and made able to carry loads including airplanes and houses;

a second rubber mat of the same kind layed vertical and made into an underwater wall against the water waves and attached to the edge of said horizontal mat, and facing the water waves, serving as floater carrier wall;

a multi-chambered wall, having a plurality of open bottom chambers, window inward valves facing the surfs, a flat overhang roof, and mounted/attached to the top of said underwater wall at an elevation such that the outer lips of said open bottom chambers are a few inches above the valley cycle of the water waves;

said open bottom chambers having horizontal wall subdivisions with upward air valves;

a plurality of brackets spacedly holding the lips of said chambers down to the underwater wall;

said open bottom chambers serving as air compressors by way of the upward action of the water waves getting into said chambers, and having a upper chamber, a middle chamber, a lower chamber, and a bottom open chamber by way of said horizontal subdivision walls;

a plurality of internal vertical subdivision walls inside said multi-chambered wall creating said compression chambers;

said multi-chambered compression wall comprising: an impact wall with inward window valves facing the surfs; a rear wall at least 5 feet to the back of said impact wall; a flat roof interconnecting the top of said impact wall with the top of said rear wall and overhanging forward against the surfs;

an open window created on each vertical subdivision wall at the upper compression chamber intercommunicating all said upper chambers;

an air outlet of said upper chamber created on the rear wall at every 10 chambers spacing;

an air tubine installed at each said air outlet;

an electric generator connceted to said turbine;

a plurality of multi-level underwater wideface anti-oscillation resistors in the form of used rubber tires, with the center holes covered by plates/boards, hanging in multi-level vertical array by ropes from said underwater floater wall to which said ropes are attached;

a plurality of vertical crisscrossing walls under and attached to the bottom said horizontal floating mat, to make said mat more stiff and to hold more air under said mat; and a plurality of interlocking steel plates layed over on top of said mat serving as wearing surface for traffic and for the landing airplanes, see FIG. 60.

125. A wideface scavenger energy converter system in accordance with claim 1 or claim 124, including a new design for a transferable floating airport or for a portable ocean platform, wherein said floating wideface rubber/plastic mat of claim 124 is placed on top of, and made to cover a plurality of evenly spaced crisscrossing rubber/plastic floatable walls and airtightly jointed with said under walls in order to form a plurality of caissons/air chambers under said mat in order to make said mat into a stiff floor and to provide said mat with a strong buoyant power, and wherein, a plurality of sections of this caisson mat are flown by airplanes and assembled into a large airport on water in emergency locations, and wherein, a plurality of interlocking pieces of wideface steel plates are layed over said mat to make a strong wearing surface of said ocean platform for use as airport or dwelling place.

126. A wideface scavenger energy converter system in accordance with claim 1 or claim 125, including a new design for a presurized honeycomb floating mat wideface platform, wherein, a wideface underwater mat is airtightly attached to and jointly cover all the bottoms of said crisscrossing wall caissons thereby forming air tanks out of said caissons with said top cover mat, and wherein, said mats and said caissons are reinforced with stiffening fibers, and high pressure compressed air is introduced into said honeycomb caissons to make said honeycomb mat into a stiff ocean platform, and wherein, said honeycomb mat is constructed into at least One mile long to cover at least 10 ocean wave lengths to eliminate oscillation by the waterwaves, without using a wideface underwater anti-oscillation resistor board.

127. A wideface scavenger energy converter system in accordance with claim 1, wherein, the heat absorbing radiator pipes of an externally heated gas turbine engine are just exposed to the open hot/warm air/atmosphere in desert areas/places in the hot tropical regions, and to direct sun light/heat, and wherein, high humidity air is feed into said gas turbine engine.

* * * * *